United States Patent
Amaro, Jr. et al.

(10) Patent No.: US 12,242,245 B2
(45) Date of Patent: *Mar. 4, 2025

(54) DISCOVERY SERVICE IN A SOFTWARE DEFINED CONTROL SYSTEM

(71) Applicant: FISHER-ROSEMOUNT SYSTEMS, INC., Round Rock, TX (US)

(72) Inventors: Anthony Amaro, Jr., Round Rock, TX (US); Mark J. Nixon, Thorndale, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 641 days.

This patent is subject to a terminal disclaimer.

(21) Appl. No.: 17/489,404

(22) Filed: Sep. 29, 2021

(65) Prior Publication Data

US 2022/0404800 A1   Dec. 22, 2022

Related U.S. Application Data

(60) Provisional application No. 63/211,535, filed on Jun. 16, 2021.

(51) Int. Cl.
 *G06F 15/16* (2006.01)
 *G05B 19/4155* (2006.01)
 (Continued)

(52) U.S. Cl.
 CPC ..... *G05B 19/4155* (2013.01); *G05B 19/4184* (2013.01); *G06F 11/1469* (2013.01);
 (Continued)

(58) Field of Classification Search
 CPC ........... G05B 2219/31328; G05B 2219/31449; G05B 2219/25062; G05B 19/4184; G05B 2219/31; H04L 41/0654
 (Continued)

(56) References Cited

U.S. PATENT DOCUMENTS

| 7,281,250 B2 | 10/2007 | Ohsawa et al. |
| 7,293,080 B1 | 11/2007 | Clemm et al. |

(Continued)

FOREIGN PATENT DOCUMENTS

| CN | 115 052 033 A | 9/2022 |
| DE | 10 2019 119 714 A1 | 1/2021 |

(Continued)

OTHER PUBLICATIONS

Koziolek et al., "Self-Commissioning Industrial IoT-Systems in Process Automation," IEEE International Conference on Software Architecture, pp. 196-205 (2018).

(Continued)

*Primary Examiner* — Bharat Barot
(74) *Attorney, Agent, or Firm* — MARSHALL, GERSTEIN & BORUN LLP

(57) ABSTRACT

A software defined (SD) process control system (SDCS) includes a method executed by a discovery service for inferring information regarding a physical or logical asset of a process plant. The method includes obtaining an announcement indicative of a presence of a physical or logical asset of the process plant. The method also includes obtaining, from a context dictionary, one or more parameters retrievable from the physical or logical asset or one or more services associated with the physical or logical asset that were not indicated in the announcement. Furthermore, the method includes storing a record of the discovered physical or logical asset in a discovered item data store. The record includes an indication of the identity of the physical or logical asset and the one or more parameters or one or more services associated with the physical or logical asset that were not indicated in the announcement.

34 Claims, 46 Drawing Sheets

(51) Int. Cl.
G05B 19/418 (2006.01)
G06F 11/14 (2006.01)
G06F 15/173 (2006.01)
H04L 9/14 (2006.01)
H04L 9/30 (2006.01)
H04L 41/0654 (2022.01)
H04W 12/069 (2021.01)
G06F 16/23 (2019.01)

(52) U.S. Cl.
CPC ............... *H04L 9/14* (2013.01); *H04L 9/30* (2013.01); *H04L 41/0654* (2013.01); *H04W 12/069* (2021.01); *G05B 2219/25062* (2013.01); *G05B 2219/31328* (2013.01); *G05B 2219/31449* (2013.01); *G06F 16/2365* (2019.01); *G06F 2201/82* (2013.01)

(58) Field of Classification Search
USPC .................................. 709/223–224, 227–228
See application file for complete search history.

(56) References Cited

U.S. PATENT DOCUMENTS

| | | |
|---|---|---|
| 8,924,103 B2 | 12/2014 | Dammeyer et al. |
| 9,183,560 B2 | 11/2015 | Abelow et al. |
| 9,451,012 B1 | 9/2016 | Neill et al. |
| 9,521,115 B1 | 12/2016 | Woolward |
| 9,934,671 B1 | 4/2018 | Anderson et al. |
| 9,992,726 B2 | 6/2018 | Shepard et al. |
| 10,303,576 B1 | 5/2019 | Seymour et al. |
| 10,360,050 B2 | 7/2019 | He et al. |
| 10,382,203 B1 | 8/2019 | Loladia et al. |
| 10,547,521 B1 | 1/2020 | Roy et al. |
| 10,574,729 B2 | 2/2020 | Hadfield et al. |
| 10,663,956 B2 | 5/2020 | Jundt et al. |
| 10,915,081 B1 | 2/2021 | Nixon et al. |
| 10,977,070 B2 | 4/2021 | Li et al. |
| 11,126,469 B2 | 9/2021 | Reque et al. |
| 11,281,492 B1 | 3/2022 | Rebeja et al. |
| 11,513,877 B2 | 11/2022 | Biernat et al. |
| 11,541,447 B2 | 1/2023 | Beyfuss et al. |
| 11,637,918 B2 | 4/2023 | Yarvis et al. |
| 11,960,588 B2 * | 4/2024 | Amaro, Jr. .......... G06F 21/6218 |
| 2002/0126620 A1 | 9/2002 | Heckel et al. |
| 2003/0023795 A1 | 1/2003 | Packwood et al. |
| 2003/0061295 A1* | 3/2003 | Oberg ................ G05B 19/4184 709/227 |
| 2004/0114605 A1 | 6/2004 | Karaoguz et al. |
| 2004/0260404 A1 | 12/2004 | Russell |
| 2005/0160413 A1 | 7/2005 | Broussard |
| 2005/0220127 A1 | 10/2005 | Cane et al. |
| 2006/0167886 A1 | 7/2006 | Kantesaria et al. |
| 2007/0006228 A1 | 1/2007 | Grobman et al. |
| 2007/0076742 A1 | 4/2007 | Du et al. |
| 2009/0083843 A1 | 3/2009 | Wilkinson, Jr. et al. |
| 2009/0327606 A1 | 12/2009 | Galloway et al. |
| 2010/0235831 A1 | 9/2010 | Dittmer et al. |
| 2010/0263025 A1 | 10/2010 | Neitzel et al. |
| 2010/0290351 A1 | 11/2010 | Toepke et al. |
| 2011/0021131 A1 | 1/2011 | Chen |
| 2011/0125921 A1 | 5/2011 | Karenos et al. |
| 2011/0265077 A1 | 10/2011 | Collison et al. |
| 2012/0102492 A1 | 4/2012 | Iwata et al. |
| 2012/0259436 A1 | 10/2012 | Resurreccion et al. |
| 2013/0031249 A1 | 1/2013 | Gunzert et al. |
| 2013/0031294 A1 | 1/2013 | Feng et al. |
| 2013/0086594 A1 | 4/2013 | Cottrell |
| 2013/0212129 A1 | 8/2013 | Lawson et al. |
| 2013/0297748 A1* | 11/2013 | Wilson ............... G05B 19/4184 709/224 |
| 2014/0019491 A1 | 1/2014 | Hamel |
| 2014/0344269 A1 | 11/2014 | Dong et al. |
| 2015/0378356 A1 | 12/2015 | Hefeeda et al. |
| 2016/0019084 A1 | 1/2016 | Forestiero et al. |
| 2016/0033006 A1 | 2/2016 | Leverington |
| 2016/0043866 A1 | 2/2016 | Nixon |
| 2016/0134596 A1 | 5/2016 | Kovacs et al. |
| 2016/0164743 A1 | 6/2016 | Cimprich et al. |
| 2016/0299772 A1 | 10/2016 | Seenappa et al. |
| 2016/0373310 A1 | 12/2016 | Banikazemi et al. |
| 2017/0026677 A1 | 1/2017 | Kim et al. |
| 2017/0095405 A1 | 4/2017 | Afsarifard et al. |
| 2017/0149843 A1 | 5/2017 | Amulothu et al. |
| 2017/0279770 A1 | 9/2017 | Woolward |
| 2017/0308330 A1 | 10/2017 | Suresh et al. |
| 2017/0344408 A1 | 11/2017 | Tan et al. |
| 2017/0359245 A1 | 12/2017 | Dintenfass et al. |
| 2017/0366551 A1 | 12/2017 | Brandwine |
| 2018/0052628 A1 | 2/2018 | Endo et al. |
| 2018/0067848 A1 | 3/2018 | Baldwin et al. |
| 2018/0112795 A1 | 4/2018 | Anderson et al. |
| 2018/0113442 A1 | 4/2018 | Nixon et al. |
| 2018/0114414 A1 | 4/2018 | Law et al. |
| 2018/0144144 A1 | 5/2018 | Luo et al. |
| 2018/0164791 A1 | 6/2018 | Debes et al. |
| 2018/0227369 A1 | 8/2018 | DuCray et al. |
| 2018/0299849 A1 | 10/2018 | Martin et al. |
| 2018/0316729 A1 | 11/2018 | Chauvet et al. |
| 2018/0341241 A1 | 11/2018 | Song |
| 2018/0375936 A1 | 12/2018 | Chirammal et al. |
| 2019/0041824 A1 | 2/2019 | Chavez et al. |
| 2019/0041830 A1 | 2/2019 | Yarvis et al. |
| 2019/0042378 A1 | 2/2019 | Wouhaybi et al. |
| 2019/0109820 A1 | 4/2019 | Clark et al. |
| 2019/0140918 A1 | 5/2019 | Xu et al. |
| 2019/0205180 A1* | 7/2019 | Macha ............ G05B 19/41845 |
| 2019/0294124 A1 | 9/2019 | Law et al. |
| 2019/0317465 A1 | 10/2019 | Wei et al. |
| 2019/0324431 A1 | 10/2019 | Cella et al. |
| 2019/0369574 A1 | 12/2019 | Val et al. |
| 2019/0379590 A1 | 12/2019 | Rimar et al. |
| 2020/0067789 A1 | 2/2020 | Khuti et al. |
| 2020/0092254 A1 | 3/2020 | Goeringer et al. |
| 2020/0092271 A1 | 3/2020 | Kumar et al. |
| 2020/0099531 A1 | 3/2020 | Chidambaram et al. |
| 2020/0102507 A1 | 4/2020 | Sun et al. |
| 2020/0112442 A1 | 4/2020 | Wentz |
| 2020/0209816 A1 | 7/2020 | Cebasek et al. |
| 2020/0225649 A1 | 7/2020 | Cahill et al. |
| 2020/0226123 A1 | 7/2020 | Nixon et al. |
| 2020/0228316 A1 | 7/2020 | Cahill |
| 2020/0228342 A1 | 7/2020 | Nixon et al. |
| 2020/0310394 A1 | 10/2020 | Wouhaybi et al. |
| 2020/0322286 A1 | 10/2020 | Mehta et al. |
| 2020/0387144 A1 | 12/2020 | Nixon et al. |
| 2020/0387145 A1 | 12/2020 | Nixon et al. |
| 2020/0387146 A1 | 12/2020 | Nixon et al. |
| 2020/0396225 A1 | 12/2020 | Bhatia et al. |
| 2020/0401116 A1 | 12/2020 | McLaughlin et al. |
| 2021/0011772 A1 | 1/2021 | Zhou et al. |
| 2021/0044564 A1 | 2/2021 | Victor et al. |
| 2021/0058399 A1 | 2/2021 | Kapoor et al. |
| 2021/0089526 A1 | 3/2021 | Nixon et al. |
| 2021/0089542 A1 | 3/2021 | Nixon et al. |
| 2021/0089592 A1 | 3/2021 | Nixon et al. |
| 2021/0089593 A1 | 3/2021 | Nixon et al. |
| 2021/0092173 A1 | 3/2021 | Nixon et al. |
| 2021/0109658 A1 | 4/2021 | Mallick et al. |
| 2021/0149637 A1 | 5/2021 | Hallman, Jr. et al. |
| 2021/0271489 A1 | 9/2021 | Singhal |
| 2021/0294659 A1 | 9/2021 | Amit |
| 2021/0356944 A1 | 11/2021 | Chauvet et al. |
| 2021/0384058 A1 | 12/2021 | Harada et al. |
| 2022/0012137 A1 | 1/2022 | Xiao et al. |
| 2022/0058012 A1 | 2/2022 | Kaushik et al. |
| 2022/0070112 A1 | 3/2022 | Mazzitelli et al. |
| 2022/0091583 A1 | 3/2022 | Biernat et al. |
| 2022/0103580 A1 | 3/2022 | Manickam et al. |
| 2022/0108806 A1 | 4/2022 | Kommalapati et al. |
| 2022/0128982 A1 | 4/2022 | Mansfield |
| 2022/0229707 A1 | 7/2022 | Lange et al. |
| 2022/0283571 A1 | 9/2022 | Vieira et al. |

(56) References Cited

U.S. PATENT DOCUMENTS

| | | | |
|---|---|---|---|
| 2022/0404788 A1* | 12/2022 | Amaro, Jr. | ............ H04L 41/122 |
| 2022/0404798 A1 | 12/2022 | Amaro, Jr. et al. | |
| 2022/0404812 A1* | 12/2022 | Amaro, Jr. | ......... G05B 19/4188 |
| 2024/0004688 A1 | 1/2024 | Shigemori | |
| 2024/0031370 A1 | 1/2024 | Ubach et al. | |

FOREIGN PATENT DOCUMENTS

| | | |
|---|---|---|
| EP | 1492310 A2 | 12/2004 |
| EP | 2 790 101 A1 | 10/2014 |
| EP | 3 382 546 A1 | 10/2018 |
| GB | 2 403 043 A | 12/2004 |
| GB | 2 410 573 A | 8/2005 |
| GB | 2 481 753 A | 1/2012 |
| GB | 2 575 758 A | 1/2020 |
| GB | 2 589 710 A | 6/2021 |
| WO | WO-2014/124701 A1 | 8/2014 |
| WO | WO-2016/090292 A1 | 6/2016 |
| WO | WO-2017/064560 A1 | 4/2017 |
| WO | WO-2017/066304 A1 | 4/2017 |
| WO | WO-2017/121928 A1 | 7/2017 |
| WO | WO-2018/234741 A1 | 12/2018 |
| WO | WO-2020/202126 A1 | 10/2020 |
| WO | WO-2020/251828 A1 | 12/2020 |
| WO | WO-2021/079357 A1 | 4/2021 |

OTHER PUBLICATIONS

Madiwalar et al., "Plug and produce for Industry 4.0 using software-defined networking and OPC UA", 24th IEEE International Conference on Emerging Technologies and Factory Automation (ETFA), pp. 126-133 (Sep. 2019).

Pribis et al., "An Industrial Communication Platform for Industry 4.0—Case Study," Cybernetics & Informatics, pp. 1-8 (2020).

Profanter et al., "OPC UA for Plug & Produce: Automatic Device Discovery Using LDS-ME," 22nd IEEE Interational Conference on Emerging Technologies and Factory Automation, pp. 1-8 (2017).

Search Report for Application No. GB2208755.5, dated Feb. 10, 2023.

Search Report for Application No. GB2208757.1, dated Feb. 10, 2023.

Search Report for Application No. GB2208758.9, dated Dec. 16, 2022.

Search Report for Application No. GB2208759.7, dated Dec. 16, 2022.

Search Report for Application No. GB2208766.2, dated Feb. 16, 2023.

Search Report for Application No. GB2208768.8, dated Dec. 7, 2022.

Search Report for Application No. GB2208769.6, dated Dec. 7, 2022.

Search Report for Application No. GB2208770.4, dated Dec. 7, 2022.

Search Report for Application No. GB2208771.2, dated Dec. 12, 2022.

Search Report for Application No. GB2208794.4, dated Jan. 17, 2023.

Search Report for Application No. GB2208795.1, dated Jan. 17, 2023.

Search Report for Application No. GB2208796.9, dated Nov. 10, 2022.

Search Report for Application No. GB2208797.7, dated Dec. 1, 2022.

Search Report for Application No. GB2208857.9, dated Nov. 18, 2022.

Search Report for Application No. GB2208858.7, dated Nov. 18, 2022.

Sung et al., "Description lookup based UPnP extension for wireless sensor networks", Proceedings of the 2009 6th annual international mobile and ubiquitous systems: Networking & Services, MobiQuitous (Jul. 2009).

Computer and Information Security Handbook, 3rd Edition (2017). Select pages.

Emerson & PreScouter, "Software Defined Architecture for Embedded Applications," Research Support Service (2020).

NAMUR Recommendation, NAMUR Open Architecture NOA Concept (2020).

"Kubernetes—Web UI (Dashboard)," (2021).

Aftab et al., "Analysis of identifiers in IoT platforms", Digital Communications and Networks, 6(3):333-340 (2019).

Alaasam et al., "Stateful Stream Processing for Digital Twins," International Multi-Conference on Engineering, Computer and Information Sciences (Oct. 21, 2019).

Bellini et al., "High Level Control of Chemical Plant by Industry 4.0 Solutions," Journal of Industrial Information Integration, vol. 26 (Sep. 2, 2021).

Dobaj et al., "A Microservice Architecture for the Industrial Internet-Of-Things", Computational Biology and Bioinformatics (Jul. 4, 2018).

Greevenbosch, "Use Cases and Requirements for Authentication, Authorisation and Revocation in the Internet of Things; draft-greevenbrosch-dice-authent-author-revoc-00.txt," Standardworkingdraft, Internet Society (2013).

Hmaity et al. "Virtual Network Function Placement for Resilient Service Chain Provisioning", 978-4673-9023-1, 2016, IEEE (Year: 2016).

Houmani et al., "Enhancing microservices architectures using data-driven service discovery and QoS guarantees", 2020 20th IEEE/ACM International Symposium on Cluster, Cloud and Internet Computing (CCGRID), IEEE (May 11, 2020).

International Search Report and Written Opinion for Application No. PCT/US2023/027978, dated Dec. 11, 2023.

International Search Report and Written Opinion for Application No. PCT/US2023/027988, dated Oct. 25, 2023.

International Search Report and Written Opinion for Application No. PCT/US2023/028003, dated Oct. 25, 2023.

International Search Report and Written Opinion for Application No. PCT/US2023/028005, dated Oct. 26, 2023.

International Search Report and Written Opinion for Application No. PCT/US2023/028027, dated Nov. 7, 2023.

International Search Report and Written Opinion for Application No. PCT/US2023/028029, dated Oct. 27, 2023.

International Search Report and Written Opinion for Application No. PCT/US2023/033926, dated Mar. 18, 2024.

International Search Report and Written Opinion for Application No. PCT/US2023/034272, dated Jan. 22, 2024.

International Search Report and Written Opinion for Application No. PCT/US2023/034349, dated Jan. 18, 2024.

International Search Report and Written Opinion for Application No. PCT/US2023/034351, dated Jan. 22, 2024.

International Search Report and Written Opinion for Application No. PCT/US2023/035611, dated Jan. 25, 2024.

International Search Report and Written Opinion for Application No. PCT/US2023/035613, dated Jan. 26, 2024.

International Search Report and Written Opinion for Application No. PCT/US2023/035618, dated Mar. 21, 2024.

Jairo et al., "Deliverable D1.1. Review of Reference Architectures for IoT Enabled Agriculture Development. Consultandy Design of a reference architecture for an IoT sensor network. Company International Center for Tropical Agriculture (CIAT)", (Apr. 29, 2019).

Jin et al., "Secure Edge Computing Management Based on Independent Microservices Providers for Gateway-Centric IoT Networks", IEEE Access, IEEE, 8:187975-187990 (2020).

Kashyap: "Yokogawa Cloud Architecture for Smart Manufacturing", Yokogawa technical report (Nov. 10, 2023).

Khalyly et al., "Smart Agent Edge Microservices Deployment pproach", 2020 International Conference on Decision Aid Ciences and Application (DASA), IEEE (Nov. 8, 2020).

Malakuti et al., "A Four-Layer Architecture Pattern for Constructing and Managing Digital Twins," Advances in Databases and Information Systems, 231-246 (2019).

(56) References Cited

OTHER PUBLICATIONS

Pontarolli et al., "Towards Security Mechanisms for an Industrial Microservice-Oriented Architecture," 14th IEEE International Conference on Industry Applications (2021).
Radchenko et al., "Micro-Workflow: Kafka and Keplar Fusion to Support Digital Twins of Industrial Processes," IEEE/ACM International Conference on Utility and Cloud Computing Companion (Dec. 17, 2018).
Search Report for Application No. GB2208756.3, dated Feb. 23, 2023.
Search Report for Application No. GB2208780.3, dated Feb. 22, 2023.
Search Report for Application No. GB2208821.5, dated Mar. 31, 2023.
Search Report for Application No. GB2208856.1, dated Jan. 18, 2023.
Steindl et al., "Semantic Microservice Framework for Digital Twins," Applied Sciences, 11(12):1-19 (2021).
Tomarchio et al., "TORCH: A TOSCA-Based Orchestrator of Multi-Cloud Containerised Applications," Journal of Grid Computing (2021).
Tundo et al., "Declarative Dashboard Generation," IEEE Internation Symposium on Software Reliability Engineering Workshops (2020).

\* cited by examiner

| Container | Active? | Next Available? | Power Supply | Node | Node Loading | Processor | Processor Loading | Core | Core Loading |
|---|---|---|---|---|---|---|---|---|---|
| Controller #1-1 | Yes | | 1 | 1 | 60% | 2 | 40% | 1 | 94% |
| Controller #1-2 | No | Yes | 2 | 2 | 57% | 2 | 46% | 2 | 75% |
| Controller #1-3 | No | Yes | 1 | 3 | 23% | 1 | 23% | 1 | 73% |
| Cont. Ctrl #1-1 | No | Yes | 1 | 2 | 60% | 2 | 40% | 3 | 64% |
| Cont. Ctrl #1-2 | Yes | | 2 | 1 | 57% | 3 | 73% | 1 | 63% |
| Dist. Alarm #1-1 | No | | 1 | 2 | 60% | 2 | 40% | 2 | 41% |
| Dist. Alarm #1-2 | Yes | | 2 | 1 | 57% | 1 | 27% | 1 | 39% |
| I/O Server #1-1 | Yes | | 1 | 2 | 60% | 2 | 60% | 2 | 77% |
| I/O Server #1-2 | No | Yes | 2 | 2 | 57% | 3 | 73% | 2 | 77% |

FIG. 6

| Device Type | Primary Variables | Contextual Variables |
|---|---|---|
| Thermocouple | Temperature | Device Health Metrics, Device Tolerance |
| Mass Flow Sensor | Mass Flow | Full Speed Fluid Velocity, Fluid Density |
| Valve | Valve Position, Air Pressure | Valve Health Metrics, Valve Travel Metrics, Mode of Operation, Dead Band, Dead Time, Valve Performance Monitoring Service |

CONTEXT 1

FIG. 36

DISCOVERY SERVICE IN A SOFTWARE DEFINED CONTROL SYSTEM

CROSS-REFERENCE TO RELATED APPLICATIONS

This application claims priority to and the benefit of U.S. Provisional Patent Application 63/211,535 filed on Jun. 16, 2021 and entitled "Software Defined Process Control System for Industrial Process Plants," the entire disclosure of which is hereby incorporated by reference.

TECHNICAL FIELD

The present application relates generally to industrial process control systems of industrial process plants and, more particularly, to industrial process control systems that are software defined.

BACKGROUND

Current distributed industrial process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks. The field devices, which may be, for example, valves, valve positioners, switches and transmitters (e.g., temperature, pressure, level and flow rate sensors), are located within the process environment of the industrial process plant (which is interchangeably referred to herein as a "field environment" or a "plant environment" of the industrial process plant), and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which are also typically located within the plant environment, but may be located in a back-end, protected environment associated with the plant, receive signals indicative of process measurements made by the field devices and/or other information pertaining to the field devices and execute a control routine or application that runs, for example, different control modules which utilize different control algorithms make process control decisions, generate process control signals based on the received information and coordinate with the control modules or blocks being performed in the field devices, such as HART®, WirelessHART®, and FOUNDATION® Fieldbus field devices.

Other types of field devices may include, for example, spectrometric devices which may be used for quality control and purity verification, e.g., in specialty chemical and pharmaceutical process plants. Examples of spectrometric field devices include NIR (Near-infrared), UV-VIS (ultraviolet-visible), and Raman spectrometers, to name a few. Spectrometric field devices may be controlled or managed by controllers or device managers which typically instruct the spectrometric devices when to collect data, when to transmit collected data, etc. I/O devices disposed between the field devices and the controllers enable communications therebetween. For example, control modules in a process controller send the control signals to various different input/output (I/O) devices, which then send these control signals over specialized communication lines or links (communication physical layers) to the actual field devices to thereby control the operation of at least a portion of the process plant or system, e.g., to control at least a portion of one or more industrial processes (e.g., physical processes) running or executing within the plant or system. In another example, spectrometric managers or controllers transmit instructions to various I/O devices, which then send the instructions via the specialized communication lines or links to physical spectrometric devices disposed in the industrial process plant. Responsive to the instructions, the spectrometric devices transmit collected data to the managers/controllers and/or to other recipient devices in the process control system via a similar reverse route through the I/O devices. The I/O devices, which are also typically located within the plant environment, are generally disposed between a controller and one or more field devices, and enable communications there-between, e.g., by converting electrical signals into digital values and vice versa. Different I/O devices are provided to support field devices that use different specialized communication protocols. More particularly, a different I/O device is provided between a controller and each of the field devices that uses a particular communication protocol, such that a first I/O device is used to support HART field devices, a second I/O device is used to support Fieldbus field devices, a third I/O device is used to support Profibus field devices, etc. Field devices, controllers, and I/O devices are generally referred to as "process control devices," and are generally located, disposed, or installed in a field environment of a process control system or plant.

Still further, information from the field devices and their respective controllers is usually made available through the controllers over a data highway or communication network to one or more other hardware devices, such as operator workstations, personal computers or computing devices, data historians, report generators, centralized databases, or other centralized administrative computing devices that are typically placed in control rooms or other locations away from the harsher and/or hazardous field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths, and typically uses a packet based communication protocol and non-time sensitive communication protocol, such as an Ethernet or IP protocol.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which may be objects in an object-oriented programming protocol that perform functions within the control scheme based on inputs thereto and that provide outputs to other function blocks within the control scheme. The configuration application may also allow a configuration engineer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As distributed industrial process control systems have evolved over time, different hardware, communication, and networking technologies have been developed and added. Consequently, present day process control systems typically include a myriad of inflexible and hardware-centric devices, such as dedicated operator consoles, configuration stations, purpose-built controllers, and I/O cards, to name a few. This slew of different types of hardware devices within a process control system necessitates multiple levels of configuration and exposure of the underlying system to the user, and typically translates to increased cost of initial engineering efforts and increased cost to perform change management. Further, process plant installations and expansions are easily subject to cost overruns and supply-chain delays due to their dependence on purpose-built hardware.

The information technology (IT) sector suffers from similar issues, although in a more generalized sense. Within the IT sector, recent trends include abstracting layers of infrastructure, including physical hardware requirements, away from user-bearing business logic so as to allow for flexibility of hardware installation. Typically, in IT systems, IT administrators design, dictate, or otherwise set forth the hardware requirements which are deemed to be needed to implement the target user-bearing business logic, and IT administrators adjust hardware platform configurations and utilizations when business logic needs change.

SUMMARY

An industrial, software defined process control system (SDCS) provides a novel architecture for a process control system of an industrial process plant which, to a large extent, decouples software and hardware of the process control system. Generally speaking, the business logic of process control system automation is implemented as logical abstractions on top of software and hardware computer resources. The management of these resources for industrial process control may be implemented in a hyper-converged computer system infrastructure environment, in which the software defined (SD) components or elements are managed and distributed by the software defined process control system using some or all of the techniques described herein. Advantageously, the software defined process control system dynamically and automatically manages software and hardware resources to support dynamic demands of process control system business logic in view of dynamically occurring conditions of the process control system and industrial process plant (e.g., responsively and/or predictively) during run-time of the software defined process control system.

The software defined process control system (SDCS) may include a software defined networking layer, a software defined application layer, and a software defined storage layer which are supported by a physical layer. The physical layer may or may not be included in the SDCS. Generally speaking, the physical layer includes hardware interfaces (e.g., one or more network interfaces or ports) via which the SDCS is communicatively connected to the field environment of the industrial process plant and physical devices or physical components disposed therein. For example, the hardware interfaces may include input/output (I/O) interfaces. The physical layer may also include routing components, which may be implemented via software and/or hardware, to route data to and from specific interface ports. In some embodiments, the SDCS includes the physical layer, and in some embodiments, the SDCS excludes the physical layer and is communicatively connected to another set of computing devices or computing platform which provides the physical layer.

The software defined networking layer of the SDCS includes a computing platform including one or more data computing clusters, which are at least partially, if not fully, internetworked. Each cluster may include one or more nodes which are at least partially networked to each other via respective networking resources, and each node includes a respective set of processor and/or processor core resources and memory resources. For example, a node may be implemented on a computing device or a server. A computing device or server may include multiple processors, and a processor may include multiple cores.

At the SD networking layer, a software defined operating system monitors and administrates the creation of components of the software defined application layer and the application layer components' usage or utilization (both singularly and collectively) of the available (and possibly dynamically changing hardware and software resources) of the computing platform nodes during start up and run-time of the SDCS. For example, the SD operating system assigns application layer components to execute on particular nodes of the computing platform, and/or to utilize particular processor resources, processing core resources, and/or memory resources of the nodes of the computing platform. Generally speaking, the SD operating system of the SD networking layer provides support services, some of which are consumed by SD application layer components, which allocate, assign, re-allocate, re-assign, load-balance, etc. the SD application layer components to and among various nodes (and, in some cases, to various processing and/or memory resources of a specific node) according to process control system business logic, timing, and performance requirements, in coordination with monitoring and managing the hardware and software resources of the nodes to support the software defined application layer components. Additionally, the software defined networking layer communicatively couples and manages the networking or delivery of data between software defined application layer components and their respective endpoints, which may be other software defined application layer components, devices disposed in the process plant field environment, user interface devices, external systems, etc.

The software defined application layer includes process control system business logic, which is typically implemented via containers, virtual machines, or other suitable encapsulated execution environments. For example, process control system business logic may be implemented as a set of application layer services, where application layer services may be respectively configured for specific sets of business logic, and each instance of a configured service may execute in a separate encapsulated execution environment. For example, SDCS application layer services may include process control controllers, user interfaces, diagnostics, analytics, I/O networking, and historians, to name a few. SD application layer services may be configured with control routines, tags, device identifiers, device signal identifiers, parameters, values, etc. to form configured instances of services, each of which may execute in a respective encapsulated execution environment (e.g., configured containers, virtual machines, etc.). The configured encapsulated execution environments are assigned or allocated (and in some cases, re-assigned or re-allocated based on dynamically occurring conditions within the industrial process plant) by the SD networking layer to execute on respective software and/or hardware resources of the nodes of the computing platform.

The software defined storage layer includes process control system data storage which may be utilized by the software defined application layer. Similar to the software defined application layer, the software defined storage layer provides logical storage entities or locations for use by the applications of the SD application layer, and the logical storage entities are assigned and/or allocated (and in some cases, re-assigned and/or re-allocated) by the SD networking layer to various resources of the nodes of the computing platform. Further, the SD networking layer may provide redundancy of various logical storage entities, if desired.

A method and system for controlling an industrial process control plant uses the SDCS application layer services to facilitate process control using software defined controllers, software defined input/output resources, software defined storage, and/or software defined networking. The SDCS application layer includes one or more containers executing one or more services. An orchestrator operates as part of a hyper converged infrastructure to control the instantiation of the one or more containers, and to facilitate load balancing and fault tolerance by duplication and/or moving (e.g., re-instantiating) containers between different hardware resources. For example, individual containers, executing respective services, may be moved between hardware resources as hardware resources (e.g., processors, processor cores, memory devices, network capacity) become loaded, in order to ensure that all services are operating nominally. As another example, multiple copies of a specific container (i.e., multiple copies of a service serving a specific portion of the process plant) may be instantiated on different hardware resources in order to ensure that if a single copy of the container becomes unstable or unavailable, or a hardware resource fails, control can shift to another copy of the container without any (or with only minimal, milliseconds, for example) time required to ensure continuous control of the process. The services implemented in this manner, and controlled by the orchestrator, may include I/O server services, controller services, historians, subsystems (e.g., batch control, continuous control, event control, alarm subsystems, diagnostic subsystems, etc.), network services (e.g., software firewalls), and any other containerized service in the SDCS. The hardware resources over which hardware diversity may be implemented between identical containers include data clusters, power supplies, server nodes, processors, processor cores, memory devices, etc., and can allow for the dynamic addition or removal of hardware resources as necessary or required.

Another aspect of the presently described system includes nested computing containers operating within the SDCS. While each of the containers instantiated on a computing node is an isolated executing environment executing within the operating system of the computing node, a given container may be instantiated within another container and/or may have one or more containers instantiated therein. As such, it is possible, for example, to replicate physical or logical hierarchies within the process plant, thereby duplicating in the setup of the SDCS the physical and logical arrangements of elements within the process plant. For instance, plant areas, units within areas, and process modules within units may be replicated in nested containers of the SDCS.

Still further, in the SDCS described herein, containers may be pinned to other elements of the process control environment. By pinning a container to another element of the process control system or plant, a configuration engineer or operator may ensure that certain parameters are met, notwithstanding some autonomy enjoyed by the orchestrator. For example, containers may be pinned to compute resources, to storage resources, to network resources, to power supply resources, and the like, in order to ensure that certain aspects of fault tolerance are maintained, even though containers may be "moved" for load balancing purposes (e.g., a container may remain on compute resources coupled to a specific power supply, even though the container may be moved between compute resources that are coupled to the power supply). Containers may also be pinned to other containers or groups of containers (so that they are moved/instantiated together), whether nested or not, or may be pinned to hardware in the process control plant itself (e.g., so that a particular controller container is associated with a specific unit of process control hardware).

In example operation, an I/O server service of the SDCS interfaces with multiple containerized controller services each implementing the same control routine to control the same portion of the same plant. The I/O server service may provide the same controller inputs to each of the containerized controller services (e.g., the controller outputs representing measurements that have been obtained by field devices and transmitted by the field devices to the I/O server service). Each containerized controller service executes the same control routine to generate a set of controller outputs. The I/O server service receives each set of controller outputs and forwards an "active" set of controller outputs to the appropriate field devices. The sets of outputs from the other controller services may not be transmitted to the field devices. The I/O server service and other services in the system, such as an orchestrator service, may continuously evaluate performance and resource utilization in the control system, and may dynamically activate and deactivate controller services as appropriate to optimize performance. If desired, the I/O server service may be containerized. Further, more than one instance of the same containerized I/O server service may exist. In such an implementation, a single one of these instances may be considered "active," acting as a fully functional intermediary for I/O traffic between field devices and containerized controller services. The "inactive" I/O server services may receive the same I/O traffic received by the "active" I/O server service and may implement the same logic on the I/O traffic. However, if desired, the "inactive" I/O server services do not forward the I/O traffic; or if they do, it is not received and acted on by the target service or device (e.g., a network switch may receive the traffic and determine it is "inactive" I/O traffic, and thus might not forward it to it target).

Containerized controller services and containerized I/O server services may be distributed across physical resources at a plant or elsewhere in any desired fashion. Further, if desired, any one or more of the implemented containers are not permanently fixed or pinned to any particular computer cluster or node/server they happen to be executing on at any given time. The containers may be dynamically (e.g., in or near real-time, during execution) instantiated, deleted, and re-instantiated at different computers when desired to balance computing and network loads and to mitigate computational or networking inefficiencies (e.g., when a given physical resource becomes overly burdened computationally or by network traffic). Further, the total instances of a given container can be dynamically reduced or increased as needed, and any one of these instances (e.g., each implementing the same controller service) may activated or deactivated as needed. This "juggling" between containers may be helpful if the computational and networking workloads for the physical resources are highly variable. Each controller service may be containerized in its own dedicated container, thereby providing a relatively isolated, consistent, and predictable environment within which each controller service is implemented, regardless of the broader software environment present on the node implementing the containers. For example, a container may include software dependencies and software libraries needed for a given controller service. Without containers, it might be necessary to properly configure every single node on which the controller service might run in order to ensure consistent environments for the controller service. And if a given node needs to be capable of implementing various different types of services (each of which may have different environmental requirements), ensuring proper configuration of the node can become complex. By contrast, the described controller service containers enable each controller service to easily be instantiated at any given node and to easily be moved between nodes/servers or computing clusters (e.g., by the I/O server service).

Another aspect of the presently described system includes security services within the SDCS. At the SD networking layer, an SD networking service may administer and manage the logical or virtual networking utilized by the logical process control system, which may be implemented by the SD networking service across the physical nodes. The SD networking service may deploy and manage instances of network appliances, such as virtual routers, virtual firewalls, virtual switches, virtual interfaces, virtual data diode, etc., and instances of network services, such as packet inspection services, access control services, authorization services, authentication services, encryption services, certificate authority services, key management services, etc., in the SDCS.

For example, the SD networking service may deploy a service for role-based authorization within the SDCS. When a user requests authorization to access a service (e.g., a control service) within the SDCS, the authorization service may determine an authorization level of the user based on the request and determine whether the user is authorized to access the other service. More specifically, the authorization service may determine a minimum threshold authorization level for accessing the control service, and determine whether the user's authorization level meets or exceeds the minimum threshold authorization level. If the user is unauthorized, the authorization service may prevent access to the control service.

The SD networking service may also deploy a certificate authority service. The certificate authority service may generate digital certificates for physical or logical assets for authenticating the physical or logical assets. The certificate may indicate that the certificate authority service verified the identity of the physical or logical asset, so that the identity of the physical or logical asset does not need to be verified each time the physical or logical asset communicated with services or nodes of the SDCS.

The SDCS may also include a discovery service that executes via a container on a compute node of the SDCS. When a physical or logical asset joins a network in the process plant, the physical or logical asset announces its presence. The discovery service then generates and stores a record of the identity, capabilities, and/or location of each physical or logical asset in the process plant which may be utilized during run-time of the process plant to control at least a portion of the industrial process. In this manner, the discovery service may assist in the commissioning of physical assets within the process plant, such as field devices as well as commissioning logical assets such as containers, services, and microservices. Physical or logical assets in the SDCS may be commissioned automatically upon discovery without manual input.

The discovery service may also perform fault recovery when the record of the physical or logical assets in the process plant is corrupted or destroyed by broadcasting a request to each of the physical or logical assets in the network to announce their presence. In this manner, the record of the physical or logical assets may be recovered automatically without having to manually enter information about each of the physical or logical assets in the process plant.

Furthermore, unlike current process control data exchange standards such as OPC where the system at most identifies the capabilities that are announced by a physical or logical asset (also referred to herein as "primary variables"), the discovery service described herein is configured to automatically infer additional capabilities of the physical or logical asset which are not announced to the discovery service when the physical or logical asset is discovered (also referred to herein as "contextual variables"). The additional capabilities may include additional parameters or services provided by the physical or logical asset or services configured to communicate with the physical or logical asset. The discovery service may then provide an indication of the capabilities of the physical or logical asset to another node or service in the SDCS requesting information about the physical or logical asset. In this manner, the discovery service may store a more complete record of the physical or logical assets in the process plant and their respective capabilities than previous process control systems. Accordingly, nodes and services in the SDCS can obtain detailed information regarding the capabilities of the physical or logical assets in the process plant from the discovery service without having to poll the physical or logical assets directly to identify additional capabilities.

Still further, to assist a user in visualizing the run-time operation of the SDCS, a visualization service interfaces with the orchestrator and a configuration database to obtain configuration data and current run-time operational data defining the currently established or operating interrelationships between various logical elements of the control system, such as control and subsystem containers, both with each other and with physical elements in the system. The visualization service may create any number of different user displays that illustrate these relationships (as currently configured and operating in the SDCS) and that also provide key performance or health parameters for one or more of the displayed logical and/or physical elements. For example, the visualization service may create a run-time operational hierarchy that illustrates, in a hierarchical view, the manner in which various logical elements, such as control containers and sub-units thereof, are nested within one another and are pinned to one another. This hierarchy may also illustrate the manner in which various logical elements are pinned to or are simply being executed in or assigned to various physical elements of the control system. The hierarchy display may also enable a user to move or dynamically reassign various logical elements to other logical elements or to physical elements within the system. Still further, the visualization service may create and present a display that illustrates physical hardware (e.g., servers, nodes, compute clusters, processors, etc.) within the control system and the logical elements (e.g., control containers, third party containers, subsystem containers, etc.) that are currently being executed on those physical elements. The display may also include performance or health indices indicating various performance and/or health measures for the physical and logical elements within the display. In other cases, the visualization service may create and present a display that illustrates various logical elements and the manner in which these logical elements are nested or pinned to one another, as well as the physical elements currently being used to execute each of the logical elements during the current run-time of the control system. These displays may also provide or indicate various performance measures for the different logical and physical elements displayed therein to enable a user to easily see or visualize the current operation and the operational health of the control system or various portions thereof.

BRIEF DESCRIPTION OF THE DRAWINGS

FIG. 6 is an example data structure maintained by an orchestrator to track instantiated services and containers.

FIG. 36 depicts a block diagram of an example context which may be included with a context dictionary container.

DETAILED DESCRIPTION

Figure 1:
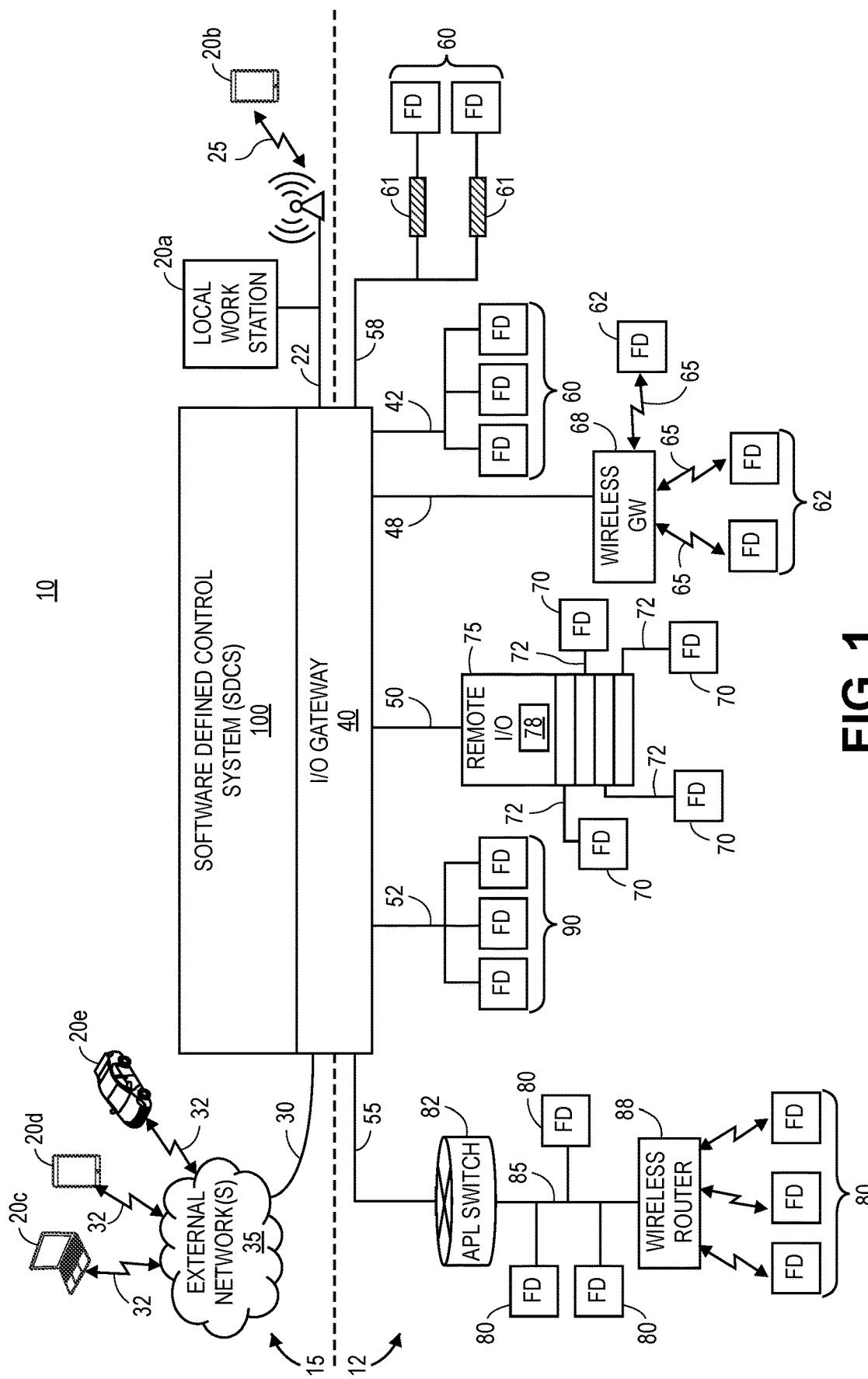
FIG. 1 depicts a block diagram of an example physical industrial process plant which includes a software defined control system (SDCS).

FIG. 1 depicts a block diagram of an example physical industrial process plant 10 including an example software defined control system (SDCS) 100. The process plant 10 includes a field environment 12 (e.g., the process plant floor) communicatively connected to a back-end environment 15. The back-end environment 15 of the plant 10 is typically shielded from the harsh conditions and materials of the field environment 12, and may include, for example, a separate room, building, or location on site proximate to the field environment 12, any number of devices which are located remotely from the plant site, and/or any number of applications which execute remotely on devices or systems which are located remotely from the plant site. The back-end environment 15 includes the SDCS 100 and typically also includes one or more physical work stations and/or user interfaces 20a-20e which are communicatively connected to the SDCS 100. For example, one or more operator and/or configuration workstations 20a may be located on-site at the plant 10 in a shielded room and communicatively connected with the SDCS 100 via a wired data or communication link 22 (e.g., Ethernet or other suitable wired link), and one or more operator tablets 20b utilized by on-site personnel may be communicatively connected to the SDCS 100 via a wireless link 25 (e.g., Wi-Fi, WirelessHART, cellular communication system link such as 4G LTE, 5G, or 6G, or some other type of suitable wireless link) and wired link 22. Other user interfaces 20c-20e associated with the process plant 10 may be disposed externally to the plant 10 and may communicatively connect to the SDCS 100 via last mile links 30 and/or wireless 32 links, and/or via one or more networks private and/or public networks 35. For example, laptops 20c, mobile devices 20d, and/or process plant-related applications executing in laptops 20c, mobile devices 20d, and/or vehicle systems 20e may be communicatively connected to SDCS 100 via respective wireless links 32, one or more public and/or private data or communication networks 35, and a direct or last-mile link 30 to the SDCS 100 (which typically, but not necessarily, is a wired link). The remote user interfaces and devices 20c-20e may be utilized, for example, by plant operators, configuration engineers, and/or other personnel associated with the industrial process plant 10 and components thereof.

Figure 2:
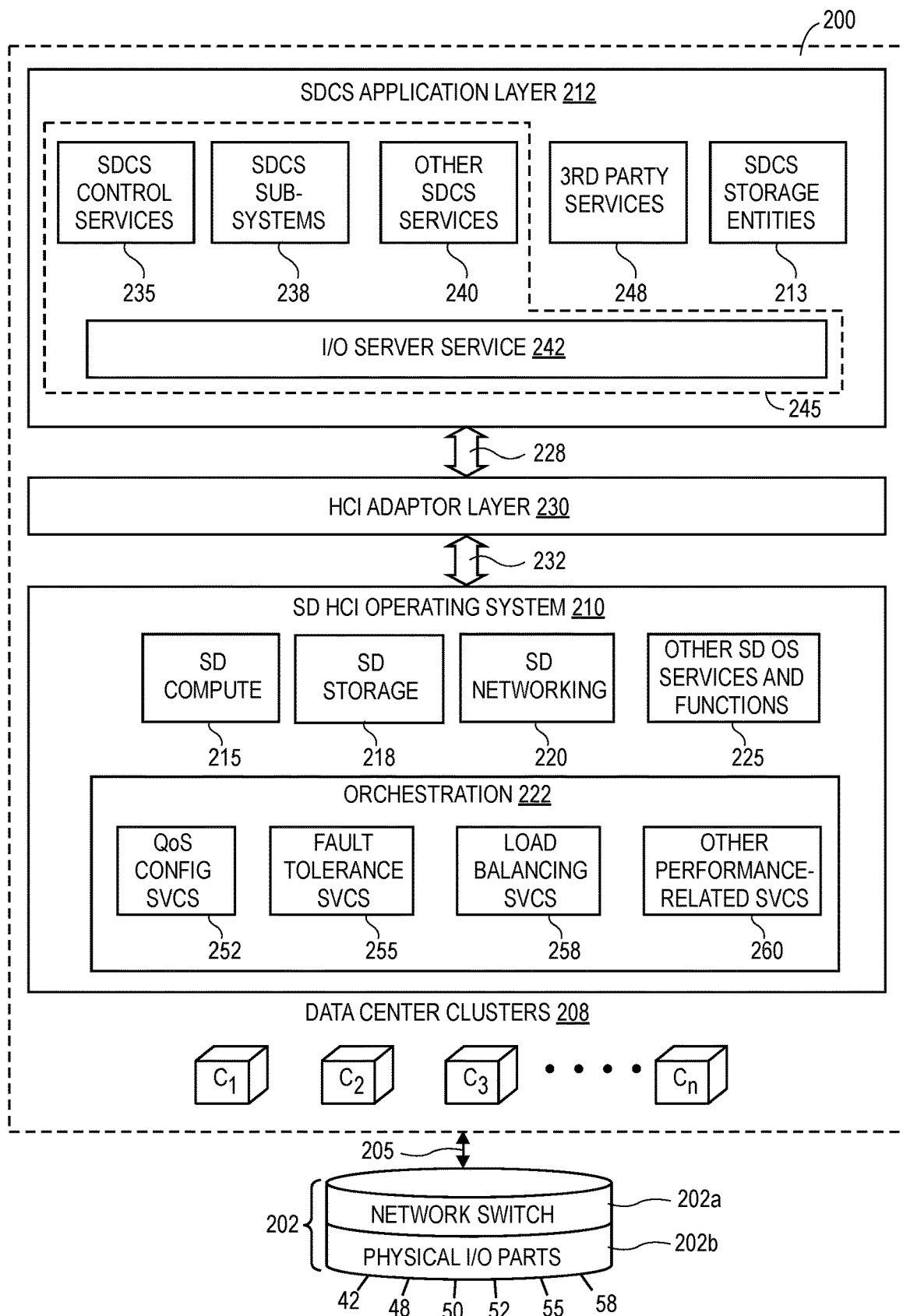
FIG. 2 depicts a block diagram of an example software defined control system, which may be included in the industrial process plant of FIG. 1.

As shown in FIG. 1, the SDCS 100 communicatively connects to components of the field environment 12 via an I/O (input/output) interface system or gateway 40. Generally speaking, the field-facing portion of the I/O interface system 40 includes a set of physical ports or physical hardware interfaces via which various types of I/O data are delivered to/from components disposed in the field environment, and which connect with and/or support various types of process plant communication links or data links 42-58 via which the I/O data is delivered. The I/O interface system 40 converts and/or routes physical I/O received via links 42-58 from components of the field environment 12 to recipient components of the SDCS 100 (not shown in FIG. 1), and conversely the I/O interface system 40 converts communications generated by the SDCS 100 into corresponding physical I/O and routes the physical I/O to respective recipient components disposed within the field environment 12, e.g., via corresponding links 42-58. As such, the I/O interface system 40 is interchangeably referred to herein as an "I/O gateway" 40. In the embodiment illustrated in FIG. 1, the SDCS 100 and at least a portion of the I/O gateway 40 are implemented using a common set of hardware and software computing resources, e.g., a same computing platform. That is, in the embodiment illustrated in FIG. 1, the SDCS 100 and at least a portion of the I/O gateway 40 (e.g., the portions of the I/O gateway 40 which perform converting, routing, switching, etc.) share at least some computing hardware and software resources; however, the I/O gateway 40 further includes the physical I/O ports or I/O hardware interfaces to the data or communication links 42-58. In other embodiments, though, the SDCS 100 and the I/O gateway 40 may be implemented on separate, communicatively connected computing platforms, each of which utilizes a separate set of hardware and software computing resources, e.g., as is depicted in FIG. 2.

Turning now to the field environment 12, FIG. 1 depicts various physical components and/or devices (e.g., process control devices, field devices, network elements, etc.) that are disposed, installed, and interconnected therein which operate to control the industrial process (e.g., the physical process) during run-time of the plant 10, e.g., by collectively communicating and physically operating to transform raw or input materials into desired products or output materials. The various field devices 60, 62, 70, 80, 90 and other field components 68, 72, 82 may communicate process I/O to/from the SDCS 100 via the I/O gateway 40 by utilizing different types of process I/O.

For example, one or more wired field devices ("FDs") 60 may be disposed in the field environment 12 and may communicate using standard (e.g., traditional) wired physical I/O types such as Analog Output (AO), Analog Input (AI), Discrete Output (DO), Discrete Input (DI), etc. Wired field devices 60 may include, for example, valves, actuators, pumps, sensors, etc., which generate data signals and receive control signals to thereby control their respective physical operations in the plant 10, as well as to provide status, diagnostic, and other information. Wired field devices 60 may be communicatively connected with the I/O gateway 40 via wired links 42 using any known industrial automation wired protocol such as 4-20 mA, Fieldbus, Profibus, Modbus, HART, etc. As such, the I/O gateway 40 may include respective I/O cards or devices (not shown) which service the communications received and sent via links 42. Additionally or alternatively, in some configurations, one or more wired field devices 60 may be directly connected to a separate, respective I/O card or device 61, and communications to/from the separate I/O cards or devices 61 may be delivered from/to the I/O gateway 40 via a data highway 58, such as an Ethernet or other suitable high bandwidth transport medium.

The field environment 12 may include one or more wireless field devices 62, some of which may be intrinsically wireless, and some of which may be wired field devices which are connected to respective wireless adaptors. Wireless field devices and adaptors 62 may communicate via any known industrial automation wireless protocol, such as WirelessHART, or a general purpose wireless protocol, such as Wi-Fi, 4G LTE, 5G, 6G, etc. via respective wireless links 65. One or more wireless gateways 68 may convert the wireless signals received from wireless devices 62 via the wireless links 65 into wired signals that are delivered to the I/O gateway 40 via one or more links 48, and may convert signals received from the I/O gateway 40 via links 48 into wireless signals and transmit the wireless signals to the appropriate recipient devices 62 via wireless links 65. Thus, the links 48 may support a wireless I/O type, and the I/O gateway 40 may include respective wireless I/O cards or devices (not shown) which service the communications sent and received via the links 48. In an embodiment (not shown in FIG. 1), at least some of the links 48 may be directly connected to a respective wireless I/O card or device, which in turn may be communicatively connected to the I/O gateway 40 via a data highway (e.g., in a manner similar to wired devices 60 and I/O cards/devices 61), where the data highway may be included in the data highway 58 or may be a different data highway.

The process plant 10 may include a set of field devices 70 which are communicatively connected to the I/O gateway 40 via respective terminals 72, one or more remote or marshalling I/O cabinets or systems 75 and one or more links 50. That is, each of the field devices 70 may communicate using a standard or traditional wired I/O type (e.g., AO, DO, AI, DI, etc.) to the remote I/O marshalling system 75 via a corresponding physical connection and terminal 72. One or more processors 78 of the remote I/O system 75 may serve as a local switch of the remote I/O system 75, and thus may switch or route communications to/from the physical terminals 72 (and their respective connected field devices 70) and the I/O interface system 40, e.g., via links 50. Accordingly, the links 50 may support a marshalled or remote I/O type, and the I/O gateway 40 may include respective I/O cards or devices to service the communications delivered via the links 50. In an embodiment (not shown in FIG. 1), at least some of the links 50 may be directly connected to a respective remote I/O card or device, which in turn may be communicatively connected to the I/O gateway 40 and communications to/from the remote I/O card or device may be delivered from/to the I/O gateway 40 via a data highway, via a data highway (e.g., in a manner similar to wired devices 60 and I/O cards/devices 61), where the data highway may be included in the data highway 58 or may be a different data highway.

In some implementations, the process plant 10 includes a set of wired and/or wireless field devices 80 which communicatively connect to the I/O gateway 40 via an APL (Advanced Physical Layer) switch 82. Generally speaking, the APL switch 82 and its links 85 provide power to field devices 80 and in some cases to other devices such as wireless router 88, e.g., in a manner which meets the jurisdictional power safety requirements of the hazardous field environment 12. Typically, the APL-compatible links 85 provide data transport to/from field devices 80 and wireless router 88 via high bandwidth transport media and packet protocols, such as Ethernet and IP protocols, or other suitable high bandwidth transport media and packet protocols. Some of the field devices 80 may be next-generation or APL-compatible field devices, and some of the field devices 80 may be standard field devices which are connected to the links 85 via respective APL adaptors. Similar to the links 85, the links 55 communicatively connecting the APL switch 82 and the I/O gateway 40 may also utilize APL-compatible transport media and/or packet protocols, such as high-bandwidth Ethernet and IP protocols, and thus the links 55 may support an APL I/O type. Consequently, the I/O gateway 40 may include respective I/O cards or devices to service the communications delivered via the links 55.

Further, in some configurations, the APL switch 82, or another APL switch (not shown) which is communicatively connected to the I/O gateway 40, may provide a direct connection to a remote I/O bus, such as the remote I/O bus included in the remote I/O cabinets or marshalling systems 75, or another remote I/O bus included in another remote I/O cabinet or marshalling system (not shown). In these configurations, the APL switch may provide power to the remote I/O cabinet or marshalling system.

In some configurations, the process plant 10 may include a set of field devices 90 which communicatively connect to the I/O gateway 40 via standard or non-APL Ethernet connections 52. For example, the field devices 90 may communicate with the SDCS 100 via the I/O gateway 40 by using an industrial control IP protocol, such as HART-IP or other suitable industrial control IP protocol, via one or more high-bandwidth Ethernet links 52 which are shielded from the hazardous field environment 12 but do not provide power to the field devices 90. As such, the links 52 support a standard Ethernet or packet I/O type, and the I/O gateway 40 may include respective I/O cards or devices to service the communications delivered via the links 52. In an embodiment (not shown in FIG. 1), at least some of the links 52 may be directly connected to a respective IP-compatible (standard Ethernet) I/O card or device, which in turn may be communicatively connected to the I/O gateway 40 via a data highway (e.g., in a manner similar to wired devices 60 and I/O cards/devices 61), which may be included in the data highway 58 or may be a different data highway.

Of course, the field devices 60, 62, 70, 80, 90 and field components 68, 72, 82 shown in FIG. 1 are exemplary only. Other types of field devices and field components of the industrial process plant 10 may be additionally or alternately utilized in the process plant 10, and may communicate with the SDCS 100 via the I/O gateway 40 by utilizing suitable links, protocols, and process I/O types.

FIG. 2 depicts a block diagram of an architecture of an example software defined control system (SDCS) 200, which may be included in the industrial process plant of FIG. 1. For example, at least a portion of the architecture 200 may be utilized by the SDCS 100 of FIG. 1. Generally speaking, and as is described below, the SDCS 200 utilizes a layered architecture in which business logic of the SDCS 200 is abstracted from the physical computing platform of the SDCS 200. For ease of discussion, the SDCS 200 is described with simultaneous reference to various portions of the industrial process plant 10 of FIG. 1; however, this is only for illustration purposes and is not limiting.

FIG. 2 depicts the SDCS 200 as communicatively connected to the field environment 12 via an I/O interface system or I/O gateway 202, which, unlike the I/O interface system 40 of FIG. 1, utilizes a set of hardware and software computing resources different that those utilized by the SDCS 200. The functionalities 202a provided by the I/O interface system 202, such as switching, routing, and converting communications delivered between the SDCS 200 and devices or components disposed in the field environment 12 of the process plant 10, are performed by utilizing the hardware and/or software computing resources of the I/O gateway 202, for example. As such, these functionalities 202a are categorically and collectively referred to herein as a "network switch" 202a. The software and hardware resources utilized by the network switch 202a may be implemented on one or more memories and processors of the I/O gateway 202. For example, the network switch 202a may be implemented on one or more servers, by a bank of networked computing devices, a cloud computing system, one or more data clusters, etc. Similar to the interface system 40 of FIG. 1, though, the I/O interface system 202 includes a set of physical ports or interfaces 202b via which various types of I/O links 42-58 deliver physical I/O from the SDCS 200 to components of the field environment 12 and vice versa. The I/O interface system 202 and the SDCS 200 may be communicatively connected via one or more links 205, which typically are high bandwidth data or communication links.

As shown in FIG. 2, the architecture of the SDCS 200 includes a computing platform 208 of hardware and software resources which support the higher layers of the architecture. Accordingly, the computing platform 208 is interchangeably referred to herein as the "physical layer 208" of the SDCS 200, as it contains physical processors, processor cores, memories, and networking interfaces. The computing platform or SDCS physical layer 208 includes a set of data center clusters C1, C2, . . . , Cn, each of which includes a respective plurality of nodes, where the nodes included within each data center cluster may be at least partly, if not entirely, interconnected. Each node of each data center cluster includes one or more respective processors and/or processor cores, one or more respective memories, and respective networking resources, such as one or more respective physical communication interfaces which communicatively connect the node to one or more other nodes of the data cluster. For example, a node may be implemented on a single server, or may be implemented on a bank or group of servers.

Additionally, each data center cluster is communicatively connected or networked with one or more of the other data center clusters of the platform 208. As such, this disclosure also interchangeably refers to the computing platform 208 of the SDCS 200 as "data center clusters," "computing platform nodes," or "nodes" 208. In FIG. 2, the SDCS Hyper Converged Infrastructure (HCI) operating system (OS) 210 (which is interchangeably referred to herein as an "SD HCI OS" 210) of the SDCS 200 may assign, designate, or allocate various nodes 208 to perform respective roles to support the SDCS 200, such as computing (e.g., via the nodes' respective processors and/or processing cores) or data storage (e.g., via the nodes' respective memories). Nodes 208 which are assigned, designated, or allocated to perform computing activities of the SDCS 200 are respectively referred to herein as "compute nodes" or "computing nodes." Similarly, nodes 208 which are assigned, designated, or allocated to perform storage activities of the SDCS 200 are respectively referred to herein as "storage nodes." An individual node 208 may be utilized as only a compute node, only a storage node, or as both a compute node and a storage node, and the role(s) of each individual node 208 may dynamically change over time, for example, as directed by the SD HCI OS 210. Advantageously, the computing platform 208 is scalable, so that individual nodes 208 and/or individual clusters $C_x$ may be easily added, removed, swapped out, etc. as needed to support the Software Defined process control system 200, and in particular, in accordance with the requirements of the other, higher layers of the SDCS 200.

The SDCS Hyper Converged Infrastructure (HCI) operating system 210 executes on the computing platform 208, and may be built based on any suitable general purpose HCI operating system (OS) such as Microsoft Azure Stack, VMWare HCI, Nutanix AOS, Kubernetes Orchestration, including Linux Containers (LXC/LXD), Docker Containers, Kata Containers, etc. As such, the SDCS HCI OS 210 provides a set of computing, storage, and networking support services in a manner somewhat similar to general purpose HCI operating systems. However, in contrast to general purpose HCI OSs, and advantageously, in the SDCS 200 these SD HCI OS support services are dynamically responsive to the logical or abstracted process control system of the SDCS 200, e.g., to the software components of the application layer 212 of the SDCS 200. That is, as performance, resource needs, and configurations of the various application layer services, subsystems, and other software components of the application layer 212 dynamically change (and/or are dynamically predicted, by services within the application layer 212, to change), the SDCS HCI operating system 210 may automatically and responsively adjust and/or manage the usage of hardware and/or software resources 208 of the SDCS 200 to support the needs and the requirements of the SDCS 200 for computing, storage, and networking, as well as for other functionalities related to industrial process control. To this end, the SD HCI operating system 210 may include a set of support services including, for example, a Software Defined (SD) Computing (or Compute) service 215, an SD Storage service 218, an SD Networking service 220, an SD Orchestrator service 222, and optionally one or more other SDCS HCI OS support services and/or functions 225. As such, in an embodiment, the SDCS HCI operating system 210 includes a general purpose HCI operating system platform (e.g., Microsoft Azure Stack, VMWare HCI, etc.) which has been particularly customized to include the SD Computing service 215, the SD Storage service 218, the SD Networking service 220, the SD Orchestrator service 222, and the other SDCS HCI OS support services and/or functions 225, where the set of support services 215-225 is automatically responsive to and particularly supports SDCS application layer software components 212 of the Software Defined control system 200. Generally speaking, the SD HCI OS 210 and the SD support services 212-225 which the SD HCI OS 210 provides are collectively and generally referred to herein as the "software defined networking layer" 210 of the SDCS 200.

In particular, as the SDCS HCI OS 210 manages the allocation of the hardware and software resources of the nodes of the physical layer 208 via the SDCS HCI OS support services 215-225, the SDCS HCI OS support services 215-225 may serve as interface services between the SDCS HCI OS 210 and the higher level services, subsystems, and other software components of the application layer 212 of the SDCS 200, and/or may provide a framework for the higher level services, subsystems, and other software components of the application layer 212. As such, the software components of the SDCS application layer 212 may interface with the SD HCI OS 210 (and in some cases, particularly with one or more of its SD-specific support services 215, 218, 220, 222, 225) via a set of Application Programming Interfaces (APIs) 228, either via an HCI Adaptor 230 (also referred to herein as an "HCI Adaptor layer" 230) and another set of APIs 232, or directly (not shown in FIG. 2). The HCI Adaptor layer 230 enables the SDCS application layer 212 to access the support services 215, 218, 220, 222, 225 while remaining agnostic of the particulars of the general purpose HCI operating system (e.g., Microsoft Azure Stack, VMWare HCI, etc.) which has been customized with such SD-specific services 215-225 to form the SD HCI OS 210. Accordingly, the HCI Adaptor 230 transforms or translates the APIs 228 utilized by the SDCS application layer 212 into a set of APIs 232 which are understood or otherwise known to or compatible with the customized or adapted general purpose HC operating system 210 of the SDCS 200.

Thus, unlike generalized, layered IT (Information Technology) system architectures in which business logic applications are abstracted from the hardware and software computing platform and for which the management of computing platform resources is largely governed and designed by human IT administrators, the architecture of the SDCS 200 not only abstracts the higher level, business logic services, subsystems, and other software components of the application layer 212 from the hardware and software computing platform 208, but also enables the higher level SD services, subsystems, and other software components 212 to dynamically, automatically, and responsively direct and cause changes to the usage of the hardware and software resources of the nodes and clusters of the computing platform 208, e.g., via the APIs 228 and the SD support services 215, 218, 220, 222, 225, and without requiring any human intervention or direction. Particularly, and advantageously, the management of the resources of the computing platform 208 is dynamically responsive to changes in configurations and needs of these higher level SD services, subsystems, and other software components of the application layer 212, and in particular, with respect to the particular requirements, metes, and bounds of industrial process control systems.

In the SDCS 200, industrial process control and other associated business logic are performed by the higher level SD services, subsystems, and other software components 235, 238, 240, 242, 248 at the application layer 212 of the SDCS 200. For ease of reading herein, this disclosure categorically refers to these higher level SD services, subsystems, and other software components 235-248 as Software Defined "application layer software components" of the SDCS 200. Collectively, the sets of SD application layer components 235, 238, 240, 242 (and optionally at least some of the third party services 248) form a logical process control system 245 (also referred to herein interchangeably as a "virtual process control system" 245) for controlling one or more industrial or physical processes which execute, for example, in the industrial process plant 10. As shown in FIG. 2, the SD application layer software components 212 include a set of process control services 235 and a set of process control subsystems 238, and optionally may include a set of other SDCS business logic services 240. In FIG. 2, the I/O server service 242 is depicted separately for clarity of discussion (and not limitation) purposes; however, the I/O server service 242 may be included in a subsystem 238 of the SDCS 200, or may be included in the set of other SDCS business logic services 240. Indeed, in other embodiments of the SDCS 200 (not shown), at least a respective portion or an entirety of the I/O server service 242 may be implemented in the HCI Adaptor 230, in the SD HCI operating system 210, and/or in even in the network switch 202a. Additionally, in some implementations of the SDCS 200, a set of third-party business logic services 248 may also execute at the SDCS application layer 212, and may or may not operate as part of the logical process control system 245. For example, third-party services 248 may be generated by a software development kit (not shown) of the SDCS 200, via which users may develop, generate, install, and manage third-party services 248 at the SD application layer 212. More detailed discussion of the I/O Server service 242 and third-party services 248 are provided elsewhere within this disclosure.

In an embodiment, at least some of the SD application layer software components 235-248 may be deployed as microservices which are communicatively connected via a microservice bus (not shown), so that the microservices 235-248 may transfer data to and receive data from other microservices 235-248. The microservices 235-248 and delivery of data there between may be supported and/or managed by the I/O server service 242 and/or by the SD HCI operating system 210 and its SD support services 215-225. As such, the SD application layer software components 235-248 may execute on any suitable hardware platform 208 which can run the SD HCI operating system 210, such as server class hardware, embedded hardware, and the like. Accordingly, the microservices 235-248 may be business-logic components of the SDCS 200 which are abstracted away from the computing platform 208.

Within the architecture of the SDCS 200, the application layer software components 235-248 may execute in containers, thick-provisioned virtual machine environments, thin-provisioned virtual machine environments, and/or other suitable types of encapsulated execution environments as Instantiated Software Components (ISCs). For example, an ISC may be a container configured with an instance of a particular application layer software component 235-248 to form a configured container or container image for the particular application layer software component 235-248, and the container image of the particular application layer software component 235-248 may be instantiated for execution on a particular node 208 as a specific ISC. In another example, an ISC may be a specific application layer software component 235-248 implemented as an instance of a virtual machine (e.g., of a process- or application-virtual machine) to form a virtual machine image for the specific application layer software component 235-248, and the virtual machine image of the specific application layer software component 235-248 may be instantiated for execution on a specific node 208 as a specific ISC. At any rate, whether container-based or virtual machine-based, the encapsulated execution environments of the SD application layer software components 235-248 isolate instantiated and executing software components 235-248 from other services and applications which are executing on the same node 208. However, for ease of discussion (and not for limitation purposes), the execution environments of the SD application layer software components 235-248 are referred to herein as "containers," although one skilled in the art will understand the that principles and techniques described herein with respect to containers may be easily applied to virtual machines, if desired.

With the SDCS 200, each instance of an application layer service 235, 240, 248 may execute in a respective container, each subsystem 238 may be provided or execute in a respective container, the I/O server service 242 may execute in a respective container, etc., thereby forming respective configured containers or container images. For example, a controller service 235 may be configured with one or more process control module services 235, parameters, and values of the industrial process plant 10, such as tags of inputs and outputs, reference values, and the like, thereby forming a configured or programmed controller service. A container may be configured with an instance of the configured controller service, thereby forming a container image of the configured controller service. Said another way, the configured container includes an instance of the configured controller service, where the instance of the configured controller service is executable to perform the specific, configured set of process control logic using the configured control module containers, tags, reference values, etc. Multiple instances of a configured controller service (or of other configured services) may be instantiated and executed by the SDCS 200, as is described elsewhere within this disclosure.

Container images (or instances of configured controller services within containers) may be allocated, pinned, or dynamically assigned, e.g., via the SD compute service 215, to execute on respective SD nodes and/or data center clusters 208. The SD compute service 215 may dynamically change, update, maintain, and/or otherwise manage the container images and their respective assignments to compute nodes 208 as or when needed, e.g., to load-balance across compute nodes 208, for scheduled maintenance of compute nodes 208 and/or physical components thereof, in response to detected performance issues, to support expansion or contraction of the logical process control system 245, to support expansion or contraction of the computing platform 208, etc. In some implementations, containers in which application layer software components 235-248 execute (e.g., configured containers or container images) may be assigned or pinned to (or otherwise execute on) an I/O device external to (e.g., separate from) the SDCS 200, such as a device included in the I/O interface system 202. In these implementations, the SDCS 200 discovers such configured containers executing on other devices/systems (which are referred to herein as "microcontainers"), and includes the discovered microcontainers in network scheduling and other aspects corresponding to the logical process control system 245.

Within the SDCS 200, some configured containers may be allocated or assigned to respective SD compute nodes 208 and dynamically re-assigned to different SD compute nodes 208 by the SD compute service 215 based on dynamically changing configurations, performance, and needs of the logical process control system 245. In some situations, containers may be assigned (and re-assigned) to be executed by particular processors or particular processor cores of SD compute nodes 208. Some configured containers, though, may be pinned to respective SD compute nodes 208 (e.g., by the SD compute service 215, by a configuration, by a user, etc.) and are not dynamically re-assigned by the SD compute service 215 due to dynamically occurring conditions. That is, a pinned configured container may execute on the SDC compute node 208 to which the configured container is pinned until the configured container is unpinned from the compute node 208, e.g., irrespective of dynamic conditions of the logical process control system 245 (other than perhaps the failure of the compute node 208 to which the configured container is pinned). Said another way, the software defined networking layer 210 may limit the utilization, by the pinned configured container, to only the hardware and/or software resources to which it is pinned, and when the configured container is unpinned, the SD networking layer 210 removes the limitation. Containers may additionally or alternatively be pinned to other physical or logical components of the SDCS 200, if desired. For example, a container may be pinned to another container, to a specific data cluster, to a particular processing resource (e.g., a particular physical processor or a particular physical processor core of an SD compute node 208), to a physical rack or portion of a physical rack serviced by a particular power supply (where the physical rack physically houses the hardware of one or more nodes), etc.

Further, configured containers may be nested within other configured containers, which is particularly useful in configuring and organizing the logical process control system 245. For example, when a particular process control subsystem 238 provides a particular set of control services 235 and/or other SDCS services 240, a configured container of each provided service 235, 240 of the particular set may be nested in the configured container of the particular process control system 238. Allocation/assignment of configured containers to compute nodes 208, pinning, and nesting of configured containers is described in more detail elsewhere within this disclosure.

For clarity and ease of discussion herein, the term "container" is utilized herein to generally refer to an instantiated software component (ISC) which is a configured container or a container image, e.g., a container which has been configured to include an instance of a respective SDCS controller service, SDCS subsystem, or other service provided by the SDCS 200. Accordingly, semantically speaking, within this disclosure a "container" may be instantiated and assigned to execute at a computing node 208, a "container" may be pinned to a particular computing node or to other containers, and a "container" may be nested within another "container."

At any rate, in a manner similar to that discussed for the computing resources of the computing platform 208, containers may be dynamically allocated and/or assigned, pinned, and/or nested, e.g., via SD storage service 218, to various SDC storage nodes 208 to thereby support various storage needs of the logical process control system 245. For example, the SD storage service 218 may administer and manage the logical storage resources utilized by containers of the logical process control system 245 across various physical hardware memory resources of one or more nodes 208. For instance, the configured container and the memory needed for its operations (e.g., Random Access Memory or similar) may be stored on a particular SD storage node 208 or a particular memory device or space of an SD storage node 208. Examples of types of physical hardware memory resources 208 may include (but are not limited to) pools of volume file systems across multiple hard drive (and/or flash drive) devices; NRAM, MRAM, FRAM, PRAM, and/or other types of NVRAM; NVMe memories, to name a few. Additionally, if desired, some containers may be pinned to respective SD storage nodes 208 and/or to specific memory devices or memory areas of the SD storage nodes 208. The SD storage service 218 may change, update, or otherwise manage the physical hardware memory or memories 208 to support logical storage resources of the SDCS 200 when and as needed, e.g., due to disk or other types of errors, for scheduled maintenance, due to the addition/expansion of available physical memory in the computing platform 208, etc.

Still similarly, the SD networking service 220 may administer and manage the logical or virtual networking utilized by the logical process control system 245, which may be implemented by the SD networking service 220 across the nodes 208. For example, the SD networking service 220 may administer and manage networking and hardware resources of the computing platform 208 to support the logical networking functionalities included in the logical or virtual process control system 245, such as virtual interfaces, virtual switches, virtual private networks, virtual firewall rules, and the like, as well as to support required networking between various containers or container images of the logical process control system 245. As the logical process control system 245 services the industrial process plant 10, the timing and synchronization of logical and physical components of the SDCS 200 and networking there between is critically important, as missed and/or lost messages or communications may result in the industrial or physical process becoming uncontrolled, which may in turn lead to catastrophic consequences such as overflows, gas leaks, explosions, loss of equipment, and, in some situations, loss of human life. Fortunately, the SD networking service 220 is responsive to the critical process I/O timing and synchronization of the SDCS 200 so that communications (and in particular, communications to/from control services 235), may be reliably delivered in a timely and deterministic manner. For example, the SD networking service 220 may support the time synchronization of data center clusters 208 to within 1 millisecond to ensure required synchronization between process control services 235, process control subsystems 238, the I/O server 242, and other SDCS services 240, 248 of the SDCS application layer 212.

In addition to the SD compute service 215, the SD storage service 218, and the SD networking service 220, the SD HCI operating system 210 may provide other OS support services 225 which are accessible via the set of APIs 228, 232 and which are utilized or accessed by the application layer 212 to support the logical process control system 245. For example, the other SD HCI OS services 225 may include a service life cycle management service, a discovery service, a security service, an encryptor service, a certificate authority subsystem service, a key management service, an authentication service, a time synchronization service, a service location service, and/or a console support service (all not shown in FIG. 2), to name a few. A more detailed discussion of these other process control system related OS support services 225 is provided elsewhere within this disclosure. In some embodiments of the SDCS 200, one or more of the support services may execute at the application layer 212, e.g., as other SDCS services 240, instead of executing at the software defined networking layer 210 as OS support services 225.

Now turning to the application layer 212 of the SDCS 200, the set of SD process control services 235 provide the process control business logic of the logical process control system 245. Each different control service 235 may be configured with desired parameters, values, etc. and optionally other control services 235; each instance of a configured control service 235 may execute in a respective container; and each container may be assigned (or pinned) to execute on a respective node or cluster. As such, each configured control service 235 may be a logical or software defined control entity which functionally may be configured and may perform in a manner similar to that of a traditional, hardware-implemented process controller device, process control module, process control function block, etc. However, unlike traditional, hardware-implemented process controller devices, traditional control modules, and traditional control function blocks, and advantageously, the SDCS 200 may easily replicate multiple instances of a same configured control service 235 for various purposes, such as performance, fault tolerance, recovery, and the like. For example, a controller service (which executes in its own container) may be configured to execute a control module service (which executes in its own container), and the control module service may be configured to execute a set of control function block services (each of which executes in its own container, and each of which may be configured with respective parameters, values, etc.). As such, the set of containers corresponding to the set of configured control function block services may be nested in the control module service container, and the control module service container may be nested in the controller service container. The set of containers corresponding to the set of configured function block services may be assigned to execute on different cores of a physical layer processor 208, e.g., for performance load-balancing purposes. When loads change, one or more of the function block service containers may be moved to execute on different processor cores, different processors, or even different nodes in attempt to re-balance loads; however, the moved function block service containers would still be nested under the control module service container, and would execute accordingly.

In addition to software defined control services 235, the SDCS application layer 212 may include other types of SDCS application layer services 240 such as, but not limited to, operator displays and interfaces, diagnostics, analytics, safety routines, reporting, historization of data, configuring of services, configuring of containers, communicating information with external or other systems, etc. Generally speaking, any module or process control system-related functionality or business logic which is able to be configured in a traditional process control system and downloaded into and/or instantiated at a specific physical device of the traditional process control system for execution during runtime of an industrial process plant may be logically implemented in the SDCS 200 as a respective service 235, 240 executing in a respective container. Further, any of the containerized SD control services 235 may communicatively connect, e.g., via the SD networking layer 210, with respective one or more devices disposed in the field environment 12 of the industrial process plant (e.g., process control field devices 60, 62, 70, 80, 90; user interface devices and/or other field environment devices) and/or with respective one or more user interfaces/user interface devices 20a-20e to transfer I/O data and/or other types of data there between when required to do so by the business logic of the containerized SD control service 235 and/or by the recipient device (or application or service executing on the recipient device). In some situations, different containerized SD control services 235 may communicatively connect with other containerized SD control services 235 and/or with other SDCS services 240 (e.g., via the SD networking layer 210, I/O server service 242, microservice bus, etc.) to transfer data there between when required to do so by their respective business logic.

The set of SD subsystems 238 at the application layer 212 of the SDCS 200 provide the virtual or logical process control-related subsystems of the logical process control system 245. Each different SD subsystem 238 may be provided by or execute in a respective container. In some cases (not shown in FIG. 2), a subsystem 238 may provide or include one or more application layer services and, as such, the containers of the services 235, 238 provided by the subsystem may be nested in the subsystem container. For example, a historian subsystem 238 may include a read service, a write service, and a search service, respective containers of which are nested in the historian subsystem container. In another example, a batch process control subsystem 238 may include a unit procedure service, a recipe service, and a regulatory record generation service, which may be nested within the batch process control system container. Generally, the set of SD subsystems 238 allow SDCS control services 235 and other SDCS services 240 to be easily and coherently grouped and/or managed. In a preferred embodiment, each node 208 of the SDCS 200 hosts a respective instance of each subsystem of the set of SD subsystems 238, e.g., so that subsystem services are proximately and readily available to other application layer services 235, 240, 248 which are presently executing on each node 208. Accordingly, changes to one or more of the subsystems 238 may be coordinated among the corresponding instances thereof executing at each node 208 (e.g., under the direction of the SD HCI OS 210). As such, not only is the set of SD subsystems 238 highly and proximately available for any SD service 235, 240, 248 executing on a same node 208, but in the event of a node failure, the failure of a node component, or the failure of a particular subsystem instance at a node, the functionalities provided by the set of SD subsystems 238 may be easily maintained for the logical process control system 245. Examples of SD subsystems 238 include, but are not limited to: continuous process control, event driven process control, batch process control, state-based control, ladder logic control, historian, edge connectivity, process user, alarm, licensing, event, version control, process configuration, and process I/O, to name a few.

For example, the set of SD subsystems 238 may include a continuous process control subsystem. The continuous process control subsystem may include a set of control services 235 which are responsible for the execution of process control tailored for continuous production and operation. For instance, the control services 235 provided by the continuous process control subsystem may execute modular control (e.g., control module services) that is capable of periodic execution with I/O assignment. Business logic of control system entities (both logical and physical) which may be managed within the continuous process control subsystem may include (but are not limited to) controllers, I/O Assignments, control modules, function blocks, ladder logic, and structural text-based control algorithms, to name a few. Continuous control module services may be scheduled periodically, with or without module chaining. For example, continuous control module services may form chains of execution such that a user-defined set of continuous control module services may execute one after another in a chained manner. The continuous control module service chain may execute at an assigned (periodic) quanta of execution in a best-effort evaluation of the control logic contained within the module service chain. Unchained continuous control module services may execute in parallel with respect to chained continuous control module services during a same periodic quanta.

In another example, the set of SD subsystems 238 may include a state-based process control subsystem. The state-based process control system may include a set of state-based control services 235 which are responsible for tracking, assigning, and deriving the state of the process control system 245 as a whole. Generally speaking, state-based operations of the process control system may include operations that are intended to automatically or semi-automatically change the state of the process (or portion thereof) on a set of process units within the plant infrastructure. Each state operation may have the ability to, for example, derive a current state of a process unit, determine the current state, analyze differences between the current process state and recorded normalizations for a known process state, and drive the process to achieve a process state.

For example, the state-based process control subsystem may automatically derive intermediate process I/O or control changes to drive at least a portion of the process control system 245 from one state to another. States for the SDCS 200 may be saved and restored, with the automatically-derived transitions between states respecting boundary conditions corresponding to process safety and process profitability. To illustrate, in an example scenario, to safely drive the state of process unit A to known state B to known state B', a set of process instructions may be generated (e.g., by one or more application layer services 235 included in the state-based process control system), where the generated process instructions respect the process safety limitation that a burner for a boiler unit must be less than 200 degrees Celsius. Additionally, as profitability may be maintained by minimizing the amount of fuel utilization per time period to affect the state change and by minimizing monetary charges associated with reporting an environmental discharge, the automatically-derived process instructions may also respect profitability constraints that limit the change in the burner output to 1 degree Celsius every second so as to prevent environmental discharge due to sudden flare-up, and/or to prevent a rich running condition on the burner itself.

Additionally, the state-based process control subsystem may provide application layer services 235 which recognize unknown states within the process plant and resolve the unknown states. Generally speaking, an unknown state of a process plant may occur when process plant I/O and process tags are in a state that deviates beyond a pre-defined amount from a known state. Additionally or alternatively, unknown process plant states may occur when the process I/O or process devices have an unreadable or indeterminate status or value, e.g., when a sensor has an Out of Range status, or the sensor is not communicating at all. The application layer services provided by the state-based process control subsystems may record the last known process state of various portions and/or components of the process control system 245, and present the last known states to a user for comparison with unknown states. Still, the state-based process control subsystem may include application layer services 235 which estimate the state of a process unit when a process device included therein is not communicating but is still operational, that is, when all other control and I/O tag values except for those associated with the non-communicative process device are consistent with a known state. An example of this situation may be a field valve that is no longer communicating; however, the valve position has not changed from the last known process unit state. An application layer service 235 included in the state-based process control subsystem may determine that because all other process I/O and sensor tags still report a valid process value for a given state, the field valve position may be estimated to be in the previously reported, known state. A state visualization tool may show discrepancies between estimated states and the actual process values to alert a user, e.g., so that maintenance tasks to bring the system to a known recorded, and provable (e.g., not estimated) state may be initiated.

Further, the state-based process control subsystem may provide application layer services 235 which automatically aid a user in creating and saving a state definition. Generally speaking, process states may be defined by the user, commonly by referencing state transition diagrams. To aid the user in creating state definitions, application layer services 235 provided by the state-based process control subsystem may automatically create a state definition by taking the current values of a running process or digital twin system and processing those values into state ranges for a particular named state, e.g., as defined by the user. For example, if the plant process is shutdown, an application layer service 235 provided by the state-based process control subsystem may create a state definition labeled Shutdown State by creating state ranges based on the currently-read process I/O and device tag values. Occurring deviations (whether autonomously generated or intentionally inserted) may be recorded and state ranges may be created to capture those deviations as part of the state definition. For example, when a level deviation occurs due to vibration or temperature of 10% during a data collection time period, the automatic state definition creation application layer service 235 provided by the state-based process control subsystem may generate a range of +/−10% for that process value to define as a verified range of the given process state definitions. Process state definitions may be automatically derived from a running process using current process values, or may be derived based on particular segments of time for a given state as indicated by a comprehensive process historian.

In another example, an event-based process control subsystem may include a set of application layer control services 235 which may be triggered to execute based on occurrences of one or more events. For example, an event-based control module service may execute upon an I/O condition reaching a certain value or status. Control module service execution chains may also be triggered on an event basis. Further, various control module services and/or control module service chains may be configured to execute when an event timeout occurs, for example, when the control logic is primarily event driven and the triggering event fails to occur within a certain time period. In these situations, the periodic scheduler may execute the control module services and/or control module service chains after the event timeout has taken place, in embodiments. Other events within the SDCS 200 may trigger the execution of various control module services, where the other events may include diagnostic events or conditions, process download changes, or other SDCS events.

In still another example, a batch process control subsystem may include a set of application layer control services 235 which perform batch control and tracking of regulatory items (e.g., for governmental traceability). Application layer control services 235 provided by the batch process control subsystem may provide unit procedure, recipe, phase, phase transitions, etc., for example. Further, application layer control services 235 provided by the batch process control subsystem may manage regulatory records related to batch process control which are generated.

The set of SDCS subsystems 238 may include a historian subsystem which provides a set of application layer services 240 to record time series data for process I/O and events within the Software Defined Control System 200. For example, various application layer services 240 provided by the historian subsystem may subscribe to process I/O and/or event data for recording purposes. Other application layer services 235 provided by the historian subsystem may include source time stamping services, time compression services (e.g., which may record a constant value once and update a range of times accordingly), traditional time-series database features, and the like. Recorded historical data may be duplicated and made available to all nodes 208 within the SDCS 200. Further, in embodiments, historical data may be categorized by source subsystem (e.g., the service or subsystem which generated the historical data), production asset, production tag, SDCS data path, and/or by any other desired category.

Additionally or alternatively, the set of SDCS subsystems 238 may include an edge connectivity subsystem, which may provide, via a respective set of application layer services 240, a set of edge protocols that allow process control data to be sent to and received from various third party components external to the process control system. Examples of such edge protocols include OPC-UA and MQTT, to name a few. The edge connectivity subsystem may include one or more application layer services 240 which provide cloud connectivity to the SDCS 200, where cloud-based applications may support various functionalities such as monitoring the industrial process plant for plant status and asset health as well as other types of functionalities. At least some of the application layer services 240 provided by the edge connectivity subsystem may generate a logical representation of the SDCS 200 and corresponding process I/O data as a data model specific to the edge protocol being used. Such data models allow secured, third party access to selected process data, when desired.

In some embodiments, the set of SDCS subsystems 238 include a diagnostic subsystem, which may provide a set of application layer services 240 for collecting and providing diagnostic data from various other SD application layer services 235, 240, 248; from various other SD subsystems 238; from nodes 208; and from SD networking layer components 210 of the SDCS 200.

The set of SDCS subsystems 238 may include a process I/O subsystem which provides a set of application layer services 240 to manage I/O connections and configurations for process I/O within the process control system 245. As previously mentioned, the process I/O subsystem may provide the I/O server service 242, in embodiments.

The set of SDCS subsystems 238 may include a process user subsystem which provides a set of application layer services 240 to verify and/or validate user credentials when users log into the SDCS 200. Additionally, the services 240 of the process user subsystem may provide user information to other services 235, 240, 248, e.g., for authorization. Users' data may be replicated within the data center clusters 208, if desired.

Still, the set of SDCS subsystems 238 may include an alarm subsystem which provides a set of application layer services 240 for maintaining the definitions, statuses, and states of alarms within the SDCS 200. Alarms may include, for example, process alarms, hardware alarms, maintenance alarms, unit alarms, networking layer alarms, I/O alarms, hardware asset alarms, software asset alarms, diagnostic alarms, and the like.

In some implementations, the set of SDCS subsystems 238 may include a licensing subsystem which provides a set of application layer services 240 to verify or ensure that a user has privileges in accordance with the license level of the SDCS 200. License levels may be made available to all SDCS services 235, 240 and subsystems 238, and may take the form of perpetual licenses, time subscription licenses, consumption-based licenses, remote licenses (e.g., license data from the cloud or from a dedicated license server), etc. Application layer services 240 provided by the licensing subsystem which enforce licenses are particular important, because when licenses for the SDCS 200 expire or are invalidated, the SDCS 200 may be running a process that is critical or hazardous to human health. In such situations, the license enforcement services may prevent unlicensed activity from occurring, while ensuring that license enforcement does not result in an unsafe environment for users. For example, in an embodiment, when the SDCS 200 becomes unlicensed, all user-facing applications, operator graphics, and workstations may be overlaid with a watermark or semi-transparent banner text showing that the system has become unlicensed, and all services except for services provided by control subsystems may reject any changes or modifications thereto. As such, some licensed functionality may be diminished or deactivated, while simultaneously ensuring that process execution does not become uncontrolled or dangerous.

To manage licensing, in an embodiment, the licensing subsystem may include an application layer service 240 which provides for only a single primary administrator console session or user session which is allowed to control plant operations with respect to licensing-based restrictions; all other console and/or user sessions may be prevented from effecting any user-initiated changes. As such, the licensing subsystem may provide an application layer service 240 which provides a mechanism to determine that only one session with Administrator privileges (e.g., at a time) is able to execute control operations in an unlicensed state. For example, if an active Administrator console or session fails or becomes unresponsive, then the licensing subsystem may allow a subsequent active administrator session to control plant operations. All other console sessions and user sessions may be prevented from making changes to the process control system until after licensing has been restored.

Further, in embodiments, the licensing subsystem may provide an application layer service 240 configured to remotely report licensing status and/or activities to a manufacturer system, e.g., for enforcement and/or legal remedies. In configurations in which remote reporting is not provided by the manufacturer, the licensing subsystem may, via one or more application layer services 240, maintain a record log of all license-related events for future retrieval.

The set of SDCS subsystems 238 may include a distributed event subsystem which provides a set of application layer services 240 to distribute generated events (or notifications thereof) across all nodes 208 of the SDCS 200, along with corresponding time stamps indicating respective times of occurrences at respective event sources. In this manner, consistent record keeping may be provided across all nodes 208.

Additionally, each node 208 of the SDCS 200 may include an instance of a configuration subsystem 238, where the configuration subsystem 238 stores, in a configuration database provided by the configuration subsystem 238, the configurations of control services (e.g., of all control services 235) executed by the SDCS 200. Consequently, when control strategies are modified and saved (e.g., as respective updated control services 235), the configuration subsystem, via respective application layer services 240, may update associated configurations within the configuration database accordingly. As a respective instance of the configuration database is stored at each node 208, the SDCS 200 provides fault tolerance of the configuration database across all nodes of the SDCS. As such, writes to the database (e.g., as executed by a configuration database write service provided by the configuration subsystem) may be atomic across all fault tolerant instances throughout the SDCS. That is, a database write transaction is not complete until all of the fault-tolerant instances of the configuration subsystem at all of the nodes 208 have received and processed the write operation. Atomic writes may be granular to the item or particular configuration being accessed. As such, when one entity within the database is being written to, other entities within the database may also be written to (e.g., at the same or overlapping time) in a multi-threaded manner, as the synchronization locking mechanism scope may be limited to each item or object (entry) being written. Further, lock and unlock operations may be atomic across all instances of the configuration database, so that obtaining an object lock is not considered successful until all copies of that object at all instances of the configuration database are locked. Further, the configuration subsystem may provide one or more application layer services 240 to manage version control of the configuration database. For example, version control services may track changes to the configuration database, when the changes occurred, and the respective parties who checked-in the changes.

Reads from the configuration database (e.g., as executed by a configuration database read service provided by the configuration subsystem) may be from a single local instance of the configuration database. In some situations, though, a database read request may be distributed among multiple nodes 208, e.g., so that a large read request may be segmented and results provided in a parallel manner from the multiple nodes 208.

As previously mentioned, the I/O server service 242 of the SDCS 200 may be included in the Process I/O subsystem or in another subsystem 238. Alternately, the I/O server service 242 may be an SDCS service 240 which is in its own, stand-alone subsystem, or is not associated with any subsystem. At any rate, the I/O server service 242 generally operates as a service which is responsible for transferring I/O data (and, in some scenarios, other types of data) between endpoints of the logical process control system 245, e.g., from a field device to an instantiated container image of an application layer service 235, 240, 248 (such as a controller, operator interface, diagnostics, analytics, historian, or third-party service); from an instantiated container image of an application layer service 235, 240, 248 to a field device, from an instantiated container image of a control service 235 to another instantiated container image of another type of SDCS service 240 (e.g., operator interface, diagnostics, analytics, historian, third-party service, etc.); and the like. For example, the I/O server service 242 may communicatively couple the respective endpoints and transfer data there between using any suitable data delivery or data transfer paradigm, including request/response, publish/subscribe, etc.

As such, the I/O server service 242 may be accessed by other application layer software components 235, 238, 240, 248 for the purposes of data transfer or data delivery, and the I/O server service 242 may utilize the APIs 228 to thereby cause the I/O data and/or other types of data transfer, e.g., via the SD HCI OS support services 215-225. In some situations, the I/O server service 242 may cause data to be transferred via the microservice bus. In effect, the I/O server service 242 serves as a logical or API gateway which causes process I/O and/or other types of data to be routed between containers of the SDCS 200, and which causes process I/O to be routed between containers of the SDCS 200 and devices deployed in the field environment 12 of the industrial process plant 10. Advantageously, the I/O server service 242 may automatically manage the fault tolerance and the quality of service of process control service and subsystem containers to drive industrial process outputs, as is described in more detail elsewhere herein.

Further, at the application layer 212 of the SDCS 200, at least some physical process control devices or components (e.g., controllers, safety logic solvers or devices, data storage devices, edge gateways, etc.) of traditional process control systems may be logically implemented in the logical process control system 245 as a respective service 235, 240 or subsystem 238 executing in a respective container. Such logical or virtual instances of process control devices or components may be configured in a manner similar to their physical counterparts, if desired, by configuring the logical devices with control routines, other application layer software components 212, parameters, reference values, lists, and/or other data. For example, a specific logical edge gateway service may be configured with whitelists and with a connection to a particular logical data diode service, a controller service may be configured with several control modules, etc. Configured logical or virtual process control devices or components (e.g., container instances of process control devices or components) may be identified within the logical process control system 245 via a respective device tag or identification, for example, and respective signals which are received and generated by configured logical or virtual instances of process control devices may be identified within the logical process control system 245 via respective device signal tags or identifiers.

Still further, the SDCS 200 provides for containers within the SD application layer 212 to be utilized to represent and/or logically organize physical and/or logical areas, regions, and components of the industrial process plant 10. For examples, units, areas, and the like may be represented by respective containers, and containers corresponding to physical and/or logical components of each unit, area, etc. may be nested within and/or pinned to their respective organizational container(s). For example, a fractional distillation area container of the industrial process plant 10 may include a depropanizer unit container and a debutanizer unit container; that is, the depropanizer unit container and the debutanizer unit container may be nested within or pinned to the fractional distillation area container. Within the depropanizer unit container, a controller container may be configured with a control routine container which is configured to operate on flow rate measurements from a physical measurement field device disposed at an output port of the physical depropanizer within the field environment 12 of the process plant 10. Based on received flow rate measurements, the control routine executing within the configured control routine container may generate a control output, which the controller container may provide to an actuator of a valve servicing the output port of the depropanizer, where the physical actuator and the physical valve are also disposed in the field environment 12 of the plant 10. As such, within the SDCS 200, the configured control routine container may be nested within or pinned to the controller container, and the controller container may be nested within or pinned to the depropanizer unit container. The control routine service container may be configured with the signal tag of the flow rate measurement received from the field device and with the signal tag of the control output signal which is delivered to the actuator and, if desired, the controller service container may be further configured with the device tags or identifications of the physical measurement field device and the physical actuator. For example, with respect to configuring control services 235, a user interface service container may communicate with or execute a process control configuration service container via which a user may configure the controller service and the control routine service to include desired tags, identifiers, values, and control routine (s).

At the SD application layer 212, the SDCS 200 also includes software defined storage entities or components 213, which provide abstracted data storage (and access thereto) for the services and subsystems 235-248 of the SD application layer 212. For example, historian databases, configuration databases, and other types of process control system databases and data storage entities as well as temporary storage utilized by various process control application services 235-248 during execution may be provided by the SD defined storage entities 213. The SD storage databases, areas, devices, etc. may virtualized or logical storage entities or components, which may be assigned or allocated (and may be re-assigned and re-allocated) to various storage resources of the nodes of the computing platform 208 by the SD HCI Operating System 210. For example, a single SD defined logical database may be implemented over the hardware memory resources of multiple nodes 208. Additionally, the SD Storage service 218 of the SD HCI operating system 210 may assign/re-assign and re-assign/re-allocate SD storage entities 213 at the SDCS application layer 212 to different storage resources provided by the nodes 208 based on performance, resource, and configuration needs of the SD storage entities or components 213 and optionally of other components of the SD application layer 212.

Returning now to the software defined networking layer 210 of the SDCS 200, FIG. 2 depicts a particular SD HCI OS service, i.e., the SD Orchestrator service 222, separately from the depictions of the other SD HCI OS services 215-220, 225 for ease of discussion purposes. Generally speaking, the SD Orchestrator service 222 instantiates container images (e.g., of application layer control services 235, subsystems 238, third-party services 248, and other SDCS services 240) into running or executing container processes on respective hardware and/or software physical compute resources 208, as well as assigns various SD data storage entities to reside on respective hardware storage and/or software storage resources 208. For example, the SD Orchestrator 222 may instantiate and assign various instantiated container images to execute on and/or utilize various specific sets of hardware and/or software compute resources 208, which may be resources of a single node, or may be resources of two or more nodes. Further, the SD Orchestrator 222 may assign various SD data storage entities or components 213 to reside on physical layer storage resources 208 of a single node, of multiple nodes etc., e.g., for ease and speed of access by resident containers, for redundancy purposes, for balancing of memory usage across the physical platform, etc. In doing so, the SD Orchestrator service 222 not only establishes the running container processes, but also manages the fault tolerance, load-balancing, quality of service (QoS), and/or other performance aspects of the running container processes of the SDCS 200, e.g., via QoS configuration services 252, fault tolerance services 255, load-balancing services 258, and optionally other performance-related services 260 provided by the SD HCI OS 210. As such, the SD Orchestrator service 222 may be invoked or accessed by the other SD HCI OS services 215, 218, 220, 225, and the SD Orchestrator service 222 may in turn invoke or access one or more of the performance-related services 252-260. Generally speaking, the SD Orchestrator service 222 allocates resources to containers and SD data storage entities of the logical process control system 245 so that the containers are able to operate efficiently and safely, e.g., to control the industrial process, at least at a best-effort performance level.

To this end, the performance-related services 252-260 of the SD HCI OS 210 may monitor performance parameters, resource usage, and/or criteria during run-time, detect any associated conditions which occur and/or which are predicted to occur, and provide and/or implement any changes in assignments of SD application layer software components (e.g., containers) 212 to hardware and/or software resources of the computing platform 208. Accordingly, during run-time of the industrial process plant 10, as various expected and/or unexpected hardware and/or software conditions arise and are detected, the SD Orchestrator service 222 responsively adjusts the allocation of hardware and/or software resources of various nodes 208 to instantiated container images to maintain (or attempt to maintain) a target or best-effort level of performance and fidelity of operations. Detected conditions which may cause the SD Orchestrator 222 to modify allocations and/or assignments between containers 212 and node resources 208 may include, for example, hardware faults or failures, software faults or failures, overloading of a specific node, increased or decreased bandwidth of various networking components, addition or removal of nodes and/or clusters of nodes, hardware and/or software upgrades, pinning and/or unpinning of containers, diagnostics, maintenance, and other routines which may cause hardware and/or software resources to be temporarily unavailable for run-time use, etc. Possible responsive and/or mitigating administrative actions which may be taken by the SD Orchestrator service may include, for example, re-assigning containers to execute using different software and/or hardware resources (in some cases, on different nodes), activating and/or deactivating software and/or hardware resources, changing priorities of various containers' access to various software and/or hardware resources, etc. A more detailed discussion of the SD Orchestrator service 222 is provided elsewhere in this disclosure.

Accordingly, and generally speaking, the services, subsystems, and other software components of the SDCS application layer 212 (e.g., 235, 238, 240) may determine, define, or specify the processing, containerization, networking, and storage needs of the logical process control system 245, both at an individual container level and at aggregate levels (e.g., at a subsystem level, unit level, area level, and/or the process control system 245 as a whole). By way of the APIs 228 (and, in some configurations, also by way of the HCI adaptor layer 230 and APIs 232), the SD HCI OS 210, its support services 215, 218, 220, 222, 225, and its SD Orchestrator service 222 administer and manage the hardware and software resources of the nodes 208 to support those needs. For example, in some embodiments, the SD orchestrator 222 may cause different instances of a particular control container 235 or a particular other SDCS service container 240 to execute on different nodes 208, e.g., for fault tolerance, quality of service, and/or other performance criteria of the SDCS 200. Advantageously, as the needs of the logical process control system 245 dynamically change over time, the SD HCI OS support services 215, 218, 220, 222, 225 and/or the SD Orchestrator 222 may modify, change, and adjust the usage of the hardware and software resources of the nodes 208, e.g., in a responsive and/or in a predictive manner. For example, when the logical process control system 245 creates additional instances of control services 235 executing in additional containers, the SD HCI OS support services 215-225 may responsively (via the APIS 228 and optionally the HCI adaptor 230 and the APIs 232) assign the newly created containers to execute on corresponding nodes, may re-balance existing containers among nodes, may assign specific hardware memory resources to support the logical memory resource needs of the additional containers, may adjust routing tables utilized by the nodes 208 to support the logical routing needs of the newly created containers, etc. In another example, when a particular cluster $C_2$ needs to be taken out of service (e.g., expectedly for maintenance purposes or unexpectedly due to a lightning strike), the SD HCI OS support services 215-225 may pre-emptively re-assign containers which are presently assigned to execute on cluster $C_2$ to other clusters in accordance with the present needs of the logical process control system 245 and the availability of hardware and/or software resources of the other clusters, and the SD HCI support services 215-225 may adjust routing tables utilized by the clusters 208 accordingly so that continuity of execution of said containers is maintained even when the cluster $C_2$ is taken out of service. As such, the SDCS networking layer 210 automatically, dynamically, and responsively determines, initiates, and performs changes to the allocation of hardware and software resources of the nodes of the computing platform 208 to different SD application layer software components 212 based on detected conditions, such as improvement in performance of individual logical and/or physical components or groups thereof, degradation of performance of individual logical and/or physical components or groups thereof, fault occurrences, failures of logical and/or physical components, configuration changes (e.g., due to user commands or due to automatic re-configuration by services of the SDCS 200), etc. Consequently, with the SDCS 200, a user or system administrator need not dictate or govern the redistribution of hardware and software resources of the nodes 208 to support the SDCS 200 or changes thereto. Indeed, in most cases, the user or system administrator may be unaware of the redistribution of hardware and/or software resources of the nodes 208 which is automatically performed by the SDCS 200 in response to changing conditions and components of the SDCS 200.

While FIG. 2 denotes the computing platform 208 supporting the SDCS 200, in some configurations, the computing platform 208 may support multiple SDCSs. The multiple SDCSs may share sets of hardware and/or software resources of the computing platform 208, or the hardware and/or software resources of the computing platform 208 may be partitioned among the multiple SDCSs. In embodiments in which the hardware and/or software resources are shared across multiple SDCSs, the SDC HCI operating system 210 may manage the shared resources amongst application layer services of the multiple SDCSs.

Additionally, in some implementations, the SDCS 200 may implement digital twins of various SD application services 235, 240, 248, the entire SD application layer 212, various SD support services 215-225, 252-260, and/or the entire SD networking layer 210. That is, a digital twin of the target components/layers may execute in concert with the active target components/layers on top of the computing platform 208, and thereby receive run-time data from the field environment of the industrial process plant and operate accordingly, with the same logic, states, timing, etc. as the active target components/layers. However, the I/O and other types of data generated by the digital twin are prevented from being delivered to the field environment. In this manner, should the active targets/components fail, the digital twin of the filed targets/components may simply be activated to seamlessly maintain run-time operations of the industrial process plant.

Further, in some implementations, the SDCS 200 may implement simulations of or changes to various SD application services 235, 240, 248, to the entire SD application layer 212, to various SD support services 215-225, 252-260, and/or to the entire SD networking layer 210. That is, a simulation of the target components/layers may execute in concert with the active SDCS components/layers on top of the computing platform 208, and thereby receive run-time data from the field environment of the industrial process plant and operate accordingly, e.g., with the same logic, states, timing, etc. as the active target components/layers, or with the simulated test logic, states, timing, etc. However, the I/O and other types of data generated by the simulation are prevented from being delivered to the field environment, and simulations may be paused, sped up, slowed down, fed test inputs, and otherwise managed to observe behavior and make modifications to the simulated components/layers. Accordingly, upon approval of a simulated portion of the SDCS 200, the simulated portion may simply be activated for use during run-time operations of the industrial process plant, without needing to pause or take part of the SDCS 200 out of service to do so.

Still further, it is noted that although the physical layer 208 associated with the SDCS 200 is described above as being implemented by using physical data center clusters C1-Cx, in some embodiments, at least a portion of the physical layer 208 may be implemented as a virtualized physical layer 208. For example, the data center clusters C1-Cx (or subset thereof) may be implemented as virtual machines, e.g., which execute in a cloud computing system. As such, the HCI Adaptor Layer 230 may interface the SD application layer, SD storage layer, and SD networking layer 210 with the virtualized physical layer 208.

As should be evident from the description above and appreciated by those of skill in the art, industrial process control systems such as those described herein can, and often are, extremely complex systems. They can involve hundreds, thousands, or even tens of thousands of discrete, but interconnected, field devices that must operate in a coordinated manner to control the process. The complexity brought about by the sheer number of devices is multiplied by the complexity of commissioning and maintaining the system, which includes creating and maintaining wired and wireless networks connecting all of the devices, creating and maintaining the control modules that act to control the field devices based on measurements from the field devices, ensuring that sufficient resources (network bandwidth, processing power, etc.) are available to ensure that design tolerances (network latency, synchronized messaging, etc.) of the system are continuously met, and the like.

The implementation of containers in the described software defined control system lends itself in a multiplicity of ways to efficiently managing and operating an industrial process control environment. As will be described further below, containerization facilitates more intuitive organization of control resources that can mimic the physical or logical organization of the devices in the process plant and the physical or logical organization of the processes and computing resources that control the devices in the process plant. The implementation of containers also facilitates myriad possibilities with respect to maintaining quality of service parameters, as well as creating and maintaining fault redundancy.

Figure 3:
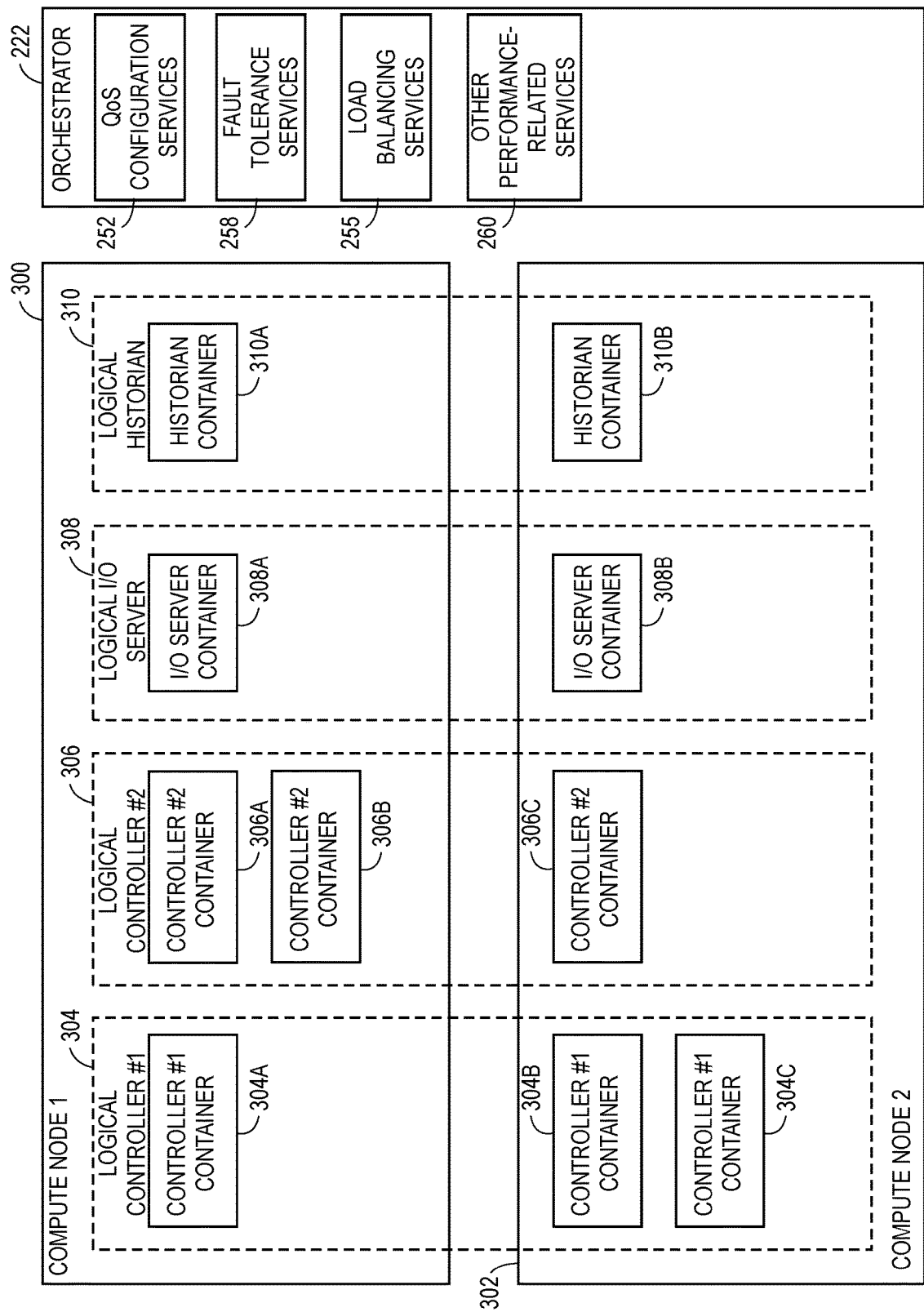
FIG. 3 is a block diagram illustrating principles of fault tolerance and load balancing.

FIG. 3 is a block diagram illustrating principles of fault tolerance and load balancing. In FIG. 3, two compute nodes 300 and 302 provide computing, memory, and networking resources for the SDCS. As should be understood, each of the two compute nodes 300 and 302 may include one compute node or a plurality of compute nodes (not shown), and each of the compute nodes may, in turn, include one or more processors (not shown), each of which may have one or more processor cores (not shown). The orchestrator 222 manages the instantiation of, and resources allocated to, various containers according to the requirements of the specific system (e.g., according to the requirements of specific containers or process control plants), in embodiments, and/or according to general requirements for load balancing and fault tolerance (e.g., when no specific requirements for the process control plant have been specified).

In greater detail, the container orchestrator service (i.e., the orchestrator 222) is responsible for instantiating container images into running container processes on available compute resources. The orchestrator 222 is responsible for ensuring that each of the containers is established properly and also manages fault-tolerance and load balancing concerns with containers. Fault tolerance is created by taking a horizontal scaling approach whereby multiple copies of a container are instantiated for a multiple input, single output mechanism. In some embodiments, the orchestrator 222 selects an "active" container from among the multiple, redundant copies of a container. As used herein, the term "active" refers to a one of a plurality of redundant containers that is selected such that the outputs of the selected container drive the inputs to another container, control a field device, or the like. For example, where multiple, redundant copies of a distributed alarm subsystem container are instantiated, the orchestrator 222 may select which of the redundant containers is the active container. As another example, where multiple, redundant copies of an I/O server container are instantiated, the orchestrator 222 may select which I/O server container is the active container. In that case, each of the redundant I/O server containers may be receiving process data from the field devices in the process plant, and may be receiving outputs from one or more controller containers, but only the outputs from the active I/O server container will be transmitted, via the physical I/O layer, to the field devices in the process plant, and each of the controller containers will be receiving process data only from the active I/O server container.

Communication between the fault tolerant copies of the service containers is possible (and in some cases necessary) to transfer and establish state information. The orchestrator 222 is responsible for maintaining a list of the specific service containers in a fault tolerant deployment, with the list order denoting the next available container to take over (the active container being at the top of the list). This list is continually updated as conditions within the data center change. Upon the active notification that an active service container is going out-of-service, the orchestrator 222 can make a fast decision on the next available fault tolerant copy to take over. In the event of an unplanned active container going out-of-service (e.g., due to a power failure) then the container orchestrator may have a timeout delay to detect when such a "hard" failure has occurred and may move to activate the next available service container. In the event that there are multiple active conditions detected, the recipient of the service outputs will receive the multiple outputs for a short period of time. The receiving service will inform the orchestrator 222 of the double outputs being received, upon which the orchestrator 222 will reconfigure (or destroy and recreate if reconfiguration fails) the old active container and instantiate it as a non-active container. During this time, the receiving container will default to the last known good source of information until the duplicate information source is eliminated.

While in some instances, the orchestrator 222 is responsible for selecting active containers, in certain circumstances, such as in the case of an I/O server container, the containers themselves may select an active container, based on various parameters, as described below with respect to I/O server containers.

As used herein, the phrase "load balancing" refers to the use of computing, memory, and/or communication resources for processes (e.g., containers) running on a system, such that the processor cores, processors, compute nodes, and or servers meet desired quality-of-service metrics. Load balancing, then, includes equalizing the use of computing, memory, and/or communication resources in some instances and, in some instances, ensuring minimum QoS parameters are met (i.e., ensuring maximum network latency for certain signals does not exceed a programmed value, ensuring maximum processing latency for certain processes does not exceed a programmed value, ensuring total latency for a particular value does not exceed a programmed value, ensuring sufficient memory resources exist for certain processes, etc.).

Load balancing parameters, such as maximum network latency, maximum computing latency, and the like may be programmed as parameters of one or more of the containers, in embodiments, and/or as parameters of specific services executing within the containers, and/or as parameters of specific values being received at or transmitted from the services executing within the containers. Load balancing parameters may also be set at a system level either to provide global parameters or to provide default parameters that may be superseded by parameters set within specific containers or services. The QoS configuration services 252 of the orchestrator 222 may provide an interface to facilitate configuration of QoS parameters on global, default, container, and/or service levels. The QoS configuration services 252 may also read QoS parameters programmed into the various containers and/or services in order to ensure that the parameters are implemented and maintained by the orchestrator 222.

The fault tolerance services 255 operating within the orchestrator 222 maintain fault tolerance within the SDCS, in embodiments. As used herein, the phrase "fault tolerance" refers to the creation of redundant processes and/or services (e.g., by creation of multiple containers), whether instantiated on different processor cores, different processors, different compute nodes/servers, and includes embodiments in which the orchestrator 222 (i.e., via the fault tolerance services 255) ensures that one or more redundant containers are instantiated on computing resources powered by separate power supplies, to ensure that failure of a power source does not affect all operating copies of a specific container. In embodiments, the orchestrator 222 itself may be instantiated as a redundant component to ensure fault tolerance persists even if an active instance of the orchestrator 222 is terminated abnormally by processor failure, power failure, etc.

Referring again to FIG. 3, several logical functions are depicted as implemented across the two servers 300 and 302. The logical functions include a first controller (i.e., a controller controlling a first set of equipment of a first portion of an associated process plant) 304, a second controller (i.e., a controller controlling a second set of equipment of a second portion of the associated process plant) 306, an I/O server 308, and an historian 310. Each of the logical functions 304-310 is implemented by an associated service executing within one or more corresponding containers. For simplicity, the description here refers to these services executing within containers simply as "containers," but it should be understood that each "container" in FIG. 3 is executing an associated service, which service is configured to operate with respect to other containers, services, and/or process control field devices. For example, each controller container has executing therein a controller service programmed to control its associated set of equipment. In some embodiments, the controller service may be programmed with one or more control module services, and each control module service may be programmed with one or more control function block services, where each of the control module services and each of the control function block services may execute within a respective container.

FIG. 3 depicts that the logical controller 304 includes three controller containers 304A, 304B, and 304C. Each of the controller containers 304A-304C is instantiated on a different computing resource (i.e. processor core, processor, compute node, or server) than at least one of the other controller containers 304A-304C. That is, the controller container 304A is instantiated on a different server (server 300) from the other controller containers 304B and 304C (instantiated on the server 302); controller container 304B is instantiated on a different server (302) from the controller container 304A (instantiated on the server 300) and on a different processor or processor core than the controller container 304C; and controller container 304C is instantiated on a different server (302) from the controller container 304A (instantiated on the server 300) and on a different processor or processor core than the controller container 304B. FIG. 3 also depicts three controller containers 306A, 306B, and 306C instantiated in a similar manner on the servers 300 and 302, two I/O server containers 308A and 308B instantiated on the servers 300 and 302, respectively, and two historian containers 310A and 310B instantiated on the servers 300 and 302, respectively.

Referring to the logical controller 304, it should be apparent that only one of the controller containers 304A-

304C can be active (i.e., providing control outputs to the controlled equipment) at a given instant, by instantiating the controller containers 304A-304C on different computing hardware, a fault on any one of the controller containers 304A-304C does not lead to a loss of control of the equipment controlled by the logical controller 304. In the event that the fault occurs on the active one of the controllers 304A-304C, one of the remaining two controllers would become the active controller. Because all three of the controller containers 304A-304C implement the same control algorithms and receive all of the data received by the active controller, the outputs being provided by each of the controller containers 304A-304C is identical and a new active controller may be selected from the controllers 304A-304C when the active controller experiences a fault. Moreover, if the fault on the active controller is caused by a power supply failure on the server on which the controller container is instantiated, at least one other instance of the controller container may be available to take over as the active controller container if at least one of the controller containers 304A-304C is instantiated on a computing resource that uses a different power supply.

In embodiments, the orchestrator 222 may monitor the QoS metrics of the various containers instantiated. By way of example, and without limitation, the QoS metrics may include processor loading, output latency, network latency, and network bandwidth. If the QoS metrics indicate that one of the containers, or the service executing in the container, is becoming unstable, or if the QoS metrics indicate that one of the containers is not performing within the requirements specified for the container, or for the service, then the orchestrator 222 may instantiate a further instance of the container and terminate the container instance that is unstable and, in doing so, maintains the same level of redundancy while substituting a properly performing container for a poorly performing container. The newly-instantiated container may be instantiated on different hardware (different processor, different server, etc.) from the poorly performing container, in embodiments, depending, for example, on whether the QoS metrics indicate that the container was performing poorly as a result of the hardware on which the container was instantiated. At the same time, if the QoS metrics indicate that one hardware resource is underutilized, while another hardware resource is heavily utilized, the load balancing service 258 may cause the orchestrator 222 to move one or more containers to the underutilized resource from the heavily utilized resource (i.e., to create a new container on the underutilized resource and terminate the container on the heavily utilized resource).

Referring again to FIG. 3, the orchestrator 222 has instantiated the four logical functions 304-310 across the two servers 300 and 302. As previously described, one instance of the controller #1 container 304A is on the first server 300, while two instances of the controller #1 container 304B and 304C are on the second sever 302. At the same time, the orchestrator 222 has "balanced" the loading of the two servers by instantiating two of three controller #2 containers (306A and 306B) on the first server 300, and only one of the controller #2 containers (306C) on the second server 302. Two containers 308A and 308B execute the I/O server service, respectively, on the first server 300 and the second server 302. Similarly, two containers 310A and 310B execute the historian service, respectively, on the first server 300 and the second server 302.

Figure 4A:
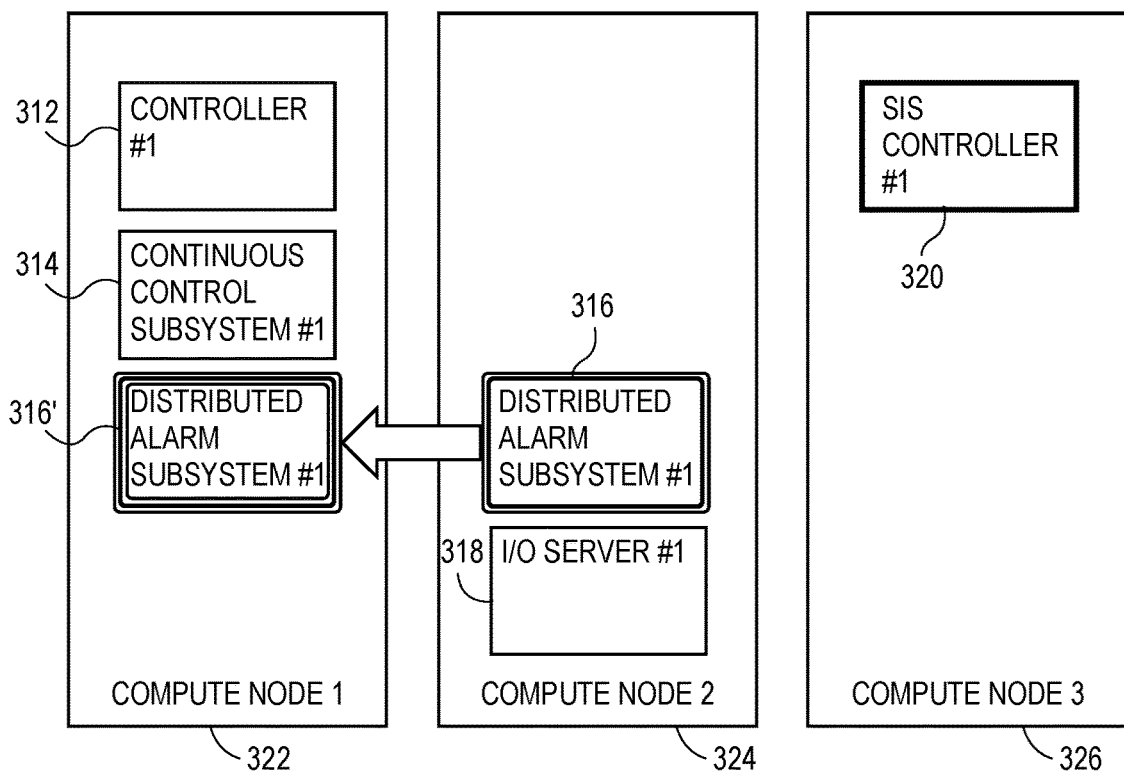
FIG. 4A is a block diagram conceptually illustrating load balancing.

FIG. 4A illustrates the load balancing concept. In FIG. 4A, five containers 312, 314, 316, 318, 320 are instantiated across three compute nodes 322, 324, 326. Each of the containers 312, 314, 316, 318, 320 depicted in FIG. 4A executes a different service. While FIG. 4A does not depict redundant containers, it should be understood that such redundancy may be present in any described embodiment, even though not depicted in order to simplify the figure(s) for the concept being described. FIG. 4A depicts a controller container 312 and a continuous control subsystem container 314 instantiated on the first compute node 322, a distributed alarm subsystem container 316 and an I/O server container 318 instantiated on the second compute node 324, and a Safety Instrumented System (SIS) controller container 320 instantiated on the third compute node 326.

FIG. 4A illustrates that the distributed alarm subsystem container 316 may be "moved" from the second compute node 324 to the first compute node 322 in the event that second compute node 324 becomes heavily loaded (e.g., in the event that the I/O server container 318 consumers a significant portion of the resources of the second compute node 324) such that the QoS metrics for the I/O server container 318 are not maintained, such that the QoS metrics for the distributed alarm subsystem container 316 are not maintained, or such that a minimum amount of available resources on the second compute node 324 is not maintained, for example. In such an event, the orchestrator 222 may instantiate on another compute node (e.g., on the first compute node 322, as depicted in FIG. 4A) having sufficient resources a second instance 316' of the container 316. Once the newly instantiated distributed alarm subsystem 316' is stable, the orchestrator 222 may make the container 316' the active container, and may terminate the distributed alarm subsystem container 316 that was instantiated on the second compute node 324, freeing up resources on the second compute node 324.

It should also be recognized that while non-active instances of redundant containers may not be driving the outputs of the service (e.g., non-active controller containers may not be driving the process), redundant containers may nevertheless be providing data to portions of the system, provided that the data received by each of the redundant containers is equivalent. For example, while an active controller container may be driving the process by providing control signals to the process control field devices operating in the process plant, one or more of the redundant controller containers may be providing data to other services within the SDCS, such as to a historian service. In this manner, the performance loading of the system may be distributed across multiple ones of the redundant containers, especially where those redundant containers are distributed across multiple hardware resources.

The SDCS 100 can also be configured to include "priority" containers (also referred to herein as "high priority" containers). Priority containers are containers that are executing high priority services, and may be designated by the configuration engineer upon configuration of the SDCS, or by default for certain services. By way of example, container services that are classified as safety rated (such as SIS controllers), may be universally designated as priority containers. With respect to load balancing, priority containers may be guaranteed computing resources (e.g., processor resources, network bandwidth, memory, storage, etc.).

As such, the orchestrator 222 may perform load balancing to maintain the guaranteed resources for priority containers. Referring still to FIG. 4A, the SIS controller container 320 is depicted as instantiated on the third compute node 326 (the heavy container border indicating in the figure that the container is a priority container). In embodiments, a priority container may, by default, operate on an otherwise unloaded compute node (as depicted in FIG. 4A), on an otherwise unloaded processor core, etc., in order to ensure that guaranteed resources are available. However, there is no requirement that the priority containers be on servers, processors, or other hardware components that do not also have other containers (priority or not) instantiated there, so long as the guaranteed resources are provided to the priority container(s).

The guaranteed resources may be specified by container type (e.g., hierarchical containers, controller containers, I/O server containers), by service type (e.g., I/O server, controller, subsystem, SIS controller), or by individual containers (e.g., controller #1 that controls a specific area of the process plant). Regardless of the level at which priority containers are specified, the specification of a priority container may include specification of the types and quantities of resources reserved for such a container. For example, and without limitation, a priority container may be guaranteed one or more of a specific level of processor performance, a minimum amount of system memory, a minimum amount of network bandwidth, a minimum amount of storage memory, and/or a maximum transmission latency.

Figure 4B:
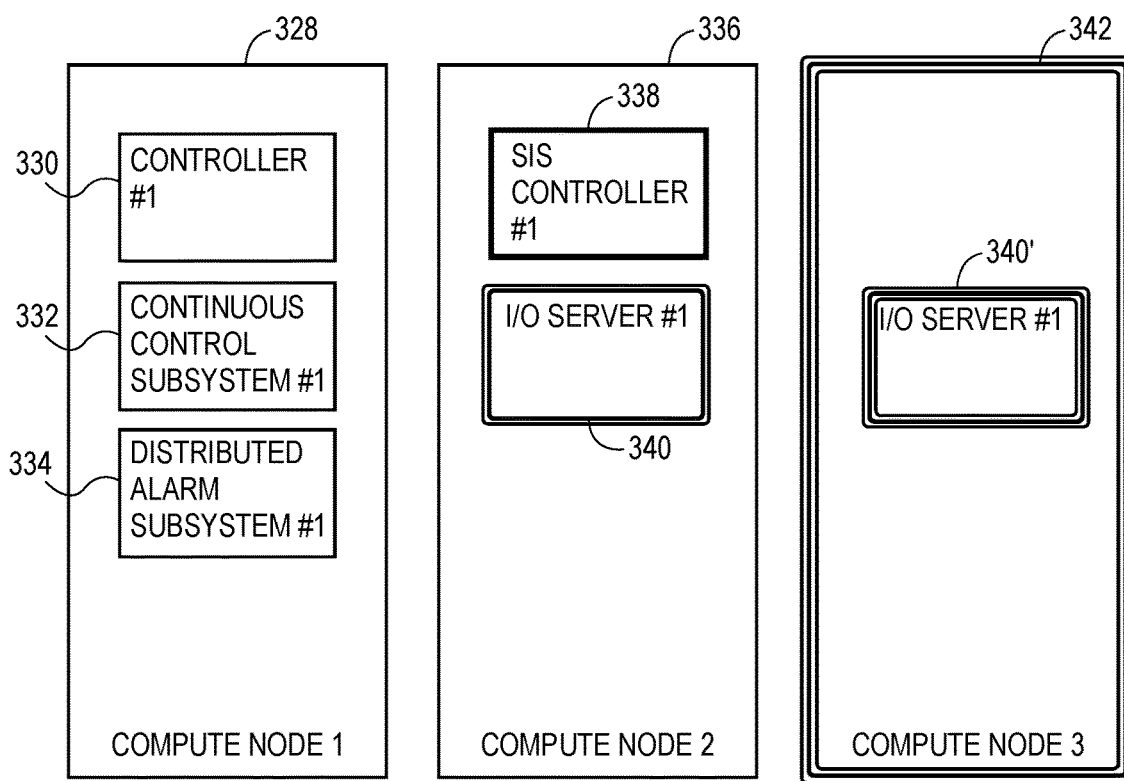
FIG. 4B is a block diagram illustrating the implementation of priority containers and of load balancing on a container level.

FIG. 4B illustrates the concepts of priority containers and also illustrates an additional capability of the load balancing services 258 of the orchestrator 222. Specifically, FIG. 4B illustrates that the orchestrator 222 may, in embodiments, add to and/or remove from the cluster one or more compute nodes, processors, and/or processor cores. FIG. 4B depicts a first compute node 328 instantiated on which is each of a controller container 330, a continuous control subsystem container 332, and a distributed alarm subsystem container 334. A second compute node 336 has instantiated on it a priority SIS container 338 and an I/O server container 340. In the illustrated system of FIG. 4B, the I/O server container 340 requires resources of the second compute node 336 that encroach upon the resources guaranteed to the priority container 338, causing the load balancing service 258 of the orchestrator 222 to free up resources for the priority container 338. In the depicted example, the orchestrator 222 frees up the resources by adding a new compute node (i.e., a third compute node) 342 to the cluster, and instantiates a duplicate container 340' of the I/O server container 340 on the new compute node 342. Once the newly instantiated I/O server container 340' is stable, the orchestrator 222 may make the container 340' the active I/O server container, and may terminate the I/O server container 340 that was instantiated on the second compute node 336, freeing up the resources on the second compute node 336 to meet the guaranteed resources for the priority container 338.

Figure 5A:
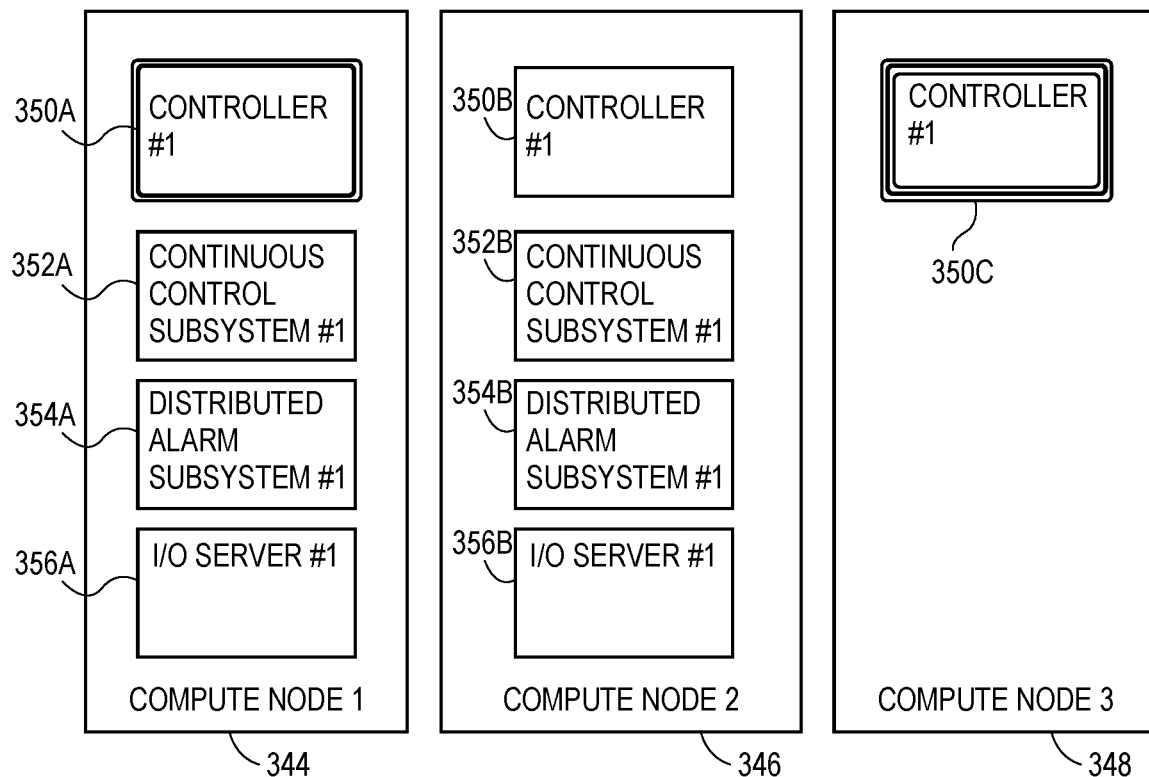
FIG. 5A is a block diagram illustrating an implementation of fault tolerance on a container level.

An example implementation of fault tolerance is depicted in FIG. 5A. In FIG. 5A, first and second compute nodes 344 and 346 each have instantiated thereon each of a controller container 350A, 350B, a continuous control subsystem container 352A, 352B, a distributed alarm subsystem container 354A, 354B, and an I/O server container 356A, 356B. A third server 348 stands idle. FIG. 5A shows that the controller container 350A becomes unstable or terminates suddenly (indicated by the differentiated outline). The orchestrator 222, recognizing that the container 350A is unstable or terminated, ensures that the remaining controller container 350B is the active controller container, instantiates a further redundant copy of the controller container 350C on the third compute node 348 to maintain redundancy.

Figure 5B:
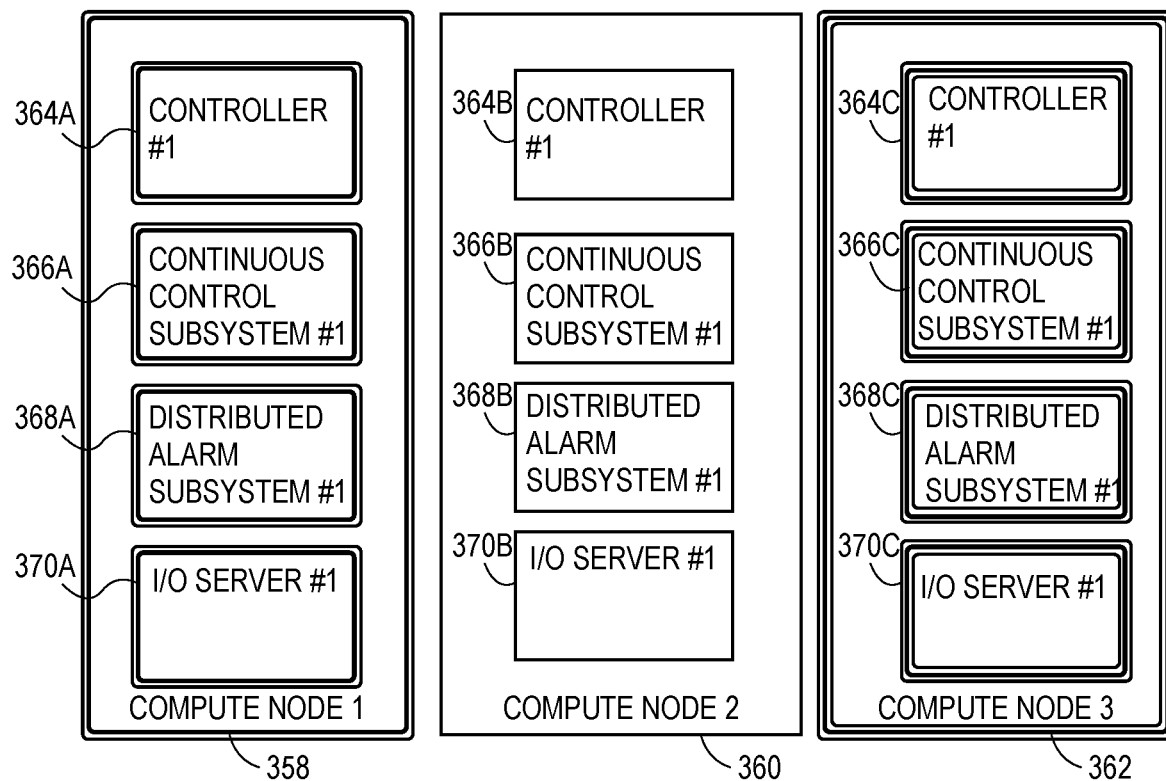
FIG. 5B is a block diagram illustrating an implementation of fault tolerance on a server level.

A similar process occurs if, for example, an entire compute node is rendered inoperable (e.g., by a power failure). FIG. 5B illustrates such a case. In FIG. 5B, first and second compute nodes 358 and 360 each have instantiated thereon each of a controller container 364A, 364B, a continuous control subsystem container 366A, 366B, a distributed alarm subsystem container 368A, 368B, and an I/O server container 370A, 370B. A third server 362 stands idle. FIG. 5B shows that the first compute node 358 becomes unavailable or, in any event, that all of the containers 364A, 366A, 368A, 370A suddenly terminate (indicated by the differentiated outlines). The orchestrator 222, recognizing that the first compute node 358 has become unavailable, ensures that the containers 364B, 366B, 368B, 370B are the active containers, and proceeds to ensure maintained redundancy by instantiating further redundant copies of the containers 364C, 366C, 368C, 370C on the third compute node 362.

In embodiments, the orchestrator 222 maintains or accesses a list, table, database, or other data structure that keeps track of all instantiated services and containers instantiated on the data center 208 (or, in any event, the portion of the data center 208 within the purview of the orchestrator 222). The information in the data structure may be populated by, for example, by the a service (e.g., the performance related services 260) executing in the orchestrator 222, by a service (e.g., the software defined services and functions 225 executing in the HCI operating system 210), by the software defined compute services 215, by the software defined storage services 218, and/or by the software defined networking services 220. FIG. 6 illustrates, in a table 372, the type of information that the orchestrator 222 maintains or accesses in the data structure. Generally, the data structure maintains a list of all containers and services instantiated in the data center (column 373), whether each is the active container or service (column 374), and various information and metrics 376 relating to each of the containers or services. By way of example only, the information and metrics 376 may include one or more of: an indication 377 of which of a plurality of power supplies is supplying power to the resources on which each container or service is instantiated; an indication 378 of on which of a plurality of nodes the container or service is instantiated; an indication 379 of the loading of the node; an indication 380 of on which of a plurality of processors the container or service is instantiated; an indication 381 of the loading of the processor; an indication 382 of on which of a plurality of processor cores the container or service is instantiated, and an indication 383 of the loading of the processor core.

The orchestrator 222 may also maintain or access a data structure tracking information at a higher level than the container and service level. For example, the orchestrator 222 may access or maintain statistics regarding the amount of compute resources, storage resources, and/or network resources available on and/or to each cluster, node, server, processor, and/or processor core, statistics regarding the stability of various power supplies (e.g., voltage stability, status of uninterruptable power supplies, etc.), statistics regarding latency of various physical network connections, etc. The orchestrator 222 may use the information in the data structure 372 and/or the data structure tracking higher level information to determine, at any given instant which of each set of redundant containers is active (e.g., column 374 in table 372) and which of each set of redundant containers is the next best or next available container (column 375 in table 372). In this manner, the orchestrator 222 can immediately make a new container active in the event that the previously active container becomes unstable, exhibits degraded performance, or is terminated.

Figure 7:
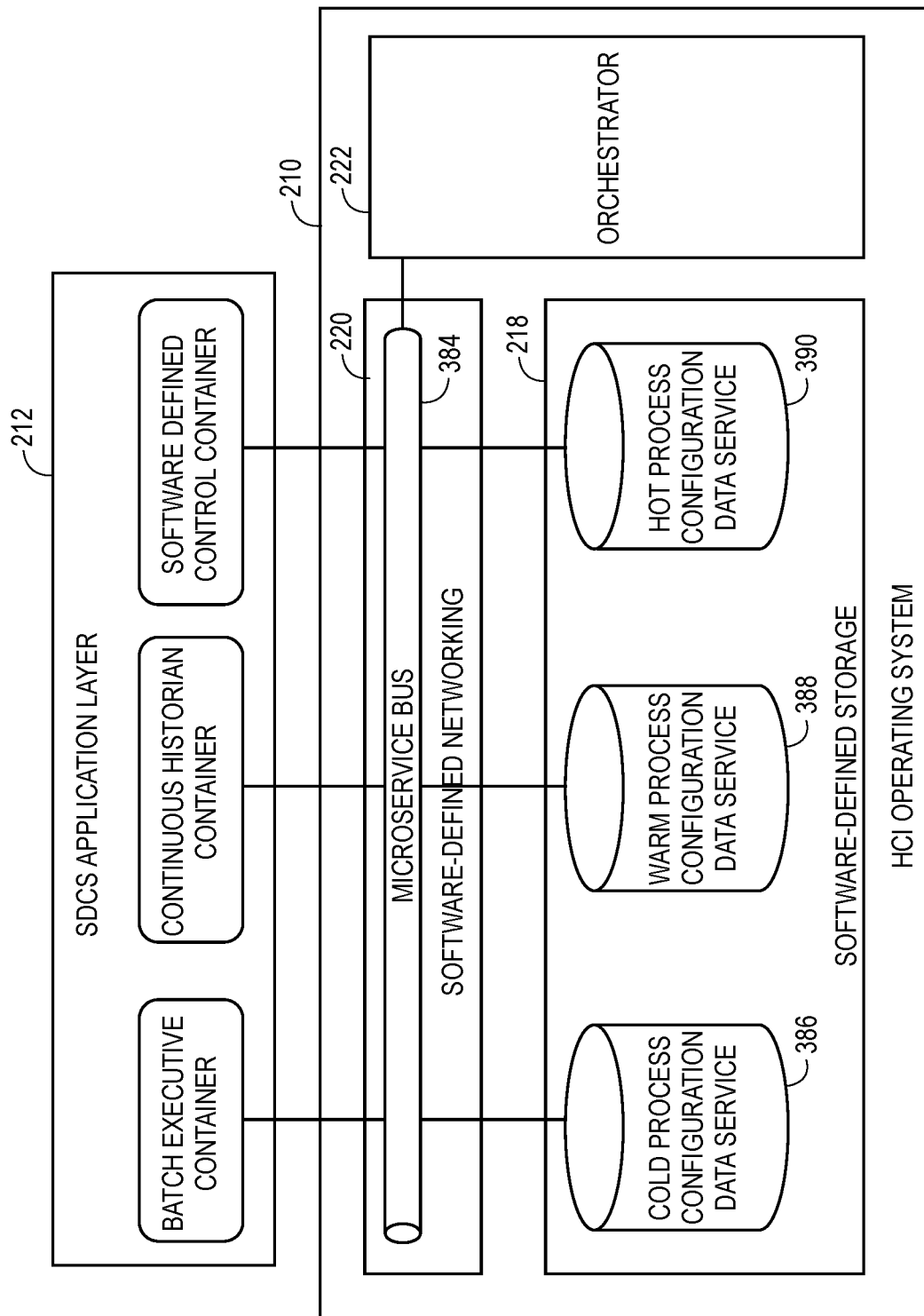
FIG. 7 is a block diagram depicting a software defined storage service.

In order for the orchestrator 222 to instantiate new containers, for load balancing purposes, fault tolerance purposes, or fault recovery purposes, the orchestrator 222 (and the services being instantiated) relies, in part, on the software defined storage service 218. FIG. 7 is a block diagram depicting the software defined storage service 218 in additional detail, as well as, for context, some of the other components of the HCI operating system 210 and the SDCS application layer 212. As described above, the applications (i.e., microservices) executing within the containers in the SDCS application layer 212 communicate via a microservice bus 384 that is part of the software-defined networking 220 of the HCI operating system 210. In addition to facilitating communication between and among the instantiated containers, the microservice bus 384 facilitates communication between the containers and the orchestrator 222, between the containers and the software-defined storage 218, and between the orchestrator 222 and the software-defined storage 218.

The software defined storage 218 includes a variety of storage resources, including three configuration data services classified broadly as a cold process configuration data service 386 ("cold PCDS"), a warm process configuration data service 388 ("warm PCDS"), and a hot process configuration data service 390 ("hot PCDS"). The cold PCDS 386 stores, for example, data related to the starting configuration of the software defined control system 100. The data stored in the cold PCDS 386 may include, for example, redundancy and fault tolerance requirements for the SDCS 100, which application services 235 to instantiate, which subsystems 238 to instantiate, which other SDCS services and/or applications 240 to instantiate, and which third-party applications 248 to instantiate. Additionally, the cold PCDS 386 may store the start-up configurations for each of the container services. For example, while each instance of a controller container implements a controller service, the controller service requires configuration information to program the controller service with the control module services or control loop services and other information necessary for the controller to implement control of the process plant or portion of the process plant that the controller is to control. The data in the cold PCDS 386 is, therefore, typically engineered by the user (e.g., a configuration engineer) or the manufacturer to give each service a set of operation instructions specific to the service. Each SDCS service (container) would query the cold PCDS 386 for configuration data stored. In embodiments, the data stored within the cold PCDS 386 is saved to software defined disk volumes dedicated to the service.

The warm PCDS 388 stores data necessary where a container service is starting up and needs to recover operation state from either a previous instantiation of the service, or in recovery from a service failure. The data stored in the warm PCDS 388 therefore may include state information of the state of each instantiated service, state information of the state of each active instantiated service, and the like. By way of example, such state information may include integration accumulator values where the configuration is performing a running mathematical integration over time, which change rapidly and, therefore, would be inappropriate for storage in the cold PCDS 386. The warm PCDS 376 handles quickly changing parameter storage in the case of warm restart applications. As a result, in embodiments the warm PCDS 388 uses a write-back cache to a mapped volume to capture quickly changing parameters.

In some situations, however, it may be necessary for an instantiated container to have information of the exact running state of a service. This may be the case, for example, where a container terminates unexpectedly without a redundant container available for failover. In such cases where the exact running state of a service is required, the data may be stored in the hot PCDS 390, which captures the exact running state of an SDCS service (i.e., container) such that the hot PCDS 390 can take the place of traditional RAM facilities available to microservices. Data stored in the hot PCDS 390 is typically saved to very fast non-volatile memory volumes, for example, MRAM or NVMe drive technology. A newly instantiated replacement container can be updated with configuration using cold, warm, and hot process data to take over process operations from a terminated predecessor container.

In a large industrial process plant, it is common to utilize parallel process flows. That is, the necessary equipment for producing a product may be multiplied many times over to produce either identical product or variations on the product. Process plants are, as a result, frequently divided into different physical hierarchies and realms. For example, a specific group of equipment may form a unit, which unit may be duplicated multiple times within a physical area of the process plant, allowing different product flows to pass through respective ones of the units, while maintaining similar groups of equipment within a specific area of the process plant. Similarly, logical hierarchies exist, sometimes in combination with the physical hierarchies, to distinguish set of equipment. For example, in the realm of batch control, a "process cell" is defined as a logical grouping of equipment that includes the equipment for production of one or more batches. The process cell may include one or more units, each of which includes one or more equipment modules that make up the unit. Each of the equipment modules may be made of one or more control modules (e.g., field devices).

A variety of methods may be implemented within the process plant 10 and, in particular, within the SDCS 100, relating to the orchestrator 222. A method may include configuring a first container to include a service executing within the first container, and assigning the configured first container to execute on an available hardware resource of a plurality of hardware resources. In so doing, the first container may be configured to control the process control field devices 60, 70, 80, 90 operating in the process plant 10. The first container may be configured to execute a controller service that receives data from the field devices and determines, from the received data, one or more control outputs, and to send the one or more control outputs to the plurality of field devices. The first container may alternatively be configured to execute an I/O server service. In still other embodiments, the first container may be configured to execute any of an historian service, a distributed alarm subsystem service, or a diagnostic subsystem service.

Assigning the first container to execute on an available hardware resource may include assigning the first container to execute on a specific power supply. Alternatively, the available hardware resource may be specified as a specific data cluster, a specific set of data clusters, a specific rack of servers, or a specific server. In other embodiments, the available hardware resource may be specified as a specific processor, a specific processor core, a specific memory device, or a specific memory resource.

Further, in some embodiments, the method may include dynamically adding or removing hardware resources, such as physical servers, data clusters, or nodes.

In embodiments, the available hardware resource to which the first container is assigned is selected according to a metric related to the available hardware resource. Assigning the configured first container to execute on an available hardware resource may include moving the configured first container from executing on a current hardware resource to executing on the available hardware resource according to a metric related to the current hardware resource, the available hardware resource, or a comparison between the metrics of the current and available hardware resources. That metric, in various embodiments, may include processing bandwidth, network bandwidth, memory resources, or communication latency between the hardware resource and another component, for example.

The method may also include configuring one or more redundant containers to include the service executing within each of the one or more containers, and assigning each of the one or more containers to execute on respective available hardware resources. The first container may be assigned as an active container, such that the outputs of the active container are driving outputs (i.e., are provided to the field devices or drive the inputs to another container).

The method may include maintaining a list of redundant containers (including the active container) and updating the list of redundant containers to indicate which container is the active container. In such implementations, assigning each of the redundant containers to execute on respective available hardware resources may include selecting the respective available hardware resources such that each of the one or more redundant containers creates fault tolerance in at least one regard, such as creating processor diversity, server diversity, and/or power supply diversity.

In still further embodiments, the method may include receiving an indication that the first container is a priority container, and, as a result, maintaining on the hardware resource a predetermined threshold of resource availability to ensure that the priority container and/or the available hardware resource meets or exceeds specified performance requirements.

Figure 8:
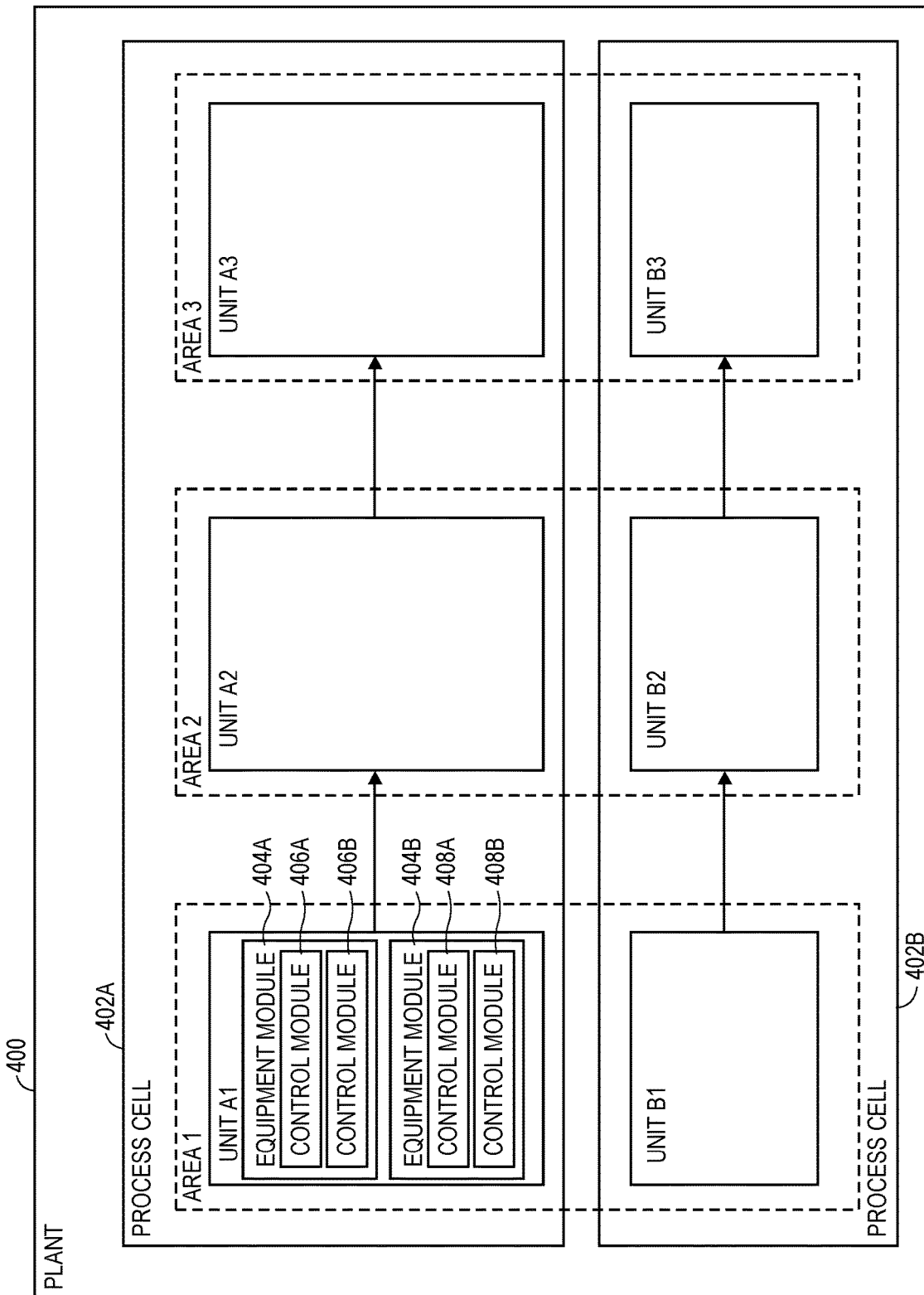
FIG. 8 is a block diagram illustrating logical and physical hierarchical arrangement of a process plant.

FIG. 8 is a block diagram illustrating logical and physical hierarchical arrangement of an example process plant 400. The process plant 400 includes two process cells 402A and 402B, each of which comprises three units 404. The process cell 402A includes units A1, A2, and A3, while the process cell 402B includes units B1, B2, and B3. Each of the units includes one or more equipment modules, which in turn include one or more control modules. By way of example, unit A1 in the process cell 402A includes two equipment modules 404A and 404B. The equipment module 404A includes control modules 406A and 406B, while the equipment module 404B includes control modules 408A and 408B. Other units in the process cells 402A and 402B each include one or more equipment modules (not shown) that, in turn, include one or more control modules (not shown).

At the same time, a physical hierarchy or organization may be employed inside the process plant 400. For instance, if the process cells 402A and 402B are processing similar products, the units A1 and B1, A2 and B2, and A3 and B3, may be each comprise identical sets of equipment operating according to the same or different control schemes. As a result, the process plant operator may group similar units within "areas" of the process plant. In the process plant 400, for example, the units A1 and B1 are in an Area 1, the units A1 and B2 are in an Area 2, and the units A3 and B3 are in an Area 3.

It will be appreciated that, depending on the process plant, various logical and physical hierarchies and arrangements are possible, and that the example process plant 400 illustrated in FIG. 8 depicts merely one possible organizational scheme. Of course, a large industrial process may have any number of areas, process cells, units, equipment modules, and control modules and, as a result, logical organization of these modules within the control scheme may be particularly helpful.

As described above, the SDCS 100 implements a containerized architecture in which each container is an isolated execution environment that executes within the operating system of a computing node that hosts the container (i.e., within the operating system of the computing node on which the container is instantiated). Because each container, when unconfigured, is essentially a "sandbox" in which services and other items may be instantiated, the containers in the SDCS 100 may represent logical and/or physical hierarchies within the process plant 10. Specifically, containers within the SDCS 100 may be nested to represent the logical and/or physical configuration of the process plant in an accurate fashion.

Figure 9:
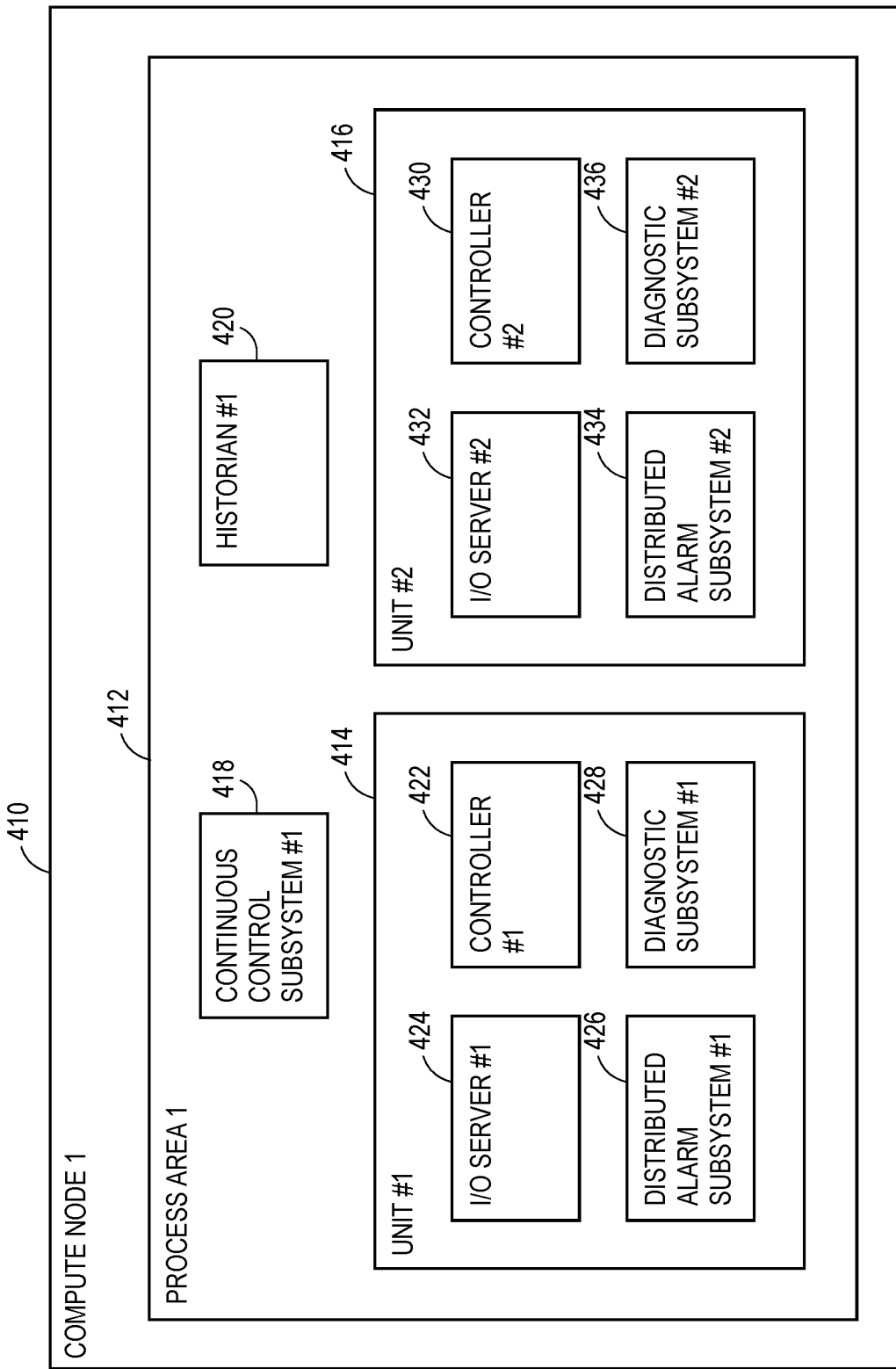
FIG. 9 is a block diagram illustrating an example implementation of nested containers in a process control system.

FIG. 9 is a block diagram illustrating an example implementation of nested containers in a process control system. A compute node 410 on a data cluster (e.g., on the data cluster 208) has instantiated on it a container 412 representing a process area "Process Area 1." Process Area 1 includes two units, Unit 1 and Unit 2. Accordingly, the container 412 representing Process Area 1 has instantiated within it a container 414 representing Unit 1 and a container 416 representing Unit 2. In this way, the hierarchy of the process plant may be represented within the organization of the computing elements of the SDCS 100. In the example depicted in FIG. 9, a single continuous control subsystem service, executing in a container 418 within the container 412, is responsible for both Unit 1 and Unit 2, and a single historian service, executing in a container 420 within the container 412, historizes data for both Unit 1 and Unit 2. Controller services, I/O server services, distributed alarm subsystem services, and diagnostic subsystem services, specific to each unit, execute, respectively, within containers 422, 424, 426, and 428 nested within the container 414, and within containers 430, 432, 434, and 436 nested within the container 416.

In this manner, a plant operator can configure the SDCS 100 in a manner that represents the logical and/or physical design of the associated process plant. In this manner, containers may also be configured to facilitate duplication of container structures for the purpose of implementing control of separate, but identical, portions of the process plant and/or for the purpose of creating redundancy and/or for purpose of facilitating load balancing operations. For example, a container may be configured such that, when instantiated, it contains specific sub-containers that, upon instantiation need only be configured for the specific equipment area of the process plant that is to be controlled. With reference again to FIG. 9, the containers 414 and 416 may be different instances of the same container that, upon instantiation, need only be configured such that the containers 422, 424, 426, and 428 within the container 414 are associated with the equipment of Unit 1 and the containers 430, 432, 434, and 436 within the container 416 are associated with the equipment of Unit 2.

Figure 10:
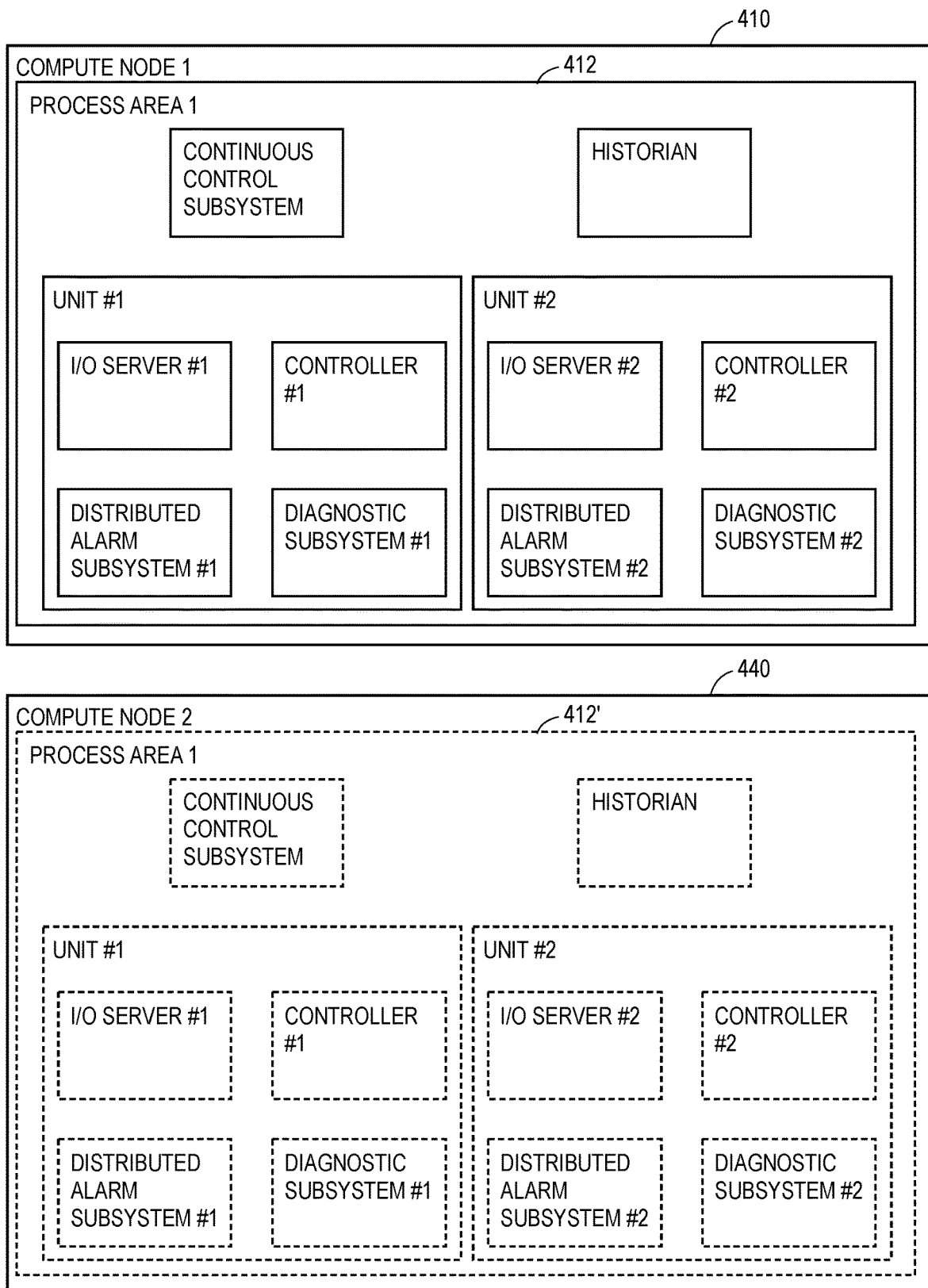
FIG. 10 is a block diagram illustrating the use of nested containers for fault tolerance and load balancing.

Turning now to FIG. 10, individual and/or nested containers may be duplicated to facilitate fault tolerance and/or moved between compute nodes or other resources in order to facilitate load balancing. FIG. 10 depicts an example in which the container 412 of FIG. 9 is instantiated on the compute node 410 (container 412) and on a second compute node 440 (container 412'). The containers 412 and 412' are functionally identical, but, being instantiated on different compute nodes, allow for one of the containers (e.g., the container 412) to be designated the active container, while the other of the containers (e.g., the container 412') is designated as redundant (as indicated by the containers having dotted lines). In so doing, if the active container suffers from degraded service (described further below) or the compute node on which the active container is instantiated suffers a fault (e.g., an unexpected server error, a power failure, etc.), the redundant one of the containers (e.g., the container 412') may be designated as the active container and the associated portion of the process plant may be continuously and reliably controlled.

Figure 11:
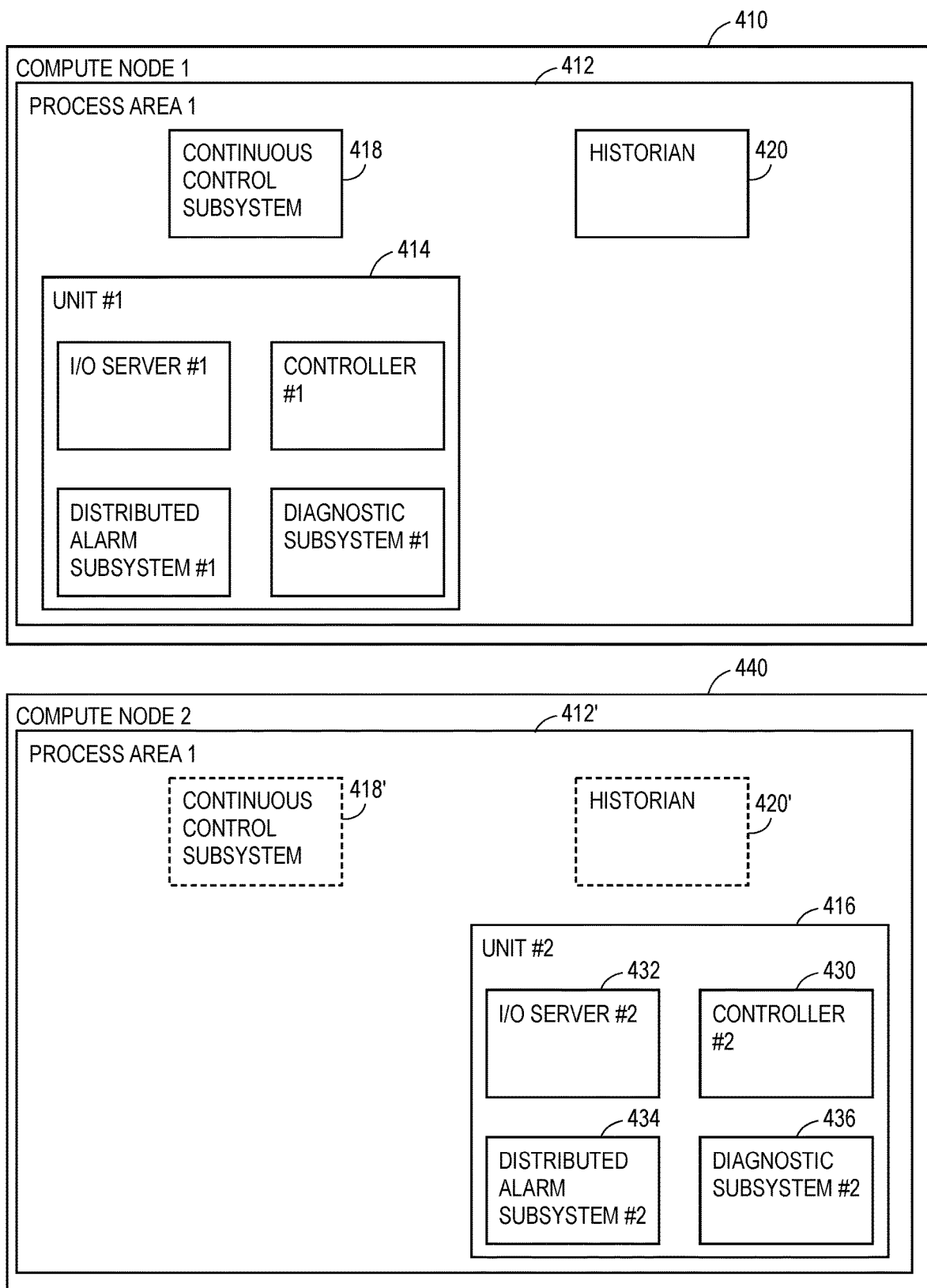
FIG. 11 is a block diagram illustrating individually instantiated containers in a nested hierarchical system.

Of course, while containers may be configured such that any instantiation of the container necessarily includes all of the containers nested within (e.g., such that instantiation of a container for Unit 1 includes all of the containers 422, 424, 426, and 428), it is also possible to instantiate each container individually. For example, such an implementation is depicted in FIG. 11, in which the two compute nodes 410 and 440 each execute a portion of the depicted process control system. In the example depicted by FIG. 11, the container 412 is instantiated on the compute node 410. The container 412 has instantiated within it the container 418 executing the continuous control subsystem service, and the container 420 executing the historian service. The container 414 associated with Unit 1 is instantiated in the container 412, and the containers 422, 424, 426, and 428, respectively executing the controller service, the I/O server service, the distributed alarm subsystem service, and the diagnostic subsystem service, are instantiated within the container 414. At the same time, the container 412' is instantiated on the compute node 440. The container 412' has instantiated within it a container 418' executing a redundant instance (indicated by the dotted lines) of the continuous control subsystem service, and a container 420' executing a redundant instance (indicated by the dotted line) of the historian service. The container 416 associated with Unit 2 is instantiated in the container 412', and the containers 430, 432, 434, and 436, respectively executing the controller service, the I/O server service, the distributed alarm subsystem service, and the diagnostic subsystem service, are instantiated within the container 416'. In this manner, load balancing may be achieved by implementing on the compute node 440 services related to unit 2, and implementing on the compute node 410 services related to unit 1, while redundancy of the historian and continuous control subsystem services is also achieved.

Figure 12:
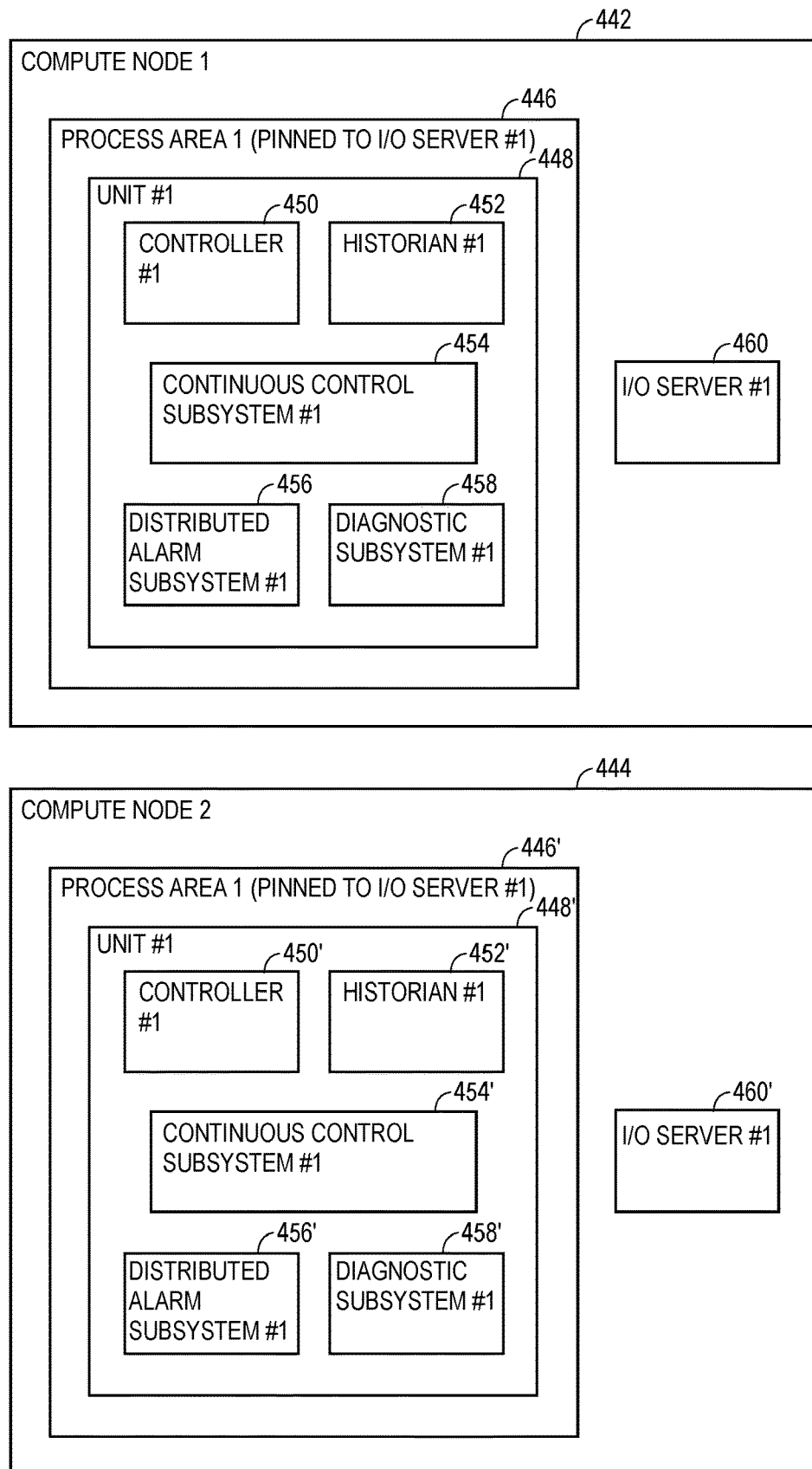
FIG. 12 is a block diagram depicting another example of container nesting.

FIG. 12 depicts another example of container nesting. In FIG. 12, redundant configurations are instantiated on first and second compute nodes 442 and 444, respectively. In each of the two redundant configurations, a container 446, 446' corresponding to a same process area 1 is instantiated and, therein, a container 448, 448' corresponding to a same unit 1 of the process area 1 is instantiated. Each of the containers 448, 448' includes a set of containers operable to provide services for unit 1, including a controller container 450, 450', an historian container 452, 452', a continuous control subsystem container 454, 454', a distributed alarm subsystem container 456, 456', and a diagnostic subsystem container 458, 458'. Redundant I/O server containers 460, 460' are instantiated on each of the first compute node 442 and the second compute node 444. The I/O server implemented by the I/O server containers 460, 460' may perform I/O services for other process areas, units, and controllers other than those depicted in FIG. 12 and, as such, are not depicted as within the containers 446, 446' for process area 1 or the containers 448, 448' for unit 1.

While the I/O server implemented by I/O server containers 460, 460' may be used by containers other than those depicted in FIG. 12, the containers 446, 446' for process area 1 are depicted in the figure as being "pinned" to I/O server 1. In this way, FIG. 12 illustrates another feature of the SDCS 100, namely that elements within the SDCS 100 may be pinned to one another, such that pinned elements operate on the same hardware or operate on the hardware to which they are pinned. In FIG. 12, for example, because the containers 446, 446' for process area 1 are pinned to respective I/O server containers 460, 460', the container 446 will be instantiated on the same server as the I/O server container 460, and the container 446' will be instantiated on the same server as the I/O server container 460'. Thus, if the process area container 446 is moved to another server, the I/O server container 460 would likewise be moved to the same server as the process area container 446. The same is true for the container 446' pinned to the container 460'.

Containers may be pinned to any of a variety of components in the process plant 10. As described with respect to FIG. 12, containers may be pinned, in embodiments to other containers, such that the containers, if moved from one piece of processing hardware to another, are moved as a unit and remain executing on the same piece of hardware. This may be useful, for example, to ensure that network latency between pinned containers remains minimal. In embodiments, containers may be pinned to specific processing hardware, including to a particular data cluster, a particular compute node of a data cluster, a particular processor of a particular compute node, a particular server rack, a particular processor core of a processor, etc. In some embodiments, a container may be instantiated on a smart field device and, as such, a container may be pinned to a particular field device. Containers may also be pinned to particular non-computing physical resources. For example, a container could be pinned to a particular physical I/O interface, or even to a particular power supply powering a plurality of computing resources. In the latter case, this would allow each of two redundant containers to be moved between computing resources powered by respective power supplies, while maintaining fault tolerance with respect to the power supplies.

Figure 13:
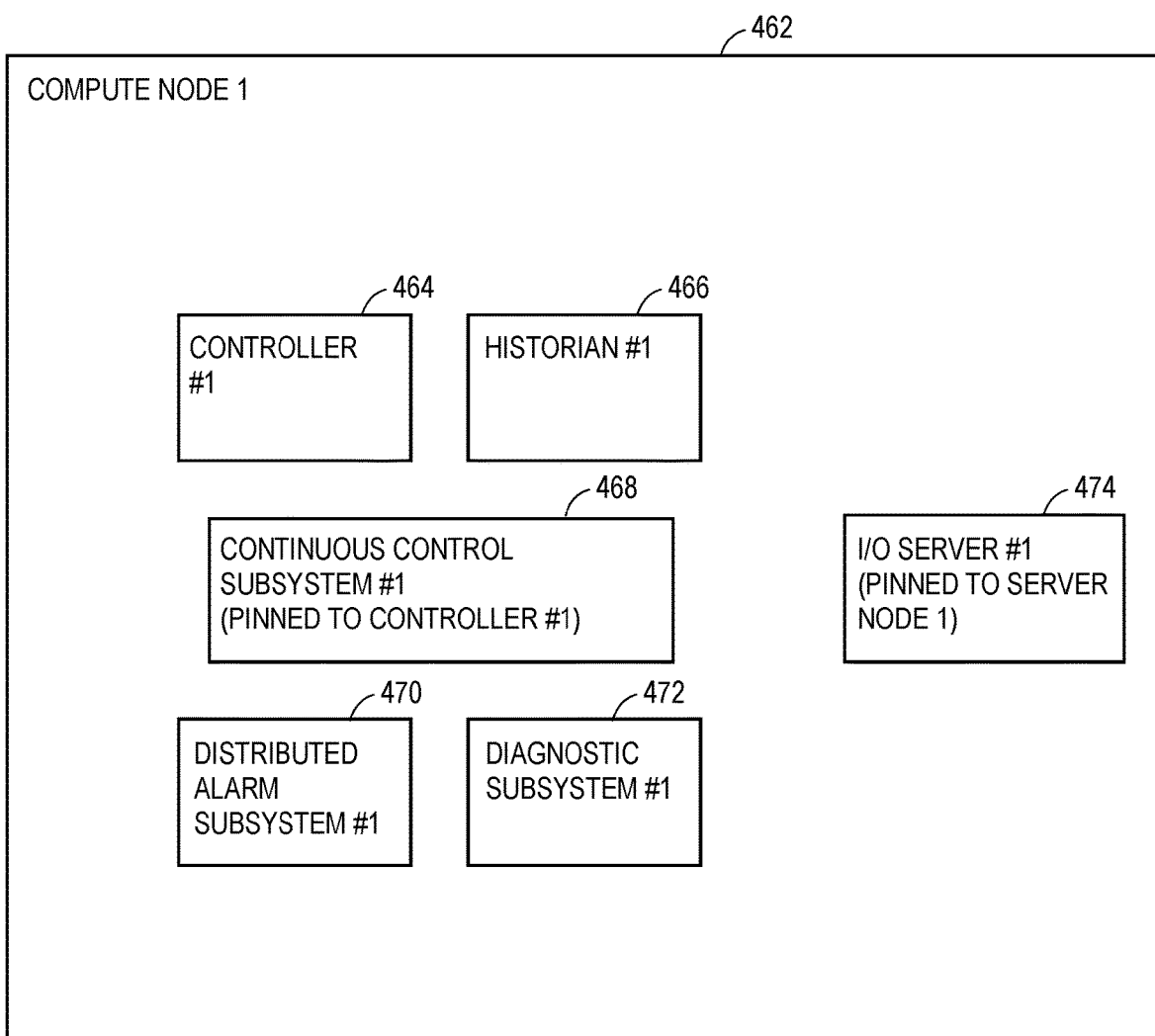
FIG. 13 is a block diagram illustrating a first example of container pinning in a process control system.
Figure 14:
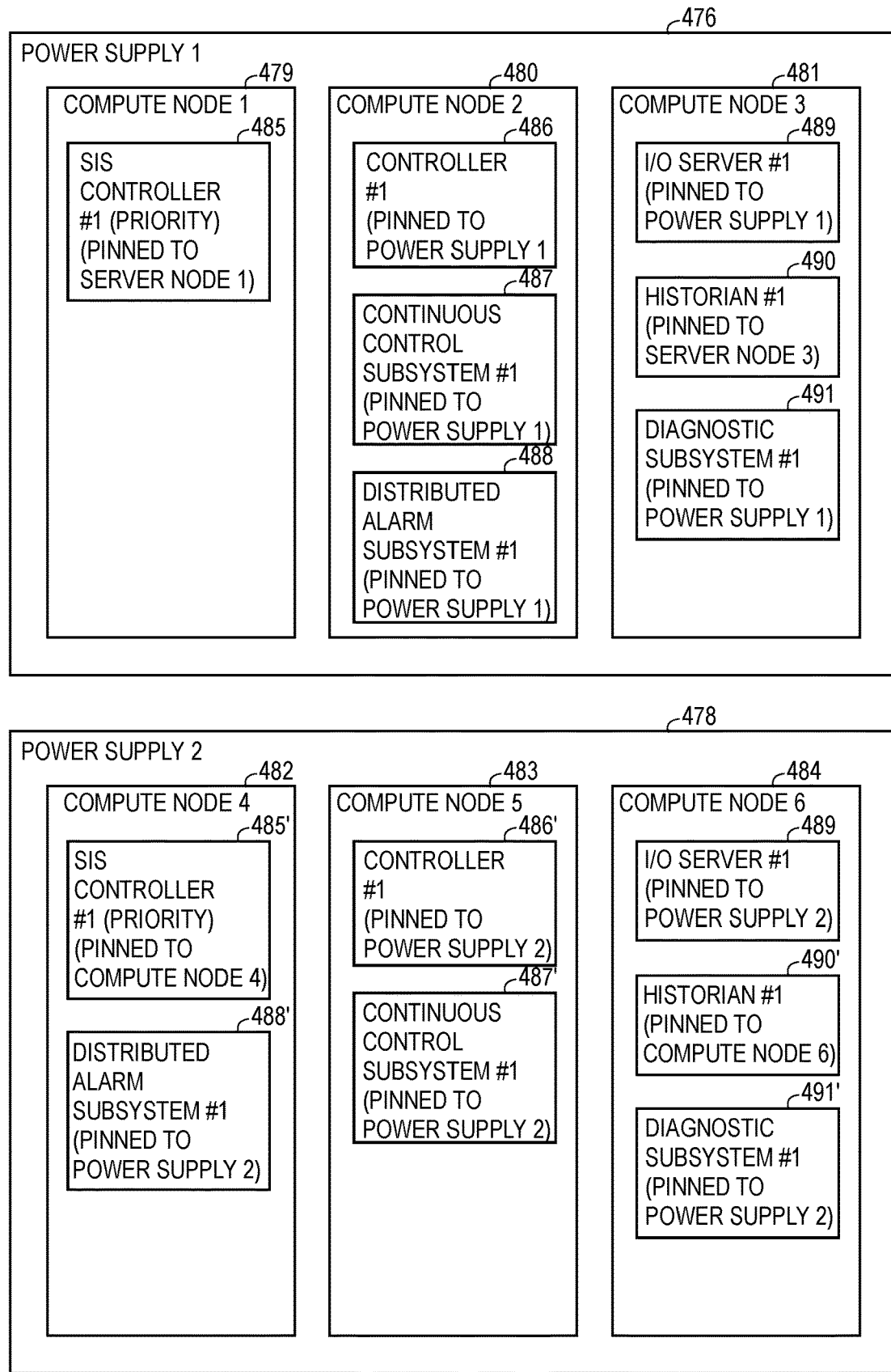
FIG. 14 is a block diagram illustrating a second example of container pinning in a process control system.

FIG. 13 and FIG. 14 illustrate various examples of pinning of containers to components. In FIG. 13, a compute node 462 has instantiated thereon a plurality of containers 464-474, including a controller container 464, an historian container 466, a continuous control subsystem container 468, a distributed alarm subsystem container 470, a diagnostic subsystem container 472, and an I/O server container 474. As depicted in FIG. 13, the I/O server container 474 is pinned to compute node 462. Thus, while others of the containers instantiated on the compute node 462 may be "moved" (i.e. instantiated on other hardware before termination of the instance instantiated on the compute node 462), the I/O server container 464 will remain on the compute node 462 until unless some circumstance (e.g., server instability, abnormal termination, etc.) forces the I/O server container 464 to be moved. At the same time, the continuous control subsystem container 468 is pinned to the controller container 464. The controller container 464 and the continuous control subsystem container 468 will be instantiated as a pair, for instance, in order to ensure that data passing between the containers 464, 468 maintain minimal latency due to their instantiation on the same hardware resources.

It may be apparent that, when a container is pinned to a particular hardware resource, that pinning may be specific to the instance of the container—that is, one instance of a container may be pinned to a first hardware resource, while a second, redundant instance of the container may be pinned to a second, separate hardware resource. In such a case, the pinning of a container to a hardware resource may facilitate redundancy and fault tolerance. However, when a container is pinned to another container, that pinning may, in some instances, be carried across to all redundant instantiations of the container pair—that is, a controller-continuous control subsystem pair may be instantiated together regardless of on which hardware resource each instance of the pair is instantiated. In this way, the pinning of one container to another may be implemented to achieve goals related to network latency and bandwidth management, for example.

FIG. 14, meanwhile, illustrates an example in which two power supplies 476 and 478 supply power to respective sets of compute nodes. A first of the power supplies 476 supplies power to three compute nodes 479, 480, 481, while a second of the power supplies 478 supplies power to three other compute nodes 482, 483, 484. Each set of servers 479-481 and 482-484 collectively has instantiated thereon the same set of containers, thereby providing 1:2 fault tolerance, such that if one of the power supplies 476, 478 failed, redundant containers would remain active on the other of the power supplies 476, 478. Collectively, the servers 479-481 have instantiated thereon: an SIS controller container 485, a controller container 486, a continuous control subsystem container 487, a distributed alarm subsystem container 488, an I/O server container 489, an historian container 490, and a diagnostic subsystem container 491. Similarly, the servers 482-484 have instantiated thereon: an SIS controller container 485', a controller container 486', a continuous control subsystem container 487', a distributed alarm subsystem container 488', an I/O server container 489', an historian container 490', and a diagnostic subsystem container 491'. Effectively, each of the containers 485-491 instantiated on the servers 479-481 is pinned to the first power supply 476, with the SIS controller container 485 pinned specifically to the first compute node 479, the historian container pinned to the third server 481, and the remainder of the containers 485-491 pinned generally to the first power supply 476. At the same time, each of the containers 485'-491' instantiated on the servers 482-484 is effectively pinned to the second power supply 478, with the SIS controller container 485' pinned specifically to the fourth compute node 482, the historian container pinned to the sixth server 484, and the remainder of the containers 485'-491' pinned generally to the second power supply 478. Except for the SIS controller containers 485, 485' and the historian containers 490, 490', the containers 485-491 may be moved between the first, second, and third servers 479-481, and the containers 485'-491' may be moved between the fourth, fifth, and sixth servers 482-484, for load balancing, while maintaining fault tolerance.

Of course, as illustrated in the paragraphs above, nesting and pinning of containers may be used in conjunction with one another or separately. Accordingly, a method may include instantiating in a first computing node of a data cluster first and second containers, each of which is a respective isolated execution environment within an operating system of the first computing node. The second container may be instantiated within the first container, while a service is instantiated within the second container. Each of the first and second containers corresponds, respectively, to first and second levels of a hierarchical structure of the process plant, in embodiments. At the same time the first container may also have executing therein one or more services. The service executing within the first container may be an I/O service, in embodiments.

The method may also include instantiating on the first computing node a third container that is instantiated, specifically, within the first container. In embodiments, the service executed within the second container may be a controller service executing a control routine configured to control a subset of process control field devices in a first portion of the industrial process plant, while the service executed in the third container may be a controller service executing a control routine configured to control a different subset of process control field devices in a second portion of the industrial process plant. In some embodiments, the services executing in the second and third containers may include respective I/O server services configured to communicate data between the process control field devices and the respective controller services. In embodiments, the method may include instantiating redundant nested container structures on one or more different nodes of the data cluster.

In various embodiments, a method may include instantiating, in a data cluster of the industrial process control system 10 executing an SDCS 100 for controlling a plurality of process control field devices 60, 70, 80, 90 operating to control a physical process in an industrial process plant, a plurality of containers. Each of the plurality of instantiated containers may be an isolated execution environment executing within an operating system of a one of a plurality of compute nodes on which the container is instantiated. The plurality of instantiated containers may cooperate to facilitate execution of a control strategy in the software-defined control system. The method may also include pinning a first container of the plurality of containers to a component of the software-defined control system. As described above, in some embodiments, one or more of the plurality of containers may correspond to a level of a hierarchical structure of the process plant.

In embodiments, the method may also include executing a service within at least one of the plurality of instantiated containers. The service may comprise, for example, an I/O server service, a controller service, an historian service, a distributed alarm subsystem service, a diagnostic subsystem service, a third-party service, or a security service. Moreover, pinning a first container to a component of the SDCS may include pinning the container to another container, which may itself be instantiated within the first container, or in which the first container may be instantiated.

The component to which the container is pinned may be a power supply supplying power to one or more data clusters or a portion of a data cluster, or may be any of a data cluster, a compute node of the data cluster, a server rack within the data cluster, a server, a specific processor, or a specific processor core within a processor. The component may alternatively be an I/O server container in which an I/O server service is executing, may be a process control field device, or may be a physical I/O interface. In embodiments, the method may include instantiating redundant container structures pinned to different nodes, servers, power supplies, processors, or processor cores.

Figure 15:
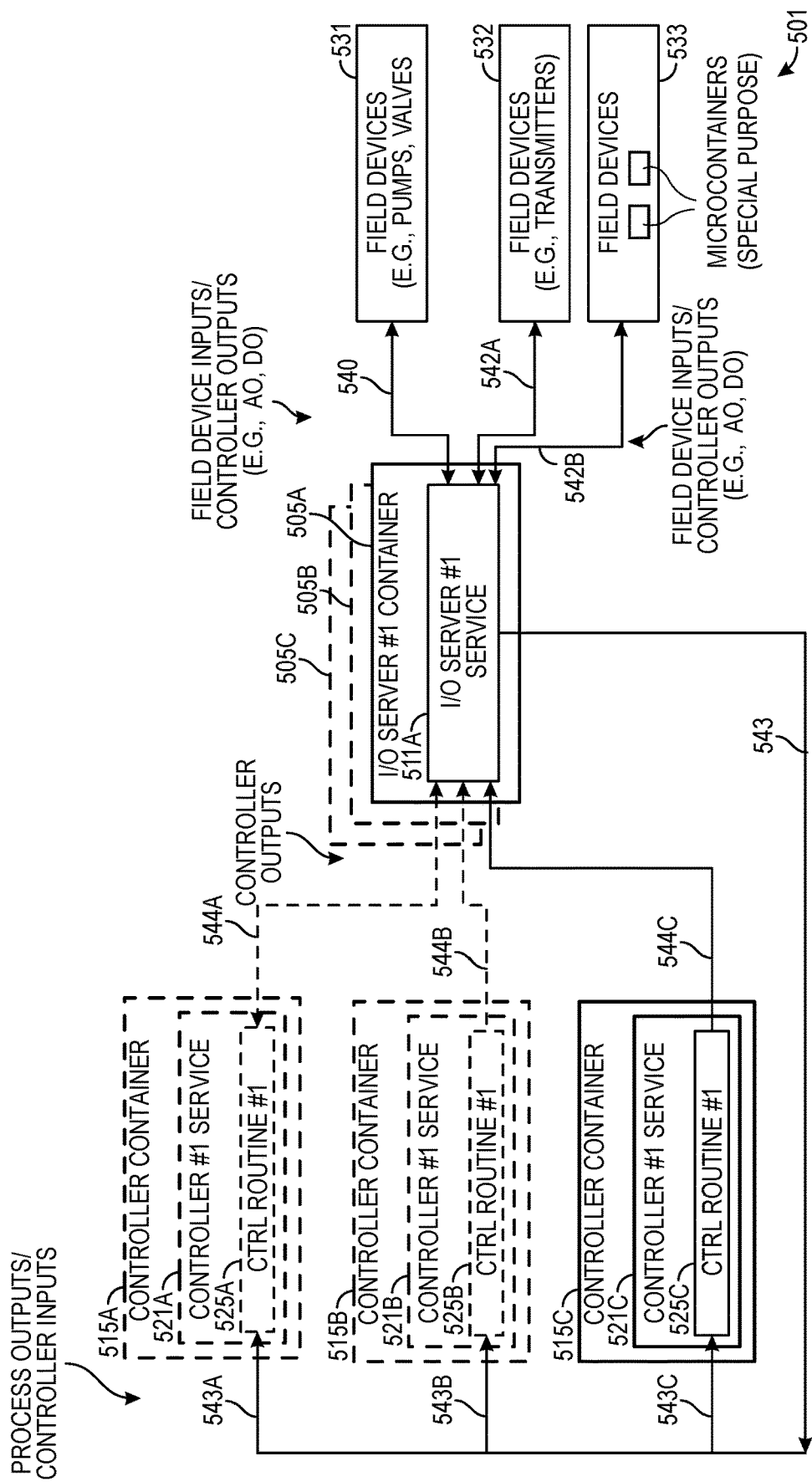
FIG. 15 is a block diagram of an I/O network including containerized services for implementing control of portions of areas of the plant shown in FIG. 1.
Figure 15:
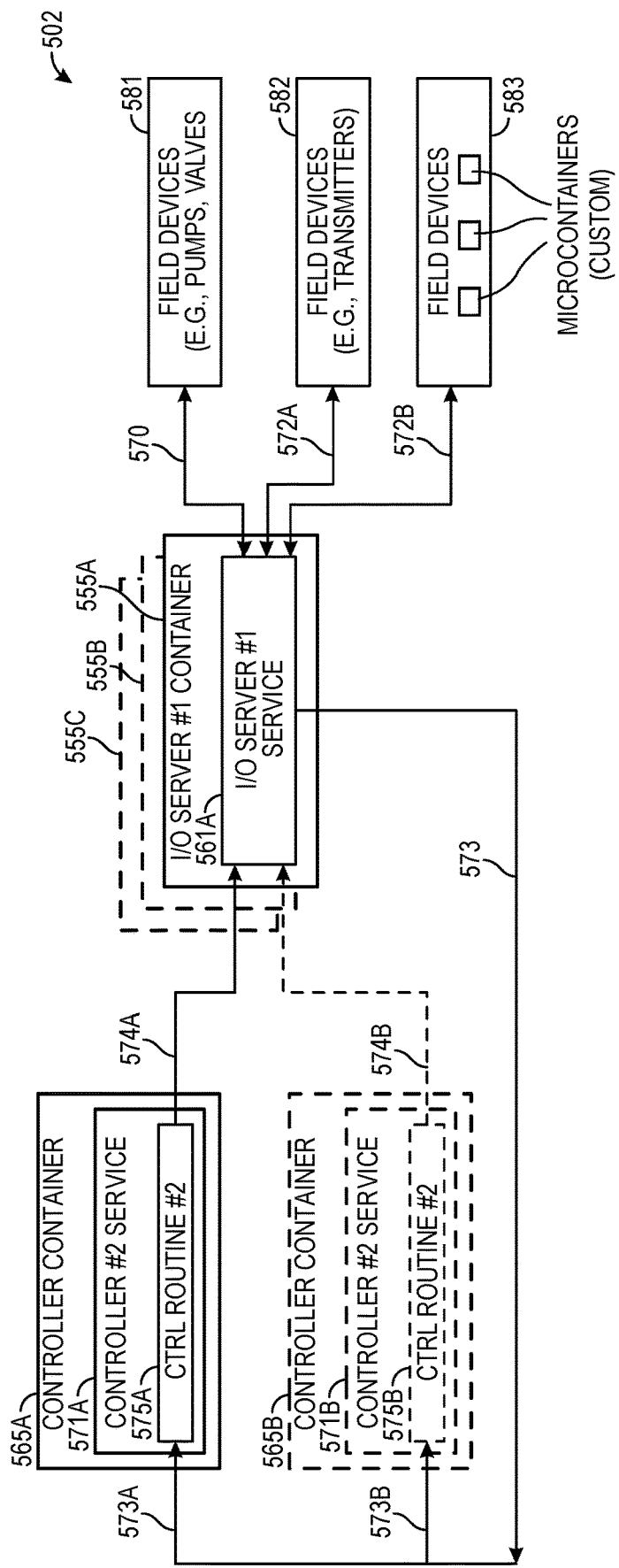

FIG. 15 is a block diagram of an I/O subsystem or I/O network 500 including containerized services for implementing control of a portion of a process in an area 501 and of a portion of a process in an area 502 of the plant 10 shown in FIG. 1. The I/O subsystem 500 may be part of, and/or connected to, the I/O gateway 40 and SDCSs 100/200 shown in FIGS. 1 and 2.

Regarding the term "I/O network," generally speaking, the network formed by one or more controllers or controller services (e.g., containerized), the field devices communicatively connected to the one or more controllers or controller services, and the intermediary hardware or software nodes (e.g., I/O server services, I/O cards, etc.) facilitating communication between the controllers or controller services and field devices may be referred to as an "I/O network" or "I/O subsystem."

At a high level, the I/O subsystem 500 includes: (i) an I/O server service (sometimes "I/O service" or just "service") 511a for the area 501 and (ii) an I/O service 511b for the area 502. Note, while the majority of the description below focuses on the configuration and operation of the I/O service 511a, it will be understood that the I/O service 561a may be similarly configured to provide similar functionality with respect to entities used to implement control of the process equipment in the area 502.

The I/O service 511a is a software service implemented at any suitable computing device or node. The service 511a may be thought of as a platform, application, or suite of applications that provides I/O functions (e.g., over a link or network) relating to the I/O subsystem 500 for various routines, modules, services, containers, devices, or nodes in the plant 10. For example, a field device (or I/O card coupled to a field device) may interact with the I/O service 511a by: (i) receiving, from the service 511a, controller outputs such as commands to actuate a field device, and/or (ii) transmitting to the I/O service 511a field device outputs, such as measured process parameters or indices generated or calculated by the field device. Further, a controller service may interact with the I/O service 511a by: (i) providing the I/O service 511a controller outputs (e.g., carrying commands), and/or (ii) receiving, from the I/O service 511a, controller inputs (e.g., the field device outputs representing, for example, measured process parameters). Communication between the I/O service 511a and the entities it serves (e.g., field devices, controller servers) may be implemented using any suitable communication model, such as a push model in which the I/O service 511a is publisher and field devices and/or controller services are subscribers; or in which the I/O service 511a is a subscriber and field devices and/or controller services are publishers. Likewise, a pull model may be used in which the I/O service 511a is requester and field devices and/or controller services respond to the request; or in which the I/O service 511a responds to requests from the field devices and/or controller services. If desired, a hybrid model may be used in which the I/O service 511a performs a different communication role with the field devices (e.g., publisher, subscriber, requester, responder, etc.) than it does with the controller services.

In any event, during example operation, the I/O service 511a receives multiple sets of controller outputs from a plurality of containerized controller services each implementing the same control routine for controlling the area 501. In a typical example, the service 501 passes a single "active" set of the controller outputs (i.e., the outputs from a particular one of the containerized controller services) to the relevant field devices to control the area 501. Further, the other "inactive" sets of controller outputs are not forwarded to the relevant field devices. The I/O server service 561a is similarly configured with respect to the area 502, capable of handling multiple sets of controller outputs, including an "active" set of controller outputs and one or more "inactive" sets.

At a high level, the I/O service 511a acts as an intermediary between: (i) a set of field devices 531 (e.g., including pumps, valves, and other actuating devices) which perform some physical control action in the plant, a set of field devices 532 (e.g., including sensor-based field devices) that operate as transmitters to measure and transmit process variables in the plant, as well as, potentially, a set of field devices 533 that encapsulate a set of microcontainers that perform "custom" algorithms (such a spectral processing microcontainer relevant for spectral processing within a spectrometer device, or an image processing microservice for a device with a camera attached) and which produce and transmit processed I/O data for particular uses (which may be control or maintenance uses) and (ii) one or more containerized controller services 521a-c each running instances 525a-c of the same control routine #1 (e.g., the same configured control routine service #1) to control the same set of field devices 531 and 532 to thereby control the area 501. While the field devices 531 are shown as actuating field devices that are distinct from the field devices 532 that function as transmitters (e.g., of measured process parameters) which are distinct from the field devices 533 which include custom algorithm or custom microcontainers to process or manipulate process variable data, for the sake of simplicity, it will be appreciated that the described field devices may be capable of any or all of actuating a control element (e.g., a valve stem) to manipulate a process variable, measuring and transmitting measured or calculated field device or process variables and processing or manipulating collected process data or other measurements and transmitting the processed or manipulated data For example, a smart valve positioner may be configured to receive a command to actuate the valve and to transmit measured flow, detected valve position, health indices regarding the valve's health, and to process collected image data from a camera on the valve positioner to detect a broken valve and to transmit that processed or collected data, etc.

In some embodiments, the I/O service 511a is not containerized. However, if desired, the I/O service 511a is containerized in an I/O server container (sometimes "I/O container") 505a. In various embodiments, the I/O subsystem 500 includes multiple I/O containers 505a-c. Each of the I/O containers 505a-c receives the same inputs (e.g., from the controller services and field devices), generates the same outputs (e.g., to the field devices and controller services), and implements the same logic (e.g., for evaluating which containerized controller service should be active, for handling transitions between controller services, etc.). Accordingly, when multiple I/O server containers 505a-c are implemented, a single one of the I/O server containers 505a-c may be designated as "active." For example, by way of solid and dotted lines, FIG. 15 indicates that the I/O container 505a is "active" and that the I/O server containers 505b and 505c are "inactive." In such an example, the I/O container 505a forwards traffic to controller services and field devices, but the containers 505b and 505c do not. One might say that, in an embodiment, all containers (including "inactive" containers) receive the same I/O data, but only "active" containers transmit I/O data that is received and acted on by controller services and field devices.

In some instances, the inactive I/O containers do not transmit traffic. In other instances, each of the I/O containers 505a-c transmits I/O traffic (including the inactive I/O containers), but a switch intercepts the traffic and only forwards the traffic to its destination if transmitted from the "active" I/O server container. In some instances, "inactive" I/O server containers may transmit data to other containers despite not actively functioning as an intermediary I/O server between field devices and controller services. For example, an "inactive" I/O server container may participate in load balancing operations by transmitting I/O traffic (e.g., controller inputs, controller outputs, etc.) to a historian or historian container, a user workstation or workstation container, to other plants or external networks, etc. Accordingly, the "inactive" I/O server(s) can alleviate the "active" I/O container from "wasting" processing power or networking capacity on performing such functions. This may be especially advantageous if the I/O containers 505a-c are distributed across more than one physical machine. Each I/O container 505a-c may be implemented at one or more physical servers such as those shown in FIGS. 16 and 17.

As noted, the containerized controller services 521a-c each run a respective instance 525a-c of the same control routine #1, within containers 515a-c respectively, to control the same set of field devices 531 and 532 and to thereby control the area 501. In some embodiments, the control routine #1 may be implemented as one or more configured control routine services and/or one or more configured control function block services, for example. The containers 515a-c may be implemented on any suitable computer device, node, or computing cluster. In some instances, one or more of the containers are implemented at computing devices in the plant environment near the field devices the corresponding controller services are configured to control. In some instances, the devices implementing the containers may be rack mounted and may have a form factor or housing similar to that typically found for a physical process controller. In other instances, the controller service containers are implemented by servers or computers at a different location in the plant, at a control room, at a data center, at a computing cluster, at a remote site, etc. Put simply, as long as the containerized controller services can establish a suitable network connection with the field devices they are controlling (e.g., via an I/O server service such as the service 511a), the containerized controller services may be implemented on any suitable hardware at any suitable location.

As noted, each of the containerized controller services 521a-c represents the same conceptual controller implementing the same control routine #1 (each configured to read from and write to the same tags associated with the same field devices). At any given time, two of the three containerized controller services 521a-c may be thought of as duplicates or as redundant controller services to the "active" containerized controller service. Generally speaking, each "controller service" represents a software platform or infrastructure analogous to that which might be found in hardware controllers. Each controller service is configured to recognize and execute control routines, which often have specialized and expected data formats and structure (e.g., as defined by configured control module services which have been in turn configured with control function block services). A controller service may be thought of as a layer between the container running on the physical device and the top-level application (e.g., the control routines). To that end, a "controller service" may be thought of as analogous to an operating system, implemented within a container at a computing device, to enable the container and computing device to properly recognize and execute control routines. In some instances, a controller service may be, or may include, an emulator that emulates a particular hardware model of a physical process controller.

A control routine or control module is a set of instructions, executable by a processor, for performing one or more operations to provide or perform control of at least part of a process. Generally speaking, a control routine or control module may be understood as software configured to implement a particular control strategy, and may be implemented within the SDCS 200 as a configured control module service executing in its container. A control routine or control module may include one or more interconnected control function blocks associated with various functions. These function blocks may be objects in an object-oriented programming protocol that perform functions within a control scheme based on inputs thereto, and may provide outputs to other function blocks within the control scheme. In an embodiment, a control function block may be implemented within the SDCS 200 as a configured control function block service executing in its container. More generally, a control routine represents logic that is executed based on one or more controller inputs (e.g., measured process variables, such as temperature, pressure, flow, etc.) to produce one or more controller outputs (e.g., commands to manipulate a field device such as a control valve). The controller outputs may cause the manipulation of a process input, such as the aforementioned valve position (such process inputs may also be referred to as "manipulated variables") to change or drive a process output (which may be referred to as a "controlled variable" or simply a "process variable"). The controlled variable may be any suitable variable the control routine attempts to control. Sticking with the previous example, the control valve position may be manipulated on an inlet valve to open the inlet valve and increase a level in the tank (the level being the controlled variable here). In many cases, the controlled variable is measured and returned to the control routine as a controller input. The control routine may also accept as an input a desired value for the controlled variable (i.e., a setpoint), which may be provided by a user or a control routine (e.g., the same control routine or a different control routine). While FIG. 15 does not explicitly show setpoints as inputs for any of the control routine instances 525a-c or 575a-c, one will appreciate that each described or shown control routine instance may receive a setpoint.

Staying with FIG. 15, during typical operation, the I/O service 511a receives a process output (sometimes "field device output") or a set of process outputs from the field device 532 via an I/O channel 542a or a set of processed data from the field device 533 via an I/O channel 542b. The process output may be any suitable process variable, and may carry a detected or calculated value (e.g., indicating a tank level variable LT004 has a value of 20% full). The I/O service 511a passes the process output to each control routine instance 525a-c as a controller input via the I/O channels 543a-c. That is, each of the I/O channels 543a-c are assigned the same variables or set of variables carrying the same values or set of values (e.g., indicating LT004=20%).

The control routine service instances 525a-c receive the controller inputs and generate controller outputs (e.g., a command to open an inlet valve to 75% open) based on the values of the controller inputs (e.g., LT004=20%) and the logic of the control routine (e.g., indicating that tank should be filled to a higher level). The controller services 521a-c transmit the controller outputs, via the I/O channels 544a-c respectively, to the I/O service 511a. Said another way, the I/O channel 544a carries a set of outputs from the control routine instance 525a; the I/O channel 544b carries a set of controller outputs from the control routine instance 525b; and the I/O channel 544c carries a set of controller outputs from the control routine instance 525c. In a typical example, because the controller inputs typically are identical and because the instances 525a-c of the control routine #1 are identical, the sets of controller outputs often are identical (e.g., each I/O channel 544a-c may carry a command to open the inlet valve to 75%). With that said, if a control routine or network traffic is compromised in some manner, the various sets may differ. Accordingly, the I/O service 511a may implement various error checks on the received sets. In some instances, the I/O service may perform a consensus analysis or best of "n" voting scheme to select a set. For example, if the first two sets received by the service 511a differ, the service 511a may select one of the two to forward based on which of the two received sets matches a third set received by the service 511a.

More specifically, the I/O service 511a analyzes the received sets of controller outputs and/or metadata associated with each set of controller outputs. Specifically, a QoS metric for each set may be analyzed, and the set having the best QoS metric may be determined by either the I/O service 511a or by some other service (e.g., an orchestrator service) to be the "active" set of controller outputs. The QoS metric may be any desired metric for analyzing a quality of service provided by the containerized controller services, such as latency, accuracy, message rate, etc. The routine, service, container, and I/O channel corresponding to the "best" QoS metric may be designated (explicitly or implicitly) as "active." In an embodiment, a single control routine service instance 525a-c, a single controller service 521a-c, a single container 521a-c, and a single I/O channel 44a-c may be considered "active" at a given time. The remaining control routine service instances 525a-c, controller services 521a-c, containers 521a-c, and I/O channels 544a-c may be designated or considered "inactive." The I/O service 511a forwards the set of controller outputs from the "active" container and controller service to the field device 531 via the I/O channel 540. The sets of controller outputs from the "inactive" containers are not forwarded to the field devices, though they may be forwarded to other containers and/or services (e.g., to a data historian) for other purposes (e.g., to optimize use of computer and/or network resources).

Staying with FIG. 15, the dotted lines indicate which routines, services, containers, and channels are inactive. As shown, the container 515c, the controller service 521c, the routine service 525c, and the I/O channel 544c are "active," meaning the controller outputs generated by the routine service instance 525c and passed to the I/O service 511a are forwarded by the I/O service 511a to the field device(s) 531 via the I/O channel 540. By contrast, the containers 515a and b, the controller services 521a and b, the routine services 525a and b, and the I/O channels 544a and b are "inactive." As a result, the I/O server service 511a does not forward controller outputs from the routine services 525a and b to the field device(s) 531.

As previously noted, the I/O server service 561a facilitates control of the area 502 in a manner similar to that described regarding the I/O service 511a and the area 501. For example, the service 561a acts as an intermediary node between: (i) a set of field devices 581 and 582 and 583 and (ii) containerized controller services 571a and 571b running instances 575a and 575b of the same control routine #2, respectively, to control the same set of field devices 581 and 582 and 583 to thereby control the portion 502 of the plant 10. The I/O server service 561a may evaluate the containerized controller services, select one "active" service, and utilize the controller output(s) from the active service to control the set of field devices (thereby implementing control on the process).

It will be appreciated that the containers shown in FIG. 15 may be distributed across physical resources at the plant 10 or elsewhere in any desired fashion. For example, the containers 515 and 505 for the area 501 may be implemented at computers near or within the area 501, and the containers 555 and 565 for the area 502 may be implemented at computers near or with the area 502. However, some or all of the containers 505 and/or 515 may be implemented at the computers near or in the area 502, and/or some or all of the containers 555 and/or 565 may be implemented near or in the area 501 if desired. Or, any one or more of the aforementioned containers may be implemented at computers in other areas of the plant 10, or at an off-site location that is remote to the plant 10 (which may be especially useful for ensuring seamless transition in the case of power outages or other failures at the plant 10). Further, none of the aforementioned containers are necessarily permanently fixed or pinned to whatever computer cluster or node/server they happen to be executing on at any given time. Containers may be dynamically (e.g., in or near real-time, during execution) instantiated, deleted, and re-instantiated at different computers when desired to balance computing and network loads and to eliminate computational or networking inefficiencies (e.g., when a given physical resource becomes overly burdened computationally or by network traffic). Further, the total instances of a given container can be dynamically reduced or increased as needed. For example, if the physical resources implementing the controller containers 565a and 565b appear to become overly burdened, a third controller container for the controller #2 service might be instantiated at a new computer or physical resource (and, if desired, the third container may be activated). The I/O server service 561a can then continue monitoring the three containers for the controller #2 service, and can continuously activate the best performing container at any given time. This "juggling" between containers may be helpful if the computational and network workloads for the physical resources are highly variable. Each controller service may be containerized in its own dedicated container, thereby providing a relatively isolated, consistent, and predictable environment within which each controller service is implemented, regardless of the broader software environment present on the node implementing the containers. For example, a container may include software dependencies and software libraries needed for a given controller service. Without containers, it might be necessary to properly configure every single node on which the controller service might run in order to ensure consistent environments for the controller service. And if a given node needs to be capable of implementing various different types of services (which may have different environmental requirements), ensuring proper configuration of the node can become complex. By contrast, the described controller service containers enable each controller service to easily be instantiated at any given node and to be easily moved between nodes/servers or computing clusters.

Further, it is noted that although the above discussion refers to controller service containers which may be instantiated at any given node and moved between nodes/servers or computing clusters, the concepts and techniques may be easily applied to other type of control services 235, such as control module services and/or control function block services. For example, multiple instances of a configured control function block service may be instantiated on different processor cores and moved among different process cores or even different processors, and the active I/O server may select one of the multiple instances of the configured control function block service and may provide the output of the selected instance of the configured control function block service to each of a plurality of instances of a configured control module service for operation thereon. Similarly, the active I/O server may select one of the plurality of instances of the configured control module service, and may provide the output of the selected instance of the configured control module service to each instance of the configured controller service.

In any event, it will also be appreciated that, with reference to FIG. 15, each I/O channel 540-544c and 570-574b may be configured to carry a particular variable or set of variables. For example, the field device 531 may be a valve, and the I/O channel 540 may be configured to always carry a control valve command (e.g., representing a desired valve position). In some instances, one or more I/O channels are configured to carry a particular primary variable (e.g., a desired valve position) and one or more secondary variables (e.g., a valve health index, a detected valve position, a measured flow, measured strain on an actuator, etc.). In any event, one might, for example, refer to the I/O channel 540 as the controller output 540.

Figure 16:
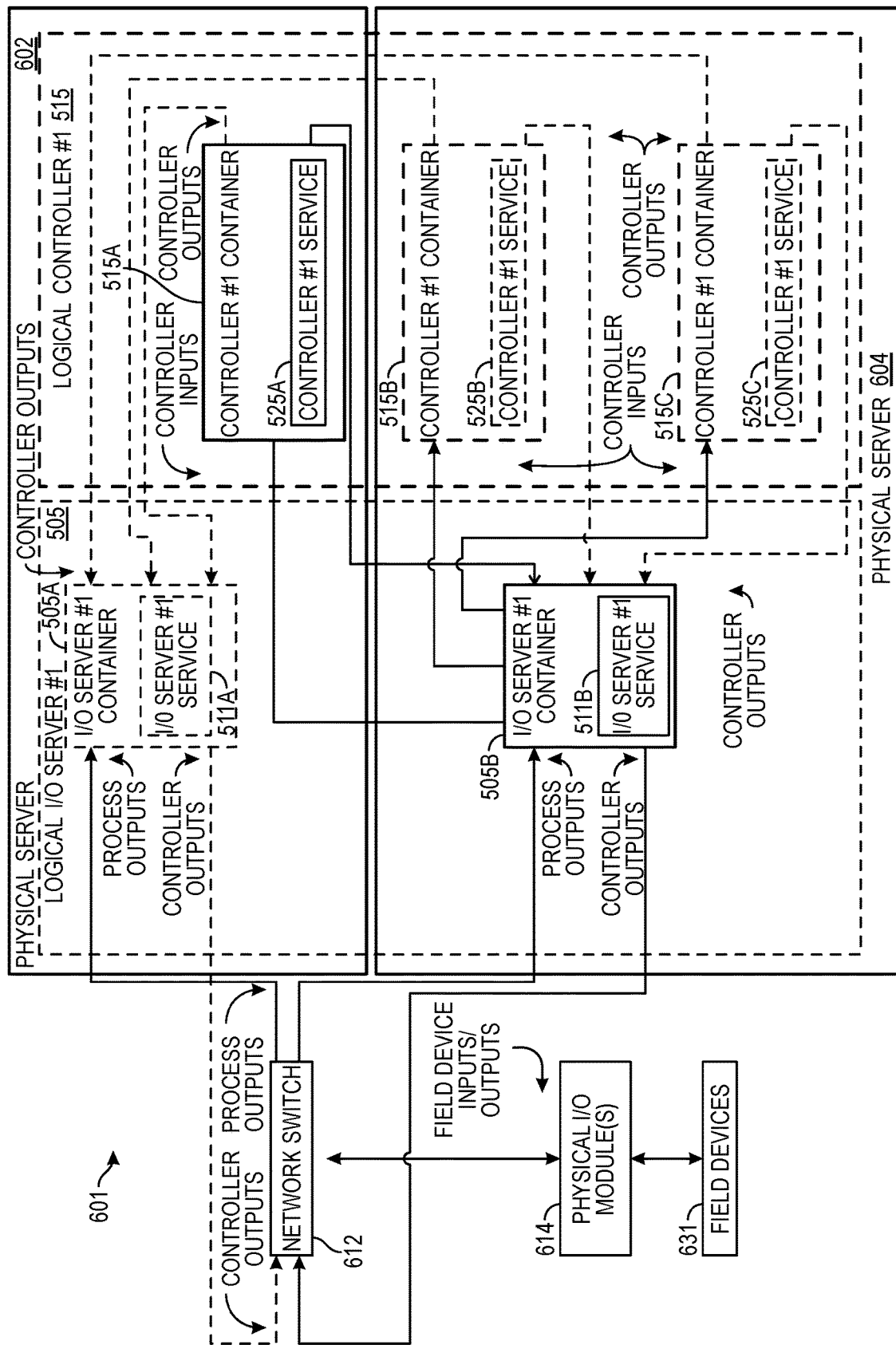
FIG. 16 is a block diagram of a computer cluster, including physical resources (e.g., computers, servers, networking equipment, etc.), on which any one or more of the various containers, microcontainers, services, and/or routines described herein may be implemented, dynamically assigned, and load balanced to optimize computer resource usage and performance.

FIG. 16 is a block diagram of a computer cluster 601, including multiple nodes or physical resources (e.g., computers, servers, networking equipment, etc.), on which any one or more of the various containers, microcontainers, services, and/or routines described herein may be implemented, dynamically assigned, and load balanced to optimize computer resource usage and performance. Specifically, the cluster 601 may include physical servers 602 and 604 configured to implement any one or more of the containers 515, 505, 555, and/or 565 shown in FIG. 15.

Figure 17:
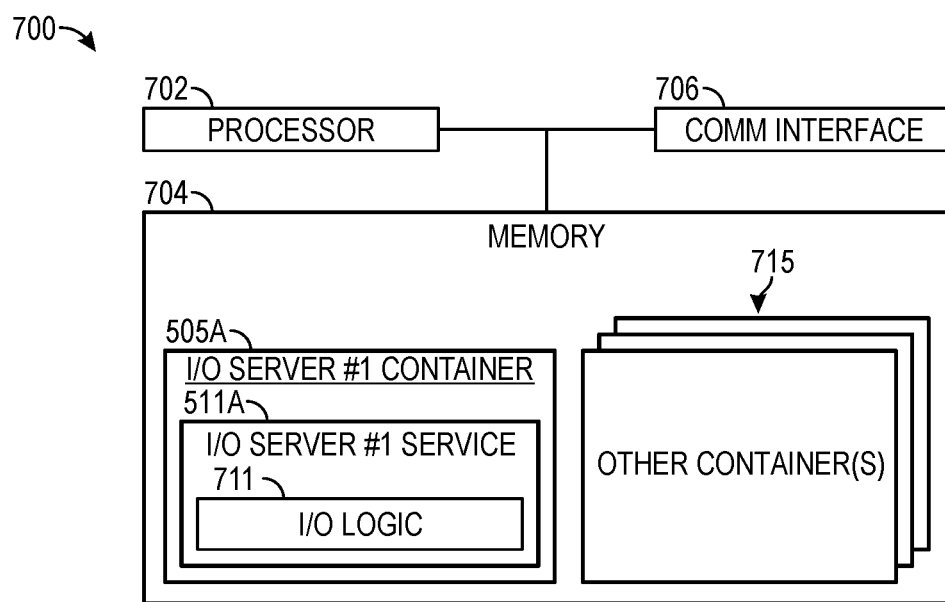
FIG. 17 depicts an example embodiment of a physical server on which containerized services, such as those shown in FIGS. 15 and 16, may be implemented.

Each of the servers 602 and 604 may be any suitable computing device including, for example, a processor, a memory, and a communication interface, and each may be disposed at any suitable location within or outside the plant 10. For example, FIG. 17 depicts an example embodiment 700 of the server 602 (sometimes referred to as the system/server/device 700). As shown, the server 700 includes a processor 702, a memory 704, and a communication interface 706. The components of the server 700 may be housed in any suitable housing (not shown).

While shown including a single processor 702, in various embodiments the server 700 may include multiple processors 702. In this example, the processor 702 may implement the container 505a, the I/O server service 511a, and/or the I/O logic 711 (e.g., including the logic for performing the I/O server operations or functions described herein). The processor 702 may also implement other containers 715 (e.g., any of the other containers shown in FIG. 1, 2, 15, or 16). If desired, any number of containers 505 and/or 715 may be instantiated and implemented at the server 700 (e.g., during run-time during load balancing operations).

The memory 704 may store software and/or machine-readable instructions, such as the containers 505 and 715 that may be executed by the processor 702. The memory 704 may include volatile and/or non-volatile memory(-ies) or disk(s) including non-transitory computer readable media ("CRM") for storing software and/or machine-readable instructions.

The server 700 includes one or more communication interfaces 706 configured to enable the server 700 to communicate with, for example, another device, system, host system, or any other machine. The communication interface 706 may include a network interface that enables communication with other systems via one or more networks (e.g., enabling the server 700 to communicate with the server 604). The communication interface 706 may include any suitable type of wired and/or wireless network interface(s) configured to operate in accordance with any suitable protocol(s). Example interfaces include a TCP/IP interface, a Wi-Fi™ transceiver (according to the I19E 802.11 family of standards), an Ethernet transceiver, a cellular network radio, a satellite network radio, a coaxial cable modem, a wireless HART radio, or any other suitable interface implementing any desired communication protocol or standard.

Returning to FIG. 16, either of the nodes or servers 602 or 604 may include similar components as the server 700 shown in FIG. 17. As shown in FIG. 16, the containers 505 and 515 are distributed across the servers 602 and 604. Note, the controller services 521 may be conceptually referred to as a single "controller." That is, when someone refers to "controller #1," they are referring to the group of containers 515 implementing the controller services 521, which are in turn each executing instances 525 of the same control routine service #1 for controlling the same set of equipment. Because an orchestrator and/or the I/O server service 511a may dynamically change the number of containerized controller services 521 in existence, and because they may dynamically change which containerized controller service 521 is active at any given time, and because they may change which physical servers implement the containerized controller services 521 at any given time, a reference to "controller #1" does not necessarily reference any fixed particular device or container. Perhaps better said, the particular device and particular container that represent "container 1" may differ at various times depending on various load balancing operations and decisions made by the I/O server service 511a and by an orchestrator service. In any event, the containers and servers shown in FIG. 16 may be distributed across physical resources and locations at the plant 10 in any desired manner.

The field devices 631 may communicate with any one or more of the containers 505 and/or 515 in the same manner as that described referencing field devices 531 and 532 shown in FIG. 15, and may be configured in a similar manner. As shown in FIG. 6, the field devices 631 may communicate with the cluster 601 via physical I/O modules or cards 614 and a network switch 612.

The I/O modules or cards 614 each may be any suitable I/O card (sometimes called "I/O devices" or "I/O modules"). The I/O cards 614 are typically located within the plant environment, and function as intermediary nodes between controller services and one or more field devices, enabling communication there between. Field device inputs and outputs are sometimes configured for either analog or discrete communications. In order to communicate with a field device, a controller or controller service often needs an I/O card configured for the same type of input or output utilized by the field device. That is, for a field device configured to receive analog control signals (e.g., a 4-20 ma signal), the corresponding controller or controller service may need an analog output (AO) I/O card to transmit the appropriate control signal. And for a field device configured to transmit measurements or other information via an analog signal, the controller or controller service may need an analog input (AI) card to receive the transmitted information. Similarly, for a field device configured to receive discrete control signals, the controller or controller service may need a discrete output (DO) I/O card to transmit the appropriate control signal; and for a field device configured to transmit information via a discrete signal, the controller or controller service may need a discrete input (DI) I/O card. Generally, each I/O card can connect to multiple field device inputs or outputs, wherein each communication link to a particular input or output is referred to as a "channel." For example, a 120 channel DO I/O card can be communicatively connected to 120 distinct discrete field device inputs, enabling the controller to transmit (via the DO I/O card) discrete control output signals to the 120 distinct discrete field device inputs. In some instances, any one or more of the I/O cards 614 is reconfigurable, enabling communication with a field device configured for any type of I/O (e.g., for AI, AO, DO, DI, etc.). Some field devices are not configured for communication via I/O cards. Such devices may still be connected to the controller services shown in the I/O subsystem 500. For example, some field devices communicate with controllers or controller services via an Ethernet port and link. Some field devices communicate with controllers or controller services via any suitable wireless protocol.

In any event, the I/O cards 614 communicate with the field devices 631 via a given process control protocol (e.g., HART) and may communicate with the cluster 601 via any other suitable protocol (e.g., TCP/IP). The I/O cards 614 route messages to, and receive messages from, the network switch 612. The network switch 612 may be any suitable network switch configured to route or forward messages between the computer cluster 601 and the field devices 631. In some instances, one or more of the I/O cards 614 may implement microcontainers implementing I/O card services. Thus, if a particular I/O card device fails and is replaced by a new I/O card device, it can be loaded with the I/O card microcontainer and thereby be configured quickly in the same manner as the previous I/O card device. As an example, in this system, a physical I/O server could have an active I/O card and additionally have an inactive I/O card that stands ready with the appropriate microcontainers instantiated to quickly take over in the event of a failure of the active I/O card. The active I/O card sends received input data from any connected device(s) to the backup I/O card in a similar fashion to how "active" and "inactive" I/O server containers operate as previously. Importantly, in this case, both the 'active' and 'inactive' I/O cards (which could be, for example, a typical or known railbus cards or Emerson CHARM I/O cards) must be physically connected to the logical I/O server in order for the 'inactive' card to take over as an 'active' card, and start receiving I/O data from the logical I/O server. An example of a microcontainer would be an extremely lightweight containerization technique called a "jail," which is a term of art known throughout the industry whereby the operating system isolates a microservice into a sandboxed environment.

In some instances, the network switch 612 may be containerized. The container may include the logic relied on by the switch 612. This logic may include a routing table including routes to addresses for field devices, I/O cards (or I/O card containers), and/or controller services. The logic may include a forwarding table mapping such addresses to ports of the switch (e.g., with or without knowing the route to reach the address). By containerizing the logic of the switch, the network switch 612 may be instantiated at any desired and suitable hardware, enabling switch hardware to be quickly configured and reconfigured for any desired switch/routing operation (e.g., in case the physical device for the network switch 612 is replaced).

In an embodiment, any suitable container, microcontainer, or I/O may be assigned to the computer cluster 601 and may be dynamically assigned to, and instantiated at, either the server 602 or the server 604 depending on resource availability. This dynamic load balancing and resource allocation enables the control system to swiftly respond to changing processing loads, resource availability, network constraints, etc., without losing functionality.

Note, while not explicitly shown, the I/O subsystem 500 may include physical I/O cards and/or one or more network switches (e.g., similar to those shown in FIG. 16) that serve as intermediaries between the field devices (531, 532, 581, 582) and I/O server services 511*a* and/or 561*a*.

In an embodiment, when physical or logical assets are connected to the system, the I/O server service 505 will automatically resolve and commission these assets as soon as they are discovered by the Discovery Services. For example, a field device may have a field device identifier unique to that field device, and the control system may be configured to link the field device to one or more variable tags (e.g., representing commands the field device is configured to receive and/or representing parameters the field device is configured to transmit) based on the field devices unique ID. Using this unique identifier, the field device may be disconnected and reconnected to the control system, and the control system may automatically route communications between the field device and the controller services that rely on the field device regardless of which hardware has instantiated and implemented the controller services and regardless of where that hardware is geographically located. Each container may likewise have a unique identifier that enables routing between the appropriate containers/services regardless of which particular hardware has instantiated the containers and regardless of where that hardware is geographically located.

Figure 18:
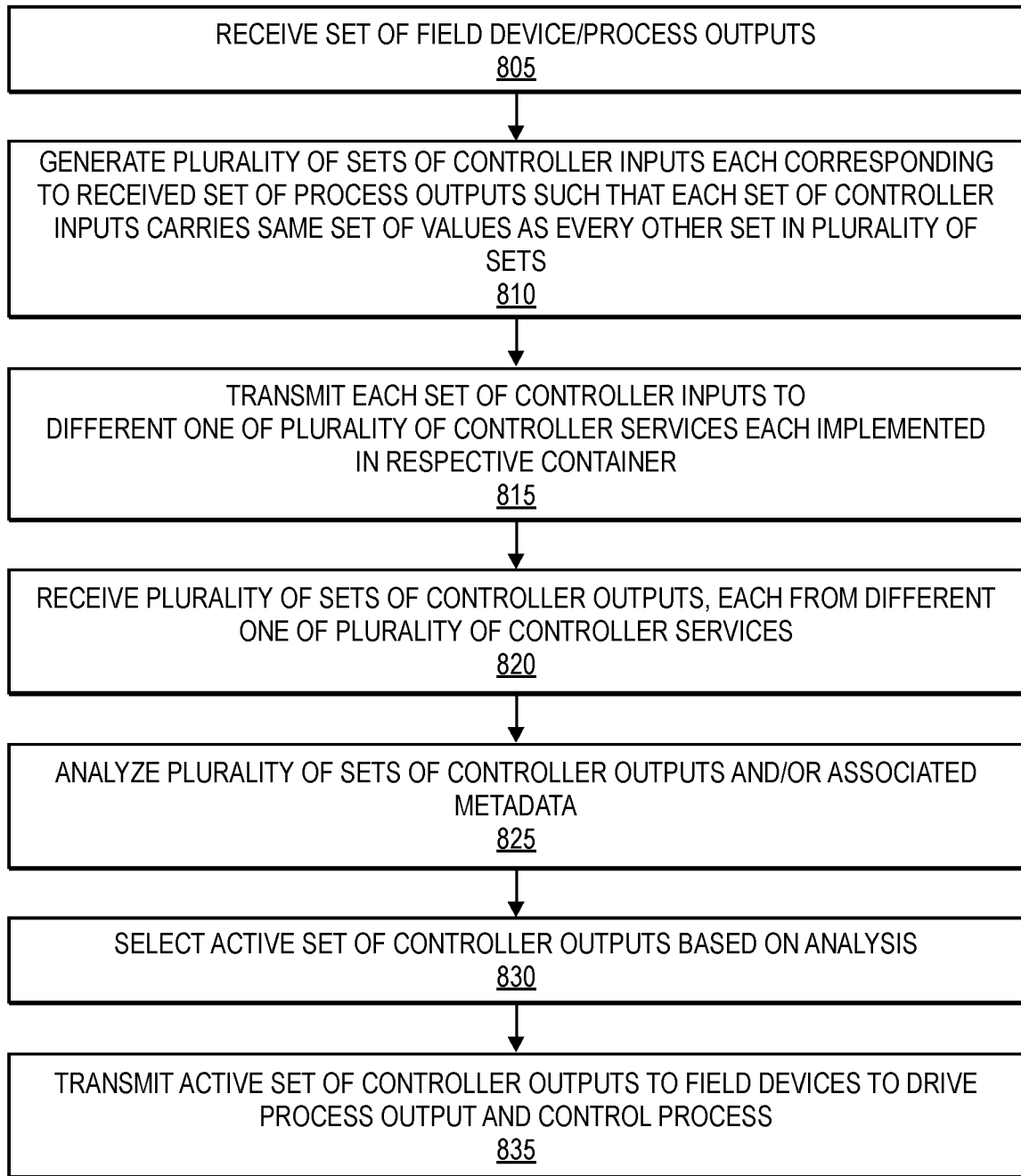
FIG. 18 is a flow chart of a method for implementing an I/O server service, such as one of those shown in FIGS. 15-17.

FIG. 18 is a flow chart of a method 800 for implementing an I/O server service, such as one of those shown in FIGS. 15-17. The method 800 may be implemented, in whole or in part, by the SDCSs 100/200 and/or I/O gateway 40 shown in FIGS. 1 and 2 and, more particularly, by the I/O server services 511/61 shown in FIGS. 15-17. Accordingly, the method 800 may be saved to a memory as one or more instructions or routines (e.g., to the memory 704 shown in FIG. 17). For ease of explanation, the description of FIG. 18 refers to the service 511*a* of system 15 as implementing the method 1800.

The method 800 begins at a step 805 when a set of field device or process outputs 542*a* and 542*b* are received by the I/O server service 511*a*. For example, I/O server service 511*a* may receive, from the field device 532, a measured flow of 10 gallons per minute (gpm) for a variable FT002.

At a step 810, the I/O server service 511*a* generates a plurality of sets of controller inputs (e.g., carried via I/O channel 543) each corresponding to the received set of process outputs received via the I/O channels 542*a* and 542*b* such that each set of controller inputs carries a same set of values as every other set in the plurality of sets of controller inputs. Sticking with the last example, each set of controller inputs may carry the same FT002 parameter with the same value (e.g., 10 gpm). To illustrate, the I/O server service 511*a* may generate a first set of controller inputs from the set of process outputs (e.g., the channel 543*a* may be the first controller input for the controller service 521*a*, may represent the parameter FT002, and may carry the value of 10 gpm). Similarly, the I/O server service 511*a* may generate a second set of controller inputs from the set of process outputs (e.g., the channel 543*b* may represent a second controller input for the controller service 521*b*, may similarly represent the parameter FT002, and may carry the same value 10 gpm).

At a step 815, the I/O server service 511*a* transmits each set of controller inputs (e.g., the sets 543*a-c*) to a different one of the plurality of controller services 521*a-c*. As shown in FIG. 15, each controller service 521*a-c* implements a different instance of the same controller routine #1 (including instances 525*a-c*). Because the control routines are each an instance of the same routine, they are all configured to generate the same set of controller outputs (e.g., the same set of command variables) to control the same portion 501 of the process plant 10 via the field devices 531 and 532 based on the same set of values for the same set of controller inputs. Note, any desired number of containerized controller services may exist, and a set of controller inputs (each carrying the same parameter(s) and value(s)) may f9d each containerized controller service.

At a step 820, the I/O server service 511a receives a plurality of sets of controller outputs via the I/O channels 544a-c, each set from a different one of the plurality of controller services 521a-c.

At a step 825, the I/O server service 511a analyzes the plurality of sets of controller outputs received via the I/O channels 544a-c and/or metadata associated with the sets (e.g., latency information). Specifically, a QoS metric for each set may be analyzed, and a set having the best QoS metric may be identified. The QoS metric may be any desired metric for analyzing a quality of service provided by the containerized controller services, such as latency, accuracy, etc.

At a step 830, the I/O server service 511a selects an active set of controller outputs based on the analysis. In an embodiment, the I/O server service 511a activates the active set of controller outputs based on the analysis. For example, the service 511a may activate the set 544c based on QoS metrics associated with each container 515a-c. The service 511a may select the container or controller service with the lowest latency, for example. In an embodiment, the service activates a given container, server, or channel after some sort of consensus has been formed. For example, it may activate the first container, server, or channel for which a second container provides the same values for the set of controller outputs 544a-c. In an example, the service 511a activates a container/controller service/channel using a best out of "n" voting scheme. In an embodiment, another service, such as an orchestrator service, performs the step 830 instead of the service 511a.

In some instances, the I/O server service 511a may confirm the status of any one or more of the controller outputs 544a-c (e.g., before or after selecting an active container). For example, the service 511a may verify that the outputs have been recently updated and are not stale. This may be done, at least in part, by cross-checking at least one set 544a-c of the outputs with another of the sets 544a-c.

At a step 835, the I/O server service 511a transmits the active set of controller outputs (e.g., including a command to open or close a valve) to the field devices 531 to drive a process output (e.g., flow rate dependent on the status of the manipulated valve) of the industrial process to thereby control the particular portion 501 of the industrial process.

The I/O server service 511a may condition signals carrying controller inputs or controller outputs in any suitable manner before it relays the controller inputs or outputs from a field device to a controller service (or vice versa). The I/O server service 511a may implement analog conditioning techniques and/or digital signal conditioning techniques. Example analog signal conditioning techniques that may be implemented by the I/O server service 511a include filtering, amplifying, scaling, and linearization techniques. Example digital conditioning techniques that may be implemented by the I/O server service 511a include unit conversion, enumeration, encoding, and adding or editing a status value to a signal. A characterizer or linearization function may be implemented by the I/O server service 511a during either analog or digital conditioning.

Figure 19:
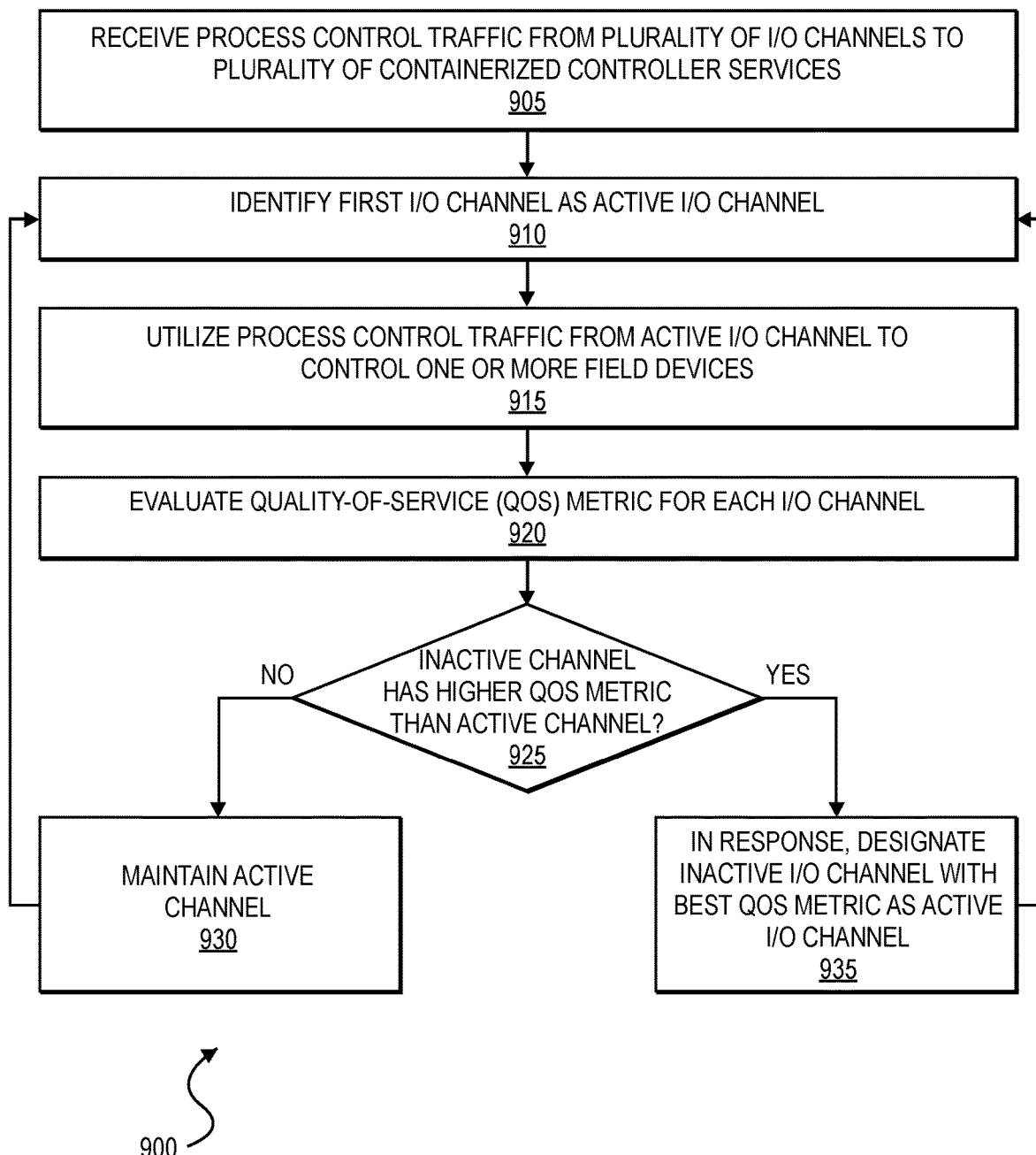
FIG. 19 is a flow chart of a method for evaluating and transitioning between containerized controller services, such as one of those shown in FIGS. 15-17.

FIG. 19 is a flow chart of a method 900 for evaluating and transitioning between containerized controller services (or corresponding I/O channels), such as one of those shown in FIGS. 15-17. The method 900 may be implemented, in whole or in part, by the SDCSs 100/200 and/or I/O gateway 40 shown in FIGS. 1 and 2 and, more particularly, by the I/O server services 511/61 shown in FIGS. 15-17. Accordingly, the method 900 may be saved to a memory as one or more instructions or routines (e.g., to the memory 704 shown in FIG. 17). For ease of explanation, the description of FIG. 19 refers to the service 511a of system 15 as implementing the method 1900.

At a step 905, the I/O server service 511a receives process control traffic via a plurality of I/O channels 544a-c.

At a step 910, the I/O server service 511a identifies a first I/O channel (e.g., 544c) that is active. As shown in FIG. 5, the service 521c and the I/O channel 544c are active, while the services 521a/b and the I/O channels 544a/b are inactive. In an embodiment, the I/O server service 511a activates the active service 544c.

At a step 915, the I/O server service 511a uses process control traffic from the active I/O channel 544c to control one or more field devices. For example, consistent with the description of the method 800, the service 511a may pass the received control traffic (e.g., including controller outputs or commands) to the field device via an I/O channel 540.

At a step 920, the I/O server service 511a evaluates a QoS metric for each I/O channel 544a-c from the controller services. As already noted, the QoS metric may be any desired metric for analyzing a quality of service provided by the containerized controller services, such as latency, accuracy, etc.

At a step 925, the I/O server service 511a determines whether the highest or best QoS metric corresponds to an inactive channel or not. If it does not (i.e., if it corresponds to the currently active I/O channel or controller container), the I/O server service 511a maintains the currently active I/O channel (step 930) and returns to the step 910. Alternatively, if the highest or best QoS metric corresponds to an active channel, the I/O server service 511a may designate the inactive channel with the highest or best QoS as the active I/O channel at a step 935. The I/O server service 511a then returns to the step 910.

In an embodiment, each controller service tracks where each control routine is in the process of executing the control routine. For example, the control routine may be broken up into phases or stages, enabling the control routines to be synchronized for a transition between controller services. In an embodiment, the controller services execute in lockstep or relative lockstep. For example, each controller service may stop after executing a given stage or phase and may wait until the other controller services (or a threshold number of container services) have finished executing the same given stage before beginning the next state or phase of the control routine. This "lockstep" execution may be beneficial in situations where process safety is a concern.

As mentioned above, referring to FIG. 2, the SD networking service 220 may administer and manage the logical or virtual networking utilized by the logical process control system 245, which may be implemented by the SD networking service 220 across the physical nodes 208. The SD networking service 220 may deploy and manage instances of network appliances, such as virtual routers, virtual firewalls, virtual switches, virtual interfaces, virtual data diode, etc., and instances of network services, such as packet inspection services, access control services, authorization services, authentication services, encryption services, certificate authority services, key management services, etc., in the SDCS 200. The network services may be implemented as services or microservices.

Additionally, the SD networking service 220 may nest containers executing the security appliances/services within other containers executing other types of services. For example, the SD networking service 220 may nest a security container within a control container to perform security services related to the control functionality. The SD networking service 220 may also nest containers executing the security appliances/services within other containers executing security appliances/services. For example, the SD networking service 220 may nest a firewall container and a smart switch container within a router container.

Furthermore, the SD networking service 220 may deploy N redundant instances of containers executing the security appliances/services within the SDCS 200. For example, the SD networking service 220 may deploy a first instance of a firewall container to receive incoming data packets and transmit outgoing data packets and a second instance of the firewall container to receive the incoming data packets and transmit outgoing data packets. The SD networking service 220 may deploy both the first and second instances of the firewall container to receive incoming data packets from the same source (e.g., a control service). However, while the first instance of the firewall container may transmit the outgoing data packets to a remote system outside of the SDCS 200, the SD networking service 220 does not configure the second instance of the firewall to transmit the outgoing data packets to the remote system. Instead, the SD networking service 220 may configure the second instance of the firewall to transmit the outgoing data packets to a monitoring system within the SDCS 200 or to transmit indications of how the incoming data packets were handled to the monitoring system within the SDCS 200. In this manner, the SD networking service 220 may monitor if the firewall functionality is performing properly.

Figure 20:
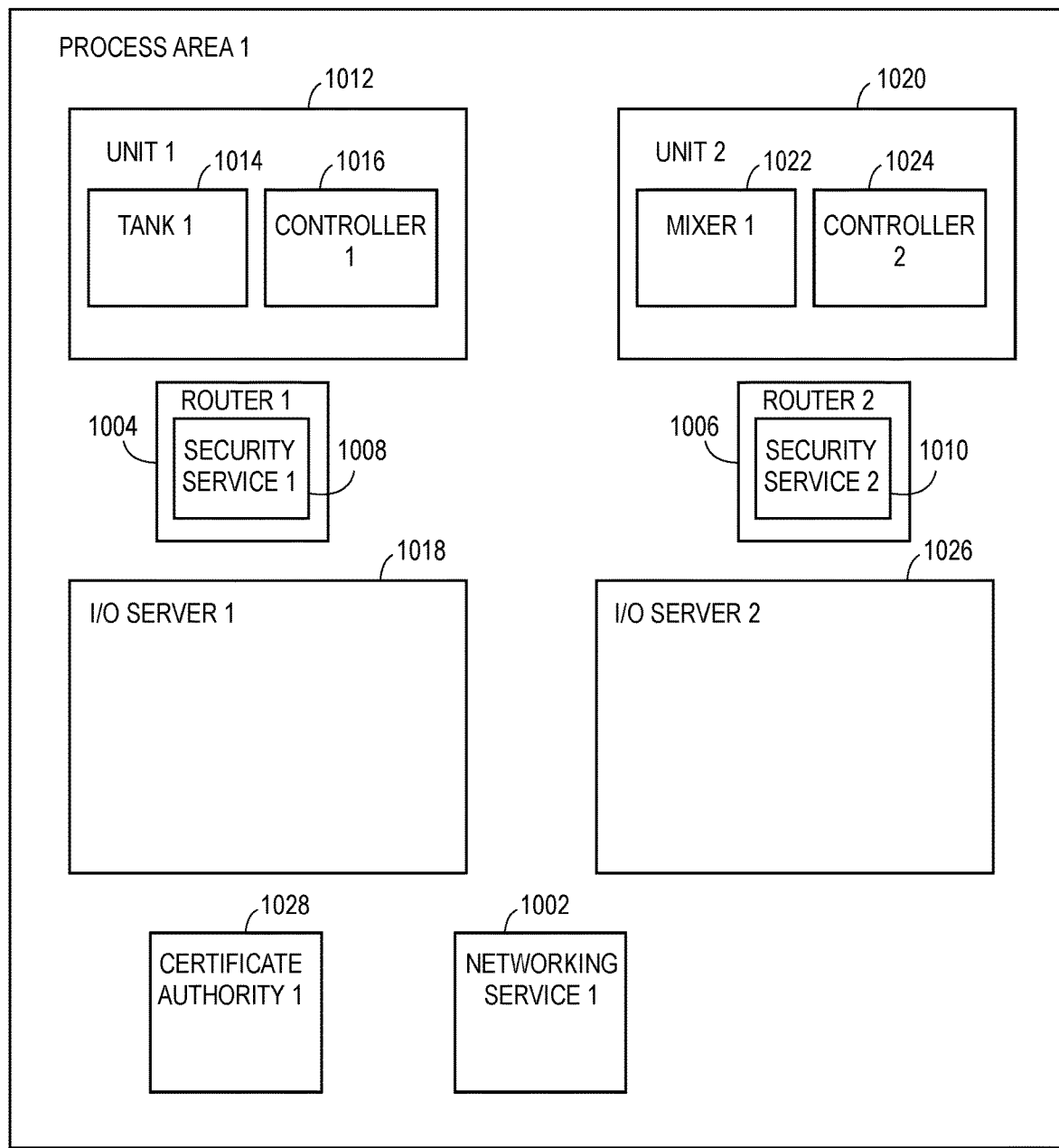
FIG. 20 depicts a block diagram of example containers, services, and/or subsystems included in the SDCS of FIG. 1 which are related to network security.

FIG. 20 illustrates a block diagram of example containers, services, and/or subsystems which are related to network security. As shown in FIG. 20, the SDCS includes a container executing a networking service 1002, similar to the SD networking service 220 as shown in FIG. 2. The networking service 1002 deploys and manages a first instance of a router container 1004 and a second instance of a router container 1006. The first router container 1004 executes a first security service 1008 and the second router container 1006 executes a second security service 1010. The networking service 1002 may deploy the first router container 1004 to connect to a first unit container 1012 having a first tank container 1014 and a first control container 1016. The networking service 1002 may also deploy the first router container 1004 to connect to a first I/O server container 1018. In this manner, the first router container 1004 may facilitate communications between the first unit container 1012 and the first I/O server container 1018. The first security service 1008 may include a first set of security rules for routing communications between the first unit container 1012 and the first I/O server container 1018.

The networking service 1002 may deploy the second router container 1006 to connect to a second unit container 1020 having a first mixer container 1022 and a second control container 1024. The networking service 1002 may also deploy the second router container 1006 to connect to a second I/O server container 1026. In this manner, the second router container 1006 may facilitate communications between the first unit container 1020 and the second I/O server container 1026. The second security service 1010 may include a second set of security rules for routing communications between the second unit container 1020 and the second I/O server container 1026.

The SDCS may also include a container executing a certificate authority service 1028. Additionally, the SDCS may include physical or logical assets of the process plant 10 which may be utilized during run-time of the process plant 10 to control at least a portion of the industrial process, such as field devices, controllers, process control devices, I/O devices, compute nodes, containers, services (e.g., control services), microservices, etc. The physical or logical assets may request digital certificates from the certificate authority service 1028 to prove their authenticity when communicating in the SDCS, such as public key infrastructure (PKI) certificates. When a physical or logical asset requests a certificate, the certificate authority service 1028 obtains identification information for the physical or logical asset and verifies the identity of the physical or logical asset based on the identification information. The certificate authority service 1028 then generates a certificate for the physical or logical asset that may include a cryptographic public key or other identifier for the physical or logical asset, an identifier for the certificate authority service 1028, and a digital signature for the certificate authority service 1028 to prove that the certificate has been generated by the certificate authority service 1028. The certificate authority service 1028 provides the certificate to the physical or logical asset which may use the certificate for authentication purposes when communicating with other nodes or services within the SDCS. In some implementations, the other services may encrypt communications with the physical or logical asset using the cryptographic public key for the physical or logical asset included in the certificate.

Also in some implementations, a user within the SDCS may request a digital certificate from the certificate authority service 1028, such as a plant operator, a configuration engineer, and/or other personnel associated with the industrial process plant 10. When the user requests the digital certificate, the user may provide identification information, such as the user's name, address, phone number, role within the industrial process plant 10, a username and password, etc. The certificate authority service 1028 may verify the identity of the user by for example, comparing the identification information obtained from the user to identification information for the user obtained from other sources. If the certificate authority service 1028 is able to verify the user, the certificate authority service 1028 generates and provides a digital certificate to the user. In this manner, the user may provide the digital certificate to access nodes or services within the SDCS and does not have to enter login information. In some implementations, the certificate authority service 1028 may include authorization information for the user in the certificate. The SDCS may assign the user an authorization level based on the user's role within the industrial process plant 10. The certificate authority service 1028 may then generate different types of certificates for different authorization levels and/or roles within the industrial process plant 10. In this manner, nodes or services which the user attempts to access may determine the user's authorization level and/or role within the industrial process plant 10 based on the type of certificate that the user provides. The node or service may then determine whether the user is authorized to access the node or service based on the user's authorization level and/or role within the industrial process plant 10. In some implementations, the user may have partial access to the node or service based on the user's authorization level and/or role within the industrial process plant 10. Accordingly, the node or service may provide the user with access to some portions of the node or service and prevent the user from accessing other portions of the node or service.

In some implementations, a user may be defined by a role which is secured by digital certificates. For example, a process manager role may correspond to a first authorization level having a first set of digital certificates which is distinct from an operator role which corresponds to a second authorization level having a second set of digital certificates.

Figure 21:
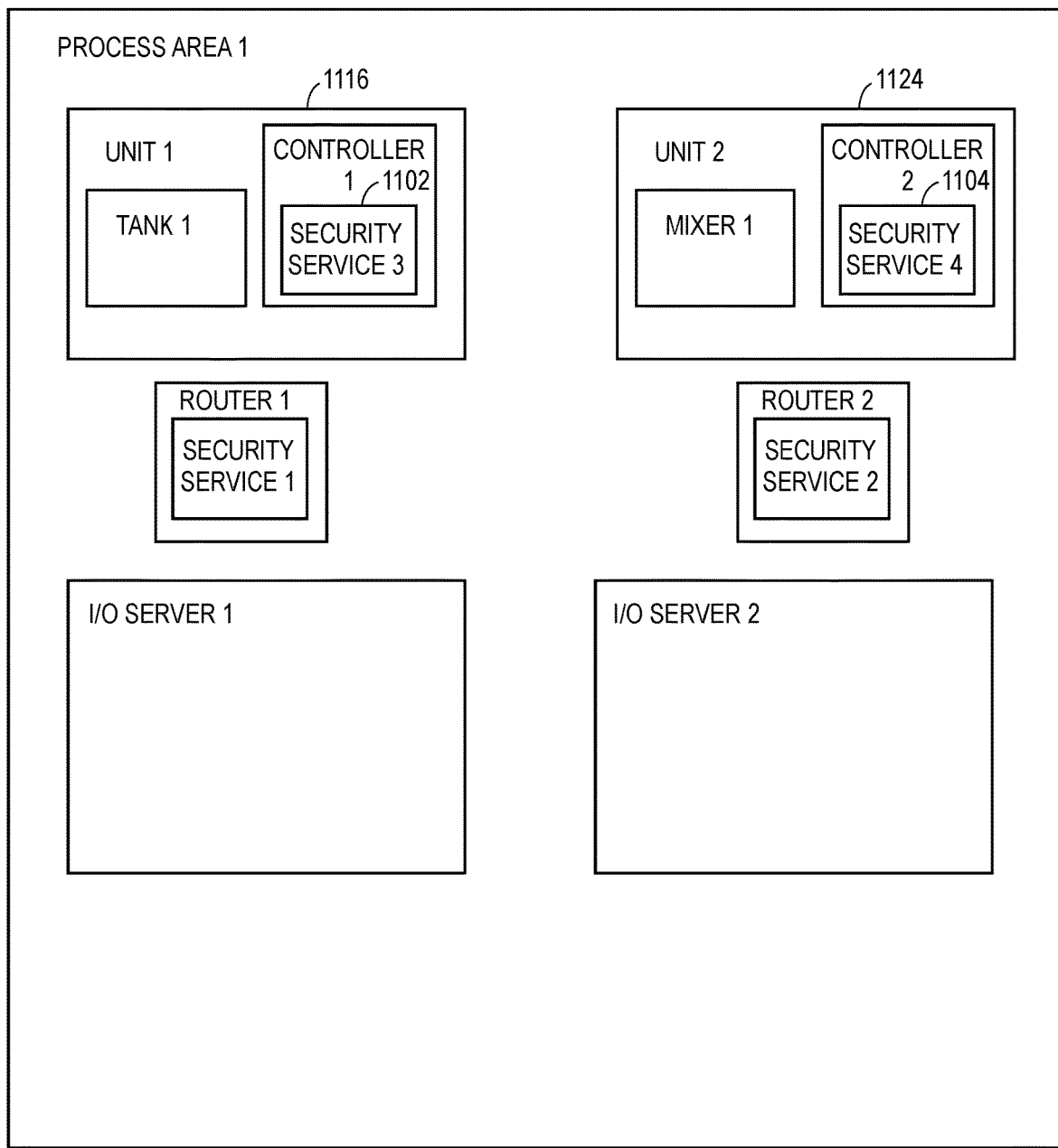
FIG. 21 depicts another block diagram of example containers, services, and/or subsystems included in the SDCS of FIG. 1 which are related to network security.

While the security services 1008, 1010 are included in router containers 1004, 1006 that facilitate communications between control services and I/O services in FIG. 20 this is merely one example implementation. Additionally or alternatively, security services may be nested in containers executing other types of services, such as control services, I/O services, etc. FIG. 21 illustrates a block diagram of an additional or alternative implementation of the SDCS in FIG. 20. As shown in FIG. 21, in addition to deploying a first security service 1008 and a second security service 1010 within first and second router containers 1004, 1006, respectively, the networking service 1002 deploys a third security service 1102 within a container (a security container) that executes within a first control container 1116 and a fourth security service 1104 within a container (a security container) that executes within a second control container 1124. The third security container 1102 may have contents which define security conditions, such as a set of security rules. Additionally, the fourth security container 1104 may also have contents which define security conditions, such as a set of security rules which may be the same as or different from the contents of the third security container 1102. The contents may also include control strategy for the corresponding control container such as control history and storage.

In this manner, the third security service 1102 may include a third set of security rules that are specific to the first control container 1116 that do not necessarily apply to other services or nodes connected to the router container. Furthermore, the third security service 1102 may encrypt data generated by the first control container 1116 before it is transmitted across a communication network. This may provide an additional layer of security before the data reaches a router container. While the security services 1102 and 1104 are nested in control containers in FIG. 21, security services may be nested in any suitable containers, such as I/O server containers, operator workstation containers, etc.

Figure 22:
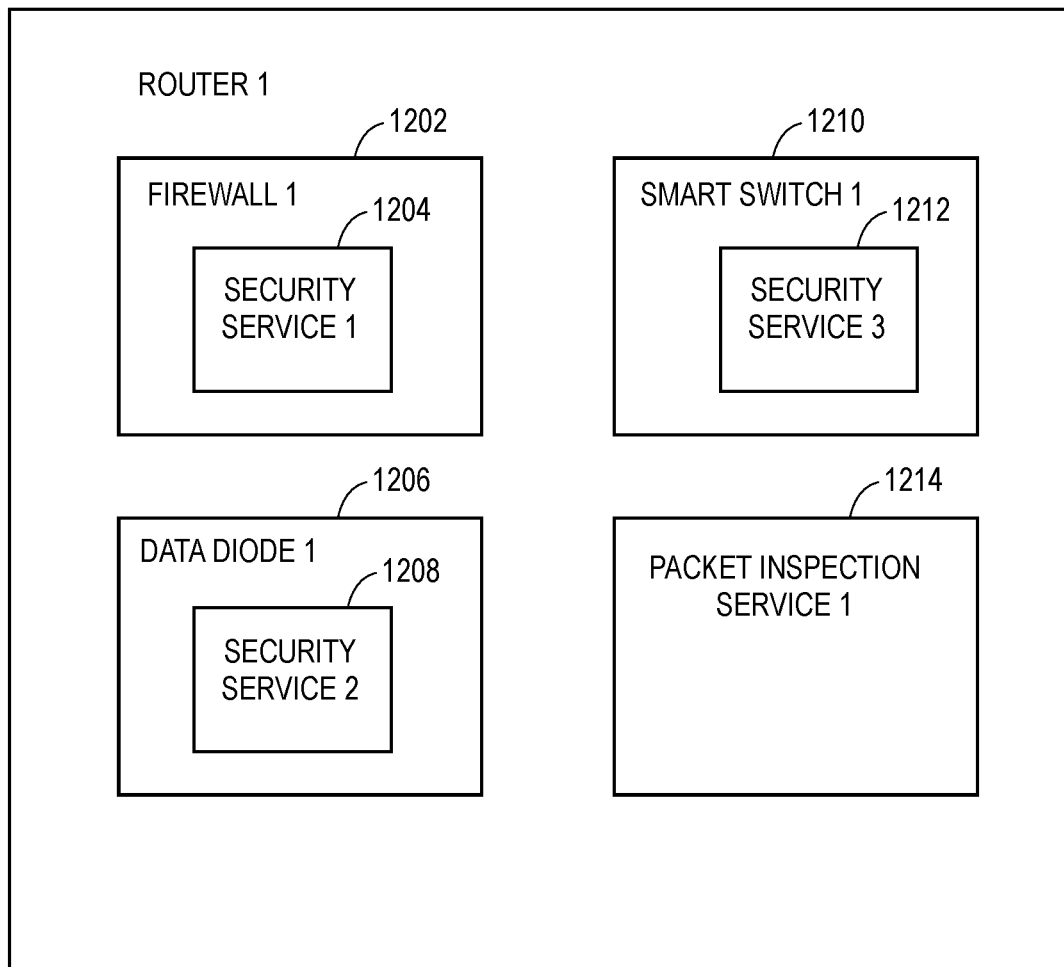
FIG. 22 depicts a block diagram of an example container configured to execute a virtual router within the SDCS of FIG. 1.

FIG. 22 illustrates a detailed block diagram of the first router container 1004 of FIG. 20. The router container may include security appliances or services nested within the router container. Additionally, each security appliance or service may include further services nested within. The router container may include a first firewall container 1202 executing a first security service 1204, a first data diode container 1206 executing a second security service 1208, a first smart switch container 1210 executing a third security service 1212, and a packet inspection service 1214.

The first security service 1204 may include a first set of security rules for the first firewall container 1202, such as whitelists or accept lists allowing data to be received/transmitted by predetermined nodes or services while preventing other connection types or ports. The first set of security rules may only allow authorized traffic to be transmitted from the first router container 1004. For example, the first security service 1204 may prevent data from external sources to the process plant 10 from being sent to a control container.

The second security service 1208 may allow data traffic to egress from the SDCS to a remote system and may prevent data traffic (e.g., data that is transmitted or sent from a remote system or other systems) from ingressing into the SDCS. Accordingly, the second security service 1208 supports only unidirectional data flow from a virtual input port to a virtual output port via software, e.g., by dropping or blocking any messages received at the virtual output port (e.g., from a remote system) and/or by dropping or blocking any messages addressed to the virtual input port (e.g., addressed to nodes or services in the SDCS from a remote system). The second security service 1208 may also encrypt data that is transmitted from the SDCS to a remote system.

The third security service 1208 may determine a network address for a node or service intended to receive a data packet, and may transmit the data packet to the node or service via the network address. For example, when a control container transmits data to an I/O server container via the router container, the third security service 1208 identifies the network address for the I/O server container and transmits the data to the I/O server container via the network address. The third security service 1208 may assign network addresses to each of the nodes or services connected to the router container and may determine the network addresses assigned to the nodes or services intended to receive data packets.

The packet inspection service 1214 can identify a pattern of network data flows through the router container by inspecting packet contents as they flow through the router container. The packet inspection service 1214 can then use the known patterns of traffic to determine if a particular service or node is experiencing out-of-norm behavior. The packet inspection service 1214 may then identify services or nodes as being suspect and may flag them to a user for action. The packet inspection service 1214 may also perform diagnostic actions to determine the probable cause of the out-of-norm behavior. While the router container in FIG. 22 includes a first firewall container 1202, a first data diode container 1206, a first smart switch container 1210, and a packet inspection service 1214 this is merely one example implementation for ease of illustration only. The router container may include any suitable security appliances and/or services.

Figure 23:
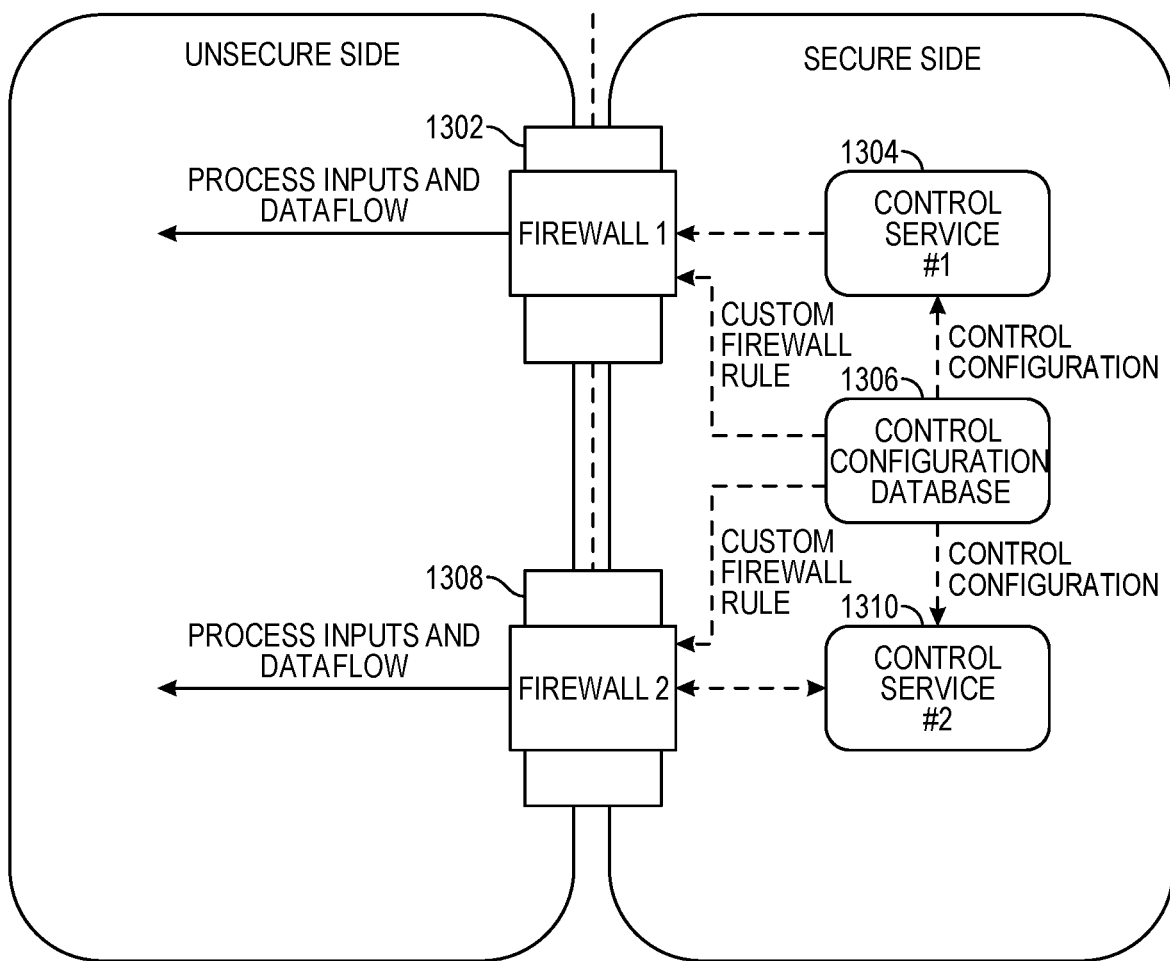
FIG. 23 depicts a block diagram of example virtual firewalls each associated with a respective control service, and including a set of firewall rules specific to the associated control service.

In some implementations, the networking service may deploy firewall services with each control service that runs within the SDCS. The firewall services may execute within containers that are nested in containers that execute the corresponding control services. In other implementations, the firewall services execute within stand-alone containers assigned to the corresponding control services. As shown in FIG. 23, the networking service deploys a first firewall container 1302 to manage network traffic to and from a first control container 1304 and deploys a second firewall container 1308 to manage network traffic to and from a second control container 1310. A control configuration database 1306, which may be managed by the SD storage service 218, may provide a first control configuration to the first control container 1304. The control configuration database 1306 may also provide a first set of customized firewall rules to the first firewall container 1302 for the assigned first control container 1304. Additionally, the control configuration database 1306 may provide a second control configuration to the second control container 1310. The control configuration database 1306 may provide a second set of customized firewall rules to the second firewall container 1308 for the assigned second control container 1310. In other implementations, a control configuration service communicates with the control configuration database 1306 to provide control configurations to the control containers 1304, 13 10 and to provide customized firewall rules to the firewall containers 1302, 1308.

For example, the first set of customized firewall rules may include a whitelist or accept list that allows the first control container 1304 to receive and transmit data to a first I/O server but does not allow the first control container 1304 to receive or transmit data to any other nodes or services. In another example, the first set of customized firewall rules may include a whitelist or accept list allowing the first control container 1304 to receive and transmit data to a particular network address of a remote system external to the SDCS. In yet another example, the first set of customized firewall rules may include a whitelist or accept list of services or nodes allowed to access data from the first control container 1304 and preventing services or nodes which are not included in the whitelist or accept list from accessing the data from the control container. The customized firewall rules may be dynamic in that the firewall containers 1302, 1308 may receive different firewall rules from a control configuration service based on future changes to the configurations of the control containers 1304, 1310.

Figure 24:
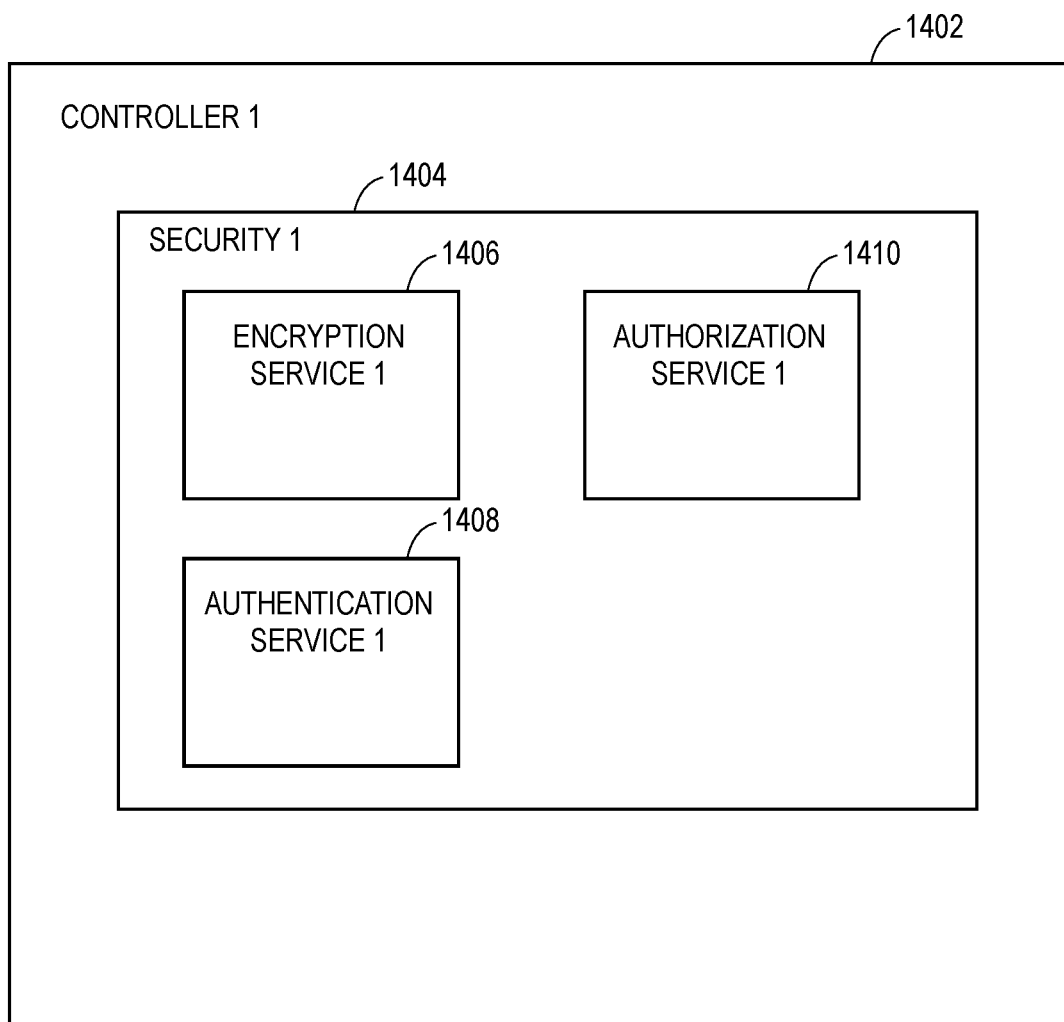
FIG. 24 depicts a block diagram of an example container configured to execute a virtual controller and including a nested container configured to execute a security service for the virtual controller.

As mentioned above, the security services described herein may include packet inspection services, access control services, authorization services, authentication services, encryption services, certificate authority services, key management services, etc. FIG. 24 illustrates a detailed block diagram of a security container 1404 nested within a control container 1402, similar to the configuration shown in FIG. 21. The security container 1404 may include an encryption service 1406, an authentication service 1408, and an authorization service 1410. In this manner, the security container 1404 may encrypt data transmitted by the control container 1402. The security container 1404 may also authenticate and/or authorize physical or logical assets or users attempting to access the control container 1402.

For example, when a physical or logical asset or user attempts to access the control container 1402, the authentication service 1408 may verify the authenticity of the physical or logical asset or user attempting to access the control container 1402. For example, the authentication service 1408 may obtain a digital certificate issued by a certificate authority from the physical or logical asset or user to verify the authenticity of the physical or logical asset or user. The digital certificate may include a cryptographic public key or other identifier for the physical or logical asset, an identifier for the certificate authority service, and a digital signature for the certificate authority service to prove that the certificate has been generated by the certificate authority service. In some implementations, the authentication service 1408 analyzes the identifier for the certificate authority service, and the digital signature for the certificate authority service to determine whether the certificate has been generated by the certificate authority service. In other implementations, the authentication service 1408 transmits the digital certificate to a certificate authority service in the SDCS to determine whether the certificate has been generated by the certificate authority service.

If the authentication service 1408 is able to verify the authenticity of the physical or logical asset or user, the authorization service 1410 may determine the authorization level of the physical or logical asset or user. On the other hand, if the authentication service 1408 is unable to verify the authenticity of the physical or logical asset or user, the authentication service 1408 may deny access to the control container 1402.

In any event, the authorization service 1410 determines whether the physical or logical asset or user is authorized to access the control container 1402 based on the authorization level of the physical or logical asset or user. If the physical or logical asset or user has an authorization level that meets or exceeds a minimum authorization level for accessing the control container 1402, the authorization service 1410 determines that the physical or logical asset or user is authorized to access the control container 1402. Otherwise, the authorization service 1410 may deny access to the control container 1402.

In some implementations, the authorization level of the physical or logical asset or user is included in the certificate. Different types of certificates may indicate different authorization levels and/or roles within the industrial process plant 10. Accordingly, the authorization service 1410 may determine the authorization level for the physical or logical asset or user based on the certificate. In other implementations, the authorization service 1410 obtains pre-stored authorization levels for physical or logical assets or users from a logical storage resource and determines the authorization level for the physical or logical asset based on the pre-stored authorization levels. In some implementations, the physical or logical asset or user may have partial access to the control container 1402 based on the authorization level. Accordingly, the control container 1402 may provide the physical or logical asset or user with access to some portions of the control container 1402 and prevent the physical or logical asset or user from accessing other portions of the control container 1402.

In any event, in response to authenticating and authorizing a physical or logical asset or user, the encryption service 1406 may encrypt data from the control container 1402 to the physical or logical asset or user using the cryptographic public key included in the certificate. The physical or logical asset or user may then decrypt the data using the cryptographic private key paired with the cryptographic public key. If the physical or logical asset or user does not have the cryptographic private key paired with the cryptographic public key, then the physical or logical asset or user is unable to decrypt the data, which is another form of authentication.

Access control services may include the authorization or authentication services mentioned above as well as whitelists or accept lists, and/or other services allowing data to be received/transmitted by predetermined nodes or services while preventing other nodes or services from receiving or transmitting data in the process control network. A key management service may store and/or access a record of the cryptographic public keys associated with each physical or logical asset in the process plant 10. In other implementations, the key management service retrieves the record of the cryptographic public keys from a discovered item data store, as described in more detail below. Then when a physical or logical asset needs to be authenticated, the physical or logical asset provides its cryptographic public key to an authentication service. The authentication service may call upon the key management service to retrieve the record from the discovered item data store to determine whether the provided cryptographic public key for the physical or logical asset matches with the cryptographic public key included in the discovered item data store.

The key management service may also store cryptographic private keys and/or PSKs for physical or logical assets in the process plant 10. Additionally, the key management service may store the certificates for physical or logical assets in the process plant 10. The key management service may password-protect the keys and certificates and/or encrypt them so that a user or physical or logical asset must authenticate itself before gaining access to its respective keys or certificate.

Figure 25:
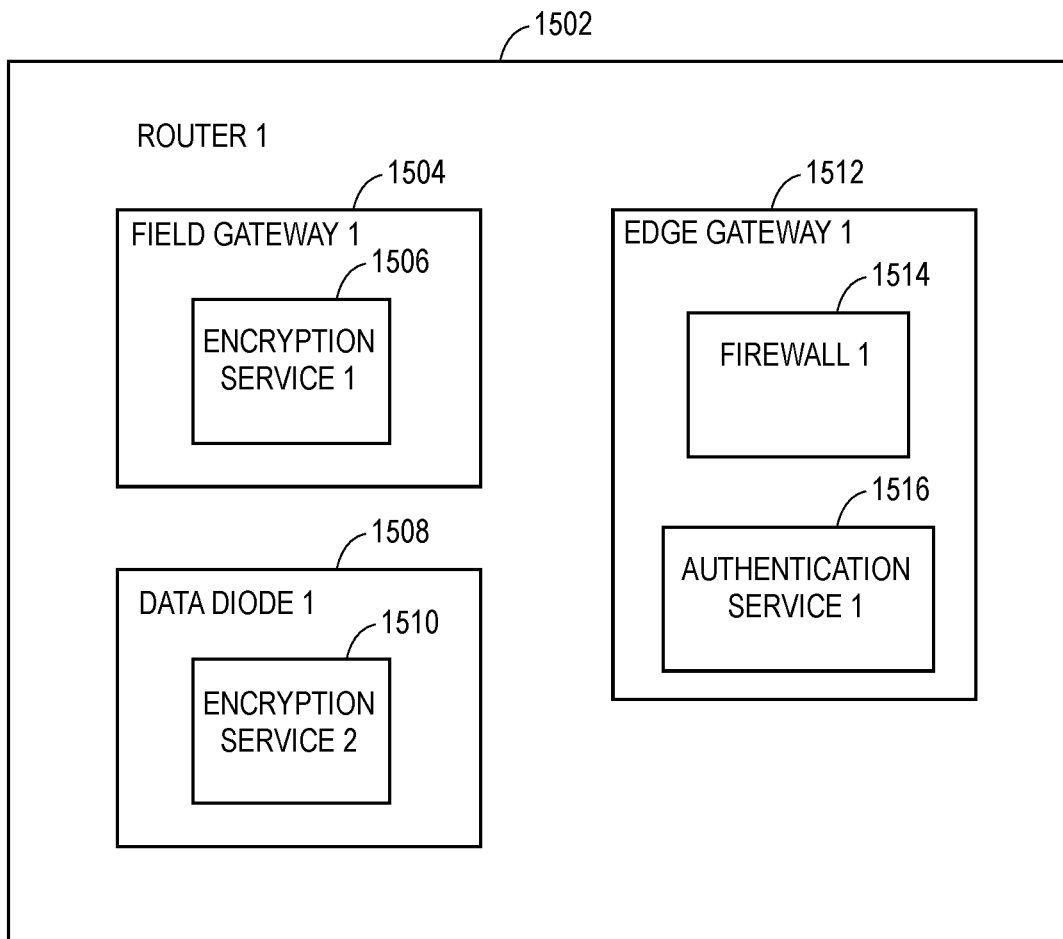
FIG. 25 depicts another block diagram of an example container configured to execute a virtual router within the SDCS of FIG. 1, where the virtual router includes nested containers configured to execute a virtual field gateway, a virtual data diode, and a virtual edge gateway, respectively.

In the example router container of FIG. 22, the router container may facilitate communications between nodes or services within the SDCS or communications between a node or service within the SDCS and a remote system external to the SDCS. FIG. 25 illustrates a block diagram of an example router container 1502 for facilitating communications between a node or service within the SDCS and a remote system external to the SDCS. The router container 1502 may include a field gateway container 1504 executing a first encryption service 1506, a data diode container 1508 executing a second encryption service 1510, and an edge gateway container 1512 executing a firewall service 1514 and an authentication service 1516.

The field gateway container 1504 may communicate with nodes or services in the field environment 12 of the process plant, such as process control devices, field devices, control services, etc. For example, the field gateway container 1504 may include a firewall service with firewall rules to only allow traffic from nodes or services in the field environment 12 of the process plant. The field gateway container 1504 may also execute a first encryption service 1506 to encrypt data from the field environment 12 of the process plant. The field gateway container 1504 may then transmit the data to the data diode container 1508.

The data diode container 1508 may allow data traffic to egress from the field gateway container 1504 to a remote system may and prevent data traffic (e.g., that is transmitted or sent from a remote system or other systems) from ingressing into the field gateway container 1504. Accordingly, the data diode container 1508 supports only unidirectional data flow from the field gateway container 1504 to the edge gateway container 1512 via software, e.g., by dropping or blocking any messages received at the edge gateway container 1512 (e.g., from a remote system) and/or by dropping or blocking any messages addressed to the field gateway container 1504 (e.g., addressed to nodes or services in the SDCS from a remote system). The second encryption service 1510 may also encrypt the data from the field gateway container 1504 in addition or as an alternative to the first encryption service 1506. The data diode container 1508 may then transmit the encrypted data to the edge gateway container 1512.

In some implementations, during instantiation, the data diode container 1508 may temporarily allow handshaking (e.g., an exchange of certificates and pre-shared keys) between entities (e.g., the field gateway container 1504 and the edge gateway container 1512) transmitting incoming or outgoing data to/from the process plant 10 via the data diode container 1508 to properly establish encrypted connections, such as in a Datagram Transport Layer Security (DTLS) or other message-oriented security protocols. Once the DTLS handshake is complete, the connection is established, and from that point on the data diode container 1508 only supports unidirectional data flow for the remaining duration of the data diode container 1508 for example, from the field gateway container 1504 to the edge gateway container 1512. If there are connection issues between the entities on the input and output ends of the data diode container 1508, the data diode container 1508 may need to restart to allow for the DTLS handshake to take place again.

The edge gateway container 1512 may communicate with remote systems external to the process plant 10. The edge gateway container 1512 may include a firewall service 1514 with firewall rules to only allow traffic from predetermined remote systems. The edge gateway container 1512 may also execute an authentication service to authenticate a remote system communicating with the edge gateway container 1512. For example, traffic delivered from the edge gateway container 1512 to the remote system may be secured via an SAS (Shared Access Signature) Token, which may be managed through a token service provided at the remote system 210. The edge gateway container 1512 authenticates the token service and requests an SAS token, which may be valid for only a finite period of time, e.g., two minutes, five minutes, thirty minutes, no more than an hour, etc. The edge gateway container 1512 receives and uses the SAS token to secure and authenticate an AMQP (Advanced Message Queuing Protocol) connection to the remote system via which content data is transmitted from the edge gateway container 1512 to the remote system. Additionally or alternatively, other security mechanisms may be utilized to secure data transiting between the edge gateway container 1512 and the remote system 210, e.g., X.509 certificates, other types of tokens, other IOT protocols such as MQTT (MQ Telemetry Transport) or XMPP (Extensible Messaging and Presence Protocol), and the like. The edge gateway container 1512 may then transmit the data to the remote system.

Figure 26:
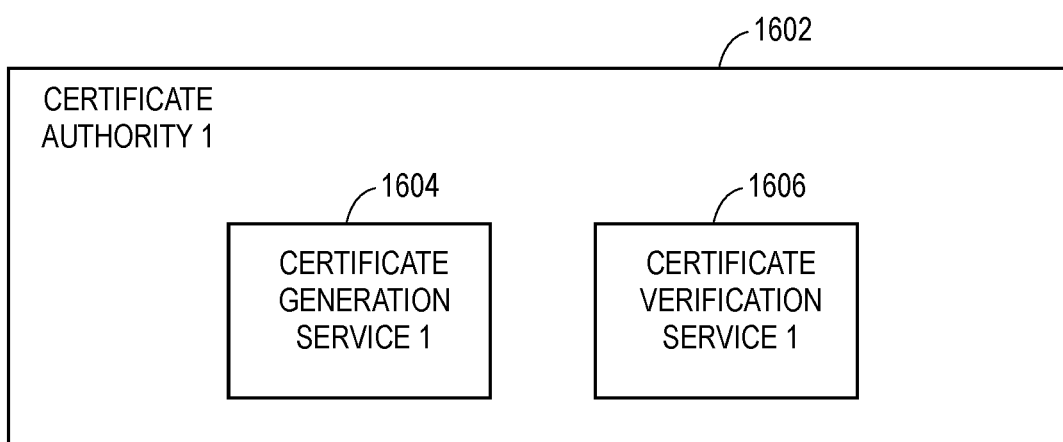
FIG. 26 depicts a block diagram of an example container configured to execute a certificate authority service.

As mentioned above, to prove authenticity when communicating in the SDCS, a physical or logical asset or user may request a digital certificate from a certificate authority service. FIG. 26 illustrates a detailed block diagram of a certificate authority container 1602, similar to the certificate authority container 1028, as shown in FIG. 20. The certificate authority container 1602 may include a certificate generation service 1604 and a certificate verification service 1606.

The certificate generation service 1604 may generate the digital certificate for a physical or logical asset for example, upon receiving a request from the physical or logical asset. Upon receiving the request, the certificate generation service 1604 obtains identification information for the physical or logical asset and verifies the identity of the physical or logical asset based on the identification information. For example, the request may include the name of the physical or logical asset, a make and model of the physical or logical asset, a cryptographic public key associated with a cryptographic private key owned by the physical or logical asset, or any other suitable identification information. The certificate generation service 1604 may verify the identity of the physical or logical asset by for example, comparing the identification information obtained from the physical or logical asset to identification information for the physical or logical asset obtained from other sources. If the certificate generation service 1604 is unable to verify the identity of the physical or logical asset, the certificate generation service 1604 does not generate a certificate for the physical or logical asset.

On the other hand, if the certificate generation service 1604 is able to verify the identity of the physical or logical asset, the certificate generation service 1604 generates a certificate for the physical or logical asset that may include a cryptographic public key or other identifier for the physical or logical asset, an identifier for the certificate authority service 1602 such as a cryptographic public key, and a digital signature for the certificate authority service 1602 to prove that the certificate has been generated by the certificate authority service 1602. The certificate generation service 1604 provides the certificate to the physical or logical asset which may use the certificate for authentication purposes when communicating with other nodes or services within the SDCS. In some implementations, the other services may encrypt communications with the physical or logical asset using the cryptographic public key for the physical or logical asset included in the certificate.

Also in some implementations, a user within the SDCS may request a digital certificate from the certificate generation service 1604, such as a plant operator, a configuration engineer, and/or other personnel associated with the industrial process plant 10. When the user requests the digital certificate, the user may provide identification information, such as the user's name, address, phone number, role within the industrial process plant 10, a username and password, etc. The certificate generation service 1604 may verify the identity of the user by for example, comparing the identification information obtained from the user to identification information for the user obtained from other sources.

If the certificate generation service 1604 is unable to verify the user, the certificate generation service 1604 does not generate a certificate for the user. On the other hand, if the certificate generation service 1604 is able to verify the user, the certificate generation service 1604 generates and provides a digital certificate to the user. In this manner, the user may provide the digital certificate to access nodes or services within the SDCS and does not have to enter login information. In some implementations, the certificate generation service 1604 may include authorization information for the user in the certificate. The SDCS may assign the user an authorization level based on the user's role within the industrial process plant 10. The certificate generation service 1604 may then generate different types of certificates for different authorization levels and/or roles within the industrial process plant 10. In this manner, nodes or services which the user attempts to access may determine the user's authorization level and/or role within the industrial process plant 10 based on the type of certificate that the user provides.

When a physical or logical asset or user attempts to access a node or service in the SDCS, the node or service may provide a request to the certificate verification service 1606 to authenticate the physical or logical asset or user. More specifically, the physical or logical asset or user may provide a certificate to the node or service which may forward the certificate to the certificate verification service 1606. In some implementations, the certificate verification service 1606 analyzes the identifier for the certificate authority service included in the certificate, and the digital signature for the certificate authority service included in the certificate to determine whether the certificate has been generated by the certificate authority service. For example, the certificate verification service 1606 may determine whether the certificate authority cryptographic public key included in the certificate matches the cryptographic public key for the certificate authority. Additionally, the certificate verification service 1606 may determine whether the digital signature proves that the entity generating the certificate owns the cryptographic private key associated with the cryptographic public key. If both of these are true the certificate verification service 1606 may determine that the certificate has been generated by the certificate authority service.

Then the certificate verification service 1606 may provide an indication to the node or service that the physical or logical asset or user has been authenticated. Additionally or alternatively, when the certificate includes an indication of the authorization level of the user, the certificate verification service 1606 may provide an indication of the authorization level to the node or service.

Figure 27:
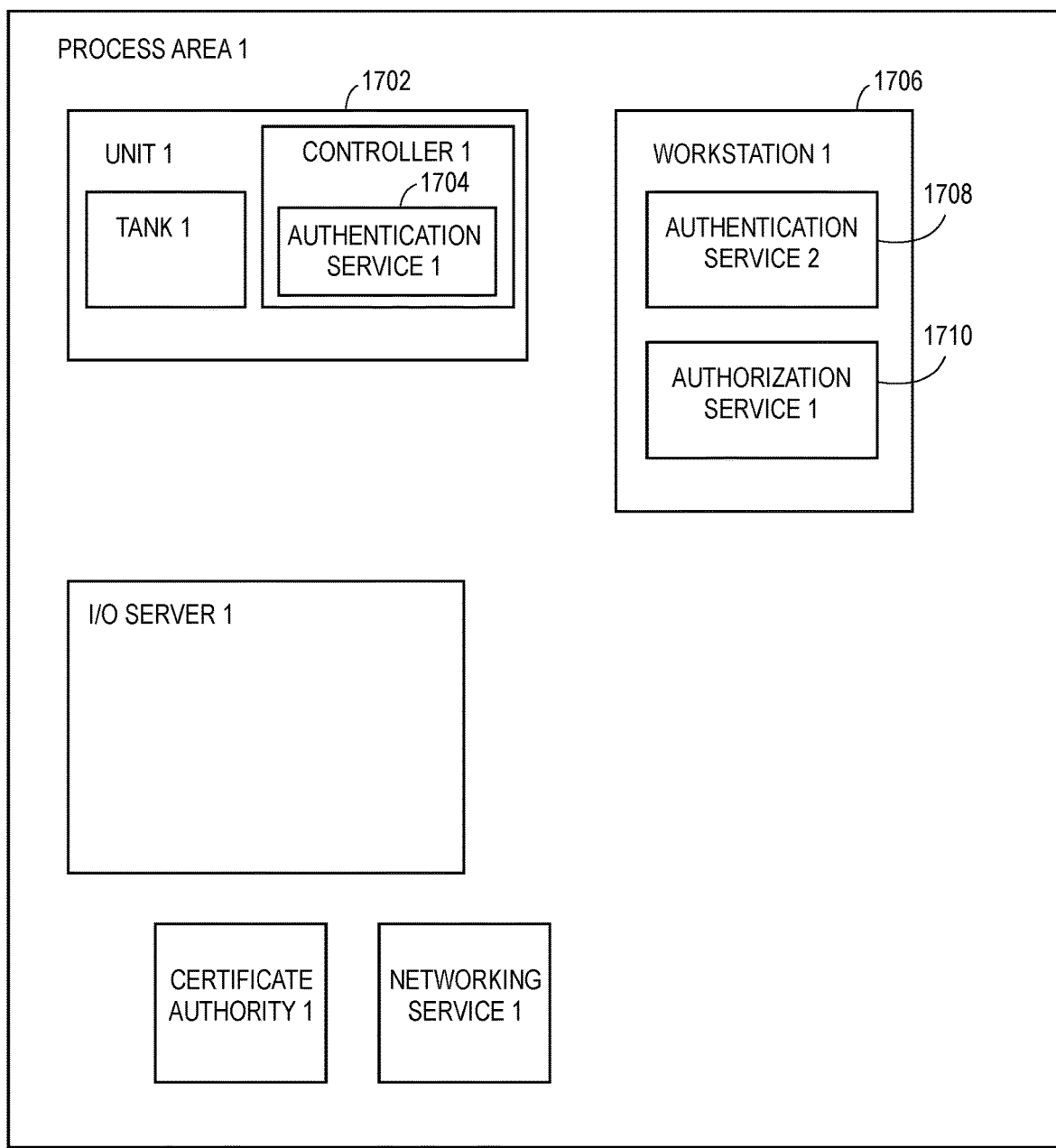
FIG. 27 depicts a block diagram of example containers, services, and/or subsystems included in the SDCS of FIG. 1 which are configured to execute authentication and authorization services.

FIG. 27 illustrates example authentication and authorization services which may be included in nodes or services of the SDCS, such as a control container and an operator workstation container (e.g., a virtual workstation). As shown in FIG. 27, a control container 1702 includes a first authentication service 1704, and an operator workstation container 1706 includes a second authentication service 1708 and an authorization service 1710.

The control container 1702 may receive a request for access from a physical or logical asset, where the request includes a certificate. Accordingly, the first authentication service 1704 may authenticate the physical or logical asset using the certificate. In some implementations, the first authentication service 1704 may provide the certificate to a certificate authority service, such as the certificate authority service 1602 as shown in FIG. 26 to authenticate the physical or logical asset. In any event, upon authenticating the physical or logical asset, the first authentication service 1704 may provide access to the control container 1702. Otherwise, the first authentication service 1704 may deny access to the control container 1702.

The operator workstation container 1706 may receive a request for access from a user, where the request includes a certificate. Accordingly, the second authentication service 1708 may authenticate the user using the certificate. In some implementations, the second authentication service 1708 may provide the certificate to a certificate authority service, such as the certificate authority service 1602 as shown in FIG. 26 to authenticate the user. In any event, upon authenticating the user, the first authentication service 1704 may provide an indication to the operator workstation container 1706 that the user has been authenticated.

The authorization service 1710 then determines whether the user is authorized to access the operator workstation container 1706 based on the authorization level of the user. If the user has an authorization level that meets or exceeds a minimum authorization level for accessing the operator workstation container 1706, the authorization service 1710 determines that the user is authorized to access the operator workstation container 1706. Otherwise, the authorization service 1710 may deny access to the operator workstation container 1706.

In some implementations, the authorization level of the user is included in the certificate. Different types of certificates for different authorization levels and/or roles within the industrial process plant 10. Accordingly, the authorization service 1710 may determine the authorization level for the user based on the certificate. In other implementations, the authorization service 1710 obtains pre-stored authorization levels for users from a logical storage resource and determines the authorization level for the user based on the pre-stored authorization levels. In some implementations, the user may have partial access to the operator workstation container 1706 based on the authorization level. Accordingly, the operator workstation container 1706 may provide the user with access to some portions of the operator workstation container 1706 and prevent the user from accessing other portions of the operator workstation container 1706.

Figure 28:
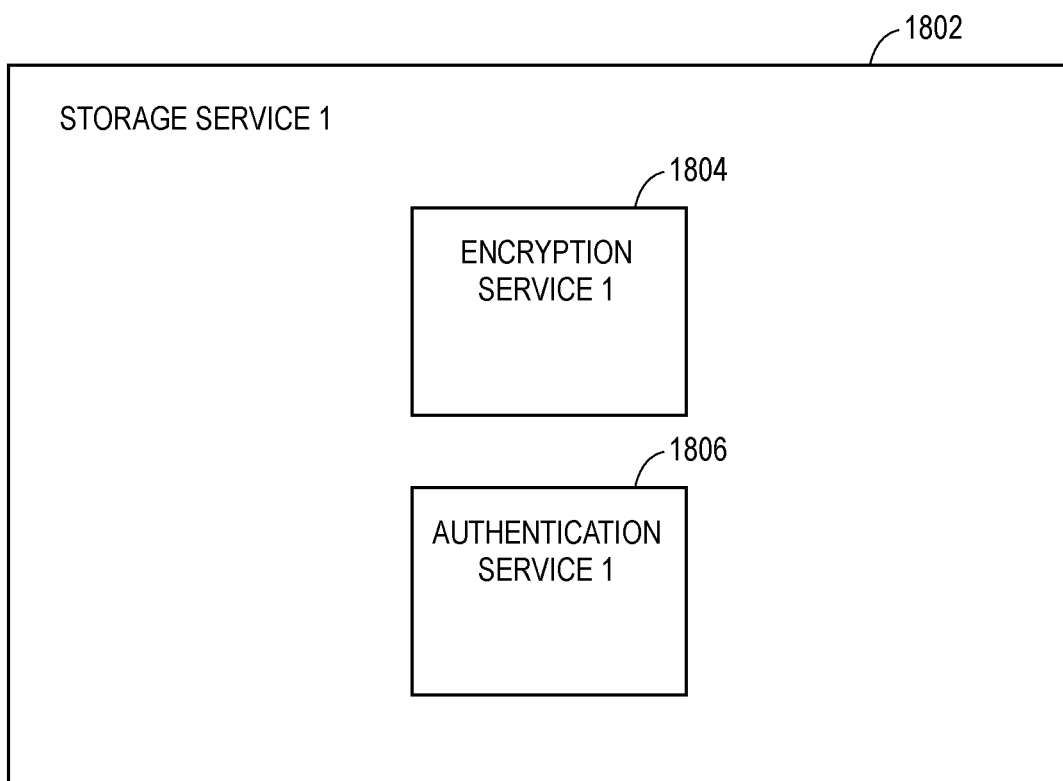
FIG. 28 depicts a block diagram of an example container configured to execute a storage service.

In addition to encrypting network communications in the SDCS, the SDCS encrypts logical storage resources. FIG. 28 illustrates a block diagram of an example storage service 1802 that includes an encryption service 1804 and an authentication service 1806.

When the storage service 1802 stores logical storage resources in the SDCS, the encryption service 1804 encrypts the data included in the logical storage resources. Then when a physical or logical asset or user attempts to access a logical storage resource, the authentication service 1806 authenticates the physical or logical asset or user. For example, the authentication service 1806 may authenticate the physical or logical asset or user based on a certificate for the physical or logical asset or user issued by a certificate authority. If the authentication service 1806 is able to authenticate the physical or logical asset or user, the storage service 1802 may decrypt the data included in the logical storage resource and provide the decrypted logical storage resource to the physical or logical asset or user. Otherwise, the storage service 1802 does not decrypt the data for the physical or logical asset or user.

Figure 29:
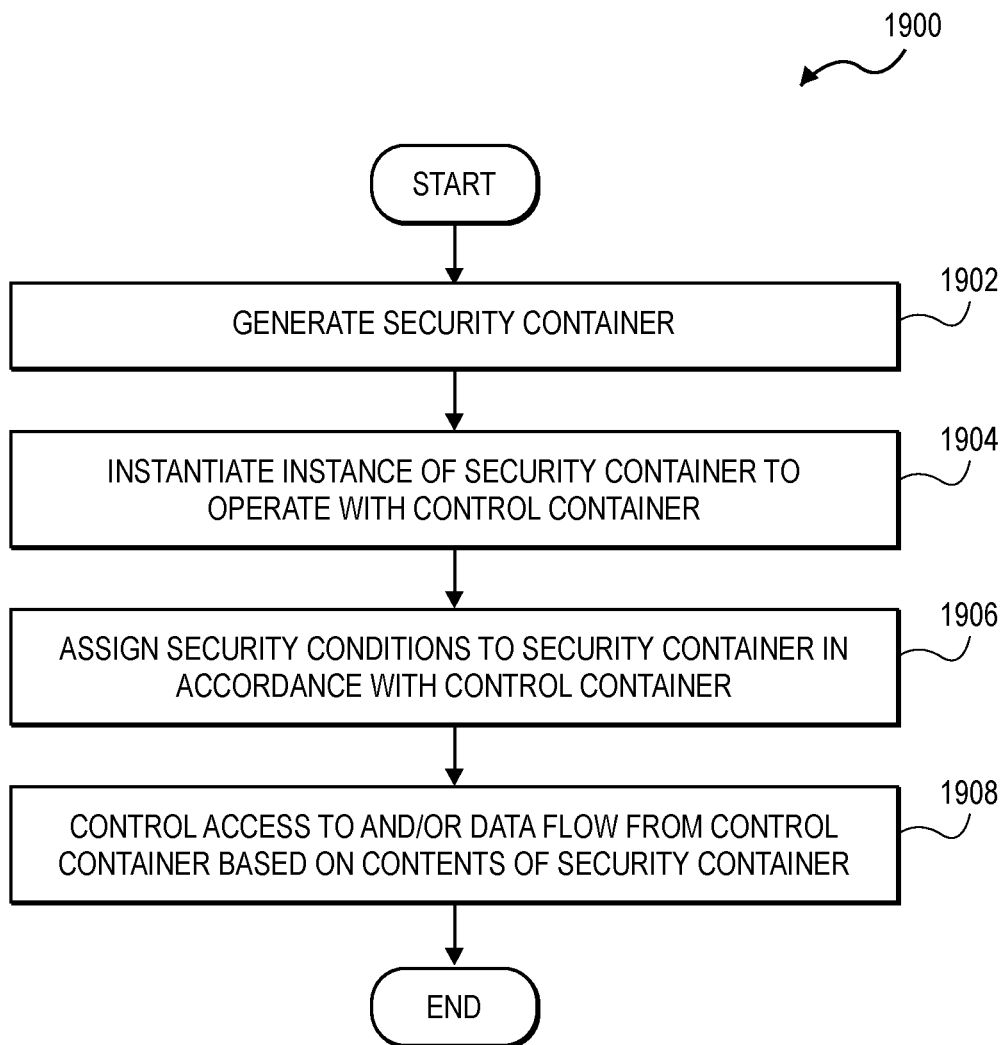
FIG. 29 depicts a flow diagram representing an example method of securing a process control system of a process plant.

FIG. 29 illustrates a flow diagram representing an example method 1900 of securing a process control system of a process plant. The method may be executed by a software defined networking service, a security container, or any suitable combination of these.

At block 1902, a software defined networking service generates a security service configured to execute via a container on a compute node within the SDCS. For example, the security service may include a virtual router, a virtual firewall, a virtual switch, a virtual interface, a virtual data diode, a packet inspection service, an access control service, an authorization service, an authentication service, an encryption service, a certificate authority service, a key management service, or any other suitable service related to security.

Then at block 1904, the software defined networking service instantiates an instance of the security container to operate with a control container. The instance of the security container may be a primary instance. The software defined networking service may also instantiate N redundant instances of the security container for example, to simulate operation with the control container without actually controlling access to or data flow from the control container. In some implementations, the software defined networking service nests the security container within the control container. In additional or alternative implementations, the software defined networking service pins the security container to the same compute node as the compute node on which the control container executes. In other implementations, the security container is a stand-alone container assigned to the control container.

At block 1906, the software defined networking service assigns security conditions to the security container in accordance with the control container. For example, a control configuration service may obtain a control configuration from a control configuration storage resource and provide the control configuration to the control container. The control configuration storage resource may also include a set of customized firewall rules for the control container. The software defined networking service may obtain the set of customized firewall rules for the control container from the control configuration service, and may assign the set of customized firewall rules to the security container as security conditions. The software defined networking service may also assign other security conditions in accordance with the control container such as authenticating physical or logical assets or users attempting to access the control container, requiring users to have an authorization level which exceeds or meets a minimum threshold authorization level, preventing access from remote systems external to the process plant 10, or prevent incoming data from remote systems external to the process plant 10.

In some implementations, the software defined networking service may assign alternative or additional security conditions to the security container to update the contents of the security container. For example, at a first point in time, the software defined networking service may assign a first set of security rules to the security container. Then, at a later point in time, the software defined networking service may obtain an updated control configuration for the control container. The software defined networking service may also obtain updated firewall rules for the control container due to the change in the control configuration and may assign the updated firewall rules to the security container as security conditions.

At block 1908, the security container controls access to and/or data flow from the control container based on the security conditions assigned to the security container. For example, the security container may prevent nodes or services which are not included in a whitelist or accept list from communicating with the control container.

Figure 30:
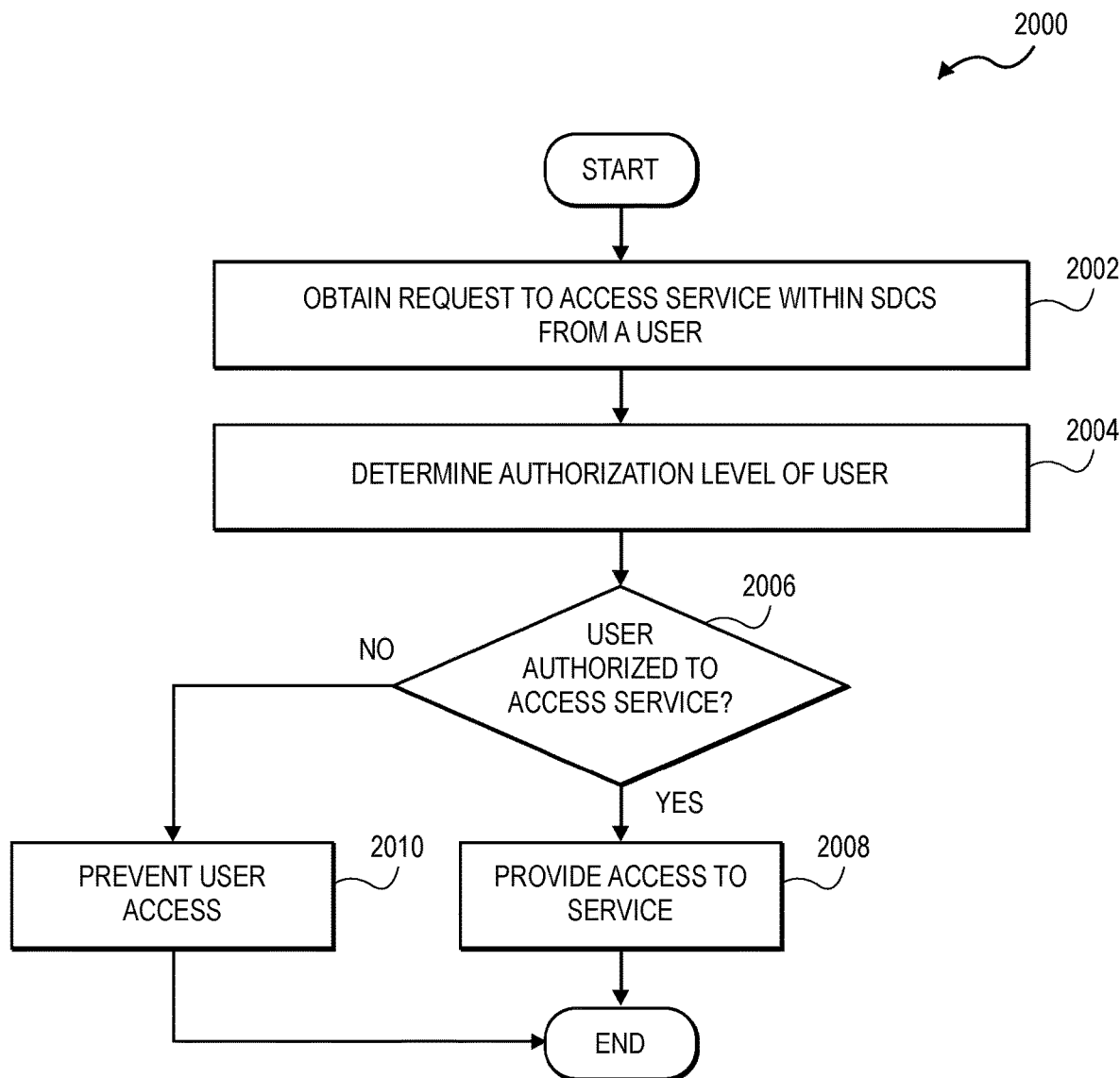
FIG. 30 depicts a flow diagram representing an example method for role-based authorization in a software defined process control system (SDCS).

FIG. 30 illustrates a flow diagram representing an example method 2000 for role-based authorization in an SDCS. The method may be executed by a security container, or an authorization service.

At block 2002, a security service executing via a container on a compute node within the SDCS obtains a request from a user to access another service or node within the SDCS, such as a control container. In some implementations, the security service may obtain the request from a physical or logical asset of the process plant 10 which is controlled by the user. Also in some implementations, the request may include a certificate provided by the user for verifying the authenticity of the user and including authorization information for the user.

At block 2004, the security service determines an authorization level of the user. For example, the authorization level of the user may be included in the certificate. Different types of certificates may indicate different authorization levels and/or roles within the industrial process plant 10. Accordingly, the security service may determine the authorization level for the user based on the certificate. In other implementations, the security service obtains pre-stored authorization levels for users from a logical storage resource and determines the authorization level for the physical or logical asset based on the pre-stored authorization levels.

At block 2006, the security service determines whether the user is authorized to access the other service or node based on the authorization level. For example, if the user has an authorization level that meets or exceeds a minimum authorization level for accessing the other service or node within the SDCS, the security service determines that the user is authorized to access the other service or node. Accordingly, the security service provides the user with access to the other service or node, such as the control container (block 2008). Otherwise, the security service may deny access to the other service or node (block 2010).

Figure 31:
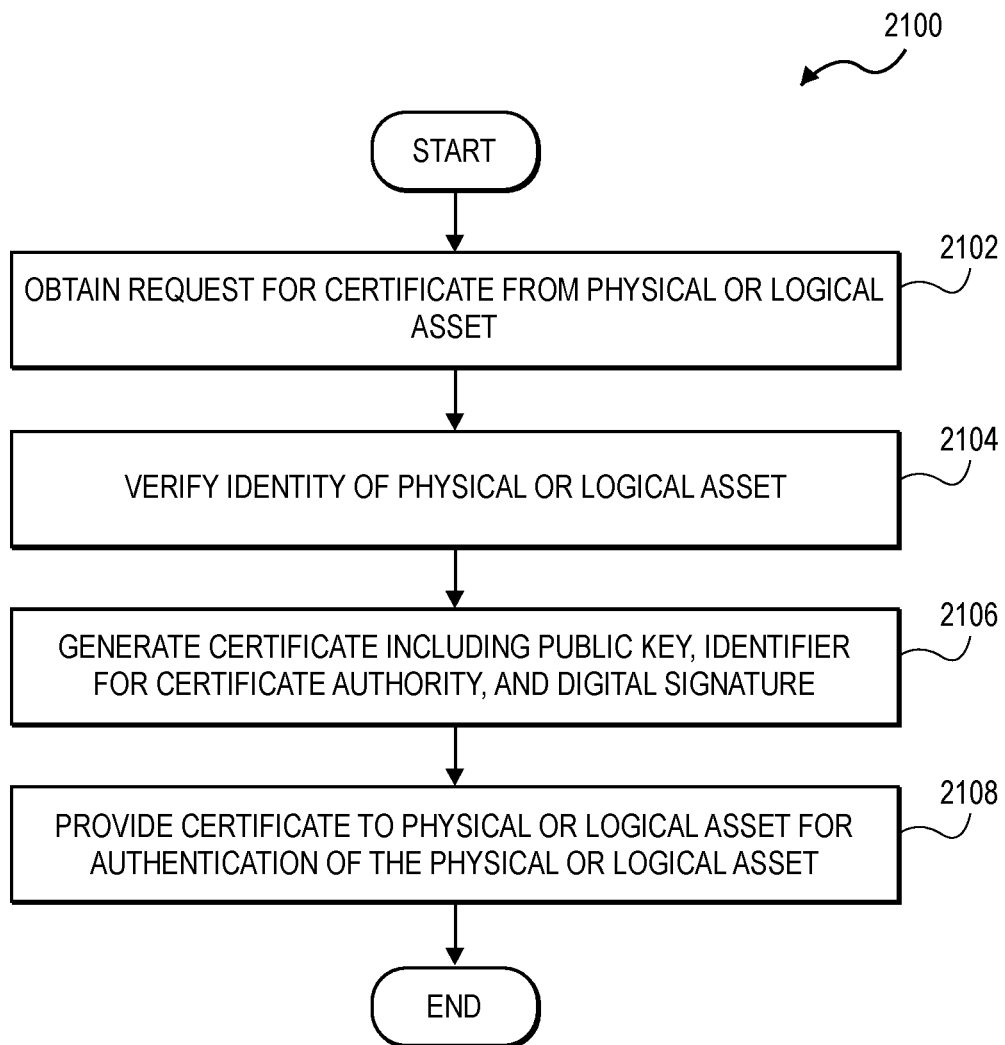
FIG. 31 depicts a flow diagram representing an example method for generating a digital certificate by a certificate authority service for authenticating a physical or logical asset of a process plant.

FIG. 31 illustrates a flow diagram representing an example method 2100 for generating a digital certificate by a certificate authority service for authenticating a physical or logical asset of the process plant 10. The method may be executed by a certificate authority service.

At block 2102, the certificate authority service obtains a request for a certificate from a physical or logical asset of the process plant 10. Upon receiving the request, the certificate authority service obtains identification information for the physical or logical asset and verifies the identity of the physical or logical asset based on the identification information (block 2104). For example, the request may include the name of the physical or logical asset, a make and model of the physical or logical asset, a cryptographic public key associated with a cryptographic private key owned by the physical or logical asset, or any other suitable identification information. The certificate authority service may verify the identity of the physical or logical asset by for example, comparing the identification information obtained from the physical or logical asset to identification information for the physical or logical asset obtained from other sources. If the certificate authority service is unable to verify the identity of the physical or logical asset, the certificate authority service does not generate a certificate for the physical or logical asset.

On the other hand, if the certificate authority service is able to verify the identity of the physical or logical asset, the certificate authority service generates a certificate for the physical or logical asset that may include a cryptographic public key or other identifier for the physical or logical asset, an identifier for the certificate authority service such as a cryptographic public key, and a digital signature for the certificate authority service to prove that the certificate has been generated by the certificate authority service (block 2106). The certificate authority service provides the certificate to the physical or logical asset which may use the certificate for authentication purposes when communicating with other nodes or services within the SDCS (block 2108). In some implementations, the other services may encrypt communications with the physical or logical asset using the cryptographic public key for the physical or logical asset included in the certificate.

Figure 32:
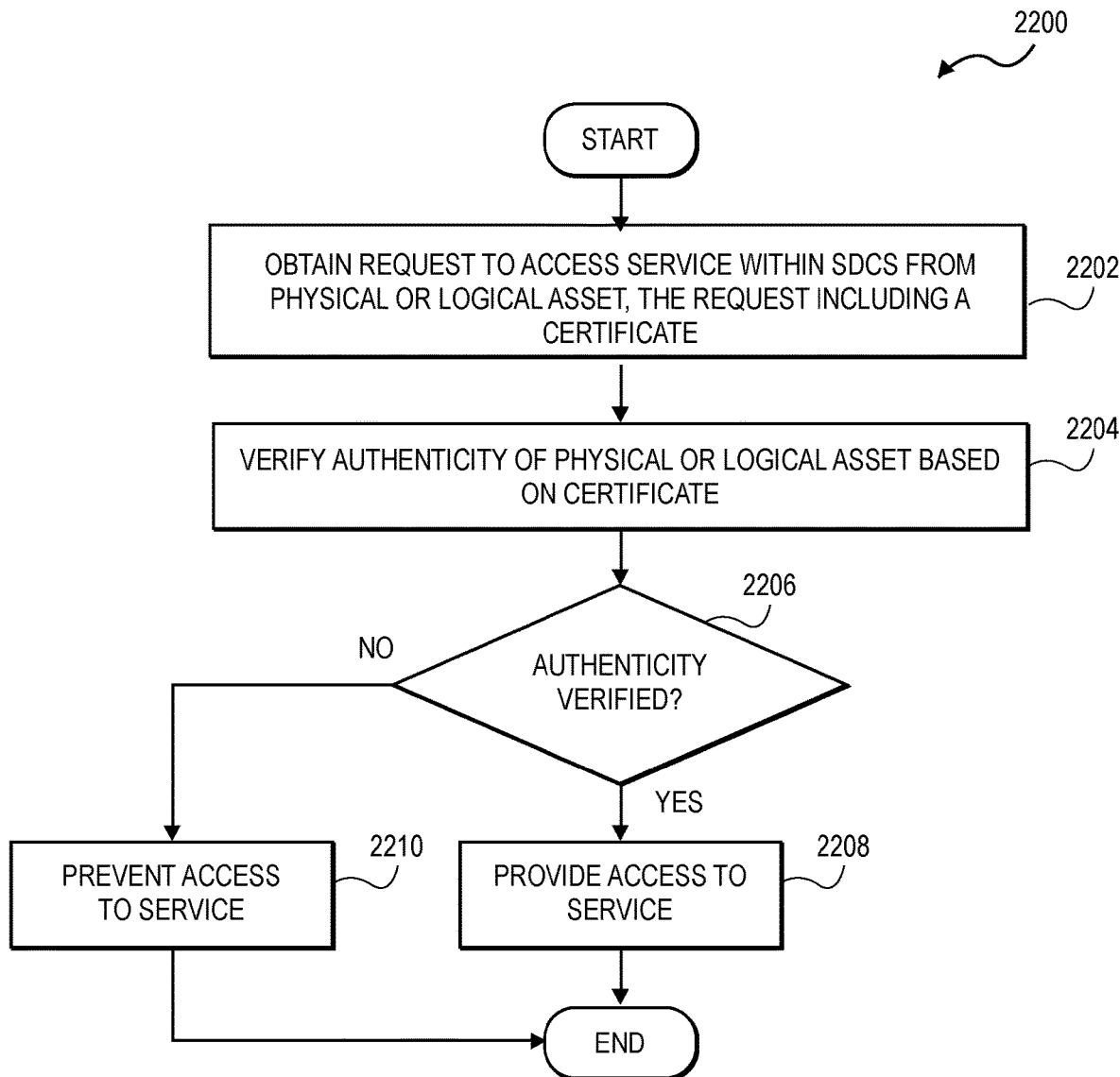
FIG. 32 depicts a flow diagram representing an example method for authenticating a physical or logical asset of a process plant.

FIG. 32 illustrates a flow diagram representing an example method 2200 for authenticating a physical or logical asset of the process plant 10. The method may be executed by a security service, an authentication service, or any suitable combination of these.

At block 2202, a security service executing via a container on a compute node within the SDCS obtains a request to access another service or node within the SDCS from a physical or logical asset. The request may include a certificate provided by the physical or logical asset for verifying the authenticity of the physical or logical asset.

At block 2204, an authentication service executing via a container on a compute node within the SDCS verifies the authenticity of the physical or logical asset based on the certificate. For example, the authentication service may analyze an identifier for the certificate authority service included in the certificate, and the digital signature for the certificate authority service included in the certificate to determine whether the certificate has been generated by the certificate authority service. In other implementations, the authentication service provides the certificate to the certificate authority service to verify the authenticity of the physical or logical asset.

If the authentication service is able to verify the authenticity of the physical or logical asset or user (block 2208), the security service may provide access to the other service or node. On the other hand, if the authentication service is unable to verify the authenticity of the physical or logical asset, the security service may deny access to the other service or node (block 2210).

The SDCS may also include a discovery service that executes via a container on a compute node of the SDCS. The discovery service stores a record of the identity, capabilities, and/or location of each physical or logical asset in the process plant 10 which may be utilized during run-time of the process plant 10 to control at least a portion of the industrial process, such as field devices, controllers, process control devices, I/O devices, compute nodes, containers, services (e.g., control services), microservices, etc.

In some implementations, the discovery service may store the record in a discovered item data store. The SDCS may include multiple instances of the discovered item data store stored across multiple compute nodes for redundancy/fault tolerance. In other implementations, an instance of the discovered item data store may be stored on each compute node within the SDCS for ease and speed of access.

Also in some implementations, the discovery service may provide the record or at least a portion thereof to an I/O server service for commissioning the physical or logical assets. For example, when a physical or logical asset joins a network 22, 25, 30, 32, 35, 42-58 in the process plant 10, the physical or logical asset announces its presence. The announcement may include parameters such as identification information for the physical or logical asset and location information for the physical or logical asset, such as a network address for communicating with the physical or logical asset. The discovery service or any other suitable service may obtain the announcement and transmit the identification information and location information for the physical or logical asset to an I/O server service for automatically commissioning the physical or logical asset using the identification information and the location information.

Figure 33:
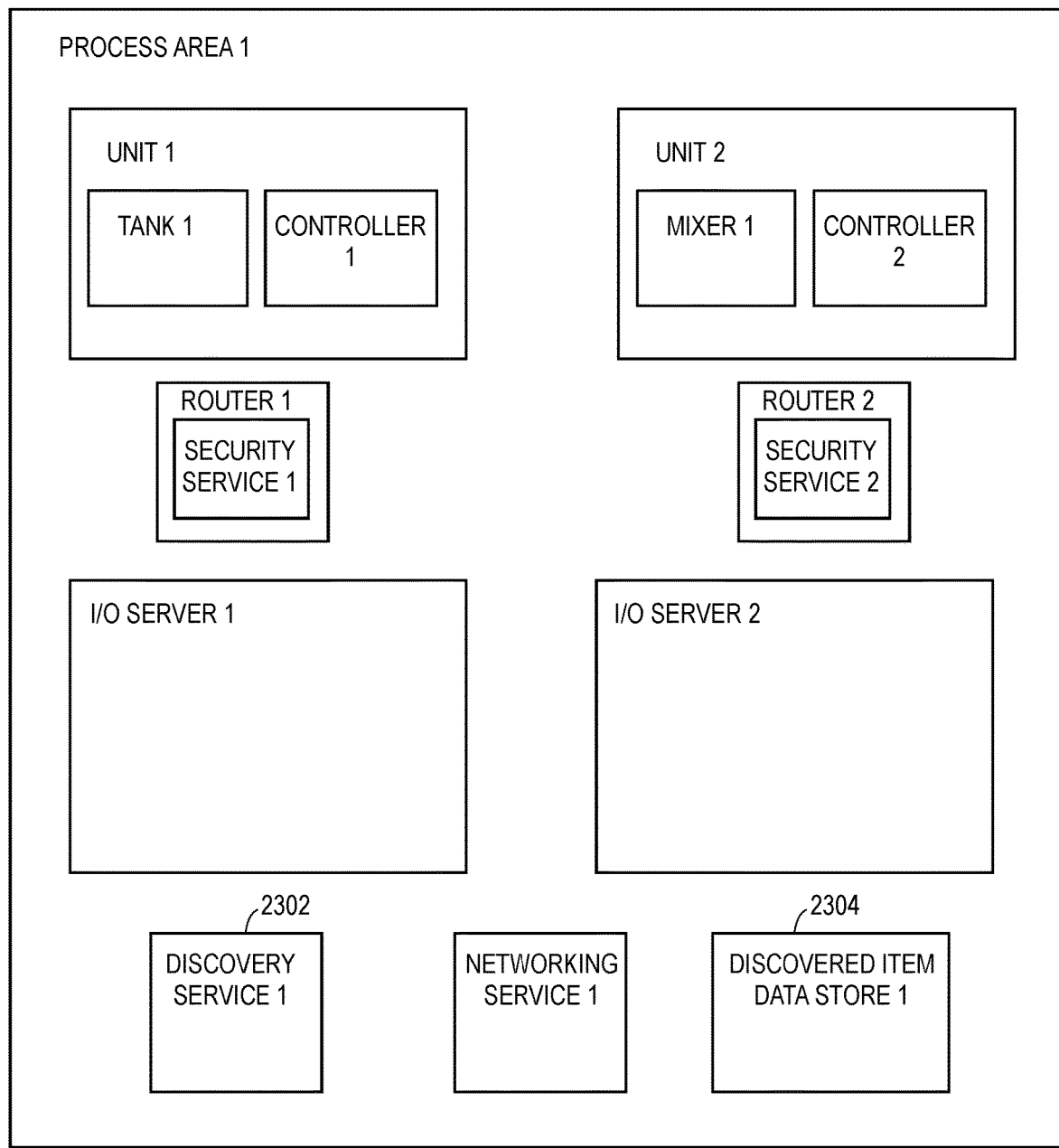
FIG. 33 depicts a block diagram of example containers, services, and/or subsystems included in the SDCS of FIG. 1 which are related to discovery.

FIG. 33 illustrates a block diagram of example containers, services, and/or subsystems which are related to discovery. As shown in FIG. 33, the SDCS includes a container executing a discovery service 2302. While the discovery service 2302 is shown in FIG. 33 executes within a container (a discovery container), in other implementations the discovery service 2302 may not be containerized. Also in some implementations, the SDCS may include multiple instances of the discovery service 2302 in multiple containers for redundancy. In some implementations, the discovery service 2302 may be deployed by the SD networking service 220 or nested within the SD networking service 220 of FIG. 2.

The SDCS also include a discovered item data store 2304 which is a logical storage resource that stores a record of each discovered physical or logical asset in the process plant 10. Upon discovering a physical or logical asset, the discovery service 2302 may store the record of the physical or logical asset in the discovered item data store 2304.

When a new physical or logical asset is added to a network 22, 25, 30, 32, 35, 42-58 in the process plant 10 (also referred to herein as a "process plant network"), the new physical or logical asset may announce its presence by for example, broadcasting its network address to nodes or services connected to the process plant network 22, 25, 30, 32, 35, 42-58. In other implementations, the new physical or logical asset may announce its presence by for example, responding to a multicast announcement from a particular node or service connected to the process plant network 22, 25, 30, 32, 35, 42-58. In yet other implementations, the new physical or logical asset may announce its network address to a reserved point-to-point network address, or a multicast address. The new physical or logical asset may announce its network address once, periodically, upon request, or in any suitable manner.

A physical asset in the process plant 10 may be a physical hardware device configured to control at least a portion of the industrial process during run-time of the process plant 10, such as a field device, controller, process control device, I/O device, compute node, etc. The physical hardware device may include a respective set of processor and/or processor core resources and memory resources. A logical asset in the process plant 10 may be software configured to control at least a portion of the industrial process during run-time of the process plant 10, such as a container, service such as a control service, microservice, etc. In some implementations, a logical asset may execute within a physical asset.

The discovery service 2302 may obtain the announcement and determine the identity of the physical or logical asset based on parameters of the physical or logical asset which are included in the announcement. The announcement may include a YAML file which defines each physical or logical asset. The YAML file may be generated manually or automatically for example, when the SDCS has previously been commissioned/configured. In other implementations, the announcement includes a different type of file such as a JSON file, an XML file, or any other data serialization file.

More specifically, the announcement may include an asset tag of the physical or logical asset, a media access control (MAC) address of the physical or logical asset, a network address of the physical or logical asset, a cryptographic key for the physical or logical asset, a serial number for the physical or logical asset, and/or a name of a service or subsystem associated with the physical or logical asset. While some of the parameters may uniquely identify the physical or logical asset such as the MAC address, other parameters such as the serial number may correspond to multiple assets having the same make and model. Accordingly, the discovery service 2302 may identify the physical or logical asset based on any suitable combination of the parameters included in the announcement. For example, two physical or logical assets may be valves having the same serial number which is a part number. The two valves may be identified based on a combination of the serial number and cryptographic keys for the two valves.

The asset tag may be a name or number assigned to/configured into the physical or logical asset and may uniquely identify the particular physical or logical asset within the SDCS or may more generally identify the asset type. For example, if the physical asset is a control valve, the asset tag may be "CTRL-VALVE" and the process plant 10 may include several control valves having the same asset tag. In other implementations, the asset tag may be "CTRL-VALVE-01" to uniquely identify that particular control valve, and other control valves may be "CTRL-VALVE-02," "CTRL-VALVE-03," etc. In another example, if the logical asset is a control service, the asset tag may be "CTRL-SERV" and the process plant 10 may include several control services having the same asset tag. In other implementations, the asset tag may be "CTRL-SERV-01" to uniquely identify that particular control service, and other control services may be "CTRL-SERV-02," "CTRL-SERV-03," etc.

The MAC address may be the address of the network card operating with the physical or logical asset. The MAC address may uniquely identify physical assets. However, for logical assets, the MAC address may be the same for services operating on the same compute nodes and the MAC address may change when the service operates on a different compute node. Accordingly, in some implementations, the MAC address may not be used to identify a logical asset or the MAC address may be used in combination with other parameters to identify the logical asset.

The network address may be an IP address or other identifier for the physical or logical asset within the process plant network 22, 25, 30, 32, 35, 42-58. The serial number may be a manufacturer assigned number indicating the make and model of a physical asset, such as a part number.

In some implementations, the physical or logical asset may be assigned an asymmetric key pair include a cryptographic private key and a cryptographic public key. The asymmetric key pair may be assigned by a user or the manufacturer. Then the physical or logical asset may store the cryptographic private key without sharing it with any other nodes or services. The physical or logical asset may share the cryptographic public key for example with the discovery service 2302, and the discovery service 2302 may store a record indicating that the cryptographic public key corresponds to the particular asset.

Then when the physical or logical asset needs to be authenticated, the physical or logical asset provides the cryptographic public key to an authentication service. As shown in more detail below with reference to FIG. 34, the authentication service may be nested within the discovery service. In other implementations, the authentication service is provided within another container of the SDCS that communicates with the discovery service. The authentication service retrieves the record from the discovered item data store 2304 to determine whether the provided cryptographic public key for the physical or logical asset matches with the cryptographic public key included in the discovered item data store 2304. The physical or logical asset also provides a digital signature to the authentication service to prove that the physical or logical asset is in possession of the cryptographic private key corresponding to the cryptographic public key. If the authentication service determines that the provided cryptographic public key for the physical or logical asset matches with the cryptographic public key included in the discovered item data store 2304 and the digital signature proves that the physical or logical asset is in possession of the cryptographic private key corresponding to the cryptographic public key, the authentication service authenticates the physical or logical asset.

In other implementations, the physical or logical asset may be assigned a pre-shared key (PSK) that the physical or logical asset shares with the discovery service 2302. The discovery service 2302 may store the PSK in association with the physical or logical asset in the discovered item data store 2304. Then when the physical or logical asset communicates with other nodes or services, the physical or logical asset may encrypt the communication using the PSK. The discovery service 2302 may then retrieve the PSK stored in association with the physical or logical asset from the discovered item data store 2304, decrypt the communication, and forward the decrypted communication to the other node or service. In this manner, the physical or logical asset is authenticated, because it used the PSK which was only shared between the physical or logical asset and the discovery service 2302 to encrypt the communication.

In addition to determining the identity of the physical or logical asset, the discovery service 2302 may determine the location of the physical or logical asset within the SDCS. For example, the location may be the network address for the physical or logical asset, such as an IP address or other identifier for the physical or logical asset within the process plant network 22, 25, 30, 32, 35, 42-58. In addition to the network location, the location may also include the physical location of the physical or logical asset such as a particular section of the process plant 10 where a physical asset is located or a physical location of a compute node that stores and/or executes a logical asset. The discovery service 2302 determines the location of the physical or logical asset based on information included in the announcement, such as a network address or a description of a physical location.

Moreover, the discovery service 2302 may identify a set of capabilities of the physical or logical asset, such as process parameters provided by the physical or logical asset (e.g., a valve opening percentage, a tank fill percentage, etc.), services provided by the physical or logical asset (e.g., authentication, authorization, control, analytics, storage, etc.), and/or services configured to communicate with the physical or logical asset. For example, the physical or logical asset may include at least some of the capabilities of the physical or logical asset in the announcement as primary variables. The discovery service 2302 may also identify capabilities of the physical or logical asset which are not included in the announcement, i.e., contextual variables. More specifically, the discovery service 2302 may retrieve contextual variables from a context dictionary service that infers a set of capabilities from a type of physical or logical asset. The discovery service 2302 may provide the identity of the physical or logical asset to the context dictionary service, and the context dictionary service may determine the type of physical or logical asset based on the identity. Then the context dictionary service provides the set of capabilities inferred from the type of physical or logical asset to the discovery service 2302. The context dictionary service is described in more detail below with reference to FIGS. 34-36.

In some implementations, upon identifying a physical or logical asset, the discovery service 2302 notifies a process control configuration service of the newly discovered physical or logical asset for commissioning and/or inclusion in the SDCS topology. A user may then accept or reject the inclusion of the newly discovered physical or logical asset in the SDCS topology at the process control configuration service. Also in some implementations, newly discovered physical or logical assets may automatically be included in the SDCS topology by the process control configuration service.

In any event, the discovery service 2302 stores a record of the physical or logical asset including the identity of the physical or logical asset, the location of the physical or logical asset, and/or the set of capabilities of the physical or logical asset in the discovered item data store 2304. In this manner, the discovered item data store 2304 maintains a record of each of the physical or logical assets within the process plant 10. Other physical or logical assets may request certain process parameters or services, and the discovery service 2302 may identify the physical or logical asset that provides the requested process parameters or services to the requesting physical or logical asset. The discovery service 2302 may also provide location information for the physical or logical asset that provides the requested process parameters or services so that the requesting physical or logical asset may obtain the requested process parameters or services. Furthermore, the discovery service 2302 may provide a record of the physical or logical asset to an I/O server or an I/O device for commissioning the physical or logical asset, such as when the physical or logical asset is a field device.

If the discovered item data store 2304 is corrupted or destroyed, the discovery service 2302 may automatically broadcast, via the process plant network 22, 25, 30, 32, 35, 42-58, a request for each of the physical or logical assets within the process plant 10 to announce their presence. Then the discovery service 2302 may quickly recover the record of each of the physical or logical assets within the process plant 10 without manual input and without having to interrupt operation of the process plant 10.

In some implementations, the discovery request from the discovery service 2302 for physical or logical assets to announce their presence may be forwarded amongst the physical or logical assets that have intermediaries. For example, the remote I/O asset 78 of FIG. 1 may forward the discovery request to each of the field devices 70 communicatively connected to the remote I/O asset 78. The field devices 70 may then respond to the discovery request by announcing their presence to the remote I/O asset 78 which forwards the announcements to the discovery service 2302.

Figure 34:
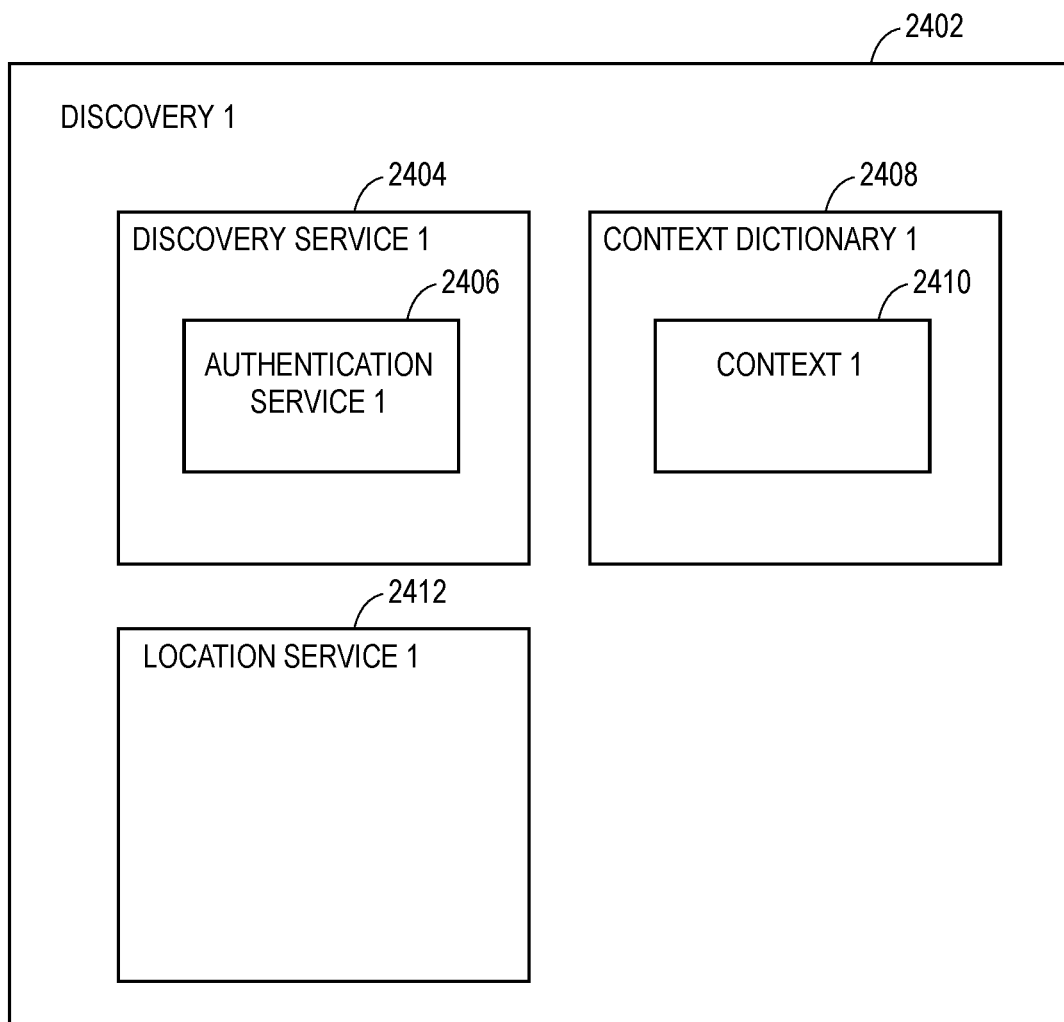
FIG. 34 depicts a block diagram of an example container configured to execute a discovery service.

FIG. 34 illustrates a detailed block diagram of an example discovery container 2402 configured to execute a discovery service, similar to the discovery service 2302 of FIG. 33.

The discovery container 2402 includes a discovery service 2404 which may execute an authentication service 2406, a context dictionary container 2408 which may include a context 2410, and a location service 2412.

The discovery service 2404 may obtain announcements of physical or logical assets that join the process plant network 22, 25, 30, 32, 35, 42-58. An announcement may include an asset tag of the physical or logical asset, a MAC address of the physical or logical asset, a network address of the physical or logical asset, a cryptographic key for the physical or logical asset, a serial number for the physical or logical asset, and/or a name of a service or subsystem associated with the physical or logical asset. The discovery service 2404 may determine the identity of the physical or logical asset based on these parameters included in the announcement.

The discovery service 2404 may also determine the location of the physical or logical asset within the SDCS. For example, the location may be the network address for the physical or logical asset, such as an IP address or other identifier for the physical or logical asset within the process plant network 22, 25, 30, 32, 35, 42-58. In addition to the network location, the location may also include the physical location of the physical or logical asset such as a particular section of the process plant 10 where a physical asset is located or a physical location of a compute node that stores and/or executes a logical asset. The discovery service 2404 determines the location of the physical or logical asset based on information included in the announcement, such as a network address or a description of a physical location.

Moreover, the discovery service 2404 may identify a set of capabilities of the physical or logical asset, such as process parameters provided by the physical or logical asset (e.g., a valve opening percentage, a tank fill percentage, etc.), services provided by the physical or logical asset (e.g., authentication, authorization, etc.), and/or services configured to communicate with the physical or logical asset. For example, the physical or logical asset may include at least some of the capabilities of the physical or logical asset in the announcement. The discovery service 2404 may also automatically infer capabilities of the physical or logical asset which are not included in the announcement. For example, when the physical or logical asset is a field device, the announcement may include primary variables retrievable from the field device, such as a mass flow rate of a fluid. The discovery service 2404 may also automatically infer contextual variables for the field device, such as a speed, a velocity, and/or density of the fluid. For example, when the physical or logical asset is a legacy device, the legacy device may not be configured to announce certain capabilities. Accordingly, the legacy device announces primary variables, and the discovery service 2404 automatically infers remaining capabilities or contextual variables which are not included in the announcement.

In another example, when the physical or logical asset is a field device, the field device may announce primary variables in an event driven data layer (EDDL), such as a valve position and an air pressure in the valve. The discovery service 2404 may automatically infer contextual variables for the field device, such as valve health metrics, valve travel metrics, etc.

More specifically, the discovery service 2404 may retrieve these capabilities from a context dictionary container 2408. The context dictionary container 2408 includes a context 2410 that infers a set of capabilities from a type of physical or logical asset. For each type of physical or logical asset, the context 2410 may include a list of each of the process parameters provided by the physical or logical asset, each of the services performed by the physical or logical asset, and each of the services within the SDCS that call on the physical or logical asset to communicate information.

The discovery service 2404 may provide the identity of the physical or logical asset to the context dictionary container 2408, and the context dictionary container 2408 may determine the type of physical or logical asset based on the identity. For example, the context dictionary container 2408 may store a set of rules for determining the type of physical or logical asset based on the identity of the physical or logical asset. More specifically, the context dictionary container 2408 may analyze the asset tag, serial number, or name of a service or subsystem associated with the physical or logical asset to determine the type of physical or logical asset. For example, if the asset tag for the physical or logical asset is "CTRL-VALVE-01," the context dictionary container 2408 may determine that the type of physical or logical asset is a control valve. The context dictionary container 2408 may store a list of physical or logical asset types and asset tags, serial numbers, names or portions thereof that correspond to each physical or logical asset type.

Then the context dictionary container 2408 automatically infers the set of capabilities from the type of physical or logical asset using the context 2410 and provides the set of capabilities inferred from the type of physical or logical asset to the discovery service 2404. The discovery service 2404 then stores a record of the physical or logical asset including the identity of the physical or logical asset, the location of the physical or logical asset, and/or the set of capabilities of the physical or logical asset in a discovered item data store.

When a physical or logical asset requests access to a node or service within the SDCS, the authentication service 2406 within the discovery service 2404 authenticates the physical or logical asset. For example, the authentication service 2406 authenticates the physical or logical asset by retrieving a cryptographic public key for the physical or logical asset included in the discovered item data store. The authentication service 2406 may then compare the retrieved cryptographic public key for the physical or logical asset to the cryptographic public key provided by the physical or logical asset in the request for access to the node or service to determine if there is a match. The authentication service 2406 may also analyze a digital signature provided by the physical or logical asset in the request for access to the node or service to determine whether the digital signature proves that the physical or logical asset is in possession of the cryptographic private key corresponding to the cryptographic public key. If both of these conditions are met, the authentication service 2406 may authenticate the physical or logical asset.

In another example, the authentication service 2406 authenticates the physical or logical asset by retrieving a PSK for the physical or logical asset from the discovered item data store. The authentication service 2406 may then attempt to decrypt the request for access to node or service using the retrieved PSK. If the authentication service 2406 successfully decrypts the request, the authentication service 2406 may authenticate the physical or logical asset.

While the authentication service 2406 is illustrated as being nested within the discovery service 2404, this is merely one example implementation for ease of illustration only. In other implementations, the authentication service 2406 is not nested within the discovery service 2404.

The location service 2412 may receive a request for the location of a physical or logical asset from a node or service within the SDCS. The location service 2412 may then obtain a record from the discovered item data store of the location of the physical or logical asset. For example, the location may be the network address for the physical or logical asset, such as an IP address or other identifier for the physical or logical asset within the process plant network 22, 25, 30, 32, 35, 42-58. In addition to the network location, the location may also include the physical location of the physical or logical asset such as a particular section of the process plant 10 where a physical asset is located or a physical location of a compute node that stores and/or executes a logical asset. The location service 2412 then provides location information for the physical or logical asset to the node or service that provided the request as a response to the request.

Figure 35:
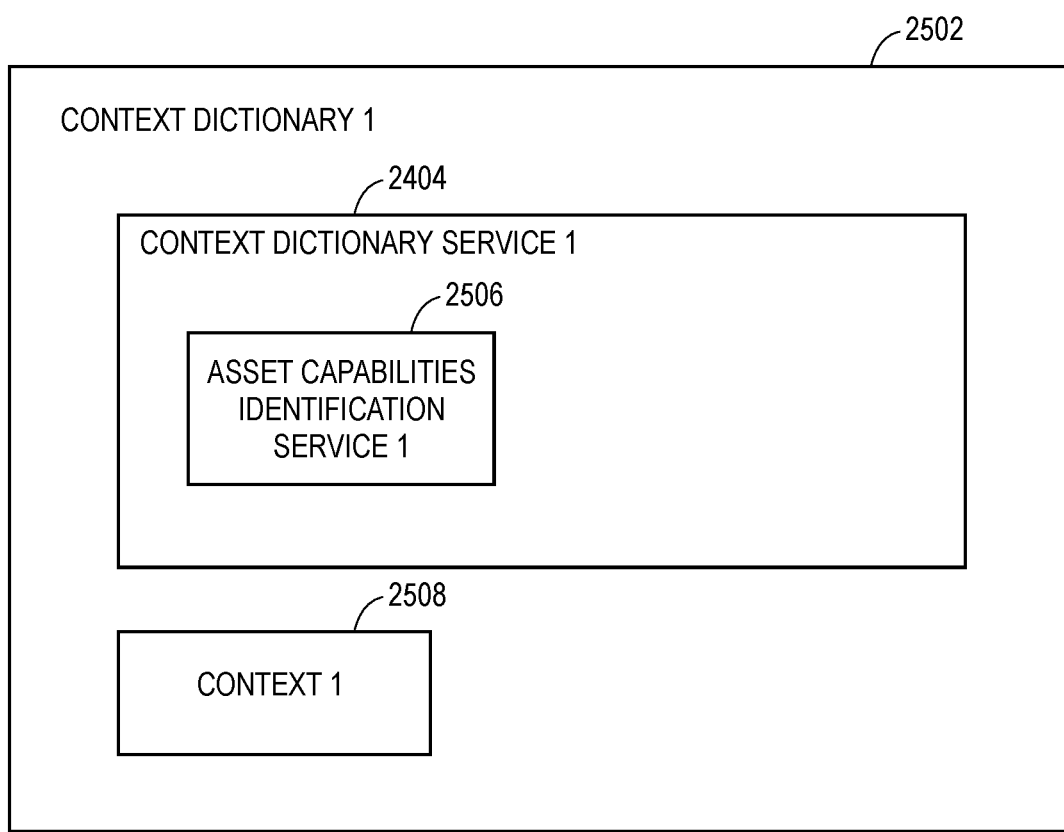
FIG. 35 depicts a block diagram of an example container configured to execute a context dictionary service.

FIG. 35 illustrates a detailed block diagram of an example context dictionary container 2502 similar to the context dictionary container 2408 of FIG. 34. As in the context dictionary container 2408, the context dictionary container 2502 includes a context dictionary service 2504 and a context 2508. The context dictionary service 2504 further includes an asset capabilities identification service 2506.

The asset capabilities identification service 2506 may determine the type of physical or logical asset based on the identity of the physical or logical asset. For example, the asset capabilities identification service 2506 may store a set of rules for determining the type of physical or logical asset based on the identity of the physical or logical asset. More specifically, the asset capabilities identification service 2506 may analyze the asset tag, serial number, or name of a service or subsystem associated with the physical or logical asset to determine the type of physical or logical asset. For example, if the asset tag for the physical or logical asset is "CTRL-VALVE-01," the asset capabilities identification service 2506 may determine that the type of physical or logical asset is a control valve. The asset capabilities identification service 2506 may store a list of physical or logical asset types and asset tags, serial numbers, names or portions thereof that correspond to each physical or logical asset type.

Additionally or alternatively, the asset capabilities identification service 2506 may analyze the primary variables for the physical or logical asset included in the announcement to determine the type of physical or logical asset, such as the primary variables included in an EDDL. For example, if a primary variable for the physical or logical asset is valve position, the asset capabilities identification service 2506 may determine that the physical or logical asset is a valve. In another example, if a primary variable for the physical or logical asset is a control service, the asset capabilities identification service 2506 may determine that the physical or logical asset is a control container. Some physical or logical assets may include a combination of capabilities, such as a valve position capability and a control service capability. In this case, the asset capabilities identification service 2506 may determine the type of physical or logical asset based on the combination of capabilities.

The asset capabilities identification service 2506 may then infer the capabilities from the type of physical or logical asset using the context 2508. For example, for a particular physical or logical asset, the announcement may indicate that the physical or logical asset can provide a first set of parameters related to control of the physical or logical asset. The context 2508 may further identify additional parameters related to maintenance of the physical or logical asset. In another example, the context 2508 may include mechanisms for accessing each of the additional parameters or services, such as mechanisms for accessing the maintenance parameters. A mechanism for accessing an additional parameter or service may be the format and/or content of a request to provide to the physical or logical asset to retrieve the additional parameter or service. In another example, the mechanism may be a reference number or identifier corresponding to the additional parameter or service which may be used to retrieve the additional parameter or to have the physical or logical asset perform the additional service.

FIG. 36 illustrates a detailed block diagram of an example context 2602 similar to the context 2508 of FIG. 35. The context 2602 may include a data table 2604 that associates device types with a class contexts. More specifically, the data table 2604 may include device types, primary variables, and contextual variables. For example, when the device type is a thermocouple, the primary variable may be temperature and the contextual variables may include device health metrics for the thermocouple and a device tolerance indicative of the variability of the thermocouple. When the device type is a mass flow sensor, the primary variable may be mass flow and the contextual variables may include fluid speed, fluid velocity, and fluid density. In another example, when the device type is a valve, the primary variables may include the valve position and the air pressure in the valve. The contextual variables may include valve health metrics, valve travel metrics, a mode of operation of the valve such as full stroke cycling, continuous throttling, periodic throttling, etc., and conditions in the valve such as dead band and dead time. Additionally, the contextual variables may include services that the valve can perform such as a valve monitoring service and/or services that may utilize the primary or contextual variables from the valve.

The SDCS may also include a recommender service that obtains the primary and contextual variables for a physical or logical asset from the context dictionary service 2504 and/or the discovery service 2404 and recommends features to a user during a configuration. For example, when a user configures a new valve to the SDCS, the context dictionary service 2504 may detect from the contextual variables for the new valve that there is a readback value. As the user configures the new valve, the recommender service may remind that user that there is an unused valve position readback value that is available but unused for example, when the user attempts to commit the configuration to the process control configuration service. In this manner, when the user does not know the full capabilities of a physical or logical asset, the recommender service allows the user to learn the capabilities of physical or logical asset without having to read the manual for each of the assets configured or commissioned within the SDCS.

Figure 37:
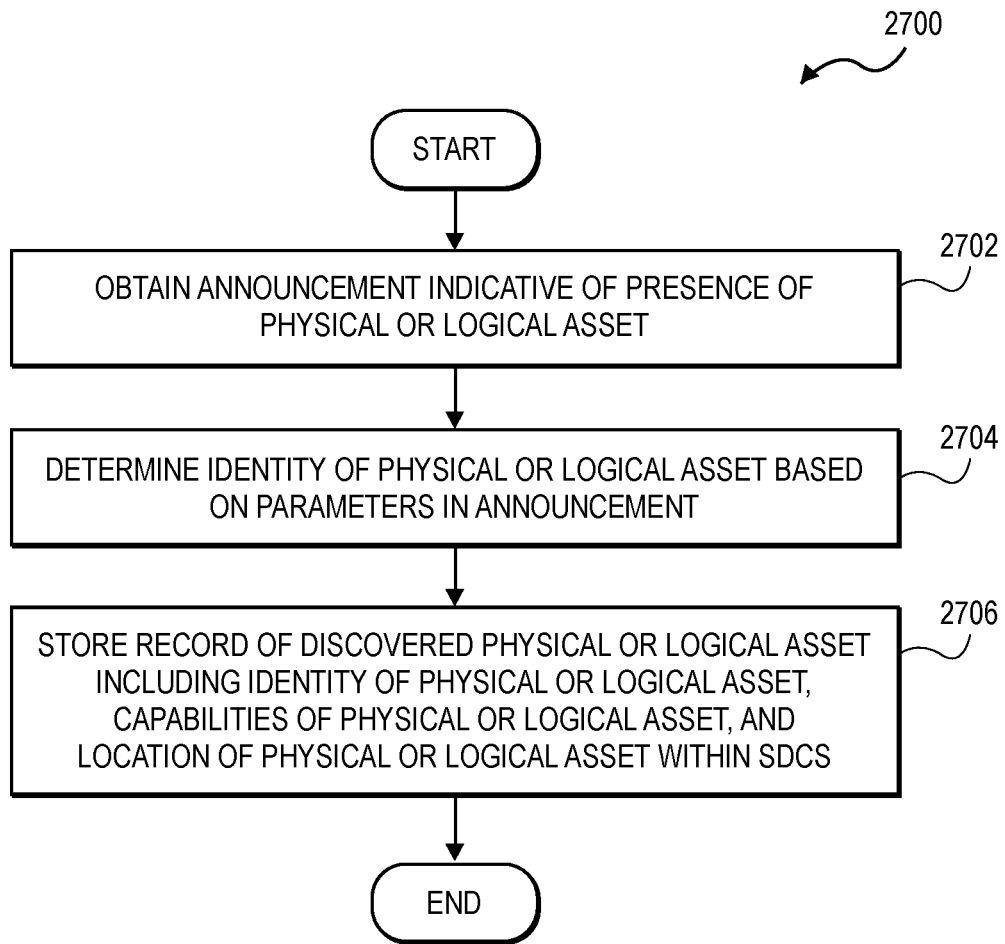
FIG. 37 depicts a flow diagram representing an example method for providing discovery software as a service in a process plant.

FIG. 37 illustrates a flow diagram representing an example method 2700 for providing discovery software as a service in a process plant 10. The method may be executed by a discovery service.

At block 2702, the discovery service obtains an announcement indicative of the presence of a physical or logical asset. When a new physical or logical asset, such as a field device, process control device, compute node, containers, service, microservice, etc. is added to the process plant network 22, 25, 30, 32, 35, 42-58, the new physical or logical asset may announce its presence by for example, broadcasting its network address to nodes or services connected to the process plant network 22, 25, 30, 32, 35, 42-58. In other implementations, the discovery service may broadcast a request to each of the physical or logical assets in the process plant network 22, 25, 30, 32, 35, 42-58 to announce their presence.

The announcement may include an identifying parameter for the physical or logical asset such as an asset tag of the physical or logical asset, a MAC address of the physical or logical asset, a network address of the physical or logical asset, a cryptographic key for the physical or logical asset, a serial number for the physical or logical asset, and/or a name of a service or subsystem associated with the physical or logical asset. The announcement may also include a network address for the physical or logical asset or any other suitable location information for the physical or logical asset including physical or network location information. Additionally, the announcement may include capabilities of the physical or logical asset, such as process parameters that the physical or logical asset is configured to provide, services that the physical or logical asset is configured to provide, or services configured to communicate with the physical or logical asset.

At block 2704, the discovery service determines the identity of the physical or logical asset based on the identifying parameters included in the announcement. In some implementations, the discovery service determines the identity of the physical or logical asset based on one of the identifying parameters which uniquely identifies the physical or logical asset (e.g., a MAC address). In other implementations, the discovery service determines the identity of the physical or logical asset based on a combination of the identifying parameters. For example, the serial number may correspond to multiple assets having the same make and model. Accordingly, the discovery service may determine the identity of the physical or logical asset based on a combination of the serial number and the cryptographic key for the physical or logical asset.

Then at block 2706, the discovery service stores a record of the physical or logical asset in a discovered item data store. The record may include an indication of the identity of the physical or logical asset, a set of capabilities of the physical or logical asset, and a location of the physical or logical asset within the SDCS. The set of capabilities of the physical or logical asset may include the capabilities included in the announcement. The set of capabilities may also include capabilities automatically inferred by the discovery service which are not included in the announcement.

More specifically, the discovery service may retrieve these capabilities from a context dictionary container. The context dictionary container includes a context that infers a set of capabilities from a type of physical or logical asset. For each type of physical or logical asset, the context may include a list of each of the process parameters provided by the physical or logical asset, each of the services performed by the physical or logical asset, and each of the services within the SDCS that call on the physical or logical asset to communicate information.

Figure 38:
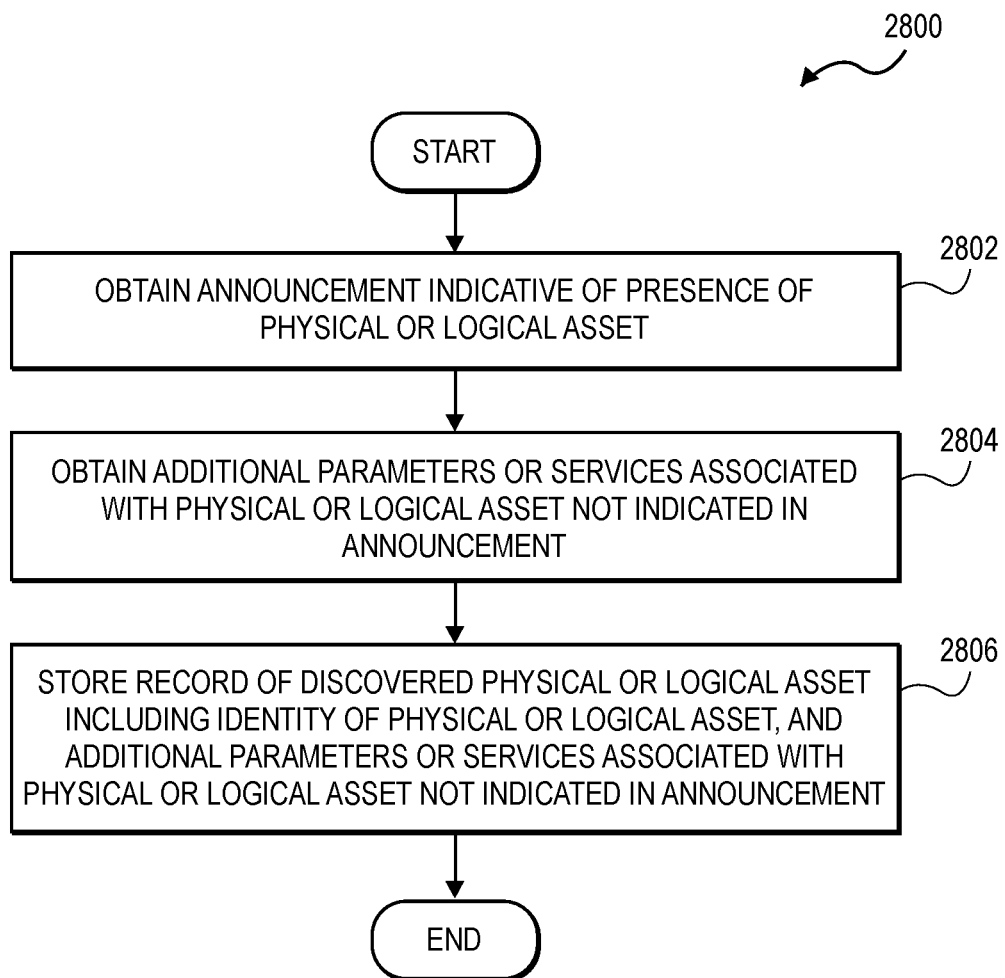
FIG. 38 depicts a flow diagram representing an example method for inferring information regarding a physical or logical asset of a process plant using a context dictionary.

FIG. 38 illustrates a flow diagram representing an example method 2800 for inferring information regarding a physical or logical asset of a process plant using a context dictionary. The method may be executed by a discovery service.

At block 2802, the discovery service obtains an announcement indicative of the presence of a physical or logical asset. When a new physical or logical asset, such as a field device, process control device, compute node, containers, service, microservice, etc. is added to the process plant network 22, 25, 30, 32, 35, 42-58, the new physical or logical asset may announce its presence by for example, broadcasting its network address to nodes or services connected to the process plant network 22, 25, 30, 32, 35, 42-58. In other implementations, the discovery service may broadcast a request to each of the physical or logical assets in the process plant network 22, 25, 30, 32, 35, 42-58 to announce their presence.

The announcement may include an identifying parameter for the physical or logical asset such as an asset tag of the physical or logical asset, a MAC address of the physical or logical asset, a network address of the physical or logical asset, a cryptographic key for the physical or logical asset, a serial number for the physical or logical asset, and/or a name of a service or subsystem associated with the physical or logical asset. The announcement may also include a network address for the physical or logical asset or any other suitable location information for the physical or logical asset including physical or network location information. Additionally, the announcement may include capabilities of the physical or logical asset, such as process parameters that the physical or logical asset is configured to provide, services that the physical or logical asset is configured to provide, or services configured to communicate with the physical or logical asset.

At block 2804, the discovery service obtains additional parameters or services associated with the physical or logical asset that were not included as capabilities of the physical or logical asset in the announcement. More specifically, the discovery service may retrieve the additional parameters or services from a context dictionary container.

The context dictionary container includes a context that infers a set of capabilities from a type of physical or logical asset. For each type of physical or logical asset, the context may include a list of each of the process parameters provided by the physical or logical asset, each of the services performed by the physical or logical asset and each of the services within the SDCS that call on the physical or logical asset to communicate information.

The discovery service may provide the identity of the physical or logical asset to the context dictionary container, and the context dictionary container may determine the type of physical or logical asset based on the identity. For example, the context dictionary container may store a set of rules for determining the type of physical or logical asset based on the identity of the physical or logical asset. More specifically, the context dictionary container may analyze the asset tag, serial number, or name of a service or subsystem associated with the physical or logical asset to determine the type of physical or logical asset. For example, if the asset tag for the physical or logical asset is "CTRL-VALVE-01," the context dictionary container may determine that the type of physical or logical asset is a control valve. The context dictionary container may store a list of physical or logical asset types and asset tags, serial numbers, names or portions thereof that correspond to each physical or logical asset type.

Then the context dictionary container automatically infers the set of capabilities from the type of physical or logical asset using the context and provides the set of capabilities inferred from the type of physical or logical asset to the discovery service. For example, for a particular physical or logical asset, the announcement may indicate that the physical or logical asset can provide a first set of parameters related to control of the physical or logical asset. The context may further identify additional parameters related to maintenance of the physical or logical asset. In another example, the context may include mechanisms for accessing each of the additional parameters or services, such as mechanisms for accessing the maintenance parameters.

Then at block 2806, the discovery service stores a record of the physical or logical asset in a discovered item data store. The record may include an indication of the identity of the physical or logical asset, and the additional parameters or services associated with the physical or logical asset which were not included in the announcement. The record my also include the capabilities included in the announcement.

Figure 39:
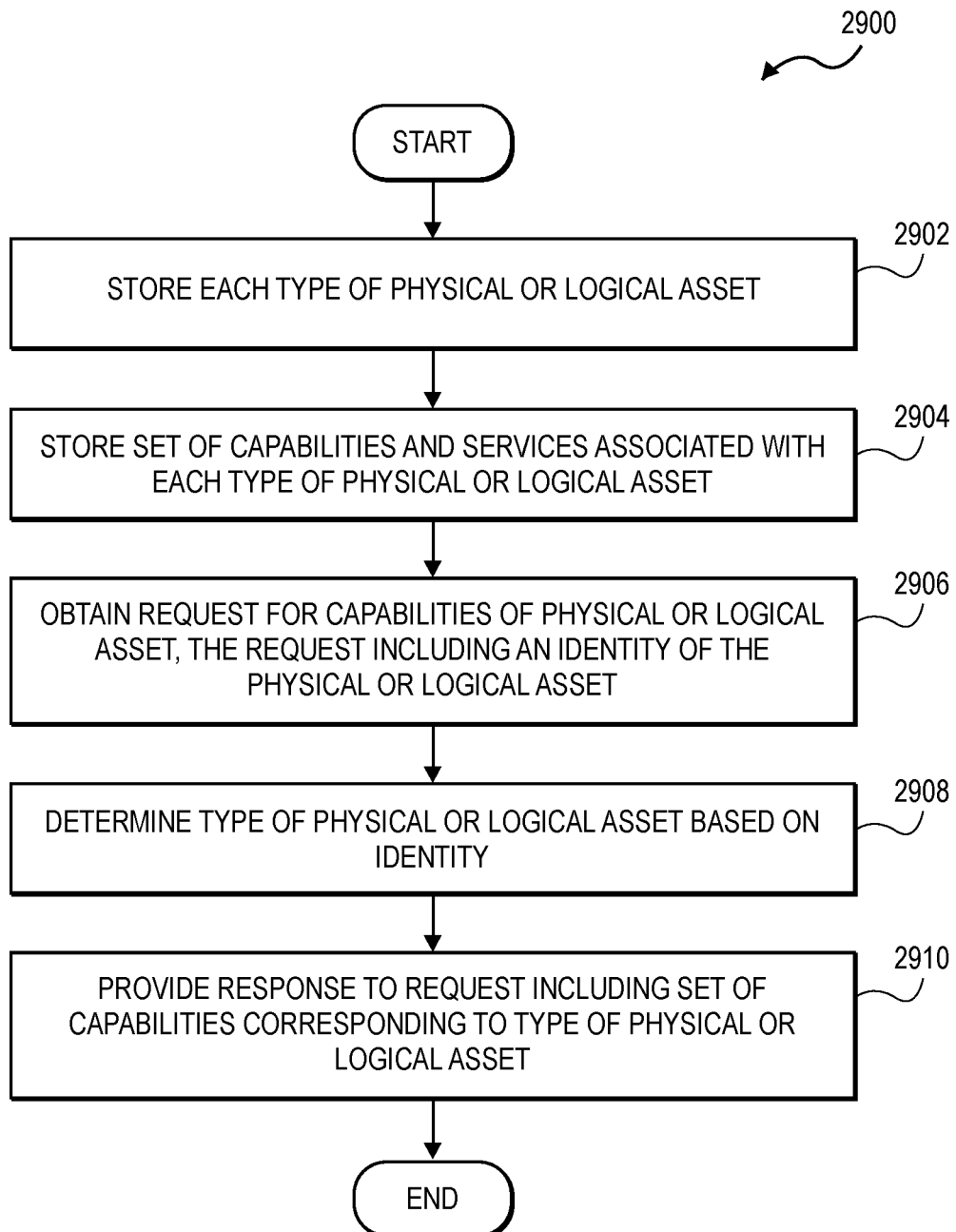
FIG. 39 depicts a flow diagram representing an example method for mapping a set of capabilities to each type of physical or logical asset in a process plant and determining the capabilities of a discovered physical or logical asset.

FIG. 39 illustrates a flow diagram representing an example method 2900 for inferring a set of capabilities from each type of physical or logical asset in a process plant and determining the capabilities of a discovered physical or logical asset. The method may be executed by a context dictionary service.

At block 2902, the context dictionary service stores each type of physical or logical asset of the process plant 10. Then for each type of physical or logical asset, the context dictionary service stores a set of capabilities of the type of physical or logical asset (block 2904). The set of capabilities may include parameters retrievable from the type of physical or logical asset and services associated with the type of physical or logical asset, such as services performed by the physical or logical asset or services that communicate with the physical or logical asset. The context dictionary service may infer corresponding capabilities for each type of physical or logical asset using a context.

Then at block 2906, the context dictionary service obtains a request for the capabilities of a particular physical or logical asset. The request may include identification information for the physical or logical asset, such as an asset tag, a MAC address of the physical or logical asset, a network address of the physical or logical asset, a cryptographic key for the physical or logical asset, a serial number for the physical or logical asset, and/or a name of a service or subsystem associated with the physical or logical asset. The request may be provided by the discovery service. In other scenarios, the request may be provided by a node or service within the SDCS attempting to locate a particular physical or logical asset having a specific capability. In yet other scenarios, the request may be provided by a node or service within the SDCS interested in accessing process parameters or services provided by the physical or logical asset.

In response to the request, the context dictionary service determines the type of physical or logical asset based on the identification information for the physical or logical asset (block G2908). For example, the context dictionary service may store a set of rules for determining the type of physical or logical asset based on the identity of the physical or logical asset. More specifically, the context dictionary service may analyze the asset tag, serial number, or name of a service or subsystem associated with the physical or logical asset to determine the type of physical or logical asset. The context dictionary service may store a list of physical or logical asset types and asset tags, serial numbers, names or portions thereof that correspond to each physical or logical asset type.

Then at block 2910, the context dictionary service may infer the set of capabilities from the type of physical or logical asset using the context. The context dictionary service may then provide a response to the request that includes the set of capabilities corresponding to the type of physical or logical asset.

In some implementations, the context dictionary service executes via a first container nested in a second container for a discovery service. In other implementations, the context dictionary service and discovery service do not execute in nested containers.

Figure 40:
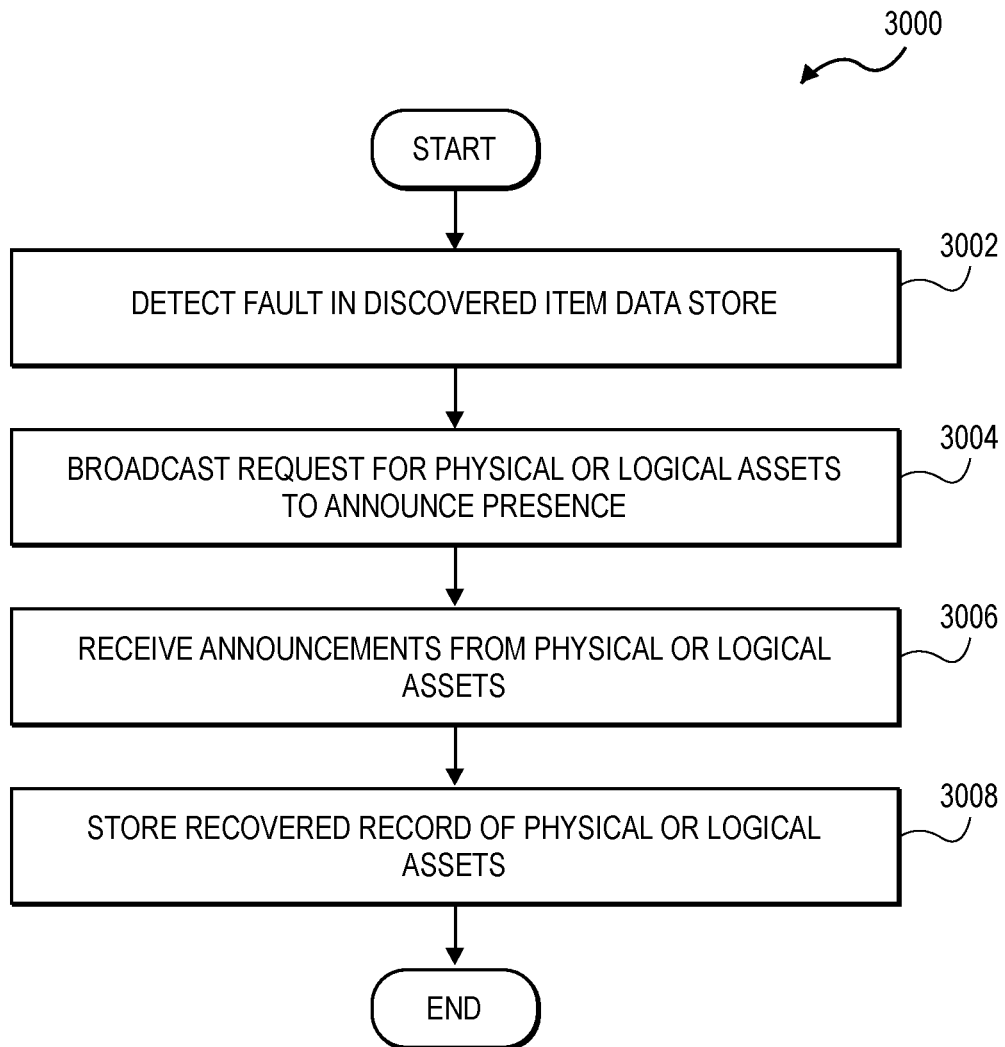
FIG. 40 depicts a flow diagram representing an example method for fault recovery of discovered items in a process plant.

FIG. 40 illustrates a flow diagram representing an example method 3000 for fault recovery of discovered items in a process plant 10. The method may be executed by a discovery service.

At block 3002, a fault is detected in a discovered item data store. For example, the discovered item data store may be corrupted, destroyed, missing records of physical or logical asset. Additionally, the discovered item data store may have been reset for example, due to a power outage. In response to detecting the fault, the discovery service broadcasts a request to physical or logical assets within the process plant 10 to announce their presence (block 3004).

In response to the request, the discovery service receives announcements from the physical or logical assets in the process plant 10 (block 3006). Each announcement may include an identifying parameter for the physical or logical asset such as an asset tag of the physical or logical asset, a MAC address of the physical or logical asset, a network address of the physical or logical asset, a cryptographic key for the physical or logical asset, a serial number for the physical or logical asset, and/or a name of a service or subsystem associated with the physical or logical asset. The announcement may also include a network address for the physical or logical asset or any other suitable location information for the physical or logical asset including physical or network location information. Additionally, the announcement may include capabilities of the physical or logical asset, such as process parameters that the physical or logical asset is configured to provide, services that the physical or logical asset is configured to provide, or services configured to communicate with the physical or logical asset.

Then at block 3008, the discovery service stores a recovered record of the physical or logical assets in a discovered item data store. For each physical or logical asset, the recovered record may include an indication of the identity of the physical or logical asset, a set of capabilities of the physical or logical asset, and a location of the physical or logical asset within the SDCS. The set of capabilities of the physical or logical asset may include the capabilities included in the announcement. The set of capabilities may also include capabilities automatically inferred by the discovery service which are not included in the announcement. In this manner, the record of the physical or logical assets is automatically received without requiring manual input.

As mentioned above, the discovery service may assist in the commissioning of physical or logical assets within the process plant 10, so that the SDCS may automatically commission physical or logical assets without manual input. While the SDCS and more specifically, an I/O server service, may commission physical or logical assets in response to the discovery service discovering the physical or logical assets, this is merely one example implementation. In other implementations, other services may identify physical or logical assets within the process plant 10 such as a process control configuration service.

Figure 41:
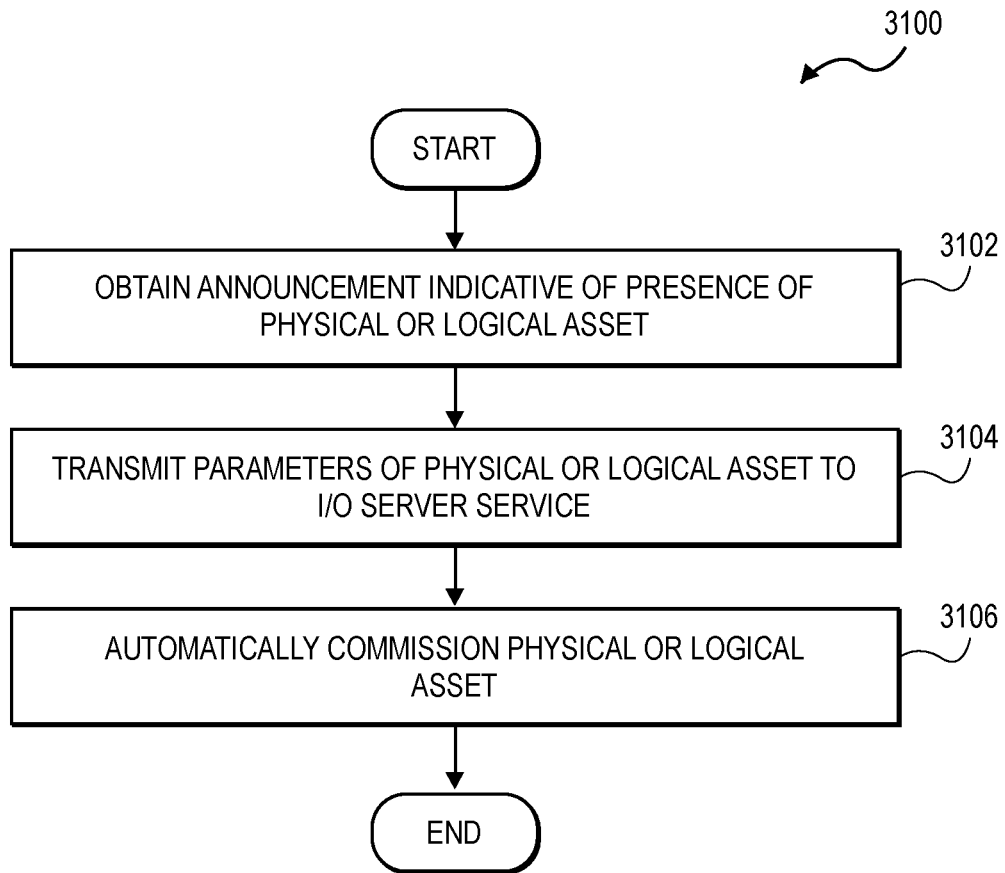
FIG. 41 depicts a flow diagram representing an example method for automatically commissioning an SDCS.

FIG. 41 illustrates a flow diagram representing an example method 3100 for automatically commissioning an SDCS. The method may be executed by a discovery service, a process control configuration service, an I/O server service, or any suitable combination of these.

At block 3102, an announcement indicative of the presence of a physical or logical asset is obtained. When a new physical or logical asset, such as a field device, process control device, compute node, containers, service, microservice, etc. is added to the process plant network 22, 25, 30, 32, 35, 42-58, the new physical or logical asset may announce its presence by for example, broadcasting its network address to nodes or services connected to the process plant network 22, 25, 30, 32, 35, 42-58. In other implementations, the discovery service may broadcast a request to each of the physical or logical assets in the process plant network 22, 25, 30, 32, 35, 42-58 to announce their presence.

The announcement may include identifying parameters for the physical or logical asset such as an asset tag of the physical or logical asset, a MAC address of the physical or logical asset, a cryptographic key for the physical or logical asset, a serial number for the physical or logical asset, and/or a name of a service or subsystem associated with the physical or logical asset. The announcement may also include a network address for the physical or logical asset or any other suitable location information for the physical or logical asset including physical or network location information. For example, the location information may also include the physical location of the physical or logical asset such as a particular section of the process plant 10 where a physical asset is located or a physical location of a compute node that stores and/or executes a logical asset.

At block 3104, the identifying parameters and location parameters for the physical or logical asset are transmitted to an I/O server service, such as the I/O server service 242 of FIG. 2. The discovery service or process control configuration service may transmit each of the identifying parameters for the physical or logical asset included in the announcement to the I/O server service or may transmit a subset of the identifying parameters included in the announcement which may be used to uniquely identify the physical or logical asset. Additionally, the discovery service or process control configuration service may transmit location information to the I/O server service so that the I/O server service may communicate with the physical or logical asset.

At block 3106, the I/O server service may automatically commission the physical or logical asset based on the identification information and the location information. Commissioning may include actions or activities, such as verifying or confirming the identity of the physical or logical asset, generating tags that unique identify the physical or logical asset within the process plant 10, and performing tests to ensure that the I/O server service is in communication within the physical or logical asset.

The I/O server service may generate a tag for uniquely identifying the physical or logical asset based on the identifying parameters for the physical or logical asset. For example, as mentioned above, the identifying parameters for the physical or logical asset may include an asset tag such as "CTRL-VALVE," and the process plant 10 may include several control valves having the same asset tag. The I/O server service may generate the tag for the valve based on a combination of the asset tag and the cryptographic public key for the valve. For example, if the last four characters of the cryptographic public key for the valve are "xg4t," the tag may be "CTRL-VALVE-xg4t."

In other implementations, the I/O server service may generate tags for control valves that include the string "CTRL-VALVE" followed by a number which has not been used to identify another valve in the process plant 10. If for example, there are four control valves, the tags may be "CTRL-VALVE-01," "CTRL-VALVE-02," "CTRL-VALVE-03," and "CTRL-VALVE-04." The I/O server service may determine that a physical or logical asset has not already been assigned a unique tag by comparing the identifying parameters for the physical or logical asset to the identifying parameters for physical or logical assets that have been assigned tags. If the identifying parameters do not match, the I/O server service may assign a new unique tag to the physical or logical asset, such as "CTRL-VALVE-05."

In another example, two physical or logical assets may be valves having the same serial number which is a part number. The two valves may be uniquely identified based on a combination of the serial number and cryptographic keys for the two valves. Accordingly, the I/O server service may generate the tags for each valve based on the combination of the serial number and cryptographic keys for each valve.

Then the I/O server service may store the tag in association with the location information for the physical or logical asset in a data store, which may be used as a reference for communicating with the physical or logical asset.

To test the physical or logical asset, the I/O server service may transmit data to the physical or logical asset or request information from the physical or logical asset using the location information. If the I/O server service is able to successfully communicate with the physical or logical asset, the I/O server service may determine that the physical or logical asset has been successfully commissioned. In some implementations, the I/O server service may request a particular parameter from the physical or logical asset (e.g., a mass flow rate), and may generate and store signal tags for particular parameters or services associated with the physical or logical asset. A signal tag may include a combination of the tag for the physical or logical asset and an identifier of the particular parameter or service. In other implementations, the I/O server service does not store signal tags.

To verify or confirm the identity of the physical or logical asset, the I/O server service may for example, obtain a cryptographic public key or PSK for the physical or logical asset from the identifying parameters. The I/O server service may encrypt the request for information using the cryptographic public key or PSK, and if the I/O server service receives a response to the request from physical or logical asset, the I/O server service determines that the physical or logical asset was able to decrypt the request using the cryptographic public key or PSK. As a result, the I/O server service verifies the identity of the physical or logical asset.

As noted above, the system orchestrator 222 controls or manages the allocation of the various logical entities, including containers, to various ones of the data center clusters 208 and ultimately to individual computing devices, such as servers (and even to processors or cores of processors in a server of a data cluster 208), and may perform this assignment during the runtime operation of the control system in order to assure operation of the control system when various physical devices (such as servers) fail, are taken out of service, become overloaded, are running slowly, etc. This dynamic and runtime allocation is very much different than past control system architectures in which the physical assets or computing devices that implemented a logical element, such as a control module or a control routine, where specified by the configuration system and did not change during run-time. As such, in this new system architecture, a user may not know where a specific logical element, such as a controller, or a container associated with a controller, is being executed or implemented at any particular time, much less know or be able to easily determine health or performance statistics associated with such a logical element (such as communication bandwidth or message rates). Moreover, it will not be easy for a user obtain performance or health indicators for the physical device in which a particular logical element is currently executing, such as latency, efficiency, load, etc., as a user will not be able to know, from the configuration system alone, what logical elements are currently operating on any particular physical device or physical node at any given time.

In many cases, however, it is important that a user, such as a control system operator, a maintenance person, etc., be able to view the current operational status of one or more logical elements of the control system in order to view and/or diagnose the current operational status of the process control system or to diagnose a problem within the process control system. Still further, a user may need to know what logical elements are currently executing on a particular physical device or physical node in order to perform servicing, updating, or other maintenance or repair activities at or on that device or node. Still further, as noted above, it may be important to easily visualize the current configuration of the logical elements within the plant, including the manner in which the logical elements, e.g., the containers, of the process control system are nested or pinned to one another and/or the manner in which these logical elements are pinned to particular hardware components.

Figure 42:
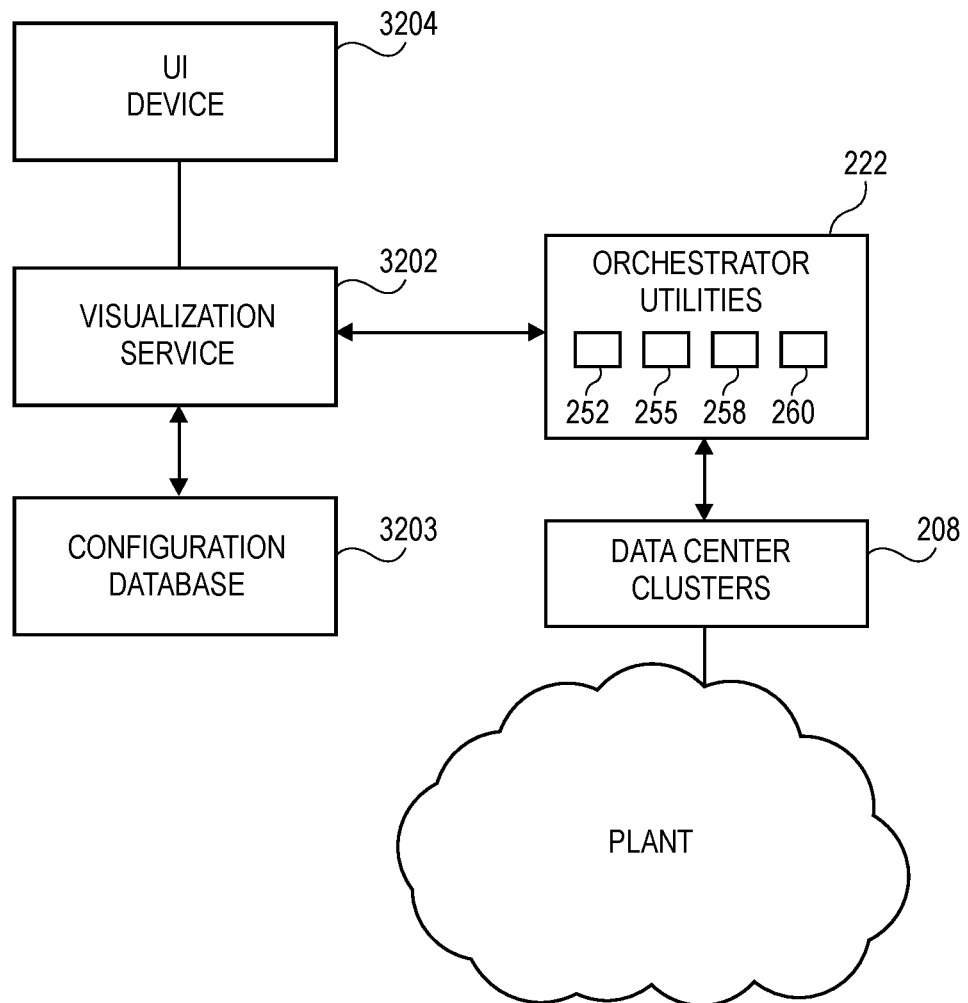
FIG. 42 depicts a diagram of a visualization service or utility, connected to a configuration database and an orchestrator, which may be used to provide current logical and physical configuration and runtime information to a user, in addition to various performance indicators associated with logical and physical elements of the system.

To assist a user in viewing the current runtime operation of a control system using the new system architecture described herein, a visualization service, which may be one of the services 240 of FIG. 2, may be provided to generate one or more system configuration and/or runtime visualizations for a user (via a user interface) to assist the user in understanding the currently configured and operational relationships between the various logical and physical elements of the control system as well as to view one or more performance indicators for the logical and physical elements. In particular, a visualization (or user interface) service 3202 is illustrated in FIG. 42 which is executed on a computer processor and which operates to interrogate or otherwise communicate with the orchestrator 222 as well as one or more of the orchestrator subsystems 252, 255, 258, 260 and discover, at any particular time, which logical elements are being hosted or executed on which physical devices, in additional to various health and/or performance statistics or indices associated with those logical elements and/or physical devices. In some cases, the visualization service 3202 may additionally communicate with a configuration database 3203 to obtain logical and physical element configuration information and to create a configuration/runtime visualization of the control system (including both logical and physical elements) that enables a user to view information identifying the various configuration and runtime details of the currently configured interplay between the logical elements (with each other) and between the logical elements and the physical elements of the control system. In some cases, this configuration interface may enable a user to change configuration details (such as pinning and nesting of logical and/or physical elements) on the fly or during run-time.

FIG. 42 depicts the visualization service or utility 3202 (that executes on a computer processor) as communicating with the orchestrator 222 of FIG. 1 as well as, if necessary, the configuration database 3203, to discover configuration and runtime information for the various logical and physical elements. The visualization service 3202 may subscribe to information from the orchestrator 222 for active visualizations, and/or may send one or more queries to the orchestrator 222 (and the configuration database 3203) when generating a visualization for a user via a user interface 3204. In any event, the visualization service 3202 executes to display both logical and physical information about the control system to a user via the user interface device 3204 (which may be any type of user interface, such as a laptop, a wireless device, a phone application, a workstation, etc.)

and may display control system information in an interactive manner, so as to enable the user to view configured, as well as the current run-time operation of the various logical elements within the plant, and of the physical elements to which these logical elements are currently assigned. In particular, the visualization service 3202 may present one or more screens to a user via the user interface device 3204 displaying one or more logical and/or physical elements of the control system and may enable the user to select any of various logical and/or physical elements of the control system, as currently being implemented, to indicate more detail about the configuration and/or runtime information the user wishes to see. The visualization service 3202 then obtains, from the orchestrator 222, runtime information for the selected logical and/or physical elements including, for example, the manner in which the logical elements (e.g., containers, such as control containers) are nested within or pinned to one another, the manner in which the logical elements are being executed in or on various physical elements, and/or one or more performance indicators that indicates the operational health or performance of the logical and/or physical elements as currently operating. The visualization service 3202 presents this information to the user in one or more screen displays and may, in some cases, enable the user to interact via a screen display to view other information, and to dynamically change the operation of the control system in terms of how one or more of the logical elements are assigned to other logical elements or to physical elements.

Figure 43:
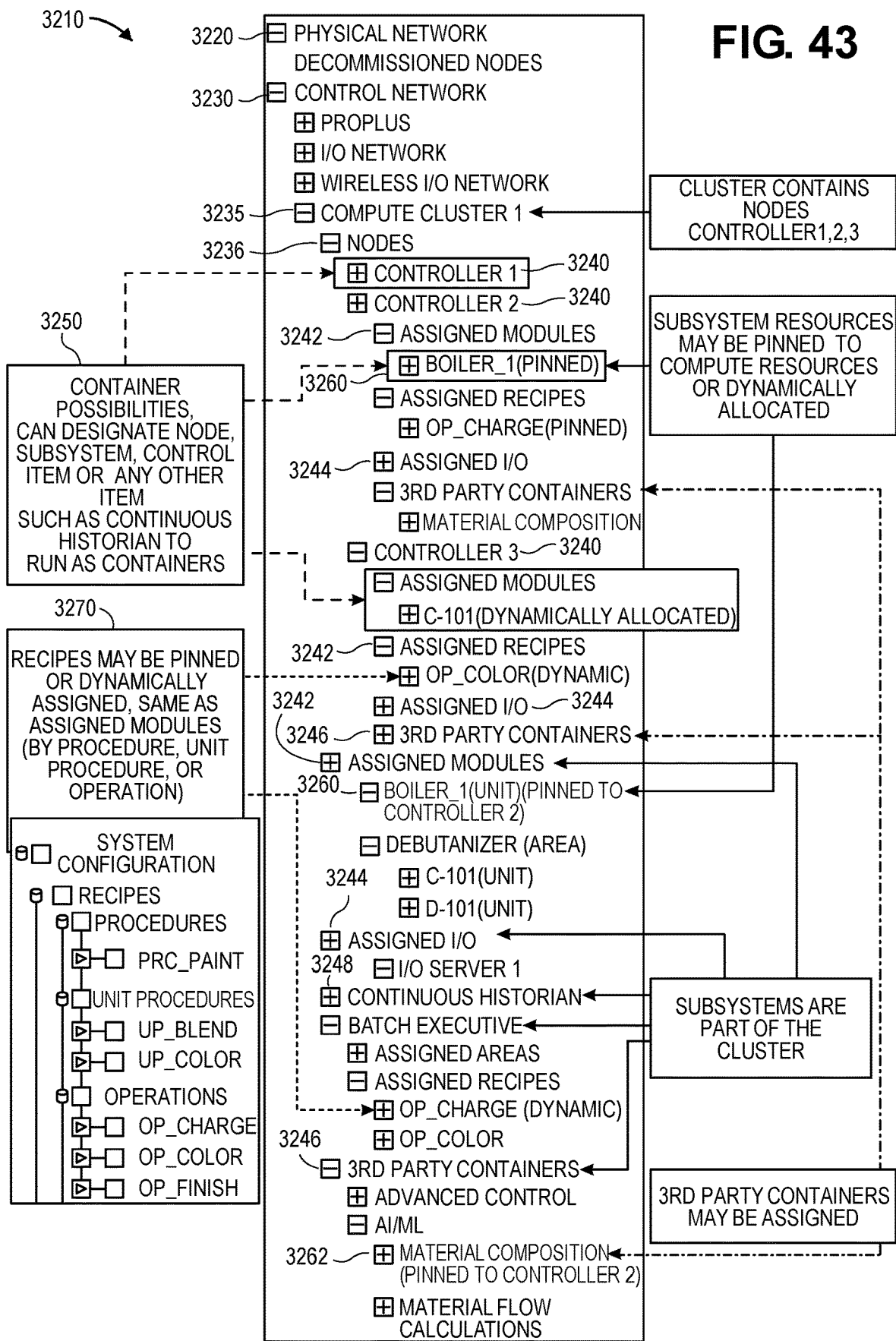
FIG. 43 depicts a first screen display that may be presented by the visualization service of FIG. 42 to illustrate, in a hierarchical view, the configured and runtime interactions of logical and physical elements in a control system.

In one example, the utility 3202 may obtain configuration information, such as a configuration hierarchy, from the configuration database 3203 in addition to obtaining runtime information from the orchestrator 222 and may present a configuration hierarchy (including both configuration information and runtime assignment information) to the user to enable the user to view various configured elements of the control system as they are currently operating or executing within the plant or control system. FIG. 43 illustrates an example configuration/runtime hierarchy 3210 that may be provided to a user. In this case, the hierarchy 3210 includes both physical and logical elements in a familiar structure and enables a user to drill down in the hierarchy 3210 to view more information about any of the upper or higher level logical and physical element information to see more information about the system as currently configured and as currently operating during run-time. In particular, in the example of FIG. 43, the hierarchy 3210 depicts both logical elements (including containers associated with the various control, subsystem and I/O services) and physical elements (e.g., data clusters, compute nodes, etc.) Generally, as noted above, the software defined control system, when configured, divides the physical nodes into micro-services (containers) and then run these containers on one or more clusters of computing nodes, some of which are chosen by the orchestrator 222 during runtime. The hierarchy 3210 of FIG. 43 illustrates this configuration, as the hierarchy 3210 includes a Physical Network element 3220 and a Control Network element 3230. The Physical Network element 3220 may, when expanded, details or lists, in a hierarchical manner, the physical interconnections of the physical elements or devices associated with the software defined control system, including any of the field devices (valves, transmitters, etc.), physical I/O devices, network switches, data center clusters and their components, user interfaces, historians, etc. In one example, the data center clusters can each include a collection of physical nodes (i.e., a collection of servers), wherein each server can be located in a specific blade of a rack of servers (which may or may not all be part of the same cluster). Moreover, each server can have one or more processors, and each processor may have one or more cores, and all of these various elements can be specified or illustrated under or as part of the Physical Network element 3220. Still further, if desired, each node or rack of nodes could be associated with one or more particular power supplies, such that a power supply may supply an entire rack, or only certain nodes on the rack, so that the nodes in a single rack could have power supply redundancy. In any event, this and other physical configuration information could be illustrated in the hierarchy 3210 under the Physical Network element 3220.

Still further, in the example display 3210 of FIG. 43, the Control Network element 3230 includes various different physical and logical components therein, including a user interface (ProPlus station), an I/O network (with tags), a wireless I/O network, and one or more compute clusters (with Compute Cluster 1, labeled with reference number 3235, shown in FIG. 43). Still further, the each compute cluster may have multiple nodes 3236 associated therewith or thereunder, with one of these nodes 3236 being illustrated in FIG. 43. Thus upper level elements of the Control Network element 3230 are generally physical elements. However, as described earlier and as illustrated in the hierarchy 3210, each node 3236 may have various logic elements (e.g., containers) assigned thereto or associated therewith, including, for example, controller containers 3240 which specify different configured controllers (which are logical elements in the SDCS architecture), control subsystem containers such as assigned modules 3242, assigned I/O containers 3244, third party containers 3246, area containers 3247, historian containers 3248, etc. The box 3250 in FIG. 43 points to some but not all of the containers indicated in the hierarchy 3210. It will be noted that the hierarchy 3210 of FIG. 43 illustrates both configured hardware components and configured logical elements, including containers. Still further, and importantly, the hierarchy 3210 of FIG. 43 illustrates the manner in which the various containers shown therein are nested or pinned to other containers and/or to physical elements under the different hierarchical layers. For example, the assigned module of Boiler_1 (3260) is pinned to the Controller 2 container 940 (as illustrated in multiple locations in the hierarchy 3210 by the reference number 3260) and the third party container Material Composition is pinned to Controller 2 as indicated at the reference number 3262). As will also be understood, the containers listed in the hierarchy 3210 below another container are nested within the upper level container at the time of the rendering of the hierarchy 3210. This nesting may be a result of the pinning of the element or a result of the run-time placement of the element by the orchestrator 222. Thus, the hierarchy 3210 may be used to indicate the configured operation of the system (in terms of how the containers are pinned with respect to one another or to particular hardware elements) and the runtime operation of the system (in terms of how containers are nested within other containers and are being executed in particular hardware or physical components). Moreover, the hierarchy 3210 can indicate the current operational configuration of the control system in terms of logical elements that are assignable during run-time operation, such as by illustrating the controller or the module to which a particular assignable container is currently assigned, and/or the physical element to which a particular container is currently assigned.

Still further, the hierarchy 3210 may indicate that various containers are dynamically assignable by the user, such as via the interaction of the elements within the hierarchy 3210. For example, the hierarchy 3210 of FIG. 43 indicates that various recipes 3270 are dynamically assignable containers. In some cases, the user interface application may enable a user to reassign a container (such as a recipe or other dynamically assignable container) by selecting the element in the hierarchy 3210 and dragging and dropping the element under or within a new logical or physical entity within the hierarchy 3210. Of course, other manners of performing a dynamic reassignment of a logical element to another logical element or to a physical element may be used as well (e.g., drop down menus, new windows, etc.)

Thus, as illustrated in the hierarchy 3210 of FIG. 43, control items such as Areas, Units, Equipment Modules, and Modules may be associated with a physical control cluster. Once assigned, a control item, for example Unit C-101, stays together as a control strategy. Because in this example, Unit C-101 has not been pinned, it may be allocated to any of the controller nodes (compute nodes). Unit BOILER_1, on the other hand, has been pinned to Controller 2. If the hardware node to which Controller 2 is assigned fails, then everything pinned to Controller 2 will migrate (based on the actions of the orchestrator 222) to another server or node with free resources. Dynamically assignable control items, on the other hand, may be dynamically allocated to any controller with free resources.

The same approach described above for control items is also used for history, alarms & events, batch, continuous historian, and other subsystem containers. Subsystems are run in separate containers and may be pinned to controller/compute nodes or they may be dynamically allocated. Thus, following the description above, all subsystems are treated as containers. As a further allocation, control items from the control strategies hierarchy may be assigned to the compute cluster and then pinned or dynamically assigned to compute nodes (e.g., by using a drag and drop technique in the hierarchy 3210). Similarity, I/O containers may be assigned to a compute cluster and dynamically assigned as the control items are dynamically assigned. Going further, micro-containers may run on I/O devices.

In any event, as will be understood, the visualization service 3202 may create the hierarchy 3210 so that the hierarchy 3210 indicates (1) the permanently configured (non-changeable or pinned) relationships between physical and logical elements and between logical elements and other logical elements, (2) the temporarily configured (user assignable or dynamically assignable during run-time) relationships between physical and logical elements and between logical elements and other logical elements, and (3) the run-time or current relationships as currently assigned by the orchestrator 222 during runtime between physical and logical elements and between logical elements and other logical elements. Thus, the hierarchy 3210 can be created to indicate the relationships between the containers and various hardware elements, such as nodes, servers, processors, cores, racks, power supplies, etc., on which those containers are currently being executed and if these relationships are pinned. Still further, the hierarchy 3210 can be used to indicate dynamically assignable containers and may even be used or manipulated by the user to perform reassign of dynamically assignable containers during runtime. In this case, the visualization service 3202, upon receiving an instruction to reassign a container to another logical and/or physical element, will instruct the orchestrator 222 of the reassignment and the orchestrator 222 will perform the reassign of the container (and any containers that are nested within or pinned to the reassigned container). Still further, the hierarchy 3210 can be created to indicate the run-time configuration (as performed by the orchestrator 222) of various logical and physical elements with respect to one another.

Figure 44:
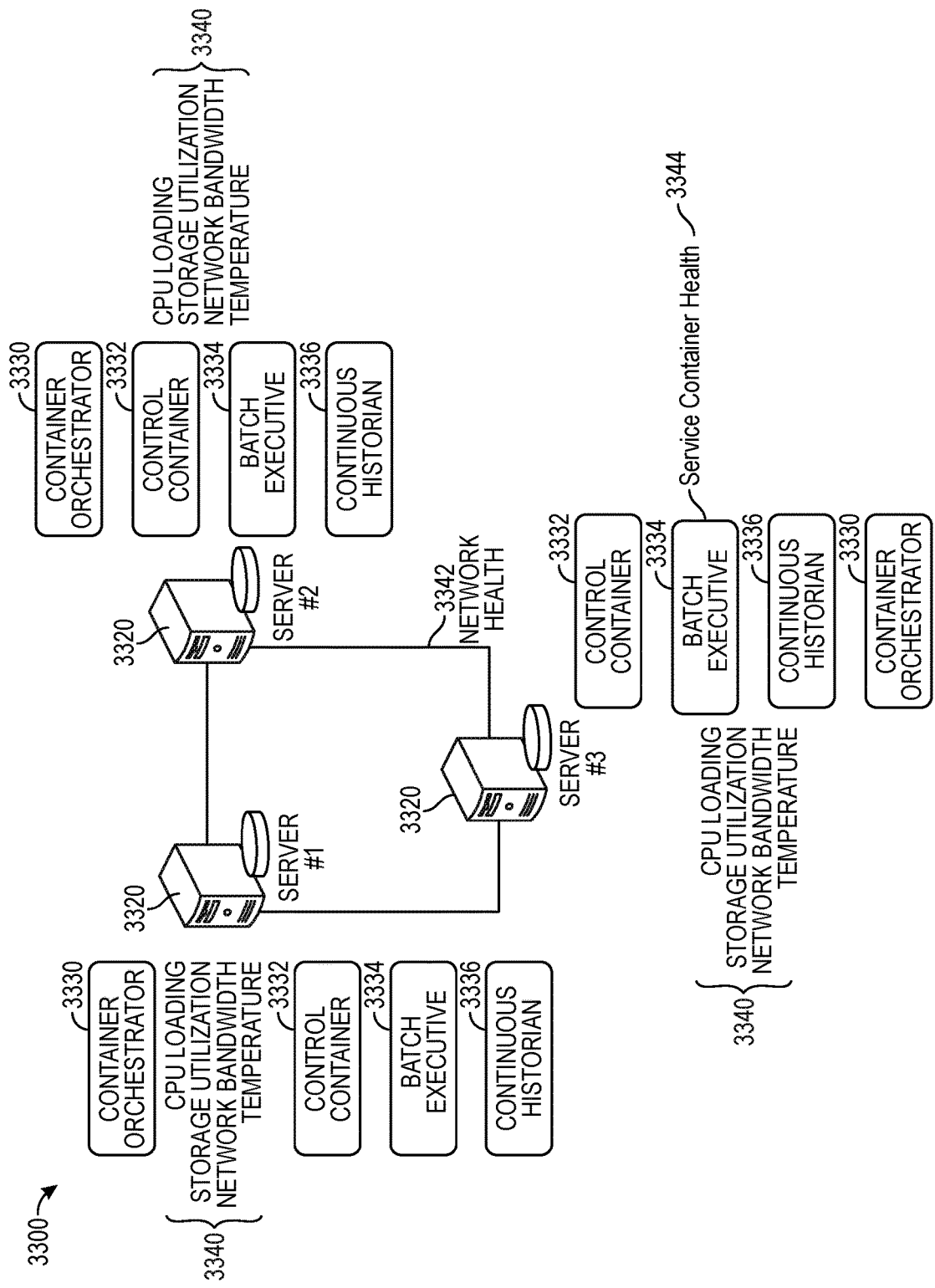
FIG. 44 depicts a second screen display that may be presented by the visualization service of FIG. 42 to illustrate configured and runtime interactions of logical elements currently implemented on a particular set of physical elements in the control system.

Of course, the visualization service 3202 may display relationships between logical elements (e.g., containers) and other logical elements and/or physical elements in other manners and may also include key performance and diagnostic indicators to enable a user to understand the current operational health or performance of the control system or any of the various components thereof. As an example, the visualization service 3202 of FIG. 42 may illustrate, for a user, the current configuration of each of a set of physical elements (e.g., nodes or servers of the system, such as all of the nodes of a particular compute cluster) by illustrating the physical elements in conjunction with the logical elements (containers) that are currently assigned thereto or are running thereon. In this case, the visualization service 3202 may also obtain and indicate physical element health, diagnostic and/or performance statistics or measures computed or determined by, for example, one or more of the utilities 252, 255, 258, 260 of FIG. 2. FIG. 44 illustrates an example user interface or display 3300 that may be created by the visualization service 3202 to illustrate a data cluster 3310 having three servers or nodes 3320 therein. The display 3300 also illustrates a set of containers or container types for each of the nodes 3320 and, in this case, includes a container orchestrator service 3330, a set of control containers 3332, a batch executive container 3334, and a continuous historian container 3336 in each of the nodes 3320. While not shown in FIG. 44, the visualization service 3202 may enable a user to drill down into each of the boxes 3332 to 3336 to see the various containers (e.g., control containers and any containers nested within or pinned to those control containers) and the subsystem containers 3334 and 3336 to view the logical elements currently executing on each of the respective servers 3320. Still further, the visualization service 3202 may present, on the display 3300, a set of performance indictors 3340 for each of the servers, including, for example, current CPU loading, storage utilization, network bandwidth, and core temperature. Of course, these are only a few example diagnostic or performance indicators that can be obtained and displayed for each of the servers or nodes 3320, and other performance and diagnostic information can be provided for the each of the hardware elements (servers or nodes 3320) as well or instead. Still further, the visualization service 3202 may display or provide other performance indicators such as a network health 3342 for the communication network in the cluster 3310 of FIG. 44 and may indicate performance indicators for logical elements such as a service container health 3344 for a batch executive in one of the servers 3320.

Again, the visualization service 3202 may enable a user to drill down into any of the elements 3330, 3332, 3334 and 3336 (or other containers such as third party containers, etc. displayed as being associated with any of the hardware elements 3320) to view the logical elements within those containers that are executing on the respective server or hardware node and one or more performance or diagnostic indicators for any of the sub-elements. The visualization service 3202 may also indicate sub-units of the physical elements that execute each of the sub-units of the logical elements, such as particular server processors or cores or blades or power supplies associated with or implementing the logical sub-units. This tool can thus provide a user with large-grain updates of the system as a whole from multiple aspects, such as from a logical view of controllers and I/O and their associated service containers, as well as a physical view of servers and physical resource management, and can also provide diagnostic information relating to the performance of the software defined control system or any part thereof at any particular time.

Figure 45:
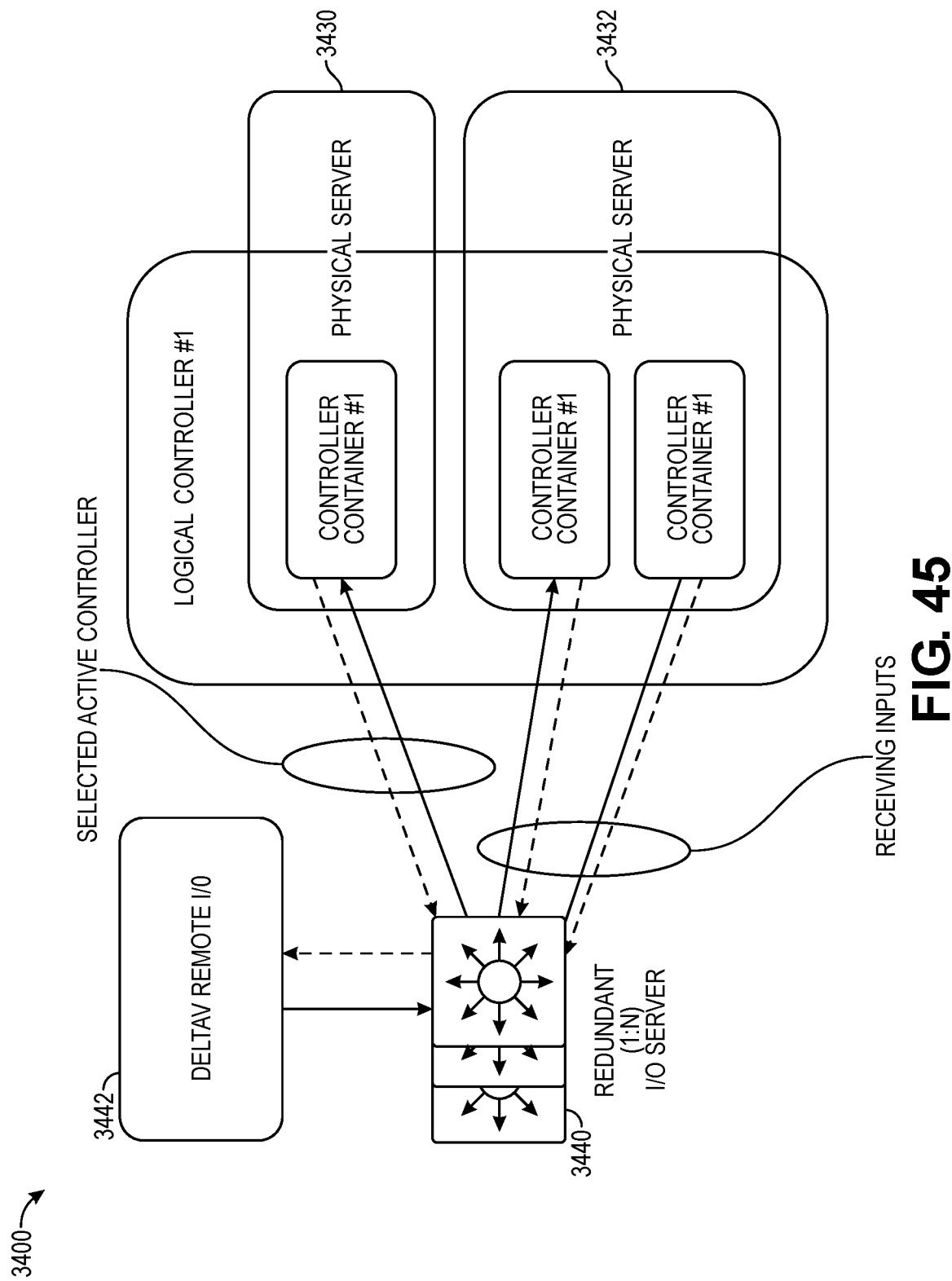
FIG. 45 depicts a third screen display that may be presented by the visualization service of FIG. 42 to illustrate configured and runtime interactions of physical elements associated with a particular or selected set of logical elements in the control system.

In another case, the visualization service 3202 may provide a diagram of logical elements or containers of the system or some sub-part of the system, and indicate the various physical elements on which these logical elements are currently running or executing. FIG. 45 depicts an example display 3400 that may be used to illustrate a logical element (in this case the Controller 1 container) and the manner which various logical sub-elements of the Controller 1 container are distributed in hardware at the current time during the performance of the control system. Thus, in the example display 3400 of FIG. 45, the logical Controller #1 is shown to include three redundant controller containers (Controller Container #1) wherein, for redundancy purposes, a first one of the Controller Container #1 instances is being executed on a Physical Server 3430 and the second and third ones of the Controller Container #1 instances are being executed on a different Physical Server 3432. Moreover, the diagram 3400 of FIG. 45 illustrates that the logical Controller #1 (including the three sub-containers nested therein or pinned thereto) communicate using a set of redundant I/O servers or I/O containers 3440 which are tied to a Remote I/O container 3442. The diagram 3400 also indicates which of the redundant Controller #1 instances is currently operating as the active controller or controller instance. If desired, the display 3400 of FIG. 45 could illustrate the particular hardware elements that are currently implementing the redundant I/O containers 3440, and/or the hardware device that is currently executing the remote I/O container 3442. Moreover, the visualization service 3202 may provide, in the display 3400, any of a desired set of performance indicators for any of the logical or physical elements depicted therein. Of course, FIG. 45 is but a simple example, and the diagram 3400 of FIG. 45 could be expanded to show any set of logical elements and the corresponding physical nodes or hardware on which these elements are currently running. Additionally, key performance and diagnostic indicators may be displayed in the diagram 3400 of FIG. 45 for each of the logical elements (and if desired the physical elements) depicted therein in any desired manner.

Figure 46:
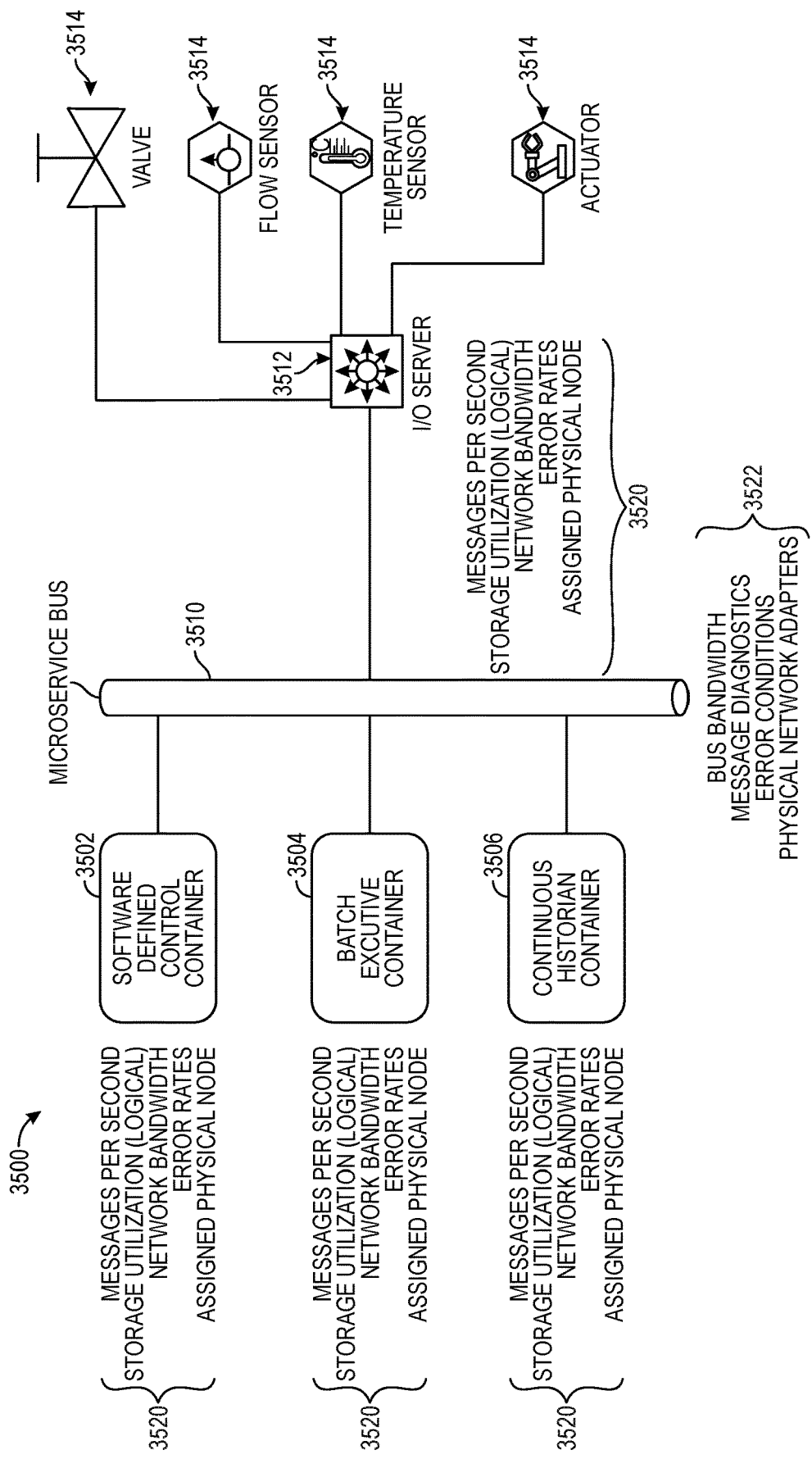
FIG. 46 depicts a fourth screen display that may be presented by the visualization service of FIG. 42 to illustrate configured and runtime interactions of logical and physical elements in the control system in addition to various performance indicators for each element.

FIG. 46 illustrates another visualization or display screen 3500 that can be provided by or created by the visualization service 3202 to indicate the current operational configuration and interaction of various logical and physical assets within the plant or control system as well as various performance and/or diagnostic indicators for each displayed element. The screen display 3500 illustrates a set of logical elements on the right-hand side including, in this example, a software defined control system container 3502, a batch executive container 3504 and a continuous historian container 3506. The diagram or interface screen 3500 illustrates that these logical elements are connected via a bus 3510 to an I/O server 3512 which is, in turn, coupled to a set of field devices 3514. Moreover, the diagram 3500 illustrates various different performance indicators 3520 (indicating performance of the elements of the control system as currently running) for each of the logical elements or containers 3502, 3504, and 3506, including, in this example a message per second indicator, a storage utilization indicator, a network bandwidth indicator, and an error rate indicator. Moreover, the diagram 3500 may including, in the list of performance indicators 3520, physical elements being used to implement the logical elements, such as an assigned physical node for each of the associated logical elements. However, this physical assignment indicator could indicate other physical hardware such as a server, a processor, a core, a blade, a power supply, etc. The diagram 3500 illustrates the same performance and diagnostic indicators for the I/O server container 3512 as well but could, of course, provide different performance and diagnostic indicators for this or any of the logical elements depicted therein. Still further, the diagram 3500 illustrates performance and diagnostic indicators 3522 for the bus 3510 in the form of a bus bandwidth, message diagnostics, and error conditions, and additionally indicates the physical network adapters that make up or that are being implemented as the bus 3510 over which the containers 3502, 3504, and 3506 are in communication with the I/O server container 3512 (which may be the actual I/O server). Of course, other performance and diagnostic indicators may be obtained and displayed as well. Thus, again, the visualization 3500 of FIG. 46 illustrates the manner in which various logical elements (containers) are connected and are implemented in physical hardware which implements these logical elements, and provides diagnostic or performance indicators for one or both of the logical and physical elements making up this part of the control system to assist a user in visualizing the operation of the software defined control system.

In each of these examples, the user interface or visualization service 3202 may show or illustrate the physical and logical configurations (and if desired associated performance data obtained via various different diagnostic services) as these physical and logical elements are being implemented by the container orchestrator and the software defined networking controller which manages all network traffic through the system. Moreover, any or all of the visualizations presented in these diagrams may use color maps to denote particular health levels and may provide recommender systems to recommend actions the user should take to alleviate perceived or detected issues within the software defined control system being visualized. Of course, it will be understood that FIGS. 43-46 illustrate but a few examples of the screens that could be used to display the manner in which various logical and physical elements are interacting and performing at any particular time during run-time of the control system, and that other visualizations could be used instead.

Other Considerations

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed is:

1. A software defined process control system (SDCS) to control an industrial process in a process plant, the SDCS comprising:
   a discovery service executing via a container on a compute node of the SDCS to:
      obtain an announcement indicative of a presence of a physical or logical asset of the process plant utilized during run-time of the process plant to control at least a portion of the industrial process;
      determine an identity of the physical or logical asset based on one or more parameters of the physical or logical asset indicated in the announcement, the one or more parameters including an asset tag of the physical or logical asset; and
      store, in a discovered item data store, a record of the discovered physical or logical asset, the record including an indication of the identity of the physical or logical asset, a set of capabilities of the physical or logical asset, and a location of the physical or logical asset within the SDCS.

2. The SDCS of claim 1, further comprising:
   a location service assigned to execute on a compute node of the SDCS to provide a response to a request by another item of the SDCS based on records stored in the discovered item data store.

3. The SDCS of claim 2, wherein the response to the request includes a network address for communicating with the physical or logical asset identified in the request.

4. The SDCS of claim 1, wherein the physical or logical asset is a field device, and the discovery service is further configured to:
   provide a record of the field device to an input/output (I/O) server in the SDCS for commissioning the field device.

5. The SDCS of claim 1, wherein the identity of the physical or logical asset is determined based on a plurality of parameters of the physical or logical asset indicated in the announcement.

6. The SDCS of claim 5, wherein the plurality of parameters of the physical or logical asset include two or more of: the asset tag of the physical or logical asset, a media access control (MAC) address of the physical or logical asset, a network address of the physical or logical asset, a cryptographic key for the physical or logical asset, a serial number for the physical or logical asset, or a name of a service or subsystem associated with the physical or logical asset.

7. The SDCS of claim 1, wherein the discovery service is further configured to:
   authenticate the physical or logical asset based on the one or more parameters of the physical or logical asset indicated in the announcement.

8. The SDCS of claim 7, wherein the discovery service authenticates the physical or logical asset by obtaining a public cryptographic key in the announcement, receiving a cryptographic signature from the physical or logical asset, and determining that the cryptographic signature proves that the physical or logical asset is in possession of a private cryptographic key associated with the public cryptographic key based on the cryptographic signature and the public cryptographic key.

9. The SDCS of claim 7, wherein the discovery service authenticates the physical or logical asset by obtaining a pre-shared key (PSK) in the announcement.

10. The SDCS of claim 1, wherein the discovery service is further configured to identify the set of capabilities of the physical or logical asset, wherein at least one of the set of capabilities of the physical or logical asset is indicated in the announcement.

11. The SDCS of claim 10, wherein to identify the set of capabilities of the physical or logical asset, the discovery service is configured to:
   automatically infer at least some of the set of capabilities of the physical or logical asset based on the identity of the physical or logical asset.

12. The SDCS of claim 11, wherein to automatically infer at least some of the set of capabilities of the physical or logical asset, the discovery service is configured to:
   provide the identity of the physical or logical asset to a context dictionary that determines a type of physical or logical asset based on the identity and associates the type of physical or logical asset to a class of contexts.

13. The SDCS of claim 10, wherein the set of capabilities of the physical or logical asset includes additional parameters obtainable from the physical or logical asset that were not included in the announcement.

14. The SDCS of claim 10, wherein the set of capabilities of the physical or logical asset includes additional services corresponding the physical or logical asset that were not included in the announcement.

15. The SDCS of claim 1, wherein the physical or logical asset is a field device.

16. The SDCS of claim 1, wherein the physical or logical asset is a control service.

17. The SDCS of claim 1, wherein the physical or logical asset is a container, a microcontainer, a compute node, a service, or an input/output (I/O) asset.

18. A method for providing discovery software as a service in a process plant, the method comprising:
   obtaining, via a discovery service executing via a container on a compute node within a software defined process control system (SDCS), an announcement indicative of a presence of a physical or logical asset of the process plant utilized during run-time of the process plant to control at least a portion of the industrial process;
   determining, by the discovery service, an identity of the physical or logical asset based on one or more parameters of the physical or logical asset indicated in the announcement, the one or more parameters including an asset tag of the physical or logical asset; and storing, in a discovered item data store, a record of the discovered physical or logical asset, the record including an indication of the identity of the physical or logical asset, a set of capabilities of the physical or logical asset, and a location of the physical or logical asset within the SDCS.

19. The method of claim 18, further comprising:
a location service assigned to execute on a compute node of the SDCS to provide a response to a request by another item of the SDCS based on records stored in the discovered item data store.

20. The method of claim 19, wherein the response to the request includes a network address for communicating with the physical or logical asset identified in the request.

21. The method of claim 18, wherein the physical or logical asset is a field device, and the discovery service is further configured to:
provide a record of the field device to an input/output (I/O) server in the SDCS for commissioning the field device.

22. The method of claim 18, wherein the identity of the physical or logical asset is determined based on a plurality of parameters of the physical or logical asset indicated in the announcement.

23. The method of claim 22, wherein the plurality of parameters of the physical or logical asset include two or more of: the asset tag of the physical or logical asset, a media access control (MAC) address of the physical or logical asset, a network address of the physical or logical asset, a cryptographic key for the physical or logical asset, a serial number for the physical or logical asset, or a name of a service or subsystem associated with the physical or logical asset.

24. The method of claim 18, wherein the discovery service is further configured to:
authenticate the physical or logical asset based on the one or more parameters of the physical or logical asset indicated in the announcement.

25. The method of claim 24, wherein the discovery service authenticates the physical or logical asset by obtaining a public cryptographic key in the announcement, receiving a cryptographic signature from the physical or logical asset, and determining that the cryptographic signature proves that the physical or logical asset is in possession of a private cryptographic key associated with the public cryptographic key based on the cryptographic signature and the public cryptographic key.

26. The method of claim 24, wherein the discovery service authenticates the physical or logical asset by obtaining an indication of a pre-shared key (PSK) in the announcement.

27. The method of claim 18, wherein the discovery service is further configured to identify the set of capabilities of the physical or logical asset, wherein at least one of the set of capabilities of the physical or logical asset is indicated in the announcement.

28. The method of claim 27, wherein to identify the set of capabilities of the physical or logical asset, the discovery service is configured to:
automatically infer at least some of the set of capabilities of the physical or logical asset based on the identity of the physical or logical asset.

29. The method of claim 28, wherein to automatically infer at least some of the set of capabilities of the physical or logical asset, the discovery service is configured to:
provide the identity of the physical or logical asset to a context dictionary that determines a type of physical or logical asset based on the identity and associates the type of physical or logical asset to a class of contexts.

30. The method of claim 27, wherein the set of capabilities of the physical or logical asset includes additional parameters obtainable from the physical or logical asset that were not included in the announcement.

31. The method of claim 27, wherein the set of capabilities of the physical or logical asset includes additional services associated with the physical or logical asset that were not included in the announcement.

32. The method of claim 18, wherein the physical or logical asset is a field device.

33. The method of claim 18, wherein the physical or logical asset is a control service.

34. The method of claim 18, wherein the physical or logical asset is a container, a microcontainer, a compute node, a service, or an input/output (I/O) asset.

* * * * *